(12) United States Patent
Jebari

(10) Patent No.: US 10,781,901 B2
(45) Date of Patent: Sep. 22, 2020

(54) MACHINE GENERATING CENTRIFUGAL FORCES FROM ECCENTRICS WITH VARIABLE RADIUS

(71) Applicant: Jamel Jebari, Cluny (FR)

(72) Inventor: Jamel Jebari, Cluny (FR)

(*) Notice: Subject to any disclaimer, the term of this patent is extended or adjusted under 35 U.S.C. 154(b) by 440 days.

(21) Appl. No.: 15/538,578

(22) PCT Filed: Dec. 24, 2015

(86) PCT No.: PCT/CA2015/000614
§ 371 (c)(1),
(2) Date: Jun. 21, 2017

(87) PCT Pub. No.: WO2016/101062
PCT Pub. Date: Jun. 30, 2016

(65) Prior Publication Data
US 2018/0003276 A1   Jan. 4, 2018

(30) Foreign Application Priority Data

Dec. 22, 2014  (CA) ..................... 2876220

(51) Int. Cl.

| F16H 33/20 | (2006.01) |
|---|---|
| F03G 3/00 | (2006.01) |
| F03G 7/10 | (2006.01) |
| F16C 3/22 | (2006.01) |
| F16C 3/18 | (2006.01) |
| H02K 53/00 | (2006.01) |

(52) U.S. Cl.
CPC .............. *F16H 33/20* (2013.01); *F03G 3/00* (2013.01); *F03G 7/10* (2013.01); *F16C 3/22* (2013.01); *F16C 3/18* (2013.01); *H02K 53/00* (2013.01)

(58) Field of Classification Search
CPC ... F16H 33/20; F03G 3/00; F03G 7/10; F16C 3/22; F16C 3/18; H02K 53/00
See application file for complete search history.

(56) References Cited

U.S. PATENT DOCUMENTS

| 5,832,788 A * | 11/1998 | Lopaska | F03G 3/00 74/574.3 |
|---|---|---|---|
| 5,860,317 A * | 1/1999 | Laithwaite | F03G 3/00 74/5.34 |
| 6,237,342 B1 * | 5/2001 | Hurford | F03G 3/00 60/721 |
| 6,694,844 B2 * | 2/2004 | Love | F03G 7/10 74/574.2 |
| 2002/0104392 A1 * | 8/2002 | Murray | F03G 3/00 74/84 S |

(Continued)

FOREIGN PATENT DOCUMENTS

| WO | WO-0146584 A2 * | 6/2001 | ............... F03G 3/00 |
|---|---|---|---|
| WO | WO-0220985 A2 * | 3/2002 | ............... F03G 3/00 |

*Primary Examiner* — Mohamad A Musleh
(74) *Attorney, Agent, or Firm* — Bekiares Eliezer LLP

(57) ABSTRACT

A generator (100) and/or machine (110) generating mechanical energy and functioning on the principle of exploitation of an energy allowing the existence of centrifugal forces (Fc) on masses (M) being displaced in rotation along an eccentric trajectory (150) within a system (130, 132, 166, 170, 190, 210) driving a progressive or sudden variation of their radius of rotation, principle of a generator of centrifugal forces from an eccentric with variable radius (100).

10 Claims, 79 Drawing Sheets

(56) References Cited

U.S. PATENT DOCUMENTS

| | | | | |
|---|---|---|---|---|
| 2003/0047015 A1* | 3/2003 | Kim | ............................ | F03G 3/00 |
| | | | | 74/22 R |
| 2003/0155770 A1* | 8/2003 | Clinch | ....................... | F03G 3/00 |
| | | | | 290/1 R |
| 2004/0219007 A1* | 11/2004 | Tavarez | ..................... | F03G 3/00 |
| | | | | 415/90 |
| 2012/0299308 A1* | 11/2012 | Kondo | ....................... | F03G 3/00 |
| | | | | 290/1 C |

\* cited by examiner

MACHINE GENERATING CENTRIFUGAL FORCES FROM ECCENTRICS WITH VARIABLE RADIUS

FIELD OF THE INVENTION

The present invention relates to the functioning principle of machines generating mechanical energy from energy being the basis or ground of the accelerated expansion of our Universe, and more specifically from centrifugal forces.

BACKGROUND OF THE INVENTION

Scientific Explanation

In the following paragraphs, there will be provided simple examples that will be in contradiction with the well known first principle of thermodynamics (the Law of Conservation of Energy) . . . . .

It is well known in physics that any body in movement has a tendency to follow a rectilinear trajectory as long as it is not deviated by an external force. This is why whatever trajectories (other than rectilinear) can exist only with introduction of external forces at different times and different locations, or continuously in the case of elliptical or circular trajectories.

In the following, we will focus on the trajectory of circular motion.

During this type of motion, the linear velocity (V), as shown in (FIG. 1), could be constant in value, but not in direction. The velocity vector, being by definition tangent to the (circular) trajectory is in a different direction at each moment. Hence, a body being in such a trajectory at constant velocity still undergo an acceleration (a"). This acceleration, permanently oriented towards the center of the circle around which the body moves, is being called centripetal acceleration. This acceleration allows the body to remain into its circular trajectory. From a dynamic stand point, the Fundamental Principle of Dynamics (Newton's $2^{nd}$ Law F=m·a") indicates therefore the presence of a radial force also oriented towards the center of the circular trajectory (Centripetal Force). The centripetal force is, following Newton's point of view, a real force that could have different origins, such as:

- exaggeration force (movement of neutrons);
- gravitation force (movement of planets); or
- tension force (circular movement of a body attached to a structure such as a stretched cord having the other end generally fixed, as shown in (FIG. 1)).

In the case shown in (FIG. 1), if the cord breaks at point (Cc), the centripetal force stops operating onto the body. One cannot refer to a circular motion from that point. The body will then follow, from that point on, a linear trajectory parallel to its tangential velocity at the time of rupture. This point of view is the one from an observer located outside from the rotating device (within a Galilean frame of reference). For an observer located at the center of the rotating device and rotating therewith (the reference frame therefore being non-Galilean), the ejection of the body is seen differently, as the effect of a force called centrifugal force (the centrifugal force is qualified as 'fictive' since it does intervene only into the rotating frame of reference to explain a subjective effect).

The above usual scientific explanation concerning circular motions, as acquired and taught in school, does not respond as to why a circular trajectory requires, to be realized, a centripetal force? This will put ourselves (with this specific case) in conflict with the first principle of thermodynamics (the Law of Conservation of Energy). But we all know that the law of conservation of Energy is inviolable (it cannot be negated or contradicted).

Problem

In the case shown in (FIG. 2), we will force a flying body into a circular trajectory without any mechanical link with the center of the trajectory.

We take the case of a physical body flying into deep space (such as a spacecraft) equipped with a thruster as schematically represented in (FIG. 2).

The thruster can rotate relative to the (center of inertia of the) body of the spacecraft, such that the thrust force can be directed according to the desired trajectory for the spacecraft.

The energy provided by the thruster E(z1,z2) (fixed amount of energy for a limited time duration, between points (z1 and z2 of (FIG. 2)) is stored into the mass of the spacecraft under the form of kinetic energy. This amount of energy, represented by thrusting force F1, allows the spacecraft to continue moving along a uniform rectilinear trajectory with a constant velocity (V)).

In order to follow a circular trajectory, the thruster have to be directed towards the center thereof, as to provide to the spacecraft a centripetal force required for a circular trajectory, therefore leading to the creation of the centripetal force (Fundamental Principle of Dynamics). But the acceleration can only come from a continuous input of energy. This is why, in this case, the thruster has to provide, without any interruption, a thrust oriented towards the center of the circular trajectory. This can only be done with a consumption of energy E(acc).

When the thruster stops providing a thrust, at point (Ptc) of (FIG. 2), the centripetal acceleration stops, and therefore, the centripetal force disappears, and the spacecraft then follows a rectilinear trajectory (from point (Ptc) towards point (z3) of (FIG. 2)) with its uniform velocity (V).

Let's do the balance of energy Σ(E) between points (z1 and z3), a distance formed by the following trajectories [a rectilinear one (z1→z2), (n) times a circular one and another rectilinear one (Ptc→z3)].

The thrusters provided two different amounts of energy, [E(z1,z2)] and [E(acc)].

$$\text{Provided Total Energy} = E(z1,z2) + E(acc)$$

The kinetic energy of the spacecraft during its overall trajectory has always remained constant and equal to the amount of energy supplied between points (z1 and z2), namely E(z1,z2) [uniform motion with constant velocity (V) between points (z2) and (z3)], and this gives us the following formula of the balance of energy:

$$\Sigma(E) = E_{(Z1,Z2)} - [E_{(Z1,Z2)} + E_{(acc)}]$$

$$\Sigma(E) = -E_{(acc)} < 0$$

The above formula indicates that there is a loss of energy, and this contradicts the Law of Conservation of Energy.

The energy E(z1,z2) is not lost since it is stored into the inertia of the spacecraft under the form of kinetic energy, and this is what allows the spacecraft to have its uniform movement. But the energy E(acc) has been used to provide a circular trajectory to the spacecraft, and is lost since this energy is not stored anywhere and under no form of energy!!!!

Therefore, if we do find where this lost energy went, we will have a problem with the law of conservation of energy, since the energy cannot be neither lost or generated, it can only be transformed from one form to another.

We are forced to modify the formula of the balance of energy such that it becomes into agreement with the first principle of Thermodynamics (the law of conservation of energy), by adding the term $\{E'(acc)\}$:

$$\Sigma(E) = E_{(Z1,Z2)} - [E_{(Z1,Z2)} + E_{(acc)}] + E'_{(acc)} = 0$$

$\{E'(acc)\}$ must be an amount of energy equal, in value, to the one that induced the centripetal acceleration E(acc) (the lost energy), and that must generate a force opposing to the centripetal force, namely a centrifugal force.

This could explain the presence of an unknown energy to us, as of today, which we did not take into account and that we have to counteract, with an input of energy (centripetal acceleration), in order to obtain the desired circular trajectory.

As a remark, one (as some scientists!) may think that the centripetal force (in the case of (FIG. 2)), which is perpendicular to the direction of the displacement (direction of the velocity (V)), does not displace the body (spacecraft flying in deep space) towards the center of circular trajectory, which would therefore not transfer any energy to the body (under the form of kinetic energy) and that the energy provided by the thruster (at the origin of the centripetal acceleration) has only been used to maintain said body in the circular trajectory and that it is not lost since it has generated a pressure at the base of the exhaust of the thruster. This reasoning does not take into account that the thruster consumes energy to generate a centripetal acceleration, hence a centripetal force F, and that any external force applied to a physical body generates a displacement of the body into the direction of the external force except in the case of that external force being cancelled because of a direct contact of that body (as against another physical body) or, in the case of absence of any physical contact (as in the case of (FIG. 2)), because of the existence of an equal (in magnitude) force in the same orientation but opposite to the external force, hence a centrifugal force in the present case of (FIG. 2). The fact that there is no direct contact of the body with another body in the direction towards the center of the circular trajectory must mean that that this centrifugal force is not there in reaction to the centripetal force, but is therefore only due to a centrifugal acceleration that is due to a specific energy.

Not considering the presence of this specific energy, into our scientific explanation of the circular movement, will inevitably imply, in the case looked at in the (FIG. 2), a conflict with the law of conservation of energy.

What kind of energy is this unknown energy?

How does it act? Etc.

It is to this kind of questions that modern Physics needs to respond to, in order to solve this problem of conflict with the law of conservation of energy.

Effectively, we know, to date, that our Universe is in constant expansion because of the observation from Edwin Hubble in 1929. In 1998, two teams of astronomers, the Supernova Cosmology Project and the High-Z Supernovae Search Team, directed by Saul Perlmutter and Brian P. Schmidt, respectively, got to the unexpected result of the fact that the expansion of the Universe seems to accelerate (a movement that can only be obtained with an input of energy). This result is surprising since there does not exist, to date, any theory to interpret such phenomenon. It implies, effectively, the existence of a unknown form of "matter" (energy) which 'pressure' is negative, with a repulsive behaviour, and not attractive, relative to the gravity. This hypothetical and unusual form of "matter" (energy), of unknown nature, usually called dark (or black) energy, represents to date one of the unsolved problems of modern Cosmology.

The dark energy enables the fact that all points of our Universe move away from one another. This automatically implies that each direction inside our Universe is an expansion direction.

Let's place ourselves inside a zone of the Universe located away from any gravitational field. If we consider, within this zone, a point (Po) of the Universe as the origin of a rectilinear frame, in such a case, any other point of the Universe (relative to this origin point (Po)) would be moving with an accelerated movement away, within said frame, from its origin (Po). This implies that any body (C) or object, having a mass and being anywhere but at the origin point (Po), will be displaced by the expansion of the Universe with its accelerated movement, and in such a case, one may state:

that, relative to the origin point (Po), the body (C) has a quantity of kinetic energy since it has a mass and it moves away with an expansion velocity (Vexp); and that the body (C) follows a rectilinear direction formed of a straight line extending through the center of inertia of the body and the origin point (Po).

This indicates to us that, under the effect of the expansion of our Universe, any body in motion has a tendency to follow a rectilinear direction as long as no external force is being applied to it forcing it to change its trajectory. On the other hand, for a body to maintain itself onto a rectilinear trajectory, the body has to be into a perfect dynamic equilibrium within said trajectory. This equilibrium is assured by the expansion velocity (Vexp) due to the driving of and body by the expansion of our Universe.

To change the direction of the trajectory of a body is essentially equivalent to move the body out from the expansion direction it is on and to place it onto another expansion direction (any direction inside our Universe is an expansion direction). This cannot be done without the implication of the effect of the kinetic energy due to the expansion velocity (Vexp) that maintains said body into a dynamic equilibrium (into the expansion direction which it is already into).

To change the direction of a body (or its state of movement in general), the beginning is to move it out from the equilibrium of the expansion direction it is into, and this cannot be done without any input from us of an amount of energy (in order to cancel the effect of this equilibrium that provides a resistance, of any body, to a modification of its state of movement).

That is what we mean by the inertia of a body having a mass. We have always considered the inertia of a body as a specific property of the body itself, although the inertia is in fact due to the driving by the expansion of the Universe within its movement (i.e. it is due to the dark energy). If our Universe would be stationary (without accelerated expansion), the bodies would not have any inertia, no matter what their mass would be.

We all know that any trajectory is a series of straight segments, more or less elongated, of different directions. This also means that any trajectory is composed of successive passages into multiple expansion directions (the rectilinear trajectory being an oscillation contained along a theoretical straight line).

A circular trajectory, as the one of (FIG. 2), is made via rectilinear segments of a same length (that could be in the order of the Planck length: $1.616 \times 10^{-35}$ m) having between adjacent ones the same infinitesimal angle ($\psi$), as shown in (FIG. 3).

To mathematically formulate the equilibrium forces that we have to overcome in order to have a body into circular movement being displaced from one straight segment to the following one, we apply to this body a force that will not modify the value of its uniform velocity (see (FIGS. 3 & 4)).

Explanation

From point (P(i−1)) of (FIG. 4), we apply onto the body under uniform circular movement (constant velocity (V)) an arbitrary force (F) which component (fy) (along the (y) direction) is opposing to its movement, and which component (fx) (along the (x) direction) is perpendicular to the direction of movement towards the center of the circular trajectory. All this in such a way that the body is being displaced at point (P(i+1)) with the same velocity (V).

Let's apply the first principle of Thermodynamics (law of conservation of energy):

Along the (x) axis:

$$f_x \times D = \frac{1}{2} \times M \times V_x^2 \quad \text{(Eq. 1)}$$

Along the (y) axis:

$$\left(\frac{1}{2} \times M \times V^2\right) - (f_y \times L) = \frac{1}{2} \times M \times V_y^2 \quad \text{(Eq. 2)}$$

At point P(i+1)), we have:

$$V_x = V \times \mathrm{SIN}(\psi) \quad \text{(Eq. 3)};$$

$$V_y = V \times \mathrm{COS}(\psi) \quad \text{(Eq. 4)}$$

And we also have:

$$D = R \times (1 - \mathrm{COS}(\psi)); \quad \text{(Eq. 5)}$$

$$L = R \times \mathrm{SIN}(\psi) \quad \text{(Eq. 6)}$$

From equations (1, 3 and 5), we get:

$$f_x = \frac{M \times (V \times \mathrm{SIN}(\psi))^2}{2 \times R \times (1 - \mathrm{COS}(\psi))} \quad \text{(Eq. 7)}$$

And from equations (2, 4 and 6):

$$f_y = \frac{M \times V^2 \times (1 - \mathrm{COS}^2(\psi))}{2 \times R \times \mathrm{SIN}(\psi)} \quad \text{(Eq. 8)}$$

Equation (Eq. 7) gives:

$$f_x = \frac{M \times V^2 \times (1 + \mathrm{COS}^2(\psi))}{2 \times R} = \frac{M \times V^2}{R} \times \frac{(1 + \mathrm{COS}(\psi))}{2}$$

$$\boxed{f_x = \frac{M \times V^2}{R} \times \frac{(1 + \mathrm{COS}(\psi))}{2}}$$

Equation (Eq. 8) gives:

$$f_y = \frac{M \times V^2 \times \mathrm{SIN}(\psi)}{2 \times R} = \frac{M \times V^2}{R} \times \frac{\mathrm{SIN}(\psi)}{2}$$

$$\boxed{f_y = \frac{M \times V^2}{R} \times \frac{\mathrm{SIN}(\psi)}{2}}$$

To force the deviation of a body into rectilinear movement with a uniform velocity (V), one has to cancel, in a first step, the effect of the equilibrium forces due to the expansion of Space. To this end, we need to apply the following forces:

Along the direction of movement and opposed thereto:

$$f_y = \frac{M \times V^2}{R} \times \frac{\mathrm{SIN}(\psi)}{2}$$

Along the direction perpendicular to direction of the movement and towards the center of the curvature:

$$f_x = \frac{M \times V^2}{R} \times \frac{1 + \mathrm{COS}(\psi)}{2}$$

It is noted that for a deviation angle ($\psi$) equal to zero (hence R=+∞) ("rectilinear" movement), both forces become null, and for obtaining a deviation into the direction of movement by an infinitesimal angle, we should provide:

Along the direction of movement, an opposing force of:

$$f_y = 0,00\ldots01 \times \frac{M \times V^2}{R} \approx 0$$

$$\boxed{f_y \approx 0}$$

(This force being essentially null, but the energy provided (to generate it), once cumulated in a long term, may become significant).

Along the direction perpendicular to direction of the movement and towards the deviation a force of:

$$f_x = 0,99\ldots99 \times \frac{M \times V^2}{R} \approx \frac{M \times V^2}{R}$$

$$\boxed{f_x \approx \frac{M \times V^2}{R}}$$

We find the formula of the force usually called "centrifugal force" (which we do not really understand what it represents)!

Note:

Along an arc of a circle (non-linear trajectory), there is as many different forces of expansion equilibrium (centrifugal forces) as there is deviations ($\psi$). It is the fact that they all have the same value that forces us to believe that it is the same constant force.

Forces (fx) and (fy) represent the transformation of energy required (hence an energy to supply) to enable the deviation of a material body from its trajectory.

This means that any body within our Universe is into dynamic equilibrium relative to the expansion of the Universe, because of the two following forces:

$$1 - \boxed{f_1 = \frac{M \times V^2}{R} \times \frac{\mathrm{SIN}(\psi)}{2}}$$

($f_1$) is in the direction of the movement $$2 - \boxed{f_2 = \frac{M \times V^2}{R} \times \frac{(1 + \mathrm{COS}(\psi))}{2}}$$

($f_2$) is in a direction perpendicular to the one of the movement

Both forces oppose to any variation of the equilibrium they maintain.

Remarks:

As any direction we try to impose to a body cannot be the expansion direction of the body at that time (probability=1/+∞), the effects of these two equilibrium forces are therefore always merged to one another.

As the deviation angle ($\psi$) is always infinitesimal, it is essentially the value of ($f_2$) that appears into our calculations of practical cases, since, in fact, the value of ($f_1$) is essentially equal to zero.

The above scientific clarifications, concerning the movement along a circular trajectory, allow us to distinguish the differences there is between the two cases of (FIGS. 1 & 2).

In the case of (FIG. 1), the equilibrium forces of expansion bring a centrifugal force that is cancelled out by a centripetal reaction due to the mechanical link (link between the rotating body and the center of rotation). This is why if we would increase the rotational velocity, this would increase the values of the equilibrium forces of expansion (centrifugal forces) and the mechanical link would end up breaking under the traction effect the centrifugal forces would provide. In this case, the centripetal force is the reaction to the equilibrium forces of expansion (centrifugal forces) due to the mechanical link.

In the case of (FIG. 1), the equilibrium forces of expansion (centrifugal forces) are cancelled by a centripetal force due to the input of energy from the thrusters of the spacecraft. This is for this reason that the provided energy, for the creation of this centripetal force, would never be stored, since it is cancelled out by the expansion energy (black energy) that is the ground or origin of the equilibrium forces of expansion. Therefore, we do not have anymore any conflict with the law of conservation of energy.

Generation of Centrifugal Forces by Eccentrics with Variable Radius

Functioning Principle

Let's take the case of (FIG. 5)—that has been experimentally verified by the inventor of the present invention—that has confirmed all of the preceding scientific explanations.

It is a case in which a body (Ce) of mass (Me) is forced to follow a trajectory other than rectilinear over a specific distance (between points (P1) and (P2)), without having any centripetal force acting thereon, such that we can recuperate the kinetic energy stored therein and that is due to the equilibrium forces of expansion (commonly called centrifugal forces).

To do this, we take advantage of the fact that the equilibrium forces of expansion are always central (in a direction extending through the center of rotation). This enables us to generate a circular movement with no loss of energy, since the energy provided to generate the rotation will be stored in the form of kinetic energy into the inertia of the mechanical system put under motion. This will be done via a torque driving a body (Ce) of mass (Me) into rotation, via the agency of perpendicular shaft (Ae) and arm (Bp) (see (FIG. 5)).

The input torque provides to the body (Ce) a force (Ft) tangent to its trajectory.

This force (Ft) is therefore perpendicular to the equilibrium forces of expansion (Fc) (centrifugal forces) that are always central (i.e. a direction of which that extends through the axis of rotation). This particularity does not allow the centrifugal forces to generate a torque that could either oppose or add up to the input torque providing the movement of rotation. Hence, there is a total independence between the (mechanical) works that that can be generated by the two forces (Ft) and (Fc) since they are always perpendicular to one another. This is this particularity that enables the obtaining of the movement of rotation without losing the energy used to generate it.

The arm (Bp), in rotating about the shaft (Ae), brings along the body (Ce) of mass (Me) with its movement while forcing the body, because of the mechanical link there between, into endless deviations.

The mechanical link between the arm (Bp) and the body (Ce) allows a translation of the latter along said arm (Bp) according to a central (radial) direction. This degree of freedom of the body (Ce), relative to the arm (Bp), prevents the existence of a centripetal reaction that could cancel out the equilibrium forces of expansion (centrifugal forces). This has two consequences:

1—the impossibility of the existence of a centripetal force makes the circular trajectory of the body (Ce) impossible; and 2—under the effect of the equilibrium forces of expansion, the body (Ce) will have a movement of translation relative to the arm (Bp), into a central direction (the direction of the equilibrium forces of expansion) and into a centrifugal orientation (from point (P1) towards point (P2)—see (FIG. 5)), and this, until said body (Ce) quits the arm (Bp), at point (P2).

The movement of body (Ce) along arm (Bp), from point (P1) up to point (P2), is done under the effect of equilibrium forces of expansion (centrifugal forces) (Fc). This displacement of body (Ce) is due to the work (Te), given by:

$$T_e = F_c \times (r_{(P2)} - r_{(P1)})$$

where ($r_{(P1)}$) is the radius at point (P1) and ($r_{(P2)}$) is the radius at point (P2).

This work (due to the expansion of our Universe, therefore to the black energy) is then stored into the body (Ce) under the form of kinetic energy that can be exploited (any body in movement contains kinetic energy due to its mass and its velocity of displacement).

Important Remark:

The displacement of body (Ce), along arm (Bp), from point (P1) to point (P2), increases its moment of inertia relative to the center of rotation (Ae). It is therefore required to supply more energy to the mechanical system [formed by shaft (Ae), arm (Bp), and body (Ce)] if we want to keep a constant rotational or angular velocity (We). This additional energy to supply (via the rotational input torque) will be entirely stored into the body (Ce), under the form of kinetic energy. Effectively, at point (P1), the body (Ce) stores an amount of kinetic energy proportional to the square of its tangential velocity [V(P1)t]. By increasing its radius from (r(p1)) to (r(p2)), its tangential velocity must increase to

[V(P2)t] if we want to maintain the rotational velocity (ωe) constant, which forces us to supply, an additional amount of energy equal to:

$$\Delta E_{(Me)t} = \frac{1}{2} \times M_e \times (r_{(P2)}^2 - r_{(P1)}^2) \times \omega_e^2$$

This amount of energy is entirely stored into the body (Ce) since it has solely been used to increase its tangential velocity from [V(P1)t] to [V(P2)t]. Hence, the whole kinetic energy stored into the body at point (P2) is:

$$E2_{(Me)t} = \frac{1}{2} \times [I_{ce} + M_e \times (r_{(P2)}^2)] \times \omega_e^2$$

Where $(I_{Ce})$ is the moment of inertia of body (Ce) relative to its own center of inertia.

The whole mechanical system operates as a flywheel and stores the energy that forces its rotation, this as long as no other external torque opposes to its movement.

In the present case, the equilibrium forces of expansion (centrifugal forces) have a central direction (extending through the axis of rotation), hence they cannot generate a torque opposing or adding up to the supplied input torque used to rotate the mechanical system.

Therefore, we have a total independence between the energy used to rotate the mechanical system [even though if its overall inertia varied because of the displacement of body (Ce) along arm (Bp)] and the work of the equilibrium forces of expansion (centrifugal forces) used to displace body (Ce) along arm (Bp), from point (P1) to point (P2).

This allows us to detail the balance of energy of the mechanical system of (FIG. 5), after body (Ce) quits the arm (Bp) at point (P2), in the following manner: [in order to simplify the understanding, we will neglect the resistive frictional forces]

Supplied Energies:
An input of energy (E1$_{supplied}$) allows the whole mechanical system to reach the rotational velocity (ωe) and to keep it constant until body (Ce) quits the arm (Bp) at point (P2).

$$E1_{supplied} = \frac{1}{2}[I_{Ae} + I_{Bp} + (I_{Ce} + M_e \times r_{(p2)}^2)] \times \omega_e^2$$

Where $(I_{Ae})$ is the moment of inertia of the shaft (Ae) relative to the center of rotation of the mechanical system; $(I_{Bp})$ is the moment of inertia of the arm (Bp) relative to the center of rotation of the mechanical system; $(I_{Ce})$ is the moment of inertia of the body (Ce) relative to its own center of inertia; $(r_{(p2)})$ is the radius at point (P2); and $(M_e)$ is the mass of body (Ce).

Stored and Recoverable Enemies:
1—/ Body (Ce):
On one hand, body (Ce) of mass (Me) has been displaced (translation relative to the arm (Bp) from point (p1) to point (P2). Its velocity at point (P2), whose direction is central, reaches a velocity $(V_{(Me)a})$.
We may state that body (Ce), at point (P2), stored an amount of kinetic energy $(\Sigma 2_{(Me)a})$ equal to:

$$E2_{(Me)a} = \frac{1}{2} \times M_e \times V_{(Me)a}^2$$

where $(V_{(Me)a})$ is the velocity of the body (Ce) when quitting the arm (Bp) at point (P2), in a central direction extending through the axis of rotation.

On the other hand, body (Ce) of mass (Me) has been forced into rotation about the shaft (Ae) with a constant rotational speed (We) (in spite of the variation of its radius from point (P1) to point (P2)).

Because of its inertia $(I_{Ce} + M_e \times r_{(p2)}^2)$ relative to the center of rotation, it has stored another amount of energy (E2$_{(Me)t}$) equal to:

$$E2_{(Me)t} = \frac{1}{2} \times (I_{ce} + M_e \times r_{(P2)}^2) \times \omega_e^2$$

2—/ The mechanical system, after the separation from body (Ce) has an amount of energy (E3$_{(Ae+Bp)}$) equal to:

$$E3_{(Ae+Bp)} = \frac{1}{2}(I_{Ae} + I_{Bp}) \times \omega_e^2$$

Balance of Energy:
The balance of energy [Σ(E)] is therefore:

$$\sum(E) = E2_{(Me)a} + E2_{(Me)t} + E3_{(Ae+Bp)} - E1_{supplied}$$

$$= \left[\frac{1}{2} \times M_e \times V_{(Me)a}^2\right] + \left[\frac{1}{2}(I_{Ce} + M_e \times r_{(p2)}^2) \times \omega_e^2\right] + \left[\frac{1}{2}(I_{Ae} + I_{Bp}) \times \omega_e^2\right] - \left[\frac{1}{2}[I_{Ae} + I_{Bp} + (I_{Ce} + M_e \times r_{(p2)}^2)] \times \omega_e^2\right]$$

$$\sum(E) = \left[\frac{1}{2} \times M_e \times V_{(Me)a}^2\right] > 0$$

Accordingly, we are in front of a positive balance of energy that contradicts the law of conservation of energy, similarly to the case of (FIG. 2), but, in the present case, it is not a loss of energy, but rather a gain of energy. This is due to the same reason as in the case of (FIG. 2), that is:

In the case of a body with a non-rectilinear movement, we have to add, into the calculations of the balance of energy, the work of the equilibrium forces of expansion (centrifugal forces) to the supplied input energy. Otherwise, our expression of the balance of energy would be wrong (incomplete) and would cause a problem relative to the first principle of Thermodynamics (law of conservation of energy).

The balance of energy [Σ(E)] should therefore be expressed as follows:

$$\Sigma(E) = (E2_{(Me)a} + E2_{(Me)t} + E3_{(Ae+Bp)}) - (E1_{supplied} + T_e)$$

with $T_e = F_c \times (r_{(P2)} - r_{(P1)})$ being the work of the equilibrium forces of expansion that acted onto the body (Ce) for its displacement, along arm (Bp), from point (P1) to point (P2), therefore allowing the body (Ce) to store the amount of kinetic energy E2$_{(Me)a}$. We therefore have:

$$T_e = F_c \times (r_{(P2)} - r_{(P1)}) = \frac{1}{2} \times M_e \times V_{(Me)a}^2$$

In adding the work (Te) to the supplied input energy, we obtain a balance of energy complying with the law of conservation of energy:

$$\Sigma(E) = (E2_{(Me)a} + E2_{(Me)t} + E3_{(Ae+Bp)}) - (E1_{supplied} + T_e) = 0$$

This work $$T_e = F_c \times (r_{(P2)} - r_{(P1)}) = \frac{1}{2} \times M_e \times V_{(Me)a}^2$$

is due, originally, to the black energy that will be exploited by the invention of the present application.

Accordingly, there is a need for a generator of centrifugal forces from eccentrics with variable radius, and the machine made therewith.

SUMMARY OF THE INVENTION

It is therefore a general object of the present invention to provide a generator of centrifugal forces from eccentrics with variable radius, and the machine made therewith.

It is noted that for the purpose of the present application, an eccentric with variable radius refers to any closed trajectory having a varying radius relative to the center of rotation, as it may include, as an example, but not limited to, a circular trajectory with a center of rotation offset from the geometric center of the circle. Furthermore, the trajectory, unless specifically mentioned otherwise, is intended to be the trajectory of the center of inertia (or gravity) of the mass of the body following the trajectory. Furthermore, the body following the trajectory could be any type of body, including a solid body (or a plurality of bodies), a fluid (liquid and/or gaseous), or any combination thereof, depending on the embodiment of the invention being considered.

The present invention refers to a generator of centrifugal forces from eccentrics with variable radius (GCFEVR) or a machine (MGCFEVR) including at least one such GCFEVR.

An advantage of the present invention is that the generator (GCFEVR) and/or machine (MGCFEVR) uses the centrifugal forces (Fc) generated onto masses (M) to provide available output power, without the use of any drawback such as availability of the power source, weather condition or the like, since the centrifugal forces (Fc) are always available, wherever on the entire Universe.

Another advantage of the present invention is that the generator (GCFEVR) and/or machine (MGCFEVR) can produce either an output torque or an output thrust, depending on the mounting of the generator(s) onto the carrying structure.

A further advantage of the present invention is that the generator (GCFEVR) and/or machine (MGCFEVR), with rotating movement, can generate electrical energy by having the power torque feeding an electric generator, and/or can be an engine for all types of ground vehicles and others.

Yet another advantage of the present invention is that the generator (GCFEVR) and/or machine (MGCFEVR), with linear movement, can be easily applied as a thrusting force to any transit vehicle essentially following a track such as ferries, boats, trains, etc., as an engine for the aerospace field, as for spacecrafts, or for watercrafts, or underwater vehicles, etc., and also as a way to cancel the gravitational weight of a body, by providing the thrusting force in a direction opposite to that of the gravity. In operation, the generator (GCFEVR) and/or machine (MGCFEVR) is totally independent of any specific environment it is located in.

Yet a further advantage of the present invention is that the generator (GCFEVR) and/or machine (MGCFEVR) exploits a source of energy which: is endless; is everywhere in the Universe (therefore exploitable outside of the atmospheric environment, and no need of carrying it); is completely green (without any pollution while operating); is easy to access; is usable by everyone; and is almost free (of charge).

According to an aspect of the present invention, there is provided a generator of centrifugal forces from an eccentric with variable radius (GCFEVR) for mounting on a chassis (Ch) having a mechanical energy transmission mechanism (METM) and a rotating shaft plate (Pcs, Pls) mounting thereon, the mechanical energy transmission mechanism (METM) having at least a section of a bore (Tpi) formed thereon, said generator (GCFEVR) comprising:

a rotating shaft (Axt) for freely rotatably connecting to the rotating shaft plate (Pcs, Pls), said rotating shaft (Axt) including a mass driving member (Mte) rotatably integral therewith and driving in rotation at least one mass (M) along an eccentric closed trajectory (Traf) linkable to the mechanical energy transmission mechanism (METM), said eccentric closed trajectory (Traf) being one of the at least a section of the bore (Tpi) and a mass support member (SuM) mountable into the at least a section of the bore (Tpi); said eccentric closed trajectory (Traf) including a varying radius of a position of said at least one mass (M) therealong about said rotating shaft (Axt), said eccentric closed trajectory (Traf) allowing the mechanical energy transmission mechanism (METM) to carry at least a portion of a centrifugal force (Fc) generated by said at least one mass (M) over the at least a section of the bore (Tpi) when said at least one mass (M) is displaced along said varying radius about said rotating shaft (Axt); and a shaft driving system (sds) selectively driving the rotating shaft (Axt) and the mass driving member (Mte) within the at least a section of the bore (Tpi).

Conveniently, the rotating shaft plate (Pcs, Pls) is a second plate (Pcs, Pls), and the mechanical energy transmission mechanism (METM) includes a first plate (Pci, Pli) having the at least a section of a bore (Tpi) formed therein.

According to another aspect of the present invention, there is provided a machine generating mechanical energy by exploiting the generation of centrifugal forces (MGCFEVR) typically comprising:

a chassis (Ch) having a mechanical energy transmission mechanism (METM) and a rotating shaft plate (Pcs, Pls) mounting thereon, the mechanical energy transmission mechanism (METM) having at least a section of at least one bore (Tpi) formed thereon; and at least one generator (GCFEVR) as defined hereinabove rotatably mounting on the rotating shaft plate (Pcs, Pls) with the eccentric closed trajectory (Traf) being one of the at least a section of the at least one bore (Tpi) and a mass support member (SuM) mountable into the at least a section of the at least one bore (Tpi), said eccentric closed trajectory (Traf) allowing the mechanical energy transmission mechanism (METM) to carry at least a portion of a centrifugal force (Fc) generated by said at least one mass (M) over the at least a section of the at least one bore (Tpi) when said at least one mass (M) is displaced along said varying radius about said rotating shaft (Axt), said at least a portion of the centrifugal force (Fc) being available for transmission as an output energy from said machine generating mechanical energy by exploiting the generation of centrifugal forces (Fc).

Conveniently, the rotating shaft plate (Pcs, Pls) is a second plate (Pcs, Pls), and the mechanical energy transmission mechanism (METM) includes a first plate (Pci, Pli) having the at least a section of a bore (Tpi) formed therein.

Conveniently, the machine (MGCFEVR) further includes an eccentric adjustment system (Eas) selectively adjusting a position of the eccentric closed trajectory (Traf) of the at least one generator (GCFEVR) relative to the at least one bore (Tpi), and being operatively located between the at least one generator (GCFEVR) and the first plate (Pci, Pli).

In one embodiment, the first plate (Pci, Pli) is movably mounted on the chassis (Ch), and the eccentric adjustment system (Eas) is a shifting mechanism (Sddp) selectively displacing the first plate (Pci, Pli) relative to the second plate (Pcs, Pls) and being operatively located therebetween.

In one embodiment, the eccentric adjustment system (Eas) is a mass support rotation system (Srst) selectively displacing the mass support member (SuM) relative to the at least one bore (Tpi) and being operatively located therebetween.

In one embodiment, the machine (MGCFEVR) further includes a main shaft (Axf) freely rotatably mounted onto the chassis (Ch) with the first (Pci, Pli) and second (Pcs, Pls) plates mounted thereon, the main shaft (Axf) and the first (Pci, Pli) and second (Pcs, Pls) plates forming a rotor assembly (Rot), thereby defining a machine (MGCFEVR) with rotating movement.

Conveniently, one of the first (Pci, Pli) and second (Pcs, Pls) plates is freely rotatably mounted onto the main shaft (Axf) and the other one of the first (Pci, Pli) and second (Pcs, Pls) plates is fixedly mounted onto the main shaft (Axf), the machine (MGCFEVR) further including a shifting mechanism (Sddp) being operatively located between the first (Pci, Pli) and second (Pcs, Pls) plates and selectively displacing the first (Pci, Pli) and second (Pcs, Pls) plates relative to one another in rotation about the main shaft (Axf), so as to selectively adjust an eccentric of the eccentric closed trajectory (Traf) of the at least one mass (M), thereby varying centrifugal forces (Fc) generated by the at least one mass (M) and transmitted onto the rotor assembly (Rot) and adjusting an output torque (Ct) applied onto the main shaft (Axf).

Alternatively, the rotor assembly (Rot) includes a torque orientation inverter (Ce) having a lever arm (Brle) freely rotatably mounted on the first plate (Pci, Pli), the eccentric closed trajectory (Traf) of the at least one mass (M) being the at least a portion of the perimeter of the bore (Tpi) fixed relative to the first plate (Pci, Pli) in an orientation allowing the centrifugal force (Fc) generated by the at least one mass (M) to drive the first plate (Pci, Pli) into a first rotational direction ($\Omega$e) and a first portion of the lever arm (Brle), the at least one mass (M) applying a centrifugal force (Fc) to the lever arm (Brle) in a second rotational direction opposite the first rotational direction ($\Omega$e), the lever arm (Brie) connecting to a free wheel (Rli) mounted on the main shaft (Axf) via a connecting rod (Bie), the free wheel (Rli) being freely rotatable relative to the main shaft (Axf) when rotating in the first rotational direction ($\Omega$e) relative to the first plate (Pci, Pli), and locked relative to the main shaft (Axf) when rotating in the second rotational direction relative to the first plate (Pci, Pli), thereby allowing an output torque (Ct) applied onto the main shaft (Axf), from the centrifugal forces (Fc) generated by the at least one mass (M) and transmitted onto the rotor assembly (Rot), to always be in the first rotational direction ($\Omega$e).

Typically, the lever arm (Brle) is freely rotatably mounted on the first plate (Pci, Pli) at a lever shaft (o), the lever arm (Brle) connecting to the connecting rod (Bie) at a second portion of the lever arm (Brle) opposite the first portion relative to the lever shaft (o).

Alternatively, the first (Pci, Pli) and second (Pcs, Pls) plates are fixedly mounted onto the main shaft (Axf), the machine (MGCFEVR) further including a mass support rotation system (Srst) being operatively located between the first plate (Pci, Pli) and the mass support member (SuM) and selectively displacing the mass support member (SuM) relative to the at least one bore (Tpi) in rotation about the rotating shaft (Axt), so as to selectively adjust an eccentric of the eccentric closed trajectory (Traf) of the at least one mass (M), thereby varying centrifugal forces (Fc) generated by the at least one mass (M) and transmitted onto the rotor assembly (Rot) and adjusting an output torque (Ct) applied onto the main shaft (Axf).

In one embodiment, the second (Pcs, Pls) plate is fixedly mounted on the chassis (Ch), and the first (Pci, Pli) plate is slidably mounted on the chassis (Ch), the machine (MGCFEVR) further including a shifting mechanism (Sddp) being operatively located between the first (Pci, Pli) and second (Pcs, Pls) plates and selectively displacing in translation the first (Pci, Pli) and second (Pcs, Pls) plates relative to one another, so as to selectively adjust an eccentric of the eccentric closed trajectory (Traf) of the at least one mass (M), thereby varying centrifugal forces (Fc) generated by the at least one mass (M) and transmitted onto the chassis (Ch) and adjusting an output thrusting force (Fp) applied thereon, and defining a machine (MGCFEVR) with linear movement.

In one embodiment, the first (Pci, Pli) and second (Pcs, Pls) plates are fixedly mounted on the chassis (Ch), the machine (MGCFEVR) further including a mass support rotation system (Srst) being operatively located between the first plate (Pci, Pli) and the mass support member (SuM) and selectively displacing the mass support member (SuM) relative to the at least one bore (Tpi) in rotation about the rotating shaft (Axt), so as to selectively adjust an eccentric of the eccentric closed trajectory (Traf) of the at least one mass (M), thereby varying centrifugal forces (Fc) generated by the at least one mass (M) and transmitted onto the chassis (Ch) and adjusting an output thrusting force (Fp) applied thereon, and defining a machine (MGCFEVR) with linear movement.

In one embodiment, said mass support member (SuM) includes a main body having the eccentric closed trajectory (Traf) formed therein for each one of said at least on bore (Tpi), and, for each said main body, said at least one mass (M) includes a plurality of masses (M) located along the eccentric closed trajectory (Traf), the plurality of masses (M) being free to move radially relative to a center of respective said bore (Tpi), the mass driving member (Mte) displacing the plurality of masses (M) along the eccentric closed trajectory (Traf).

Conveniently, the plurality of masses (M) located in a respective one said eccentric closed trajectory (Traf) are located on a mass plane being generally perpendicular to the respective rotating shaft (Axt).

Alternatively, the plurality of masses (M) located in a respective one said eccentric closed trajectory (Traf) are located on a plurality of mass planes being generally perpendicular to the respective rotating shaft (Axt).

In one embodiment, the machine (MGCFEVR) includes a plurality of pairs of generators (GCFEVR-2), and wherein both said generators (GCFEVR-2) of each said plurality of pairs have the rotating axis (Axt) rotating in opposite directions from one another, and are connected to a corresponding said eccentric adjustment system (Eas).

In one embodiment, said mass driving member (Mte) includes at least one guiding bar (Fcht) fixedly attached onto the rotating shaft (Axt) within said at least one bore (Tpi) and radially slidably supporting the at least one mass (M) therealong.

Conveniently, each one of said at least one guiding bar (Fcht) radially slidably supporting two of the at least one mass (M) therealong and on opposite sides of the rotating shaft (Axt).

In one embodiment, the machine (MGCFEVR) includes at least one set of four generators (GCFEVR-1), for each said set, said four generators (GCFEVR-1) being connected to a corresponding said eccentric adjustment system (Eas) and being arranged into two pairs with the guided bars (Fcht) being oriented generally perpendicularly to one another, and for each said pair, said two generators (GCFEVR-1) being arranged with the rotating axis (Axt) rotating in opposite directions from one another.

In one embodiment, the at least one mass (M) is at least one eccentric wheel (Re) axially mounting on the rotating shaft (Axt) within said at least one bore (Tpi) and defining an axis of symmetry thereof generally perpendicular to the rotating shaft (Axt), said at least one eccentric wheel (Re) having a longitudinal slot extending along the axis of symmetry, the mass driving member (Mte) includes a linear guide roller (Ggl) fixedly attached onto the rotating shaft (Axt) and slidably engaging the longitudinal slot for free radial displacement of the at least one eccentric wheel (Re) about the rotating shaft (Axt).

Conveniently, the at least one mass (M) is at least one eccentric wheel (Re) includes a plurality of weight relief openings extending axially therethrough and determining an eccentricity of the at least one eccentric wheel (Re).

In one embodiment, the machine (MGCFEVR) includes at least one set of eight generators (GCFEVR-1), for each said set, said eight generators (GCFEVR-1) being connected to a corresponding said eccentric adjustment system (Eas) and being arranged into two subsets of four generators (GCFEVR-1) with the axis of symmetry being oriented generally perpendicular to one another, for each said subset, said four generators (GCFEVR-1) being arranged into two pairs with an orientation of the longitudinal slot opposite to one another, and for each said pair, said two generators (GCFEVR-1) being arranged with the rotating axis (Axt) rotating in opposite directions from one another.

In one embodiment, each one of the at least one generator (GCFEVR) operatively connects to a respective one said first plate (Pci) and a respective one said second plate (Pcs) both simultaneously rotating about a respective secondary driving shaft (Ax2) mounted on the rotor assembly (Rot) via a respective supporting arm (ar2) freely rotatably mounted thereon so as to selectively radially position the respective one of said at least one generator (GCFEVR) relative to the main shaft (Rot), the respective secondary driving shaft (Ax2) mounting on the rotor assembly (Rot) radially away from the main shaft (Axf).

Conveniently, each one of the at least one generator (GCFEVR-2) has a corresponding one said mass support member (SuM) mounting of said respective supporting arm (ar2), a mass support rotation system (Srst) selectively displacing the corresponding one said mass support member (SuM) relative to the at least one bore (Tpi) of the corresponding one said first plate (Pci) and being operatively located therebetween.

In one embodiment, the machine (MGCFEVR) includes a pair of first plates (Pci) freely rotatably mounted onto the main shaft (Axf) and operatively connecting thereto via a sprocket/gear assembly including sprocket shafts (Axi1, Axi2), wheel sprockets (EL1, EL2) and gears (Eni1, Eni2, Eno), each one of said pair of first plates (Pci) operatively engaging said sprocket/gear assembly when rotating in opposite directions and being operatively disengaged therefrom when rotating in a respective reverse direction, each one of said sprocket shafts (Axi1) operatively connecting on one said pair of first plates (Pci) including a respective direction reversing member (SISR), each one of said at least one generator (GCFEVR-1) mounting into a respective one said bore (Tpi) of a corresponding one said pair of first plates (Pci) being selectively angularly oriented relative to one another so as to allow said pair of first plates (Pci) to have a rotational oscillating movement about the main shaft (Axf).

In one embodiment, the at least a section of the at least one bore (Tpi) induces either a continuously progressively varying radial displacement or at least one suddenly varying radial displacement of the at least one mass (M) along the eccentric closed trajectory (Traf) about the rotating shaft (Axt).

In one embodiment, the machine (MGCFEVR) uses at least one mass (M) generating centrifugal forces (Fc) and has a trajectory (Traf) with a radius progressively or suddenly varying with a position of the mass (M) onto the trajectory (Traf), the radius being a distance between a center of gravity of the mass (M) and a center of rotation of the trajectory (Traf), the varying radius defining an eccentric of variable radius.

In one embodiment, the machine (MGCFEVR) generates mechanical energy from generation of centrifugal forces (Fc) via at least one eccentric of radius progressively or suddenly varying.

In one embodiment, the machine (MGCFEVR) exploits a principle of generation of centrifugal forces (Fc) via at least one eccentric of variable radius to either provide power (Ct) with rotation movement at an output (Axf) thereof or a force of linear thrust (Fp) from the centrifugal forces (Fc).

In one embodiment, the machine (MGCFEVR) exploits a principle of generator of centrifugal forces (Fc) from an eccentric of variable radius having a trajectory of masses (M) extending on at least one plane.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein:

FIG. 31 is a schematic elevation section and plan view of the circular upper (Pcs) plate of the rotor assembly (Rot) of FIG. 26, showing the upper bores (Tps) where the shafts (Axt) of different GCFEVRs are mounted in;

FIG. 32 is a schematic elevation section and plan view of the circular lower (Pci) plate of the rotor assembly (Rot) of FIG. 26, showing the locations of the bores (Tpi), on a virtual bore positioning circle (Cax), where the shafts (Axt) and masses (M) of different GCFEVRs are mounted in;

FIG. 38 is a schematic elevation section view of the MGCFEVR, with the rotor assembly (Rot) of FIG. 34, with each GCFEVR having guiding bars (Fcht) and masses (M), for which the rotation of the shafts (Axt) is done by the direct link with corresponding electric motors (one motor per shaft (Axt)) mounted on the rotor assembly (Rot) and rotating therewith, with the electric power being fed via and through the chassis using an electrical rail (Raa) or the like;

Figure 17:
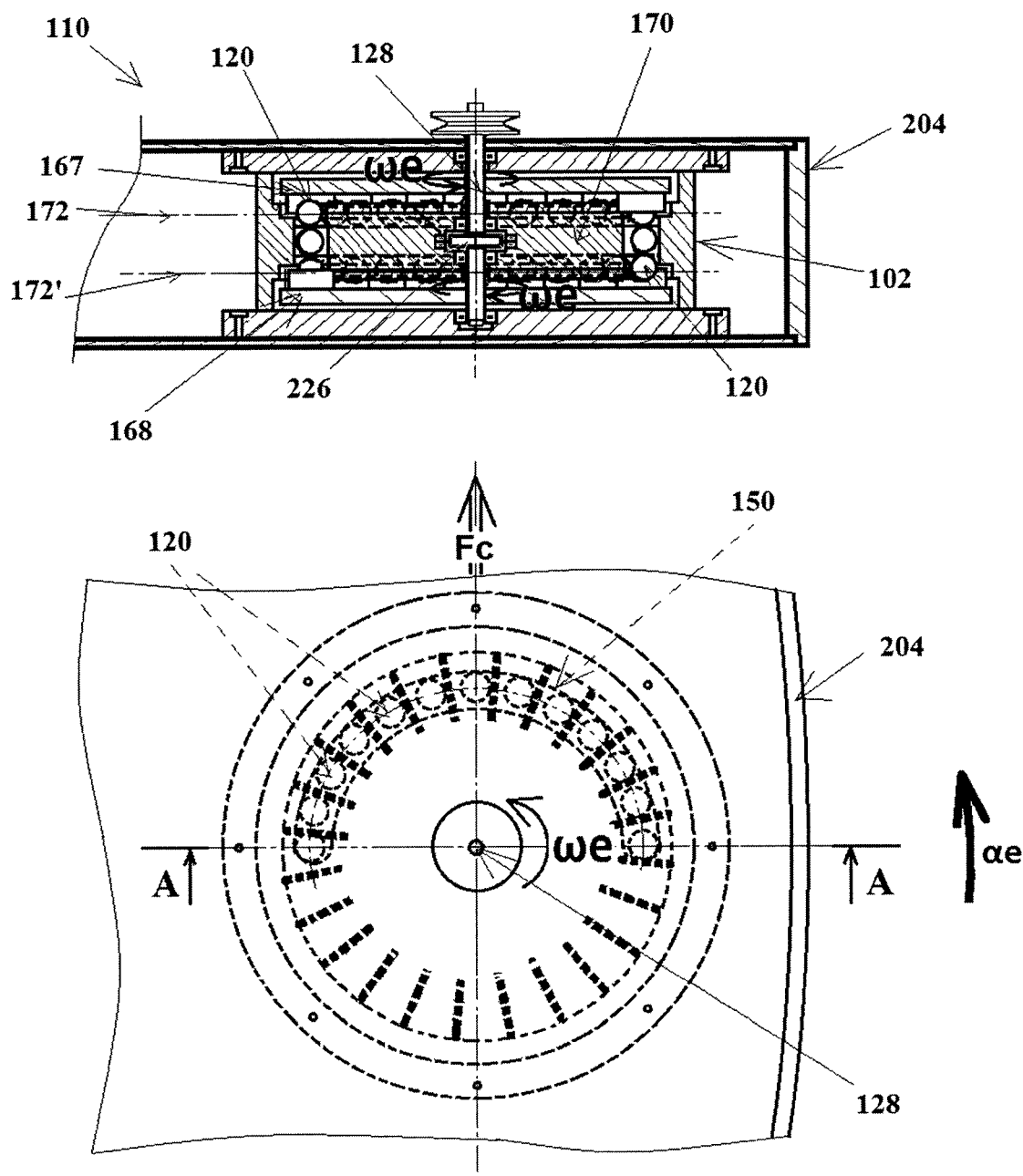
FIG. 17 are partially broken schematic elevation section (taken along line A-A) and plan views of an embodiment of a second type of generators of centrifugal forces from eccentrics with variable radius (GCFEVR-2s) according to the present invention, similar to the GCFEVR-2 of FIG. 11, but with an eccentric closed trajectory (Traf) defined into a mass support member (SuM) into two parallel mass planes and independently driven with arms (br) of a mass driving member (Mte) in opposite rotational direction for the two mass planes, as used in a machine (MGCFEVR—Machine including at least one GCFEVR) with rotating movement.
Figure 21:
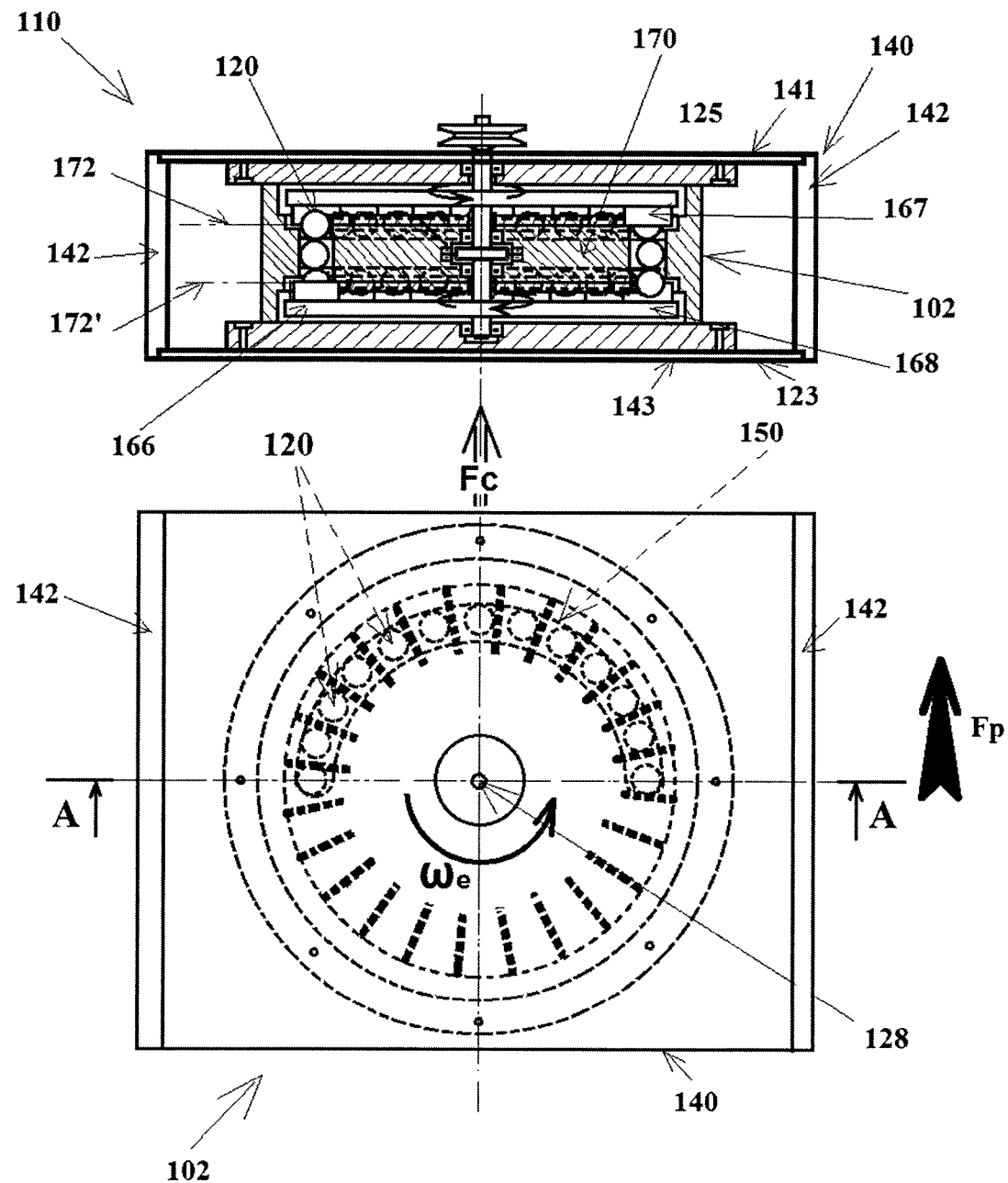
FIG. 21 are partially broken schematic elevation section (taken along line A-A) and plan views of an embodiment of a second type of generators of centrifugal forces from eccentrics with variable radius (GCFEVR-2s) according to the present invention, similar to the GCFEVR-2 of FIG. 11, but with an eccentric closed trajectory (Traf) defined into a mass support member (SuM) into two parallel mass planes and independently driven with arms (br) of a mass driving member (Mte) in opposite rotational direction for the two mass planes, as used in a machine (MGCFEVR—Machine including at least one GCFEVR) with linear movement.
Figure 42:
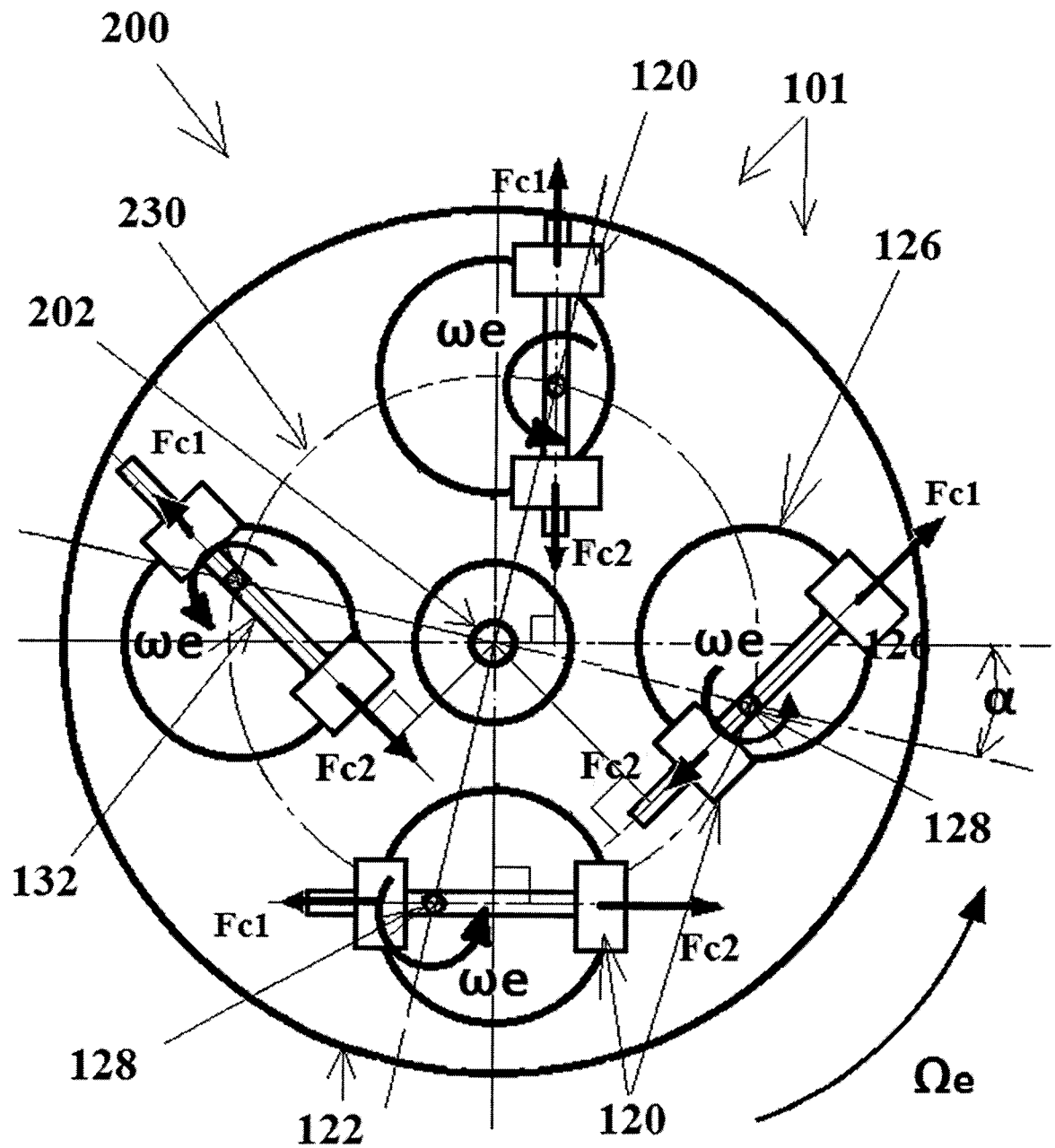
FIG. 42 is a schematic section plan view, taken along line A-A of FIG. 36, of the lower plate (Pci) of the rotor assembly (Rot) of the MGCFEVR, with each GCFEVR having guiding bars (Fcht) and masses (M), showing the rotational direction of the moving (rotating) parts and the direction of the generated centrifugal forces, along with the rotating direction of the lower plate (Pci)
Figure 62:
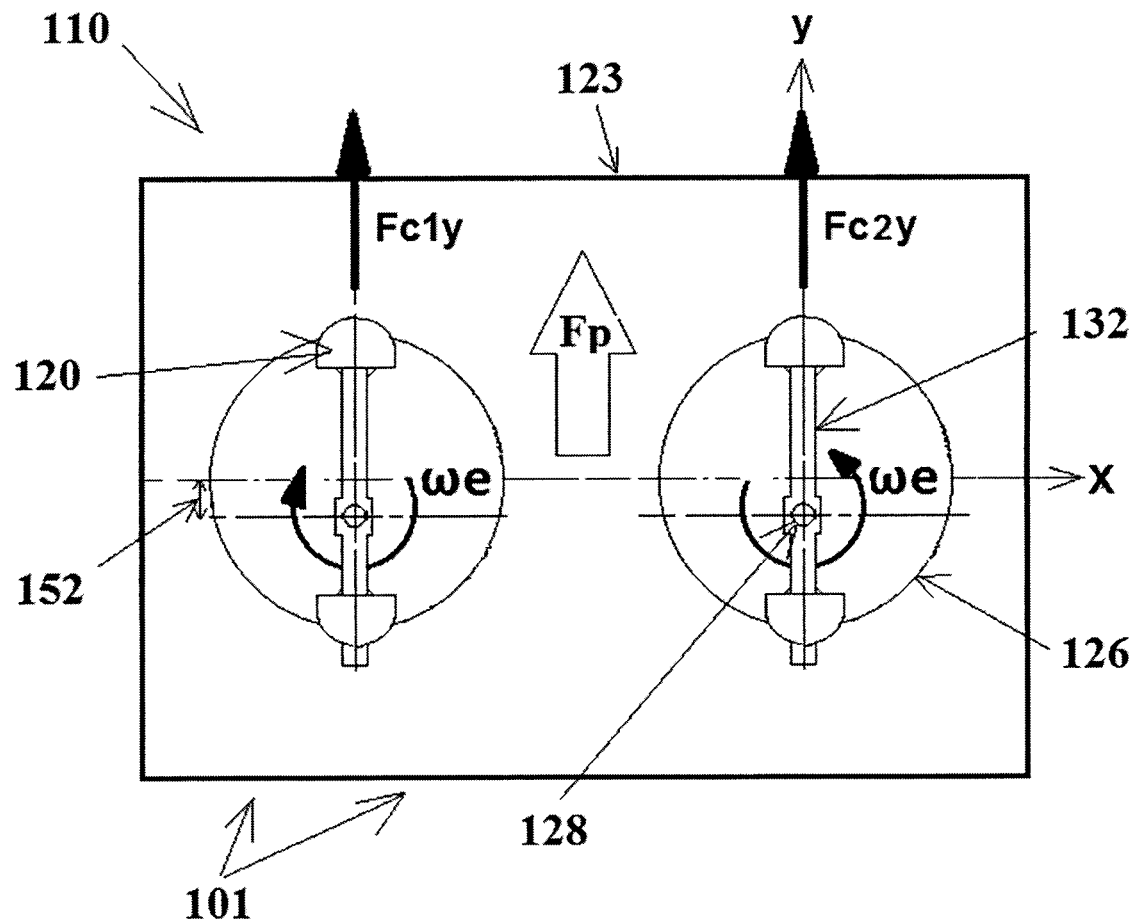
FIG. 62 is a schematic plan view of the lower plate (Pli) of a MGCFEVR with linear movement generating a positive oscillating thrusting force (Fp), in the (y) axis and having two GCFEVRs as shown in FIG. 18 and having the same orientation but with opposite rotational directions from one another, with each GCFEVR having guiding bars (Fcht) and masses (M), showing the direction of the thrusting force (Fp) along with the rotational directions of the two shafts (Axt)
Figure 63:
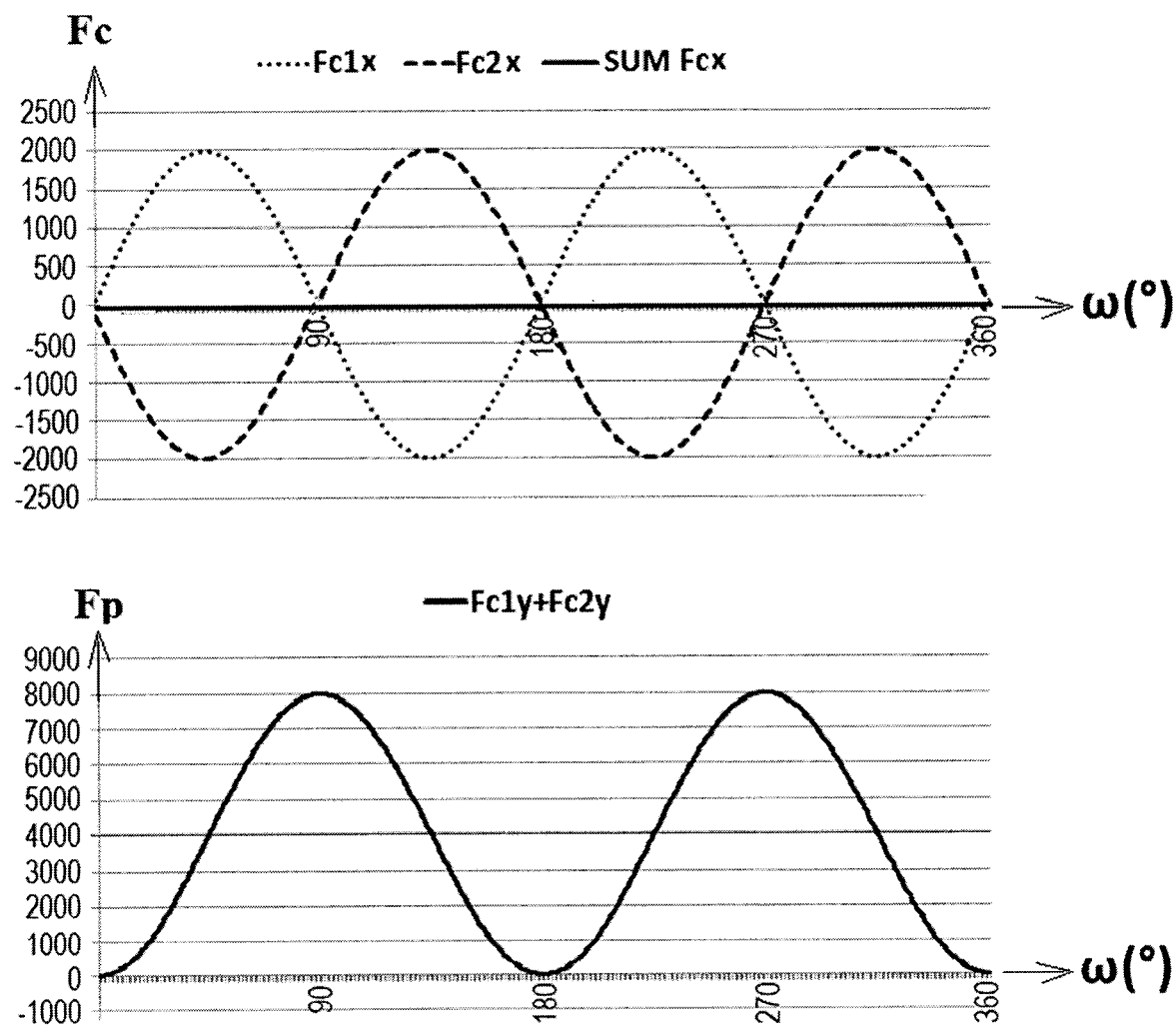
FIG. 63 is a schematic diagram of the typical curves of the value of the centrifugal forces (Fc1$x$), (Fc2$x$), (Fc1$y$), (Fc2$y$) and the sum thereof generated by the two masses (M) of both GCFEVRs of FIG. 62, along axes (x) and (y) respectively, for one 360-degree (2π-radian) rotation of the respective shaft (Axt), for which MGCFEVR the total thrusting force along the (x) axis is constantly null, while being positive and oscillating along the (y) axis.
Figure 64:
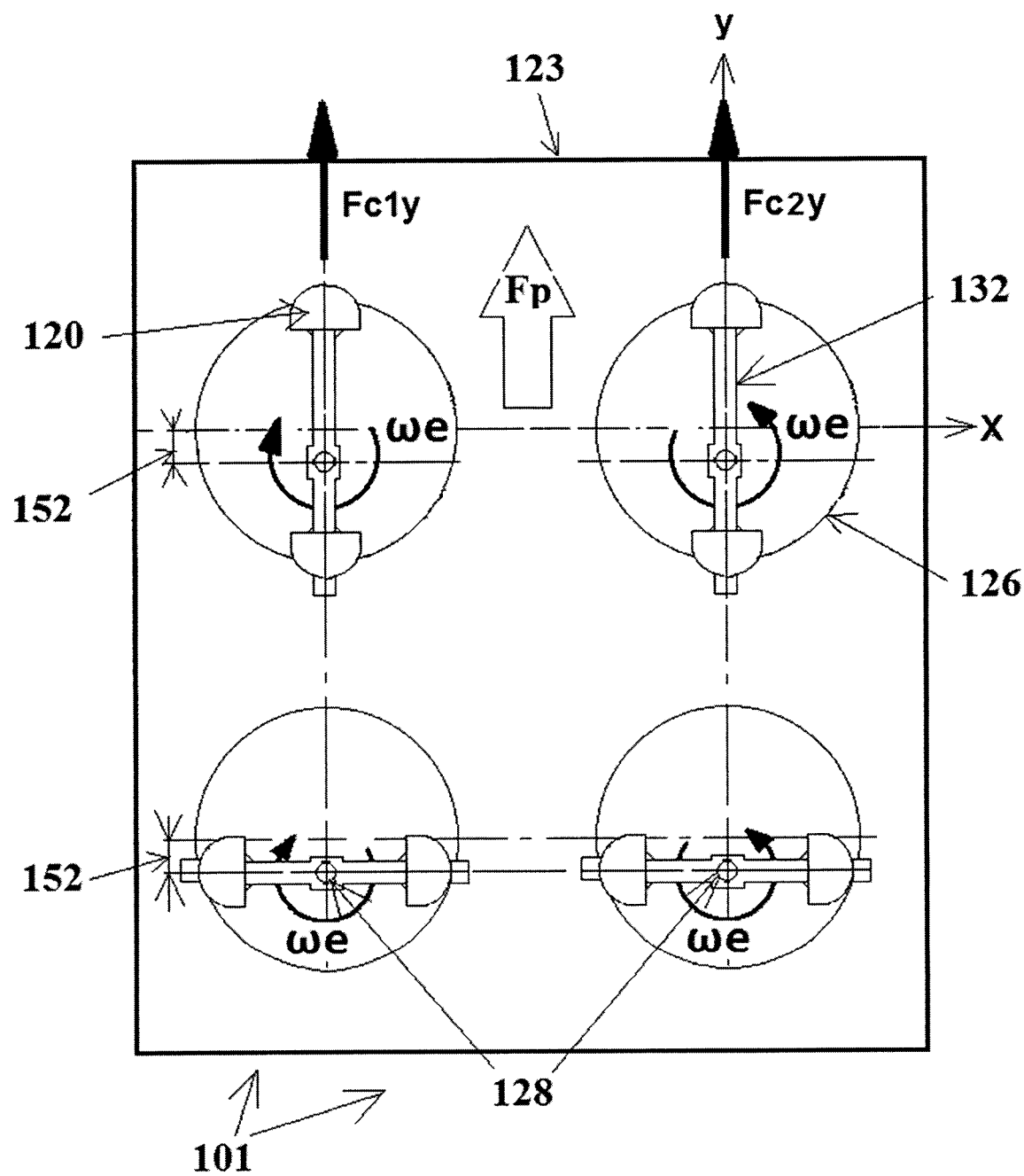
FIG. 64 is a schematic plan view of the lower plate (Pli) of a MGCFEVR with linear movement generating a constant thrusting force (Fp) and having four GCFEVRs as shown in FIG. 18 and oriented 90° relative to one another per pair (as shown in FIG. 62) having a same rotational direction, and both pairs rotating into the opposite direction relative to one another, with each GCFEVR having guiding bars (Fcht) and masses (M), showing the direction of the constant thrusting force (Fp) along with the rotational directions of the four shafts (Axt)
Figure 72:
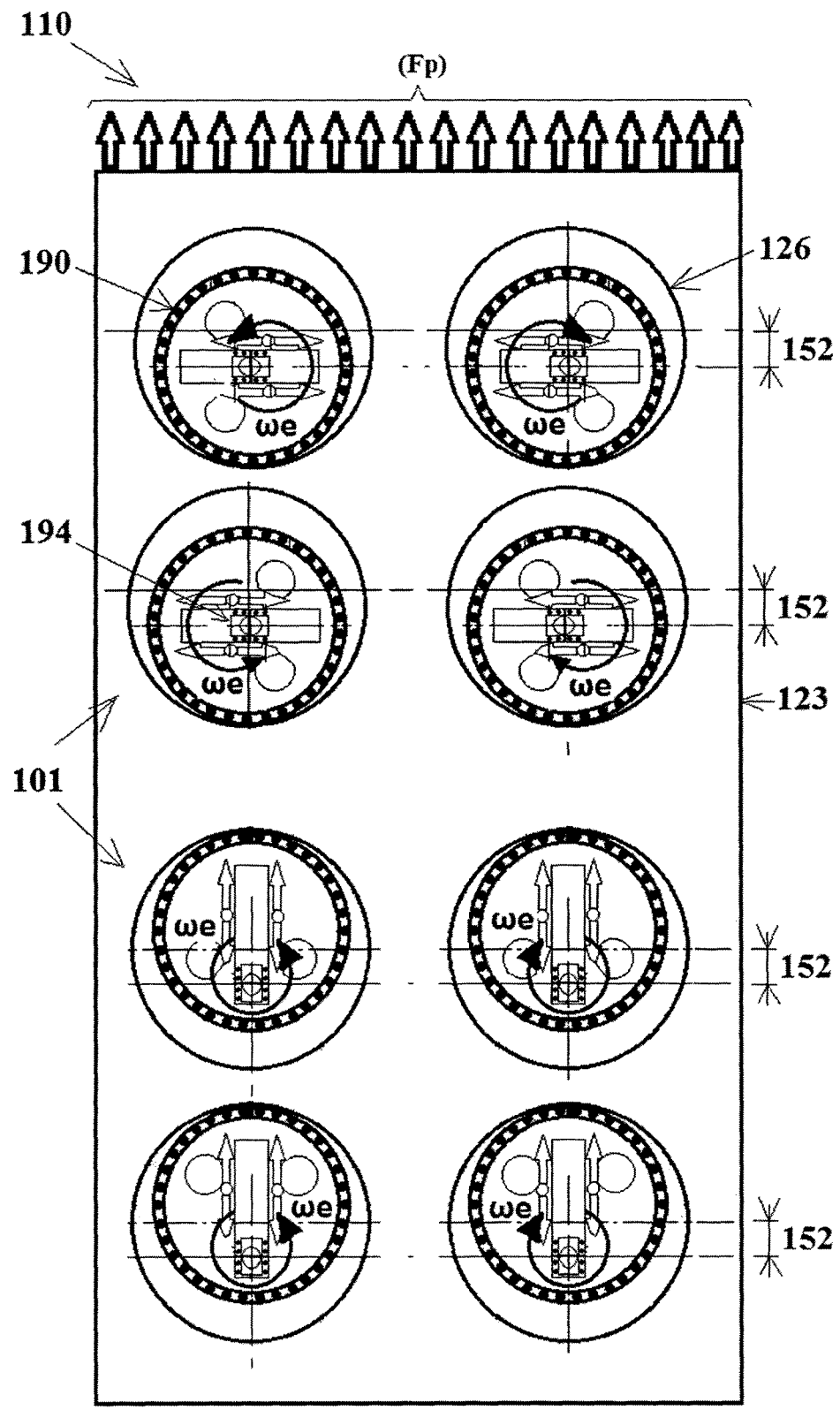
FIG. 72 is a schematic plan view of the lower plate (Pli) of a MGCFEVR with linear movement generating a constant thrusting force (Fp) and having eight GCFEVRs as shown in FIG. 19 with two sets of four GCFEVRs as in FIG. 70 oriented 90° relative to one another, with each GCFEVR having an eccentric wheel (Re) of mass (M), showing the direction of the constant thrusting force (Fp) along with the rotational directions of the eight shafts (Axt)
Figure 73:
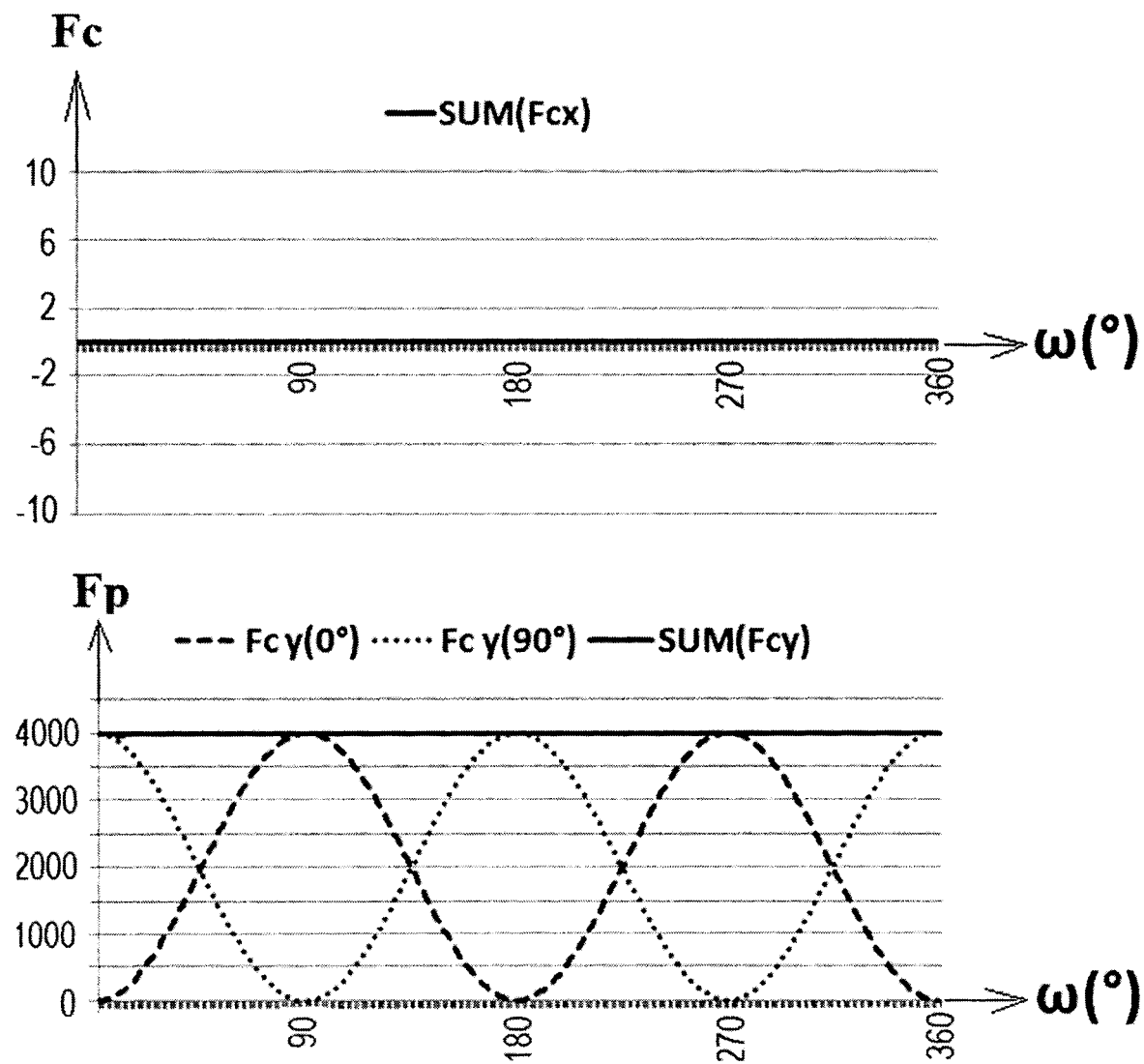
Figure 74:
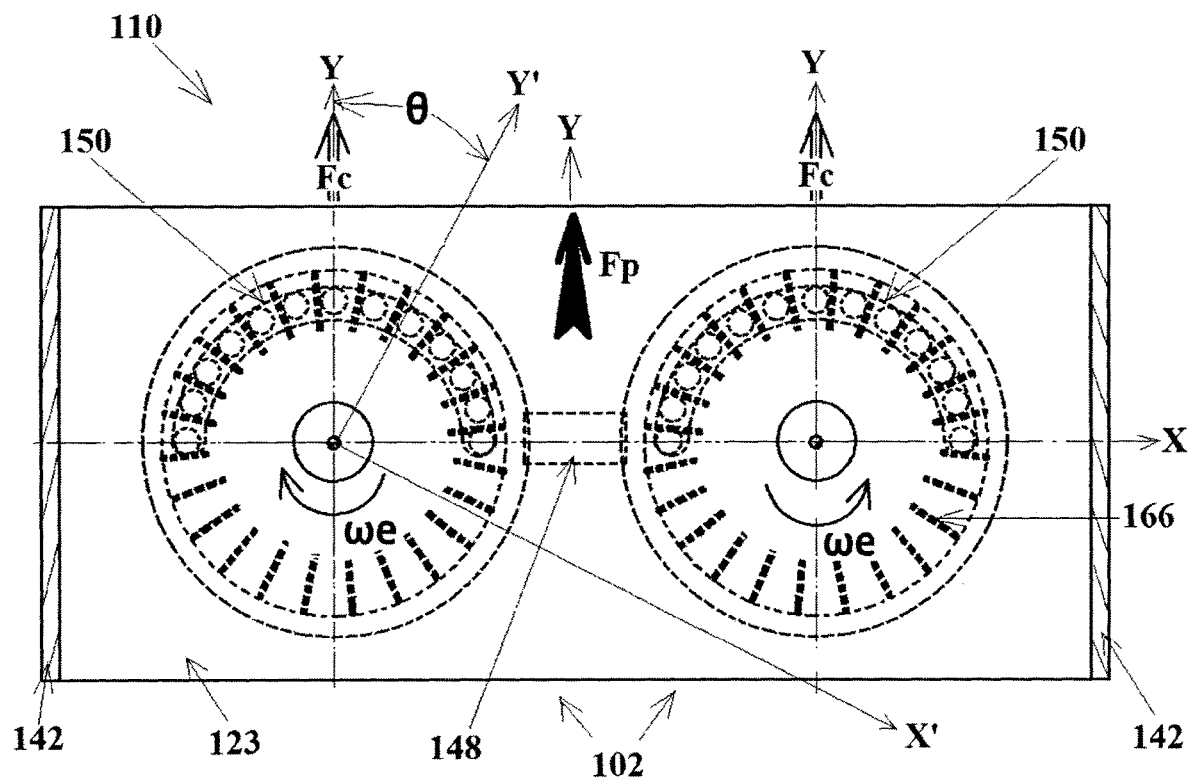
Figure 75:
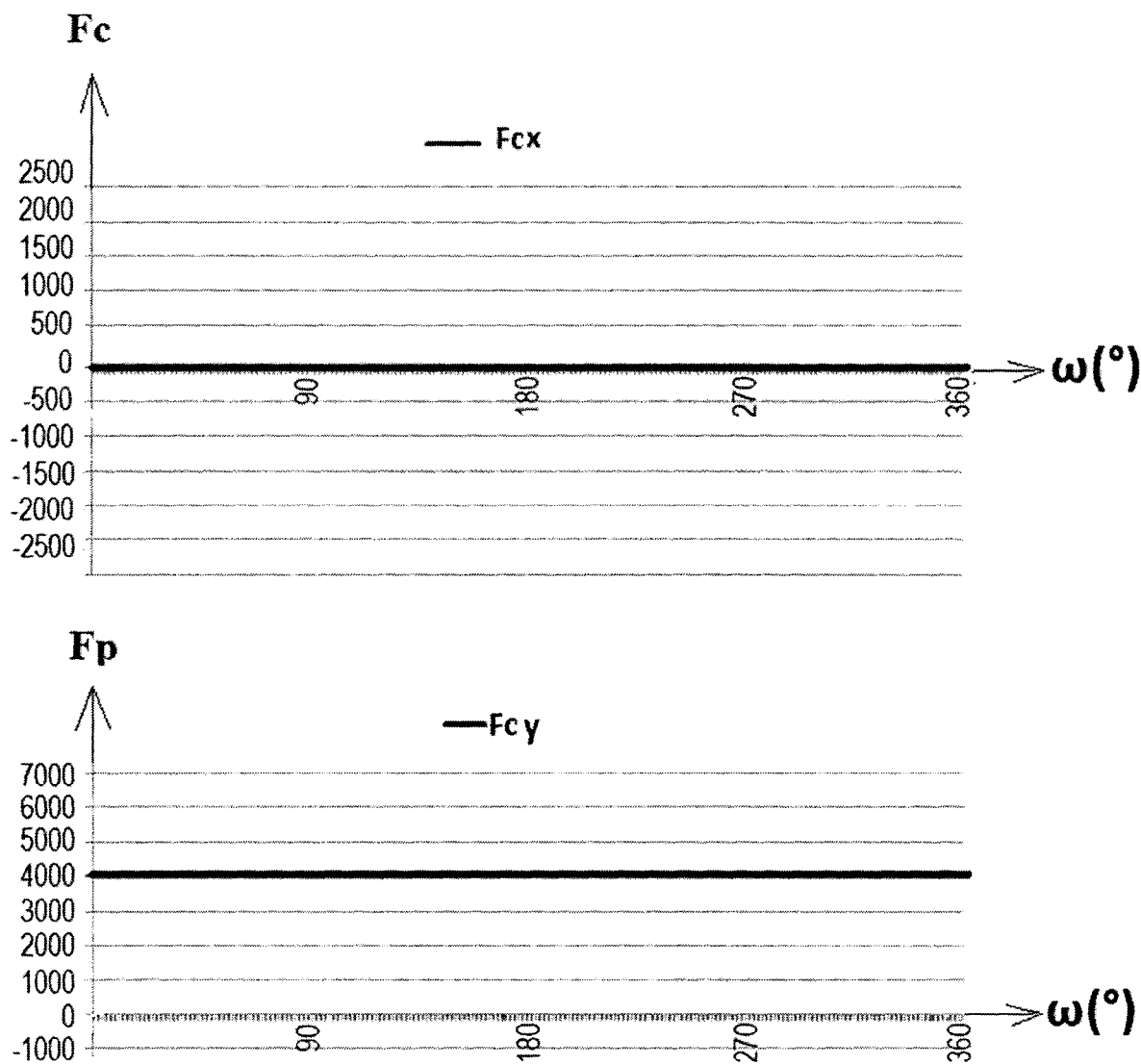
Figure 76:
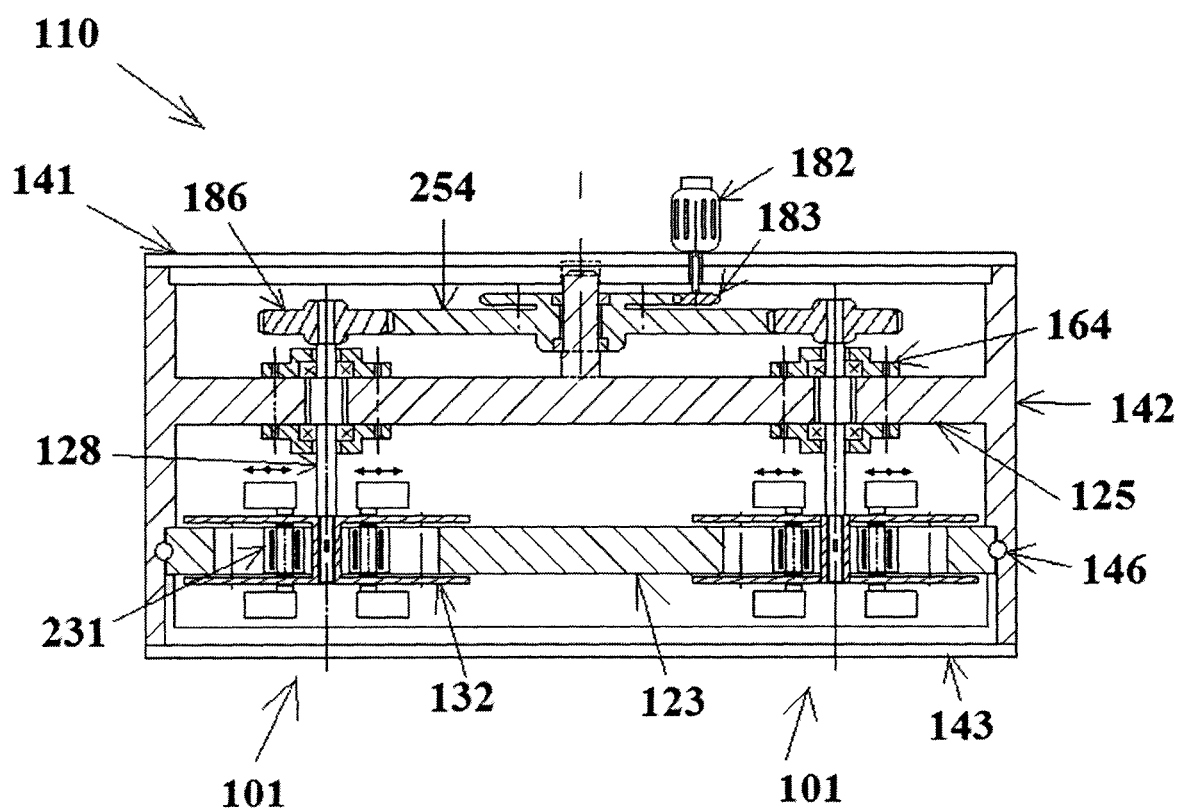
Figure 77:
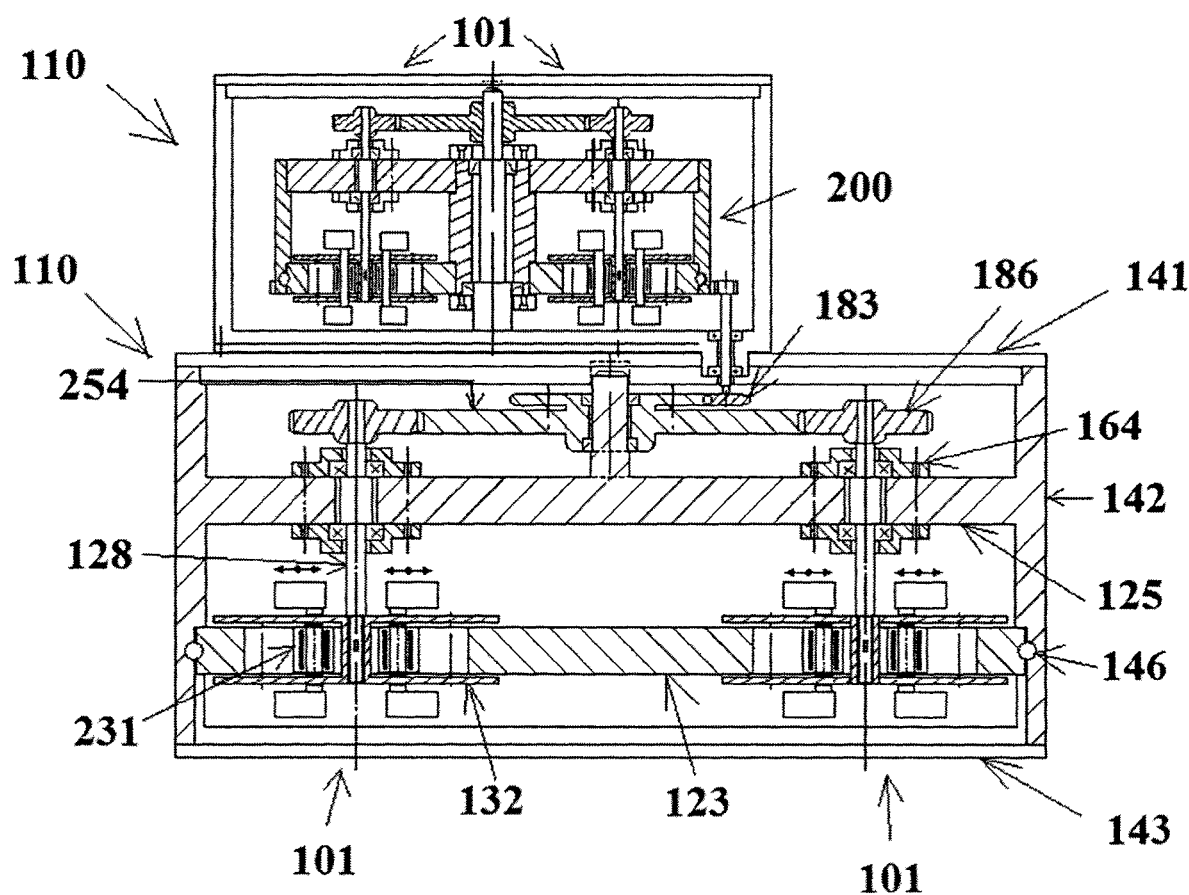
Figure 78:
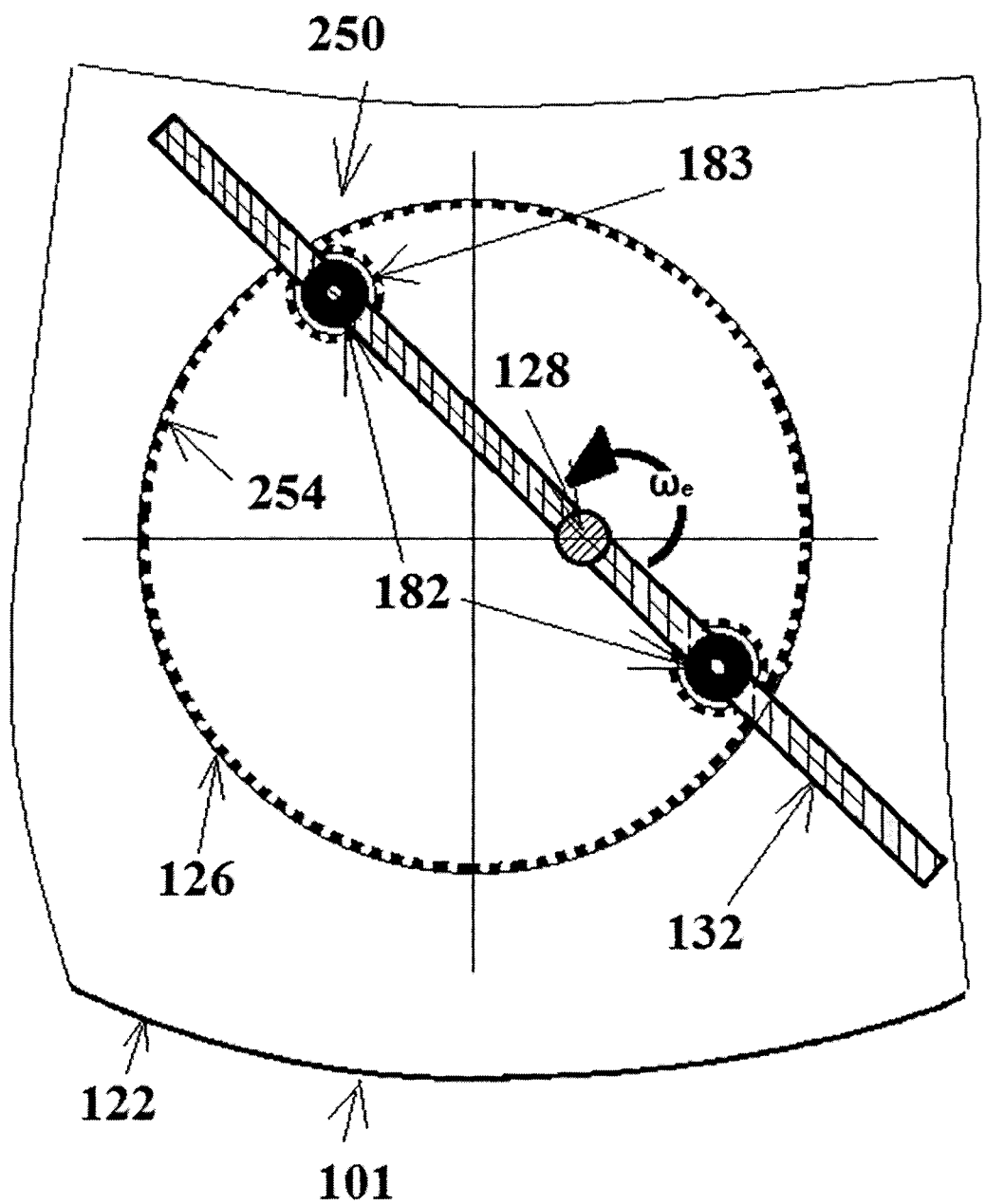
Figure 79:
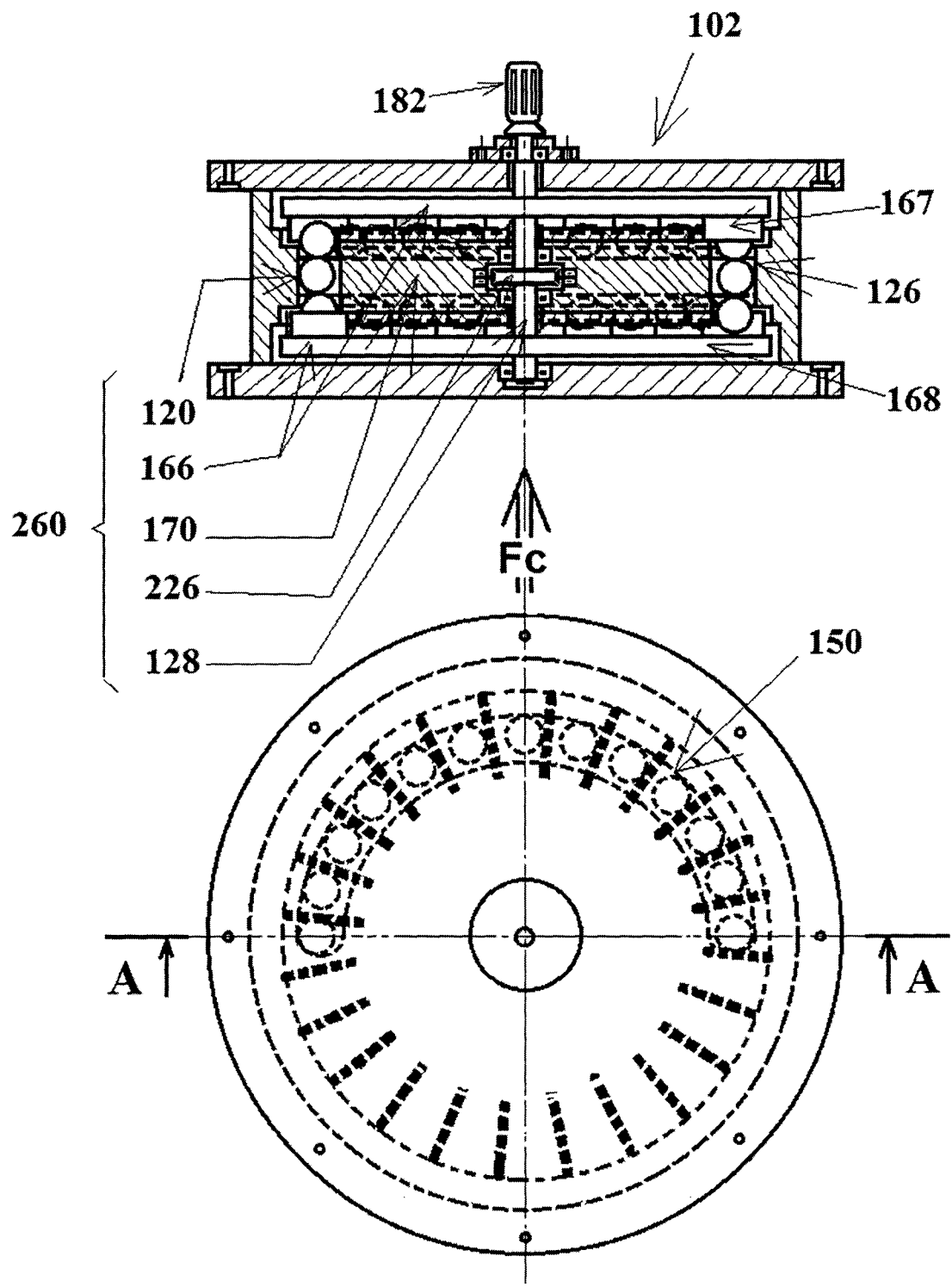
Figure 80:
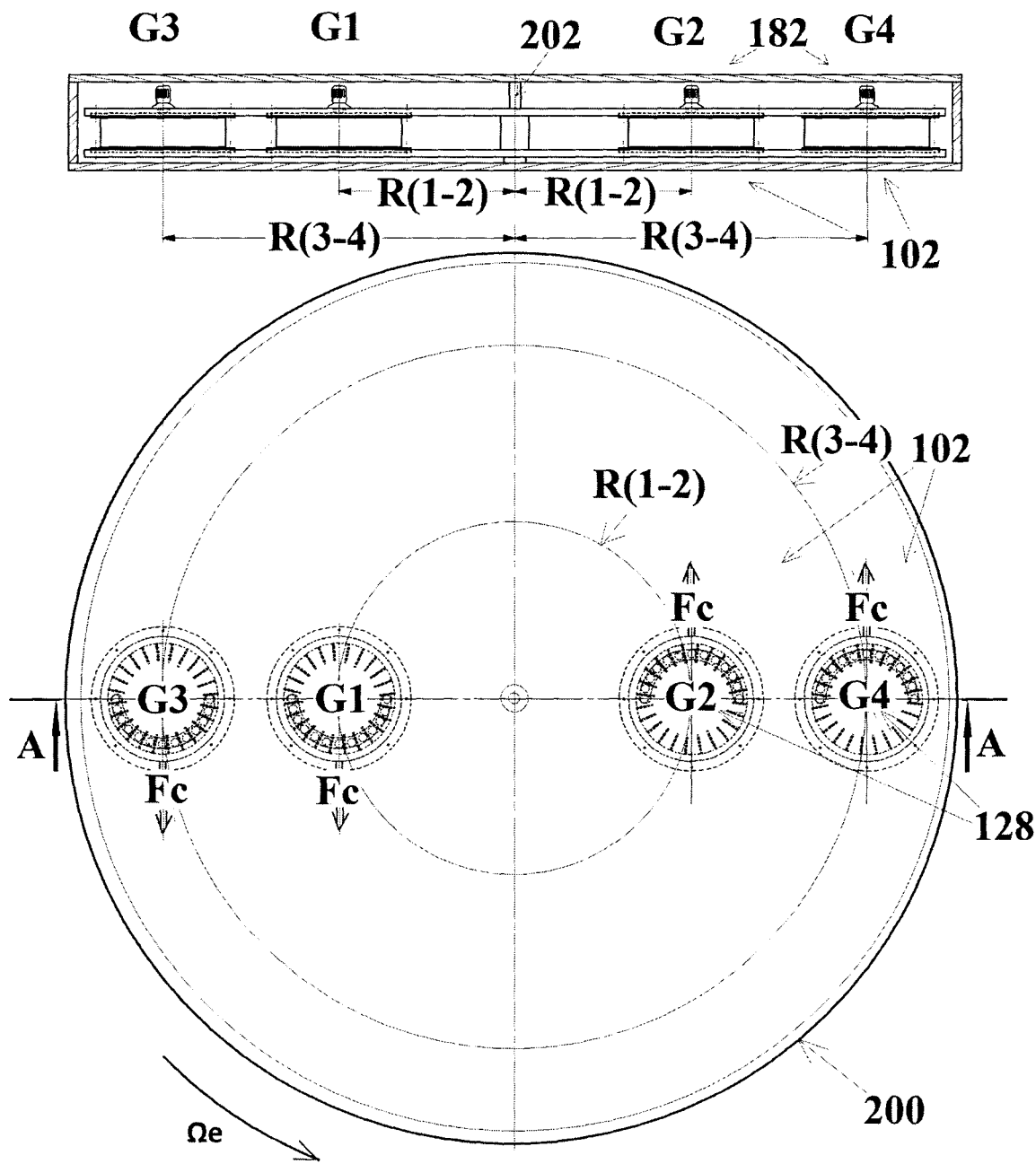
Figure 81:
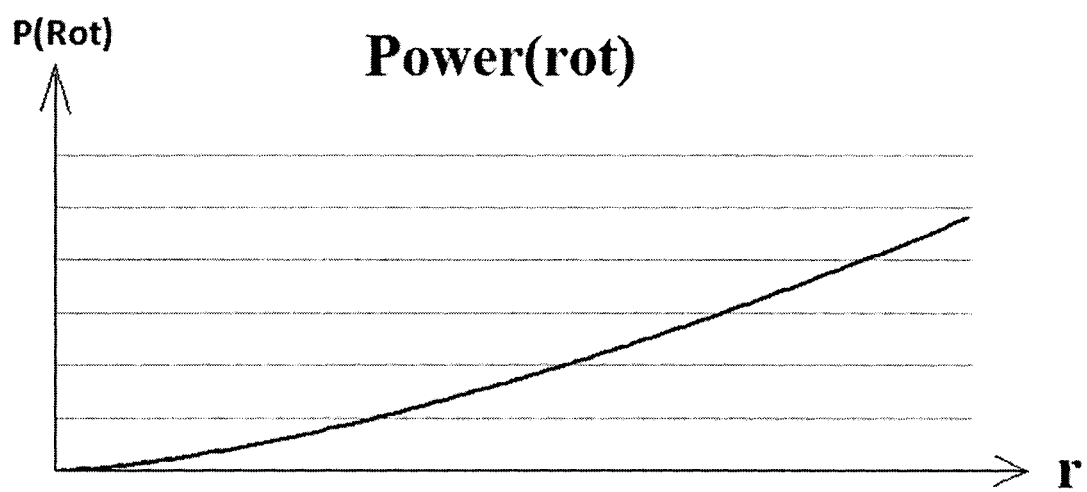
Figure 82:
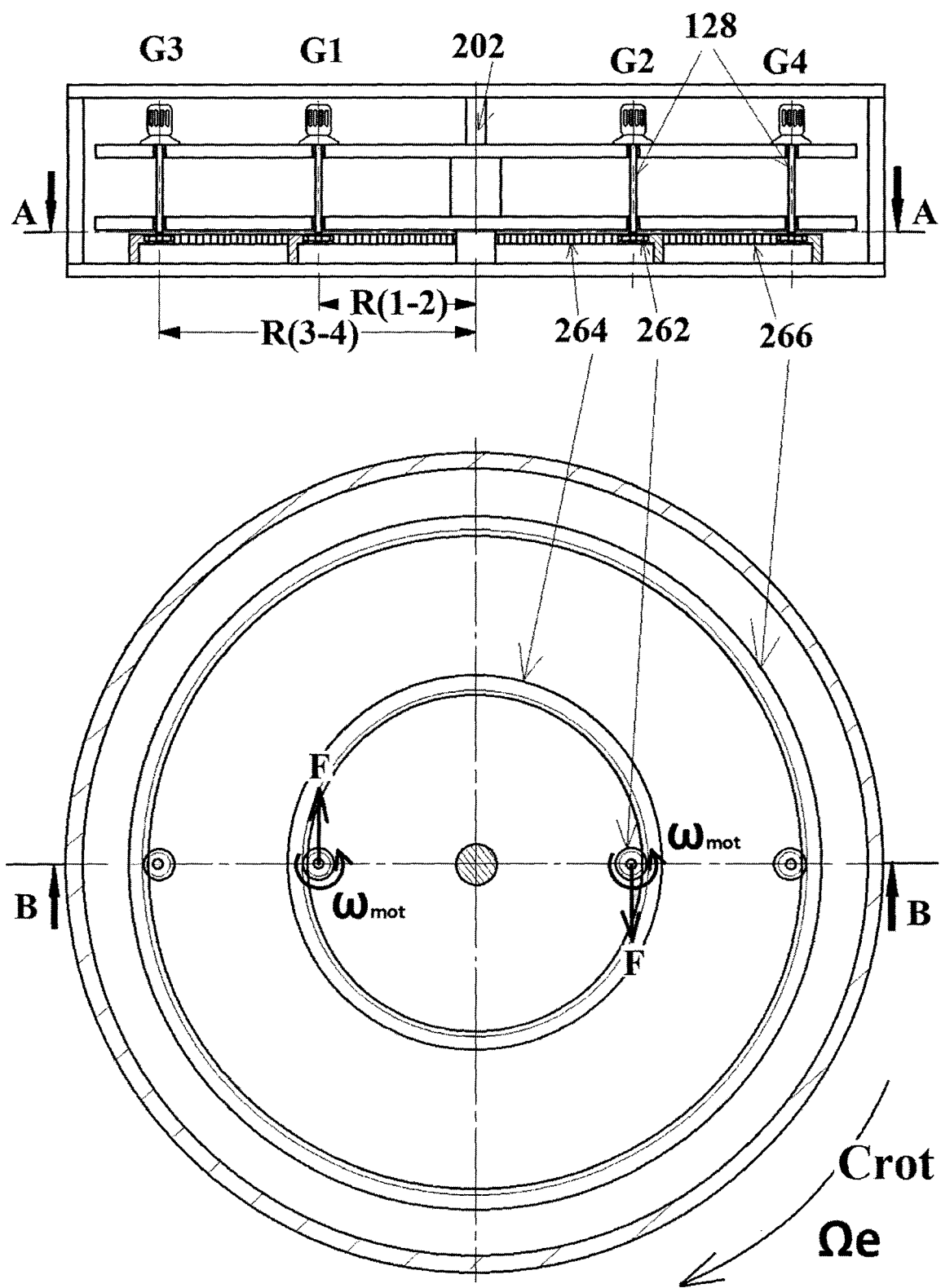

FIG. 73 is a schematic diagram of the typical curves of the value of the sum of the centrifugal forces (Fcx) along the (x) axis, of each set of four (Fcy(0°)), (Fcy(90°)) along the (y) axis and the sum (Fcy) thereof generated by the masses (M) of the eight GCFEVRs of FIG. 72, for one 360-degree (2π radian) rotation of the shafts (Axt), for which MGCFEVR the total thrusting force along the (x) axis is constantly null, while being positive and constant along the (y) axis;

FIG. 74 is a schematic plan view of the lower plate (Pli) of a MGCFEVR-2 with linear movement generating a constant thrusting force (2×Fc) and having two GCFEVR-2s as shown in FIG. 21 with a thrusting force amplitude essentially varying only the rotational angular velocity of the two rotating shafts carrying the respective mass driving member (Mte), and a thrusting force direction essentially varying with the angular orientation of the mass support members (SuM) relative to the respective bore (Tpi) of the plate (Pli) it sits in; the angular orientation (θ) of the mass support members (SuM) relative to the plate (Pli) is typically controlled via a mass support rotation system (Srst) connected there between;

FIG. 75 is a schematic diagram of the typical curves of the value of the sum of the centrifugal forces (Fcx) along the (x) axis, and the centrifugal forces (Fcy) along the (y) axis generated by the masses (M) of the two GCFEVR-2s of FIG. 74, for one 360-degree (2π radian) rotation of the shafts (Axt), for which MGCFEVR-2 the total thrusting force along the (x) axis is constantly null, while being positive and constant along the (y) axis;

FIG. 76 is a schematic elevation section view, showing the machine (MGCFEVR) with linear movement of FIG. 62 or 64 using a starter including an electric motor (Mot) connecting to the free (freely rotatably mounted on the chassis) main gear (Elc), meshing with all the gears (Ena), via the motor gear (Enm) meshing therewith;

FIG. 77 is a schematic elevation section view, showing a machine (MGCFEVR) with linear movement similar to FIG. 76 but using a starter including a machine (MGCFEVR) with rotating movement, as shown in FIG. 42, having its rotor assembly (Rot) connected to the motor gear (Enm);

FIG. 78 is a schematic elevation and plan view, showing another embodiment of a GCFEVR with a guiding bar (Fcht) and two sliding masses (M) being electric motors (Mot) enabling the rotation of the moving parts (guiding bar (Fcht), motors (Mot) and a freely rotatably mounted shaft (Axl)) within a bore (Tpi) extending through a lower plate (Pci), and the bore mechanically linking to the motors via a gear system including a motor gear (Enm) extending externally around rotor thereof and meshing with a internal gear of the bore;

FIG. 79 is a schematic elevation section (taken along line A-A) and plan section views, showing another embodiment of a GCFEVR-2 similar to that of FIGS. 17 and 21, with then different components forming a rotating group (EnsT);

FIG. 80 is a schematic elevation section (taken along line A-A) and plan section views, showing another embodiment of a MGCFEVR having a rotor assembly (Rot) equipped with four (4) GCFEVR-2s of FIG. 79;

FIG. 81 is a schematic diagram showing a typical curve of the power (P(Rot)) developed by the rotor assembly (Rot) of FIG. 80, for a predetermined rotation angle (w), varying with the distance (r) of the location of the GCFEVR relative to the center of rotation of the rotor assembly (Rot); and FIG. 82 is a schematic elevation section (taken along line B-B) and plan section (taken along line A-A) views, showing an embodiment of a simple conventional mechanical machine, similar to the machine of FIG. 80, with only simple sprocket gears driven by motors and meshing directly with the rotor assembly, but no GCFEVR.

DETAILED DESCRIPTION OF THE INVENTION (I)—Principle of Generator of Centrifugal Forces from Eccentrics with Variable Radius When a mass (M) 120 rotates about a rotating shaft (Axt) 128 within a circular trajectory, the mass (M) generates a centrifugal force (Fc) of uniform value and centrally oriented (in a direction extending through the center of rotation of the mass) relative to the rotating shaft (Axt) at each and every point of its trajectory. The principle of a generator of centrifugal forces from an eccentric with variable radius (GCFEVR) 100 in accordance with an embodiment of the present invention consists in forcing such a mass (M) 120 to move within and along an eccentric closed trajectory (Traf) 150, at least partially fixed (non-mobile), that enables the centrifugal force (Fc) acting on the mass 120 to be non-uniform around the rotating axis 128 (because of varying radius due to the eccentricity of the trajectory 150), and typically being in average larger on one side of the axis of rotation than on the other side thereof, or being always generated on a same side of the rotating shaft (Axt) 150. Accordingly, an eccentric with variable radius essentially refers to a non-continuous 360° circular trajectory with constant radius, when projected on a same plane perpendicular to the rotating shaft (Axt).

As Illustrated in FIGS. 8 to 11, 17 to 24 and 27 to 30, we designate a "generator of centrifugal forces from an eccentric with variable radius" (GCFEVR) 100 as the subset of a machine generating centrifugal forces from eccentrics with variable radius (M.G.C.F.E.V.R.) 110, as shown in FIGS. 25, 26 and 31 to 78, that typically includes a body (or chassis) (Ch) 140 of any shape, circular or other, having at least two plates (Ch1, Ch2) 141, 142 (and/or (Pci), (Pcs), or (Pli), (Pls) 123, 124, 123, 125), mechanical energy transmission mechanism (METM) (including gear mechanisms, crankshaft mechanisms, mass support members (SuM) 170, torque orientation inverters (Ce) 210) transmitting the energy from the centrifugal forces (Fc) to the output of the machine (MGCFEVR), or structures or even substantially planar sections of structures being substantially parallel to each other and connected to one another via a transversal structure (Ch3) 143, (Pal1) 162 and/or ring (Bg) 204, preferably perpendicular thereto. The generator (GCFEVR) 100 being typically comprised of:

a rotating shaft (Axt) 128 for rotatably connecting to one (Pls) 125 of the at least two plates via a bearing block (Pal2) 170, said rotating shaft including a mass driving member (Mte) 166 rotatably integral therewith and driving in rotation at least one mass (M) 120, each said at least one mass having (M) a respective mass value, equal or different than the others said masses, along an eccentric closed trajectory (Traf) 150 linked to the mechanical energy transmission mechanism (METM) or another one (Pli) 123 of the at least two plates, said eccentric closed trajectory (Traf) 150 being either at least a section of a bore (Tpi) 126 formed into the mechanical energy transmission mechanism (METM) or the other one (Pli) 123 of the at least two plates or a mass support member (SuM) 170 mounting into the bore (Tpi) 126;

a shaft driving system 180 (as an electric motor (Mot) 182 or the like) driving the shaft (Axt) 128 in rotation, typically via a meshing mechanism 184 connected thereto (example: electric motor (Mot) 182 connected a gear (Ena) 186, etc.); wherein said eccentric closed trajectory (Traf) 150 includes:

a varying radius of a position of said at least one mass (M) 120 therealong;

at least a section 127 of a bore (Tpi) 126 carrying centrifugal forces (Fc) generated by said at least one mass (M) 120; and all centrifugal forces (Fc) generated by said at least one mass (M) 120 being directly or indirectly applied onto the mechanical energy transmission mechanism (METM) or the other one (Pli) 123 of the at least two plates.

Typically, the mechanical energy transmission mechanism (METM) is any mechanism that would transmit the energy generated by the centrifugal forces (Fc), either the centrifugal forces (Fc) themselves or a generated torque, to the main shaft (Axf) 202 or to the chassis (Ch) 140 of the machine (MGCFEVR), to rotate the main shaft (Axf) 202 or to thrust the chassis (Ch) 140, respectively. The mechanical energy transmission mechanism (METM) could have multiple forms, such as the other one (Pli) 123 of the at least two plates, at least portions of mass support members (SuM) 170, at least portions of torque orientation inverters (Ce) 210, or any other mechanisms that could include gears and/or crankshafts depending on the situation the GCFEVRs are used.

Typically, the varying radius of a position of said at least one mass (M) 120 along said eccentric closed trajectory (Traf) 150 is progressive (gradual or smooth), as shown in FIGS. 8-10, and 17-22 (second and third embodiments) and 23 (partially) for example, and/or abrupt (rough, discontinued or sudden), as shown in FIGS. 11-16, 22 (last embodiment), 23 (partially) and 24 (first embodiment) for example.

Typically, said at least a section of the bore (Tpi) 126 carries centrifugal forces (Fc) generated by said at least one mass (M) 120, either by direct abutment contact of said at least one mass (M) 120 with said at least a section 127 of the bore (Tpi) 126 or by abutment contact there between via said mass support member (SuM) 170. Although the bore (Tpi) 126 is preferably a through bore, it could also be a blind bore, a counterbore or the like without departing from the scope of the present invention.

In one embodiment, all centrifugal forces (Fc) generated by said at least one mass (M) 120 are carried by said bore (Tpi) 126, either by direct abutment contact of said at least one mass (M) 120 with said at least a section 127 of the bore (Tpi) 126 or by abutment contact there between via said mass support member (SuM) 170.

In one embodiment, the at least one mass (M) 120 is being displaced within a mass plane 172 generally perpendicular to the rotating shaft (Axt) 128.

Conveniently, the at least one mass (M) 120 is being displaced within and outside of said mass plane 172.

In one embodiment, the other one (Pli) 123 of the at least two plates is movable in rotation relative to said one (Pls) 125.

Typically, the other one (Pli) 123 of the at least two plates is freely movable in rotation relative to said one (Pls) 125.

Throughout the present description, when there is a reference to the eccentric closed trajectory (Traf) 150 of a mass (M) 120 for the ease of understanding, one skilled in the art would readily understand that there is in fact made reference to the eccentric closed trajectory (Traf) 150 of the center of inertia (cg) 156 of the mass (M) 120 since the centrifugal force (Fc) is conventionally represented as being applied at the center of inertia (cg) 156 of a mass (M) 120.

A first type of generator of centrifugal forces from an eccentric with variable radius (GCFEVR-1) 101 has masses (M) 120 linked to the GCFEVR-1 101 via their direct links with the mechanisms generating their movement (the rotating shaft (Axt) 128 and the mass driving member (Mte) 166 that is connected thereto or integral therewith, as for examples described hereinafter the guiding bar (Fcht) 132, the slot 121 of eccentric wheel (Re) 190 and the like, while allowing them the required degrees of freedom to transmit the generated centrifugal forces (Fc) to the plate (Pli) 123. The eccentric closed trajectory (Traf) 150 followed by the masses (M) 120 is therefore forced by the abutment contact of the masses (M) 120 against the perimeter of the bore (Tpi) 126 inside the plate (Pli) 123.

Figure 1:
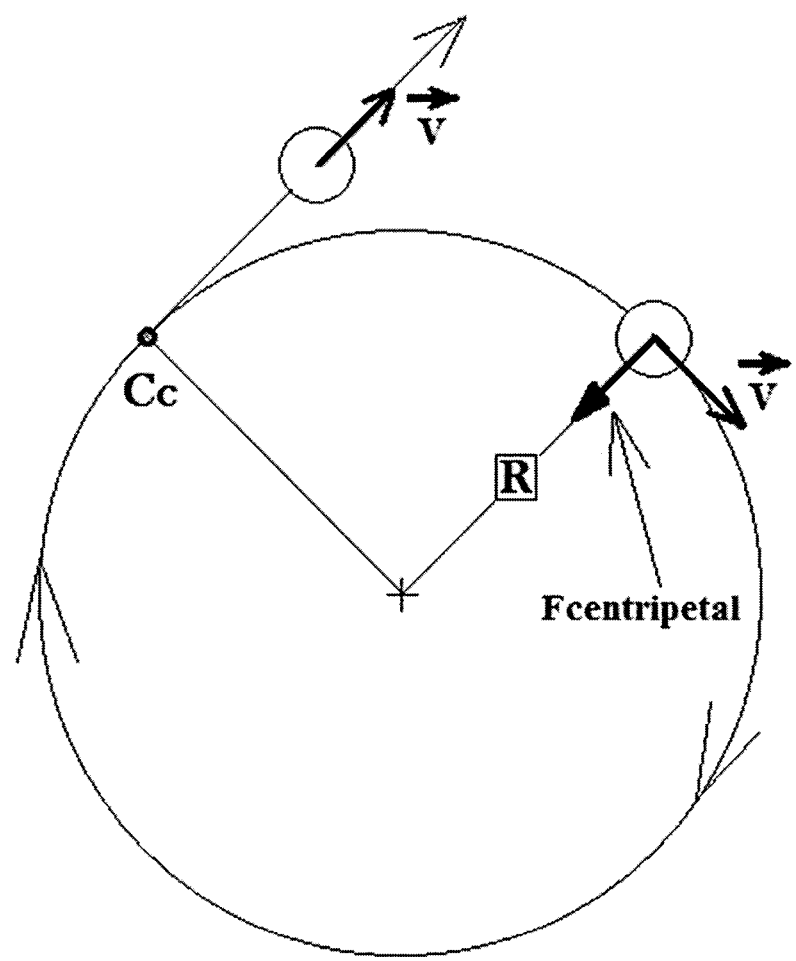
FIG. 1 is a schematic plan view of a mass rotating along a circular trajectory of radius (R) at a constant tangential velocity (V) using a retaining cord.
Figure 2:
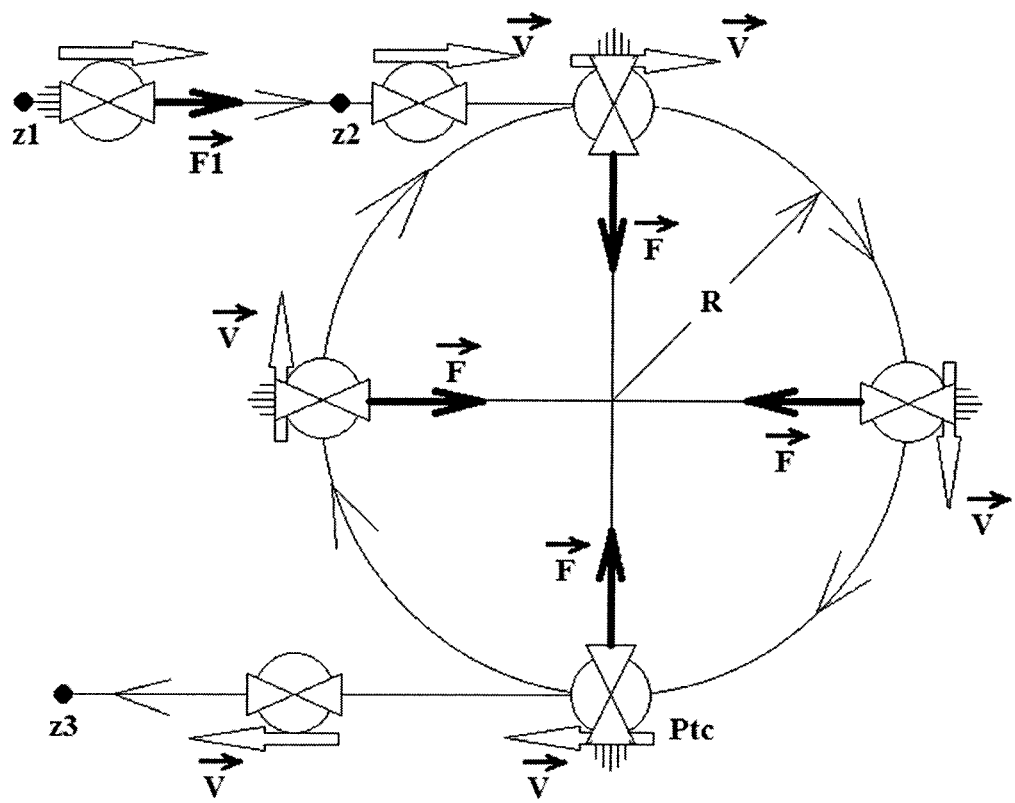
FIG. 2 is a schematic plan view of the forces acting on a spacecraft to force it to follow a circular trajectory of radius (R) at constant tangential velocity (V) using an orientable thruster.
Figure 3:
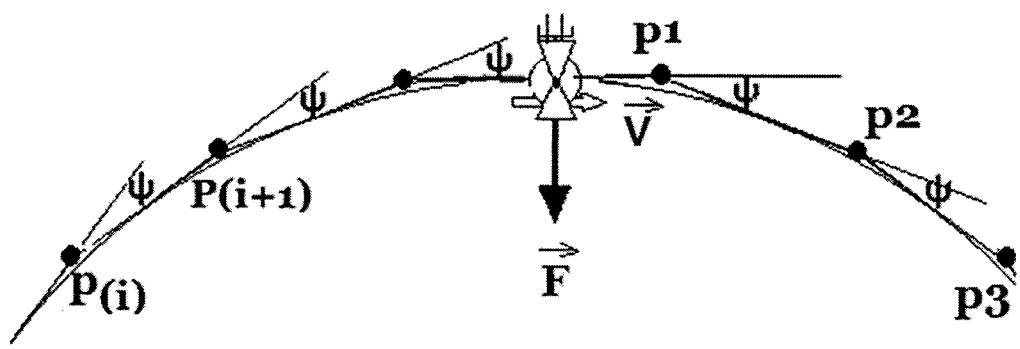
FIG. 3 is a section plan view of the continuous incremental change of direction (angles (ψ)) of a body following a circular trajectory under the action of a force acting towards the center of the circular trajectory.
Figure 4:
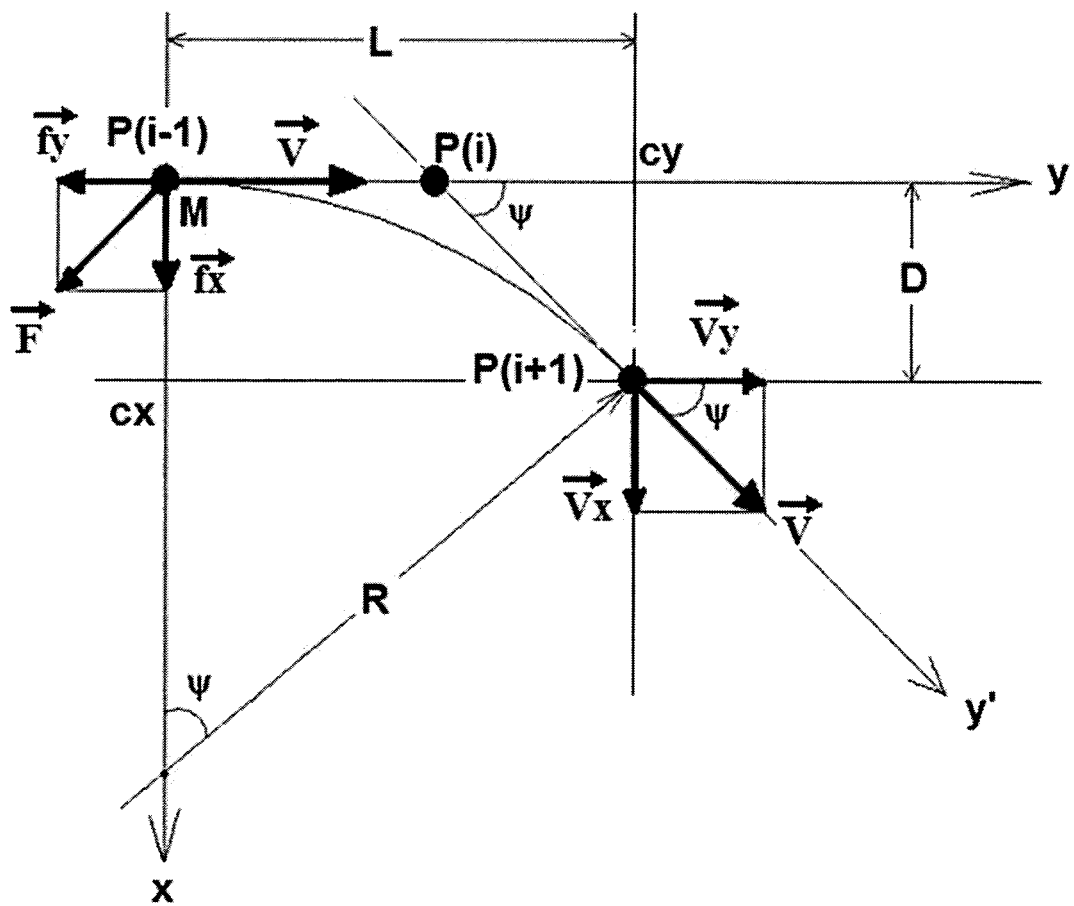
FIG. 4 is a schematic force/velocity diagram of a body undergoing an incremental change of direction (angle (ψ)) along a circular trajectory.
Figure 5:
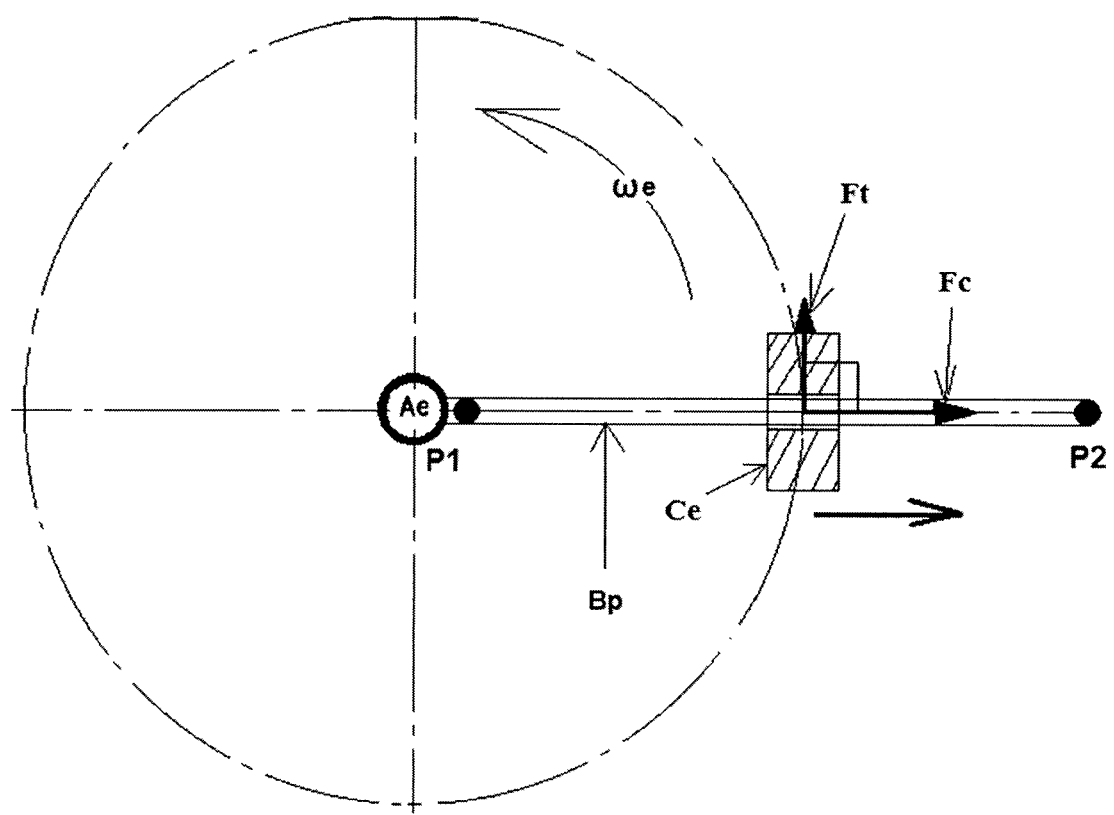
FIG. 5 is a schematic force/velocity plan view of a body (Ce) of mass (Me) free to radially slide along a bar (Bp), between points (P1) and (P2), because of centrifugal forces during the rotation of the assembly (Ce+Bp) at constant rotational or angular velocity (ψe) about shaft (Ae)
Figure 6:
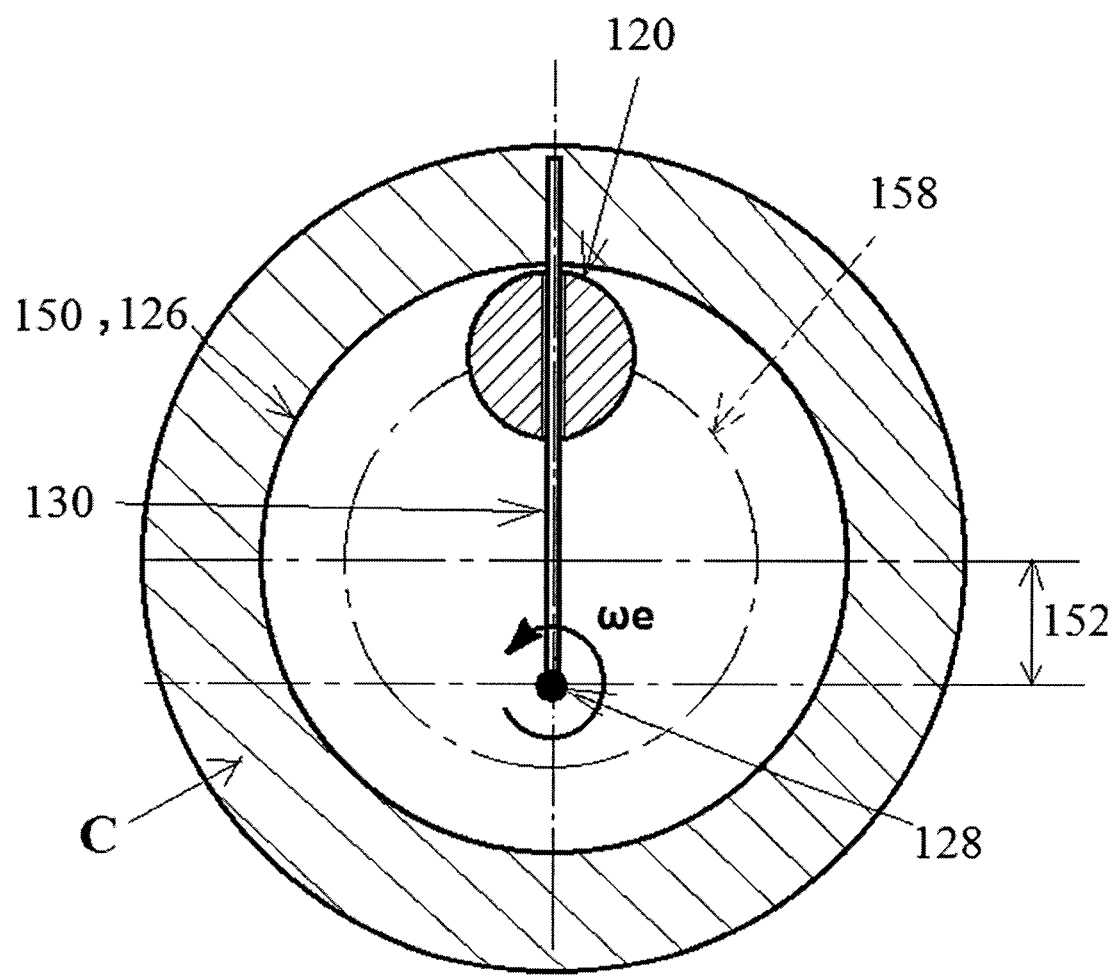
FIG. 6 is a schematic plan view showing a mass (M) contained within a core (C) and rotating about a shaft (Axt) shifted relative to the center of a bore (Tpi) by a shifting distance (e), the mass (M) being displaced along the eccentric closed trajectory (Traf) defined by the perimeter of the bore (Tpi) extending through the core (C), with the center of inertia (cg) of the mass having its own trajectory, via a guiding bar (Fcht) rotating with the shaft (Axt), the mass (M) being free to radially slide along the guiding bar (Fcht) and abut against the perimeter of the bore (Tpi)
Figure 7:
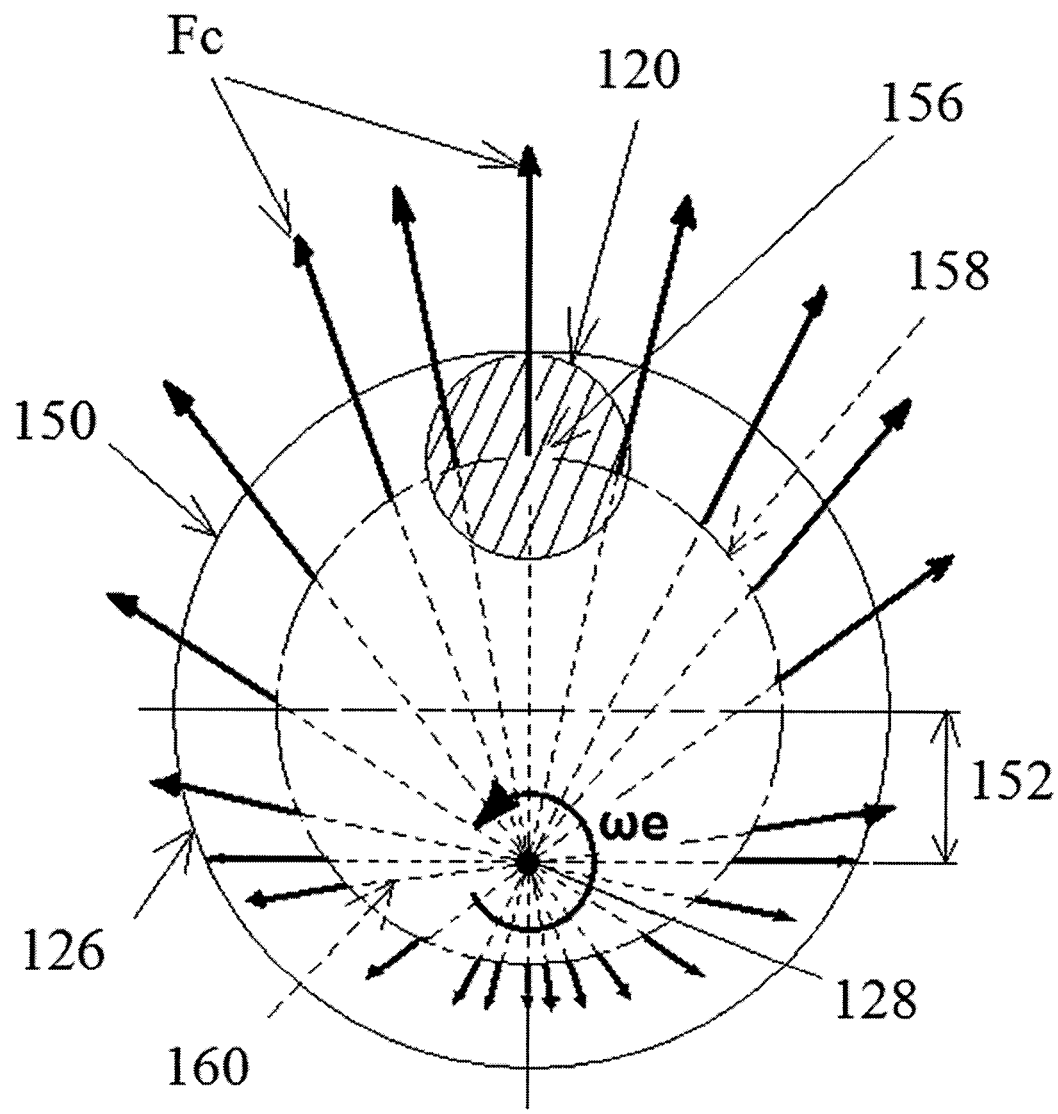
FIG. 7 is a schematic plan view showing the varying amplitude and direction of the centrifugal forces along the circular trajectory of the center of inertia (cg) of the mass (M) of FIG. 6, the radius of the center of inertia (cg) at the different positions along its trajectory is shown in dotted lines.

In order to explain the basic principles of the present invention, FIG. 6 is a schematic representation of a mass (M) 120 contained within a core (C) 154 and rotating about a rotating shaft (Axt) 128 shifted relative to the center of the bore by a shifting distance (e) 152, the mass (M) 120 being displaced along the eccentric closed trajectory (Traf) 150 defined by the perimeter of the bore (Tpi) 126, of circular shape in the present case (any other shape could also be considered), extending through the core (C) 154, with the center of inertia (cg) 156 of the mass 120 having its own trajectory (Tcg) 158. The mass (M) 120 is forced to move tangentially via a guiding bar (Fcht) 132 rotating with the shaft (Axt) 128 as being integral therewith, while the mass (M) 120 is free to radially or axially slide along the guiding bar (Fcht) 132 and to abut against the perimeter of the bore (Tpi) 126. Accordingly, the rotation of the mass (M) 120 generates centrifugal forces (Fc) having different amplitudes depending on the position of the mass 120 on the closed trajectory (Traf) 150, each position having a respective varying radius (Rcg) 160 shown in dotted lines in FIG. 7. Accordingly, FIG. 7 schematically shows the varying amplitudes and direction of the centrifugal forces (Fc) along the circular trajectory (Tcg) 158 of the center of inertia (cg) 156 of the mass (M) 120 of FIG. 6.

Following the basics presented in FIGS. 6 and 7, FIGS. 8 and 18 show respective section and plan views of generators of centrifugal forces from eccentrics with variable radius (GCFEVR-1) 101 in accordance with embodiments of the present invention. The GCFEVR-1 101 has either an angular shifting (a) (FIG. 8) or a linear shifting (e) 152, or translation, (FIG. 18) between the center of the rotating shaft (Axt) 128 and the center of the trajectory (Traf) 150 of the masses (M) 120 formed by the bore (Tpi) 126, a circular trajectory in this case. The two radially opposed masses (M) 120, relative to the shaft (Axt) 128, are linked to the shaft (Axt) 128 via a mass driving member (Mte) 166 in the form of a guiding bar (Fcht) 132 having a generally U-shape on either side of the shaft 128. The masses (M) 120 are allowed to freely radially slide along the guiding bar (Fcht) 132 on their respective side of the shaft (Axt) 128.

Figure 8:
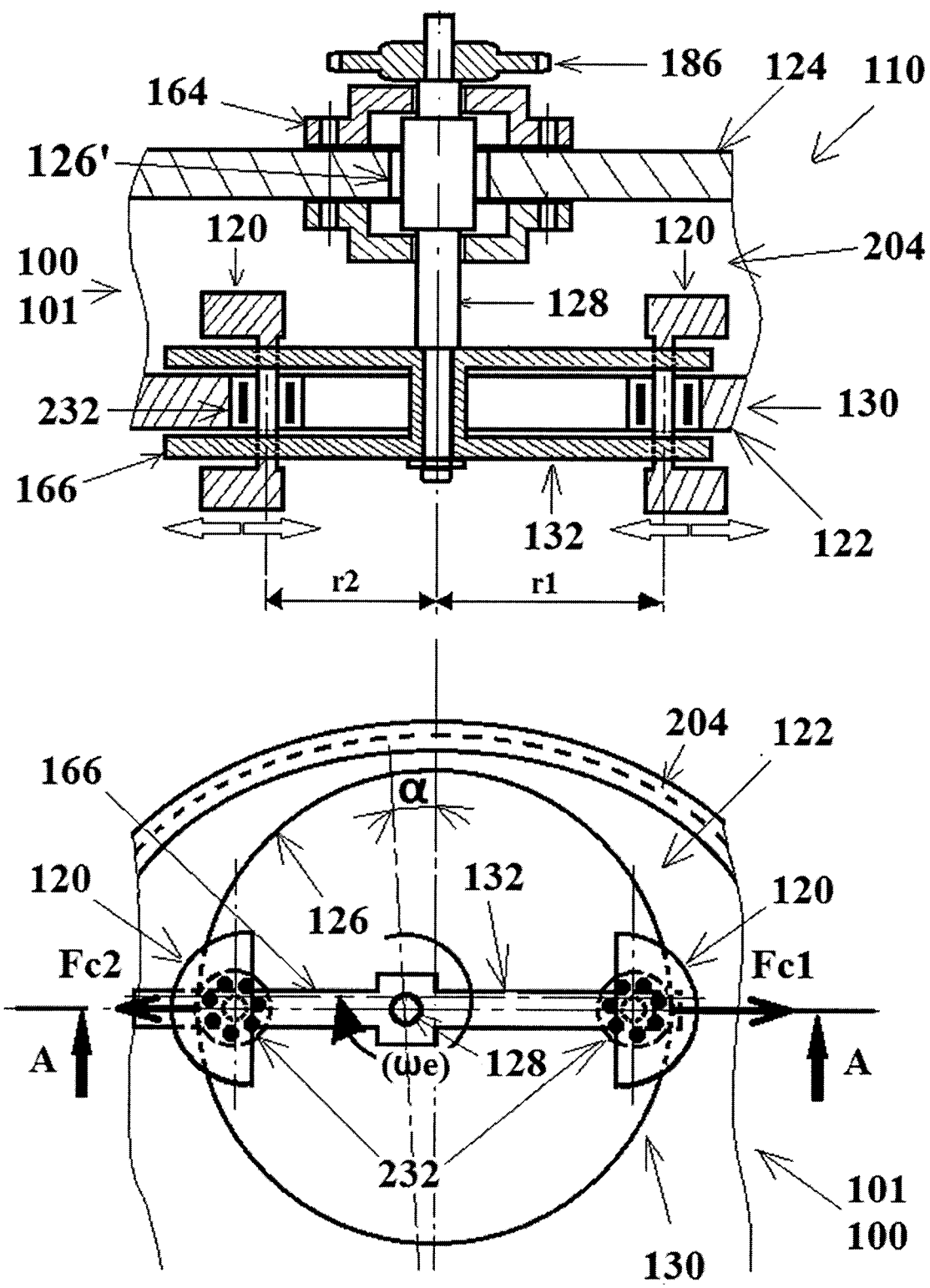
FIG. 8 are partially broken schematic elevation section (taken along line A-A) and plan views of an embodiment of a first type of generators of centrifugal forces from eccentrics with variable radius (GCFEVR-1s) according to the present invention with a guiding bar (Fcht) and two masses (M), as used in a machine (MGCFEVR—Machine including at least one GCFEVR) with rotating movement.
Figure 9:
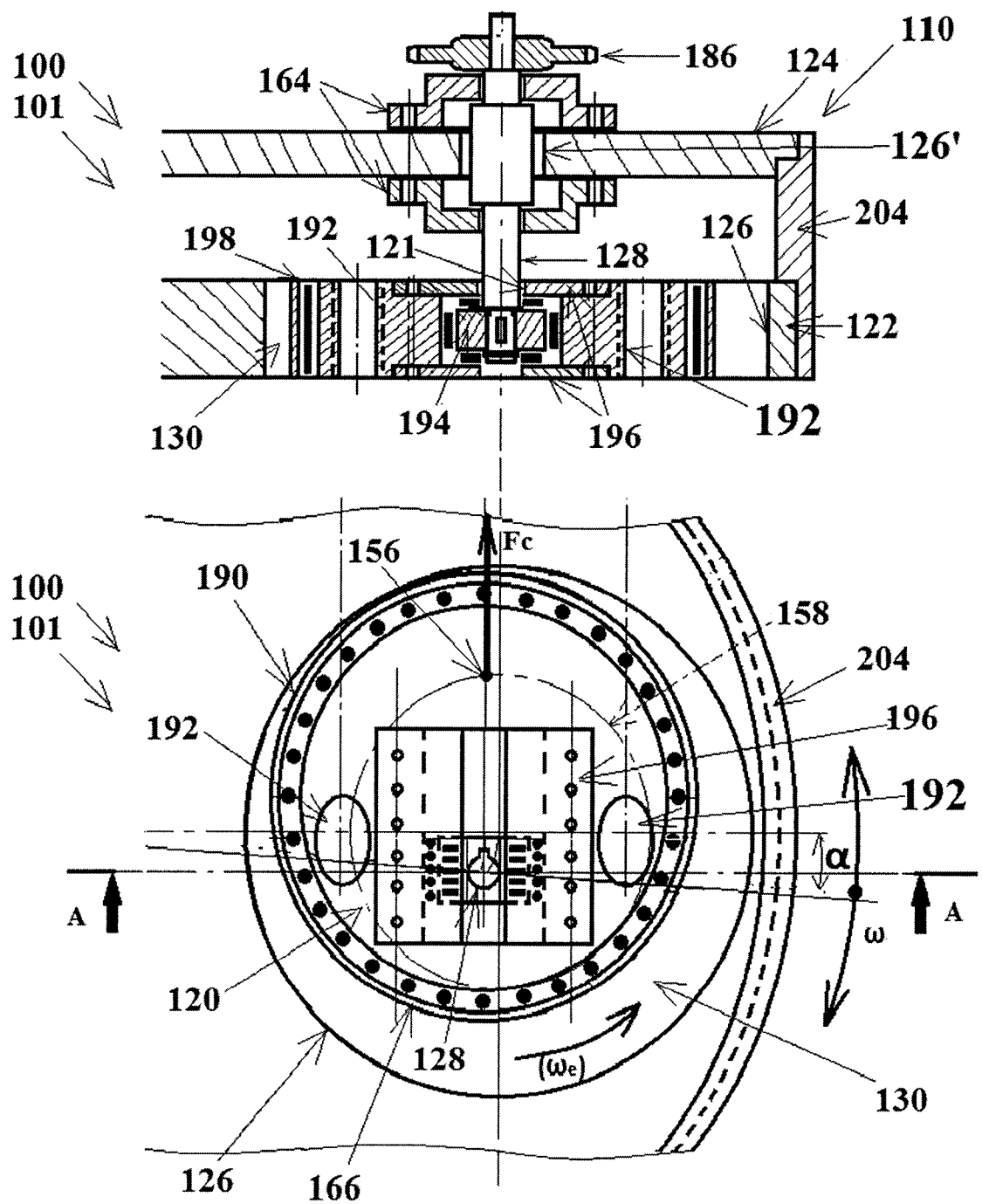
FIG. 9 are partially broken schematic elevation section (taken along line A-A) and plan views of another embodiment of a first type of generators of centrifugal forces from eccentrics with variable radius (GCFEVR-1s) according to the present invention with an eccentric wheel (Re) of mass (M), as used in a machine (MGCFEVR—Machine including at least one GCFEVR) with rotating movement.
Figure 18:
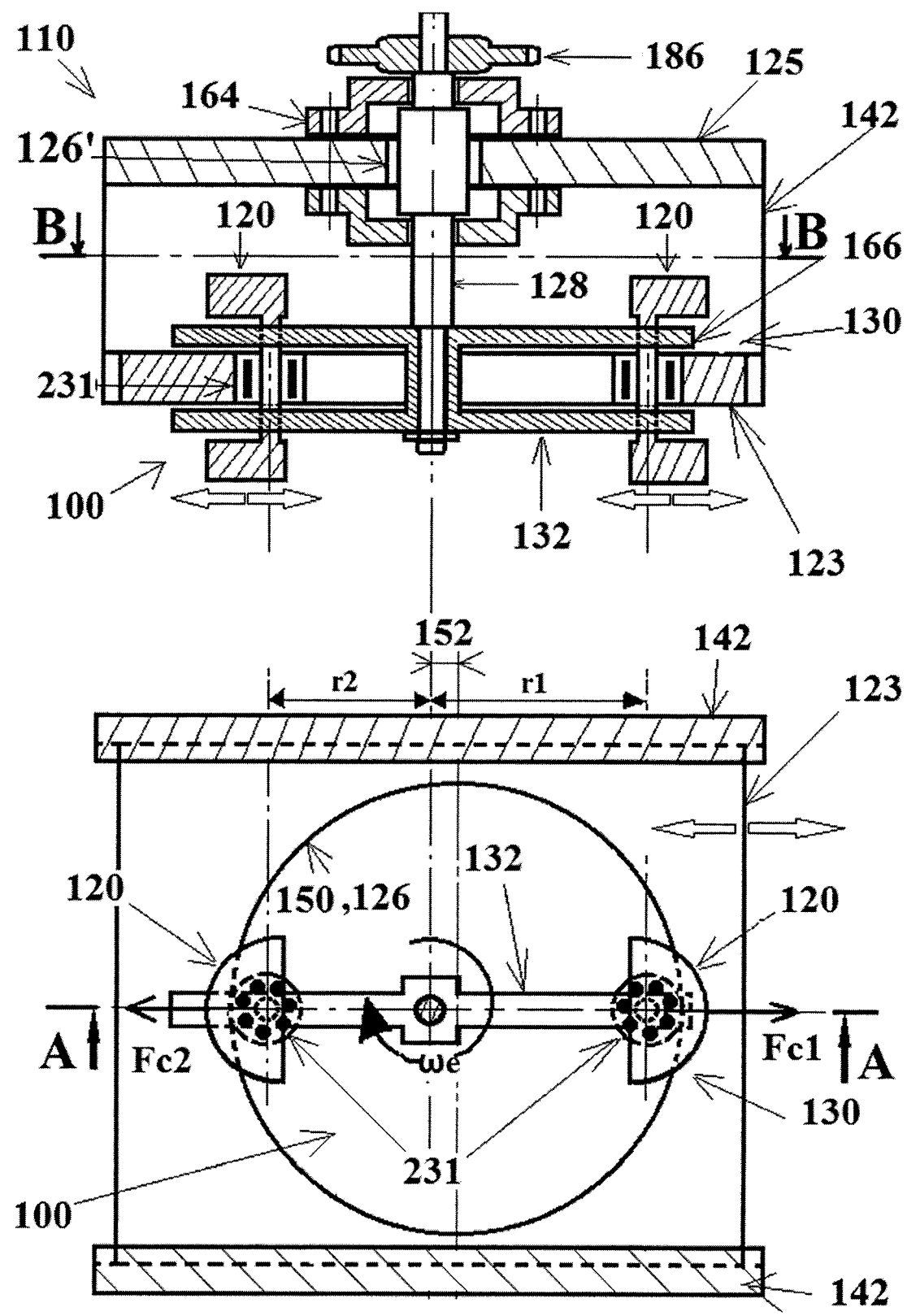
FIG. 18 are views similar to FIG. 8, showing an embodiment of generators of centrifugal forces from eccentrics with variable radius (GCFEVRs) according to the present invention with a guiding bar (Fcht) and two masses (M), as used in a machine (MGCFEVR) with linear movement.
Figure 19:
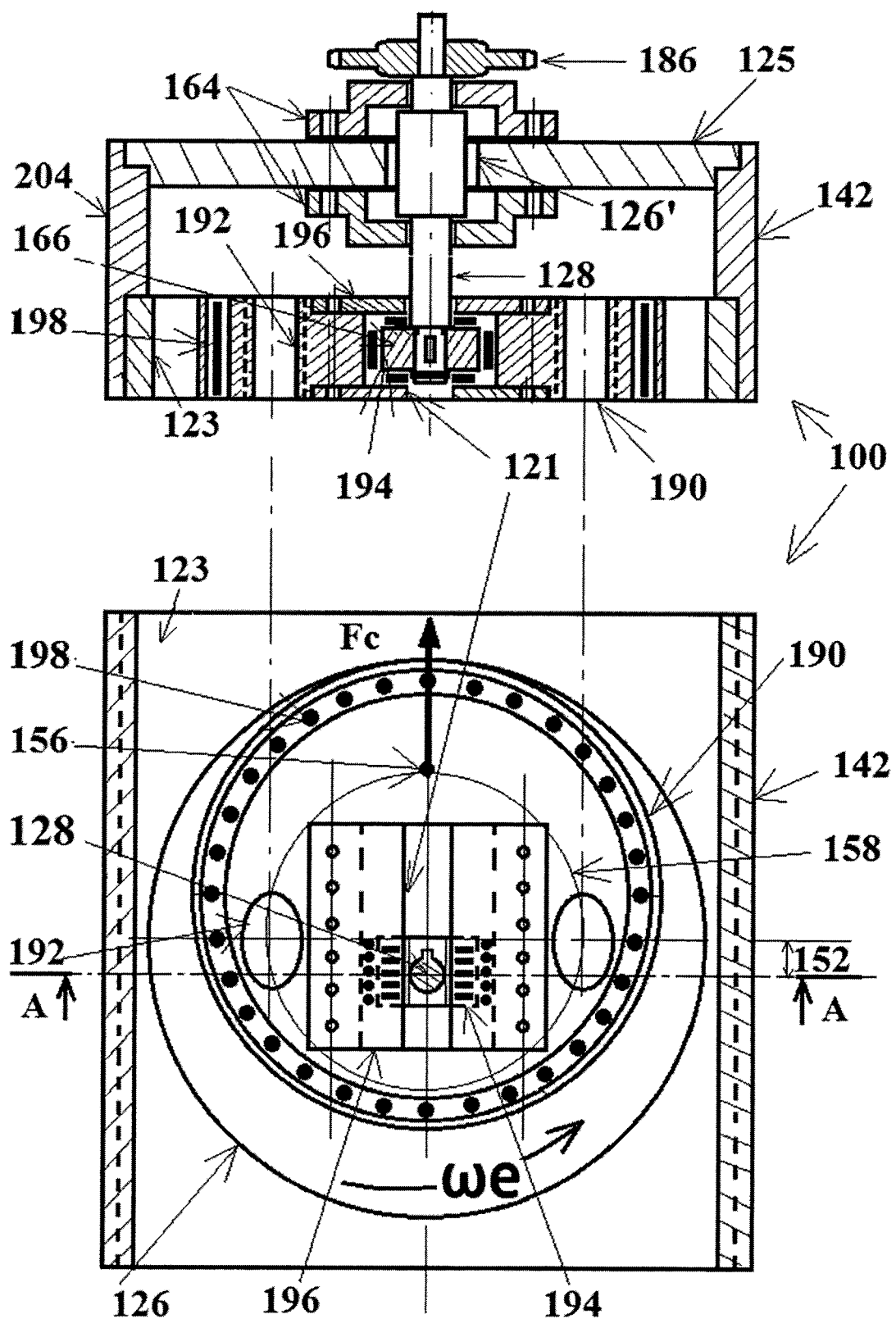
FIG. 19 are views similar to FIG. 9, showing an embodiment of generators of centrifugal forces from eccentrics with variable radius (GCFEVRs) according to the present invention with an eccentric wheel (Re) of mass (M), as used in a machine (MGCFEVR) with linear movement.

FIGS. 9 and 19, similarly to FIGS. 8 and 18, respectively, show respective section and plan views of generators of centrifugal forces from eccentrics with variable radius (GCFEVR-1) 101 in accordance with other embodiments of the present invention. In these GCFEVR-1, the mass driving member (Mte) 166 is in the form of radially oriented slot 121 formed within the mass (M) 120 being an eccentric wheel (Re) 190 of mass (M) 120 and having a center of mass or inertia (cg) 156 shifted relative to its center of geometry. The eccentric wheel (Re) 190 is free to radially slide, within the bore (Tpi) 126, relative to the rotating shaft (Axt) 128 that forces the mass (M) 120 into its rotating movement.

Figure 20:
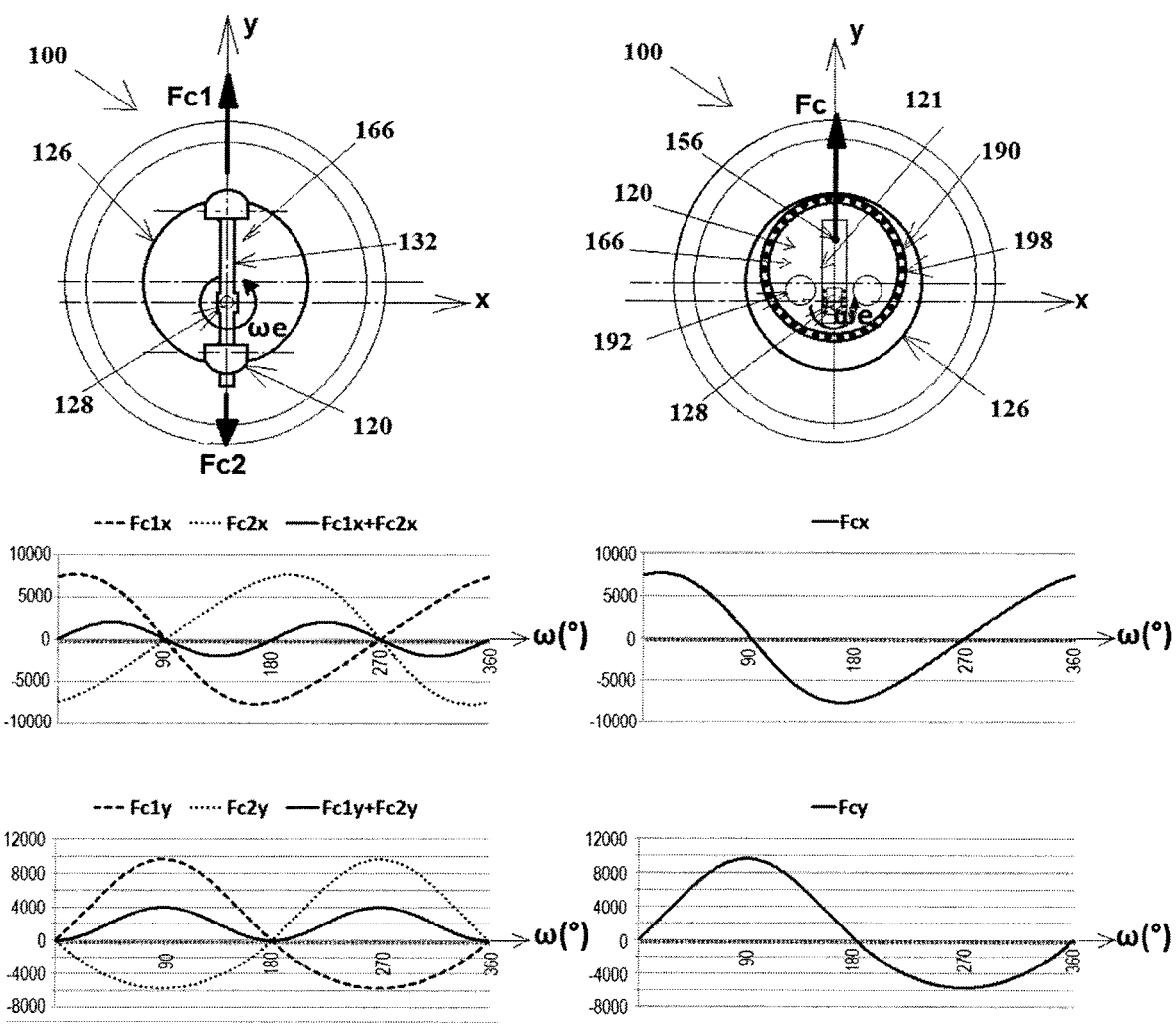
FIG. 20 is a schematic plan view, showing examples of generators of centrifugal forces from eccentrics with variable radius (GCFEVRs) of FIGS. 8 and 9, along with typical curves of the value of the centrifugal forces generated by only one GCFEVR, along axes (x) and (y), for one 360-degree (2π-radian) rotation of the shaft (Axt)

FIG. 20 shows typical curves of the variation of the value of the centrifugal forces (Fc, Fc1, Fc2) generated by the mass(es) (M) 120 of only one GCFEVR-1 101 of FIGS. 8 (or 18) and 9 (or 19), respectively, along axes (x) and (y), for one 360-degree (2π-radian) rotation of the shaft (Axt) 128. It would be obvious to one skilled in the art that considering two GCFEVR-1s 101 of FIG. 9 or 19, with parallel rotating shafts (Axt) 128 with the eccentric wheels (Re) 190 rotating with an angular shift of 180° (or π radian) relative to one another essentially refers to the GCFEVR-1 101 of FIG. 8 or 18. It would be obvious to one skilled in the art that considering two GCFEVR-1 101 of FIG. 8 or 18, with parallel rotating shafts (Axt) 128 rotating in opposite angular directions relative to one another essentially cancels out the centrifugal forces along the (x) axis while making the effect of the centrifugal forces (Fc) more constant in amplitude and always in the same direction along the (y) axis.

Figure 10:
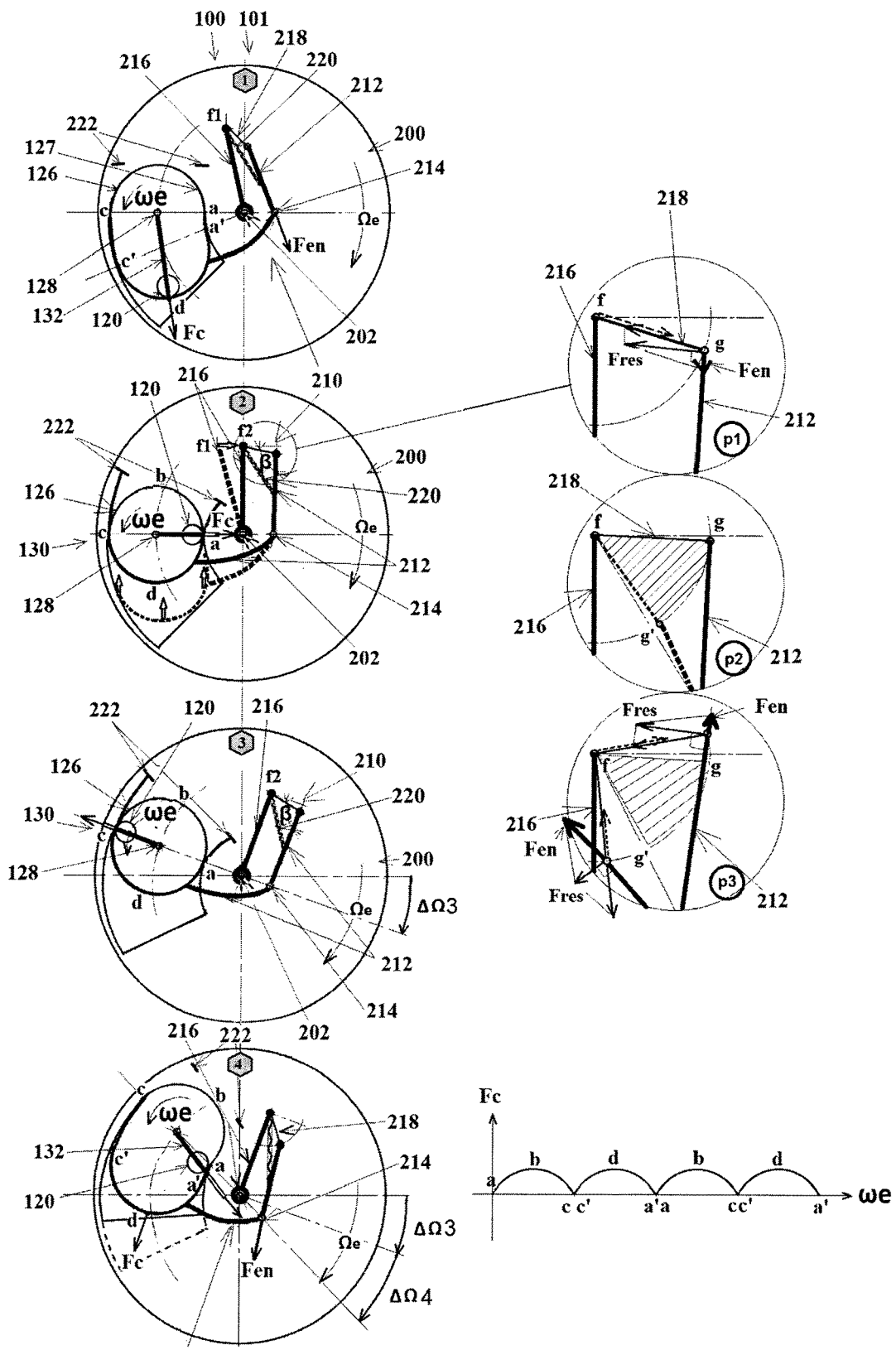
FIG. 10 are schematic elevation views of another embodiment of a first type of a generator of centrifugal forces from eccentrics with variable radius (GCFEVR-1) according to the present invention, as used in a machine (MGCFEVR—Machine including at least one GCFEVR) with rotating movement, at four (4) successive different positions of the mass (M) along its eccentric closed trajectory (Traf) and two different positions of the rotor assembly (Rot), with the GCFEVR-1 having a first portion (a-b-c) of the trajectory (Traf) being integral to the bore (Tpi) and the plate (Pli) forming the rotor assembly (Rot) of the MGCFEVR, and a remaining second portion (c'-d-a') being part of a torque orientation inverter (Ce) that is mobile relative to the plate (Pli) and movably mounted thereon; a simplified schematic diagram of a typical curve of the value of the centrifugal forces generated by the mass (M) along the (y) axis for one 720-degree (2π-radian) rotation of the rotating shaft (Axt)

Now referring to FIG. 10, there is shown four (4) successive schematic plan views of another embodiment of a first type of a generator of centrifugal forces from eccentrics with variable radius (GCFEVR-1) 101 according to the present invention, as used in a machine (MGCFEVR—Machine including at least one GCFEVR 101) 110 with rotating movement of a rotor assembly (Rot) 200 about a main shaft (Axf) 202 (two (2) successive positions being shown) rotatably mounted on a structure or chassis (Ch) 140 of the machine MGCFEVR 110. In this embodiment, a first portion (a-b-c) 127 (typically semi-circular) of the trajectory (Traf) 150 is integral to the bore (Tpi) 126 and the plate (Pci) 122 forming the rotor assembly (Rot) 200 of the MGCFEVR 110, and a remaining second portion (c'-d-a') (typically also semi-circular) being part of a torque orientation inverter (Ce) 210 that is mobile relative to the plate (Pci) 122 and movably mounted thereon. The torque orientation inverter (Ce) 210 typically includes a lever arm (Brle) 212 freely rotatably mounted onto the plate (Pci) 122 of the rotor assembly (Rot) 200 via lever shaft (o) 214, and connected to a free wheel (Rli) 216 via a connecting rod (Bie) 218. The remaining portion (c'-d-a') of the trajectory (Traf) 150 is a first end of the lever arm (Brle) 212. The second end of the lever arm (Brle) 212, opposite the first end relative the lever shaft (o) 214, is movably attached to the free wheel (Rli) 216, or freewheeling or overrunning clutch, via the connecting rod (Bie) 218. The free wheel (Rli) 216 freely rotates about the main shaft (Axf) 202 in the angular direction Ωe of the torque generated by the centrifugal forces (Fc) of the mass (M) onto the plate (Pci) 122 of the rotor assembly (Rot) 200 while being in the first portion (a-b-c) of the trajectory (Traf) 150 (clockwise direction Ωe in FIG. 10), and is prevented from freely rotating in the opposite direction (counter-clockwise direction in FIG. 10) relative to the plate (Pci) 122 of the rotor assembly (Rot) 200 via a blocking mechanism well known in the art as a ratcheting mechanism or the like. The lever arm (Brle) 212 is typically biased into the position shown in the in the second upper view of FIG. 10 (from the stippled lines position toward the solid lines position) relative to the rotor assembly (Rot) 200 via a biasing mechanism (res) 220, such as a spring mechanism or the like, typically located between the second end of the lever arm (Brle) 212 and the connecting rod (Bie) 218. In that biased or rest position, shown in the second and third plan views, a lever stop (arr) 222 is provided to prevent further displacement of the lever arm (Brle) 212 relative to the plate (Pci) 122 against the biasing mechanism (res) 220. Typically, the first end of the lever arm (Brle) 212, that is essentially free to move within the opening bore (Tpi) 126 that is configured to receive the first end therein (the stippled lines in the fourth view show that the bore (Tpi) 126 could be opened slightly further as needed), as shown in first and fourth plan views, gets in abutment contact with the plate (Pci) 122 at points (a) and (c) of the trajectory (Traf) 150, such that point (a) and (a') temporarily substantially coincides with one another while points (c) and (c') also temporarily substantially coincides with one another. When the mass (M) 120 is in the first portion (a-b-c) of the trajectory (Traf) 150, the lever arm (Brle) 212 with the biasing mechanism (res) 220 forces the free wheel (Rli) 216 to rotate along with the rotary assembly (Rot) 200. It is noted that the biasing force applied by the biasing mechanism (res) 220 is easily overrun by any centrifugal force (Fc) applied onto the first end (section (c'-d-a')) of the lever arm (Brle) 212. When the mass (M) 120 is in the first portion (a-b-c) of the trajectory (Traf) 150 (from position shown in second plan view to position shown in third plan view), the rotor assembly (Rot) 200 rotates by an angle ΔΩ3 as shown in the third and fourth views.

When the mass (M) 120, upon its rotation (we) about the rotating shaft (Axt) 128 and the guiding bar (Fcht) 132, gets into the remaining portion (c'-d-a') of the trajectory (Traf) 150, a centrifugal force (Fc) is generated and pushes the first end of the lever arm (Brle) 212 into the opposite angular direction of the rotation (Ωe) of the plate (Pci) 122, which is automatically prevented by the free wheel (Rli) 216 since it is blocked from rotating into that opposite angular direction. This centrifugal force (Fc) therefore generates onto the rotor assembly (Rot) 200, at the lever shaft (o) 214, a reacting force (Fen). This reacting force (Fen) generates a reacting torque onto the rotor assembly (Rot) 200, into the same angular rotation direction of the rotor assembly (Rot) 200 as of the torque generated by the centrifugal force (Fc) of the mass (M) when in the first portion (a-b-c) 127 of the trajectory (Traf) 150. Accordingly, when the mass (M) 120 is in the remaining portion (c'-d-a') of the trajectory (Traf) 150 (from position shown in third plan view to position shown in fourth plan view), the rotor assembly (Rot) 200 rotates by an angle ΔΩ4 as shown in the fourth view. This torque orientation inverter (Ce) 210 ensures that the torque generated by the centrifugal force (Fc) of the mass (M) 120 is always acting on a same rotational direction onto the rotor assembly (Rot) 200, independently from the position of the mass (M) 120 onto its trajectory (Traf) 150, as schematically represented by the diagram of FIG. 10 schematically showing a typical curve of the value of the torque of the centrifugal force (Fc) generated by the mass (M) 120 along the tangential direction for one 360-degree (2π-radian) rotation of the shaft (Axt) 128 onto the rotor assembly (Rot) 200.

In order to further describe the effect of the torque orientation inverter (Ce) 210, the enlarged section (p1) shows the rod force (Fres) generated onto the connecting bar (Bie) 218 between the second end of the lever arm (Brle) 212 and the free wheel (Rli) 216, during the application of the reacting torque by the reacting force (Fen), when the mass (M) 120 leaves point (c), (c') of the trajectory (Traf) 150 towards point (d). That rod force (Fres) has a first component oriented along the axis of the rod itself cancelled out by the opposing reaction force from the free wheel (Rli) 216, shown in dotted line, and a second component being the reacting force (Fen) (pointing towards the lever shaft (o) 214) acting onto the rotor assembly (Rot) 200 via the lever shaft (o) 214 and generating the reacting torque.

The enlarged section (p2) shows the angular zone (shown as the hatched portion between segments f-g and f-g') into which the connecting rod (Bie) 218 needs to be in order to have the reacting force (Fen) inducing a reacting torque into the rotational direction of the rotor assembly (Rot) 200. The first limit position, as shown by segment (f-g) in FIG. 10, is when the connecting rod (Bie) 218 forms a right angle ($\beta=90°$) with a line connecting the connection between the connecting rod 218 and the lever arm 212 with the lever shaft (o) 214, and the second limit position, as shown essentially by segment (f-g') in FIG. 10, is when the connecting rod (Bie) 218 is oriented towards the lever shaft (o) 214, or forms a flat angle ($\beta=180°$) with a line connecting the connection between the connecting rod 218 and the lever arm 212 with the lever shaft (o) 214. Accordingly, the connecting rod (Bie) 218 needs to remain between these two limit positions while the centrifugal force (Fc) of mass (M) 120 pushes onto the first end of the lever arm (Brle) 212 for the torque orientation inverter (Ce) 210 to operate.

Finally, for the sake of further explaining the effect of having the connecting rod 218 outside of the two limit positions described hereinabove, enlarged section (p3) shows that, if the connecting rod 218 is on either side outside of the two limit positions, the second component being the reacting force (Fen) acting onto the rotor assembly (Rot) 200 via the lever shaft (o) 214 is on the opposite direction (pointing away from the lever shaft (o) 214) than the desired one, as above described, such that it would slow down the rotation of the rotor assembly (Rot) 200.

Figure 11:
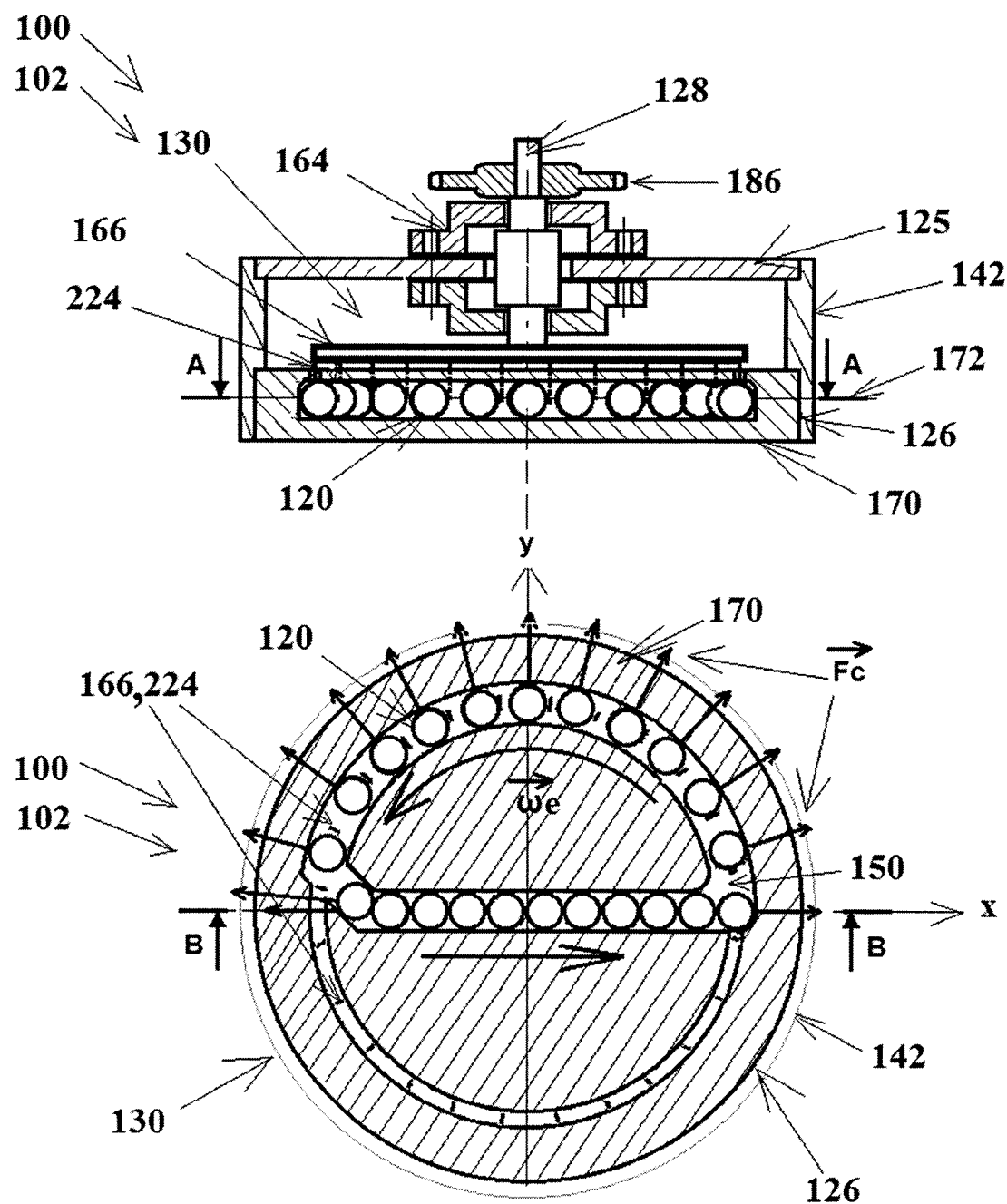
FIG. 11 are partially broken schematic elevation section (taken along line B-B) and plan section (taken along line A-A) views of an embodiment of a second type of generators of centrifugal forces from eccentrics with variable radius (GCFEVR-2s) according to the present invention with a plurality of masses (M) located into an eccentric closed trajectory (Traf) defined into a mass support member (SuM) and independently driven with arms (br) of a mass driving member (Mte), as used in a machine (MGCFEVR—Machine including at least one GCFEVR) with either rotating or linear movement.

As schematically shown in FIG. 11, a second type of generator of centrifugal forces from an eccentric with variable radius (GCFEVR-2) 102 has masses (M) 120 linked to the GCFEVR-2 via their direct presence within the eccentric closed trajectory (Traf) 150 in which they are allowed to move (similarly to the balls of a ball bearing relative to the outer race), the eccentric closed trajectory (Traf) 150 being formed within the main body of the mass support member (SuM) 170. This mass support member (SuM) 170, the external shape of which is typically a disc generally circular (although it could also be truncated, is typically located, generally tightly (but free—such as being part of the inner race of a ball bearing, with the outer race being part of the plate (Pli, Pci) 123, 122), within the bore (Tpi) 126 and is not driven into rotation by the rotating shaft 128 (but only selectively (rotation angle ($\theta$)) by the mass support rotation system (Srst) 148 described herein below). The masses (M) 120 are driven in motion along this eccentric closed trajectory (Traf) 150 via a simple abutment contact with the mass driving member (Mte) 166, as for examples described hereinafter the arms (br) 224 and the like, mounted on the rotating shaft (Axt) 128 and rotating therewith. The arms (br) 224 are typically axially and radially oriented relative to the rotating shaft (Axt) 128 and circumferentially, and preferably equally, spaced apart from one another.

The masses (M) 120 of the GCFEVR-2 102, typically of a spherical shape but not limited thereto, can be flexibly linked to one another or not so as to allow them to independently apply or transmit their centrifugal forces onto the eccentric closed trajectory (Traf) 150 and consequently, onto the plate (Pli, Pci) 123, 122 via the mass support member (SuM) 170 abutting onto the periphery of the bore (Tpi) 126. The eccentric closed trajectory (Traf) 150 of the masses (M) 150 could be on a same mass plane 172 or on different planes 172, 172' (and in between the planes) perpendicular to the axis of the rotating shaft (Axt) 128.

Figure 12:
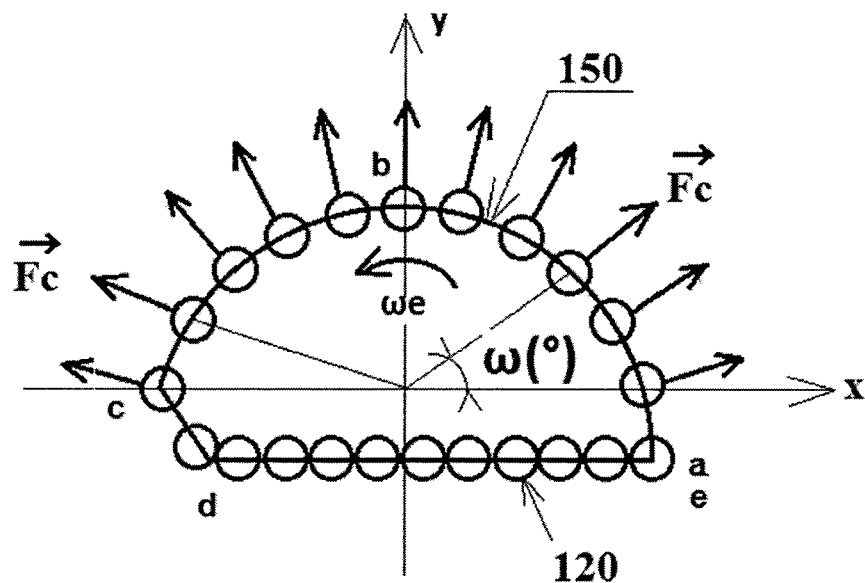
FIG. 12 is a schematic diagram plan section view of the trajectory (Traf) of the masses (M) of a GCFEVR-2 of FIG. 11, along with typical curves of the value of the centrifugal forces generated by only one GCFEVR-2 of FIG. 11, along axes (y) and (x), for one complete lap of all masses (M) along the trajectory (Traf), the centrifugal forces of all the masses (M) along the (x)-axis essentially cancel out one another.
Figure 12:
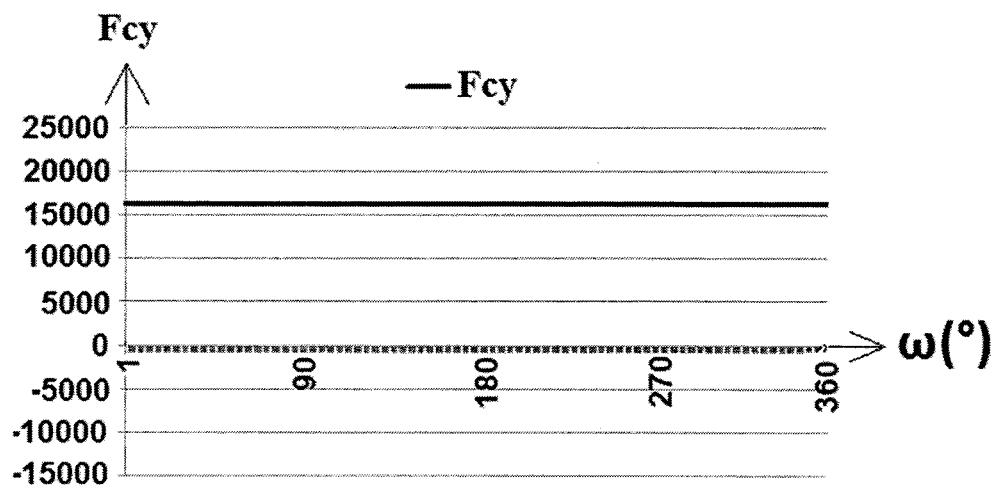
Figure 12:
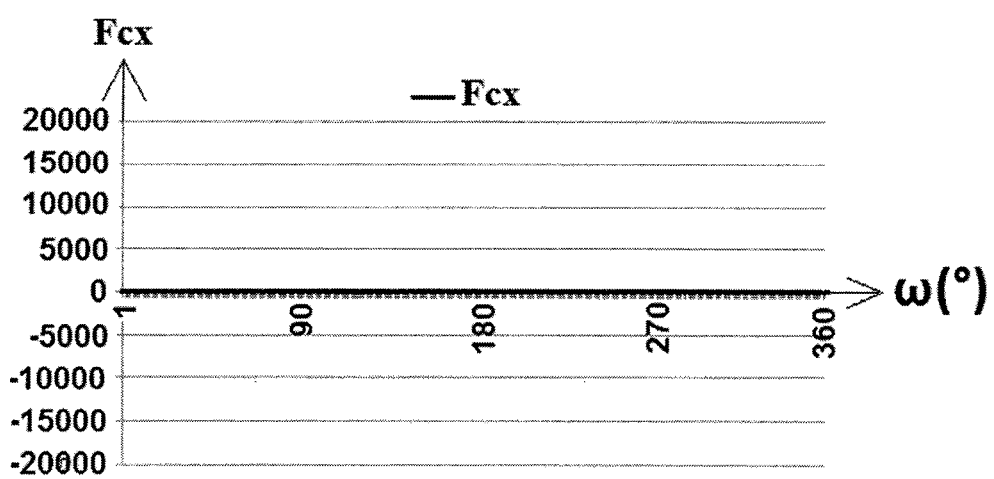

Referring now to FIG. 12, there is shown a profile representation of the schematic eccentric closed trajectory (Traf) 150 followed by the masses (M) 120 of FIG. 11 being located on a same mass plane 172 and being formed into the mass support member (SuM) 170. The eccentric closed trajectory (Traf) 170 includes a circular (but other non-circular curved shapes could be considered) portion (a-b-c) where the masses (M) 150 generates centrifugal forces (Fc) that are applied onto the periphery of the bore (Tpi) 126 via the abutment contact of the mass support member (SuM) 170 against the bore (Tpi) 126. These centrifugal forces (Fc) are all oriented on a same side of the bore (Tpi) 126, relative to its center. Along this circular portion of the eccentric closed trajectory (Traf) 150, the masses (M) 120 are driven by the mass driving member (Mte) 166 linked to the rotating shaft (Axt) 128, namely the axially extending arms (br) 224.

In the case of the GCFEVR-2 102, the radius of the curve followed by each mass (M) 120, along the trajectory (Traf) 150, can be constant (or variable) along a first portion (case of the portion (a-b-c)) and have a sudden or instantaneous variation when the mass moves along points (c-d) or (e-a).

Between points (c-d), the masses (M) 120 move away from the arms (br) 224 while following the imposed trajectory (Traf) 150, and follow each other along the linear portion (d-e) while successively pushing on each adjacent one without generating any centrifugal forces (since they follow a linear path). Between points (e-a), each mass (M) 120 successively gets into contact with an arm (br) 224 to be driven into its circular displacement path (a-b-c) to generate centrifugal forces (Fc) again there along.

In this case of the GCFEVR-2 102 of FIG. 11, the resultant (or resulting force) of the centrifugal forces (Fc) generated on the circular portion (a-b-c), at any specific time, is substantially always oriented in the same positive direction of the (y)-axis, while always cancelling each other out along the (x) axis, as illustrated in FIG. 12.

It is to be noted that, in the above case, if portions (c-d) and (e-a) are curved, when moving within portions (c-d) and (e-a) of the imposed trajectory (Traf) 150, masses (M) 120 generate centrifugal forces, the resultant of which is in the direction of the (y) axis but in the negative direction.

Figure 13:
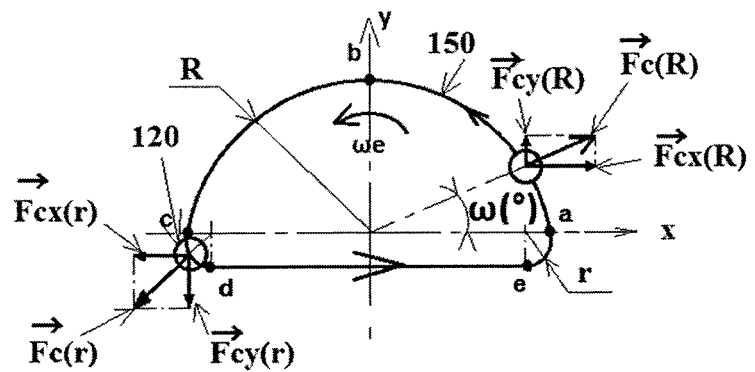
FIG. 13 is a schematic diagram plan view of the trajectory (Traf) of the masses (M) of a GCFEVR-2 similar to that of FIG. 11, having generally the same curved first portion (a-b-c) with different curved portions (c-d) and (e-a), and linear portion (d-e), along with a first typical curve of the value of the centrifugal forces (Fcy(R)) generated by five (5) masses (M), along the (y)-axis, circulating in the curved portion (a-b-c) for a 900-degree (5π-radian) rotation of the shaft (Axt), a second typical curve of the value of the centrifugal forces (Fcy(r)) generated by five (5) masses (M), along the negative (y)-axis, circulating in the curved portions (c-d) and (e-a) for a 900-degree (5π-radian) rotation of the shaft (Axt), and a third typical curve of the value of the sum of the centrifugal forces (Fcy(R)–Fcy(r)) generated by the five (5) masses (M), along the (y)-axis and circulating in all of the curved portions (a-b-c), (c-d) and (e-a) showing that the overall (average) value of the sum being with the work generated by the centrifugal forces of all the masses (M), represented by the surface under the curve, being essentially null about the (y)-axis by being essentially equal to one another on either side, with the work generated by the centrifugal forces of all the masses (M), represented by the surface under the curve, being the same over and under the x-axis of the curve and therefore essentially null.
Figure 13:
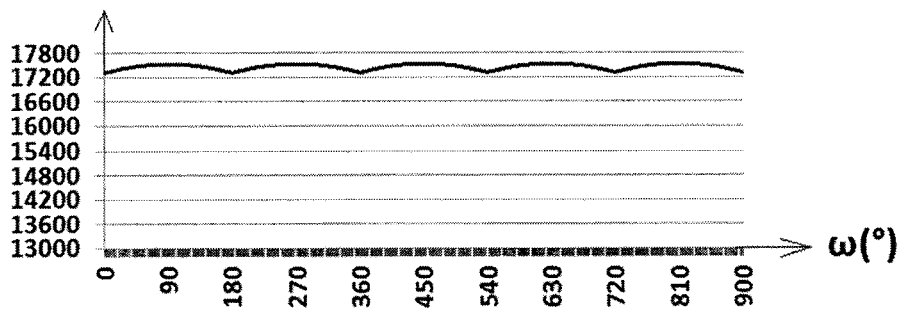
Figure 13:
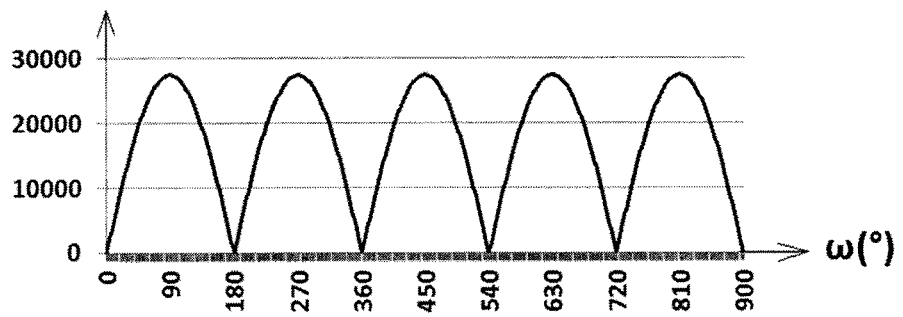
Figure 13:
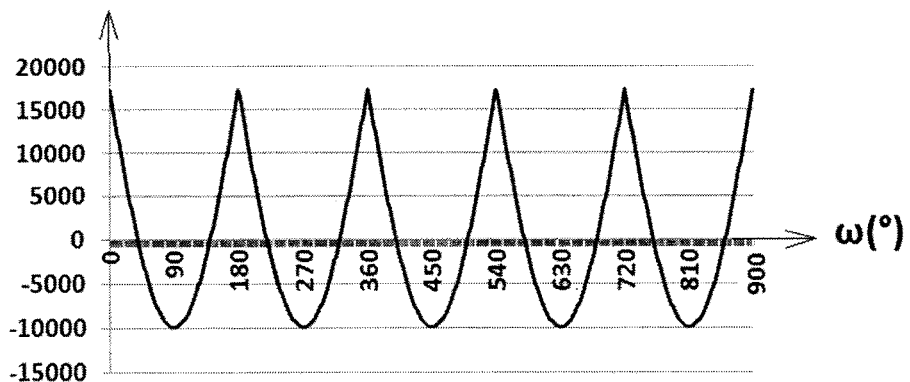

Accordingly, if the sum of the angles of all curved portions of the trajectory (Traf) 150 add up to a multiple of 360° (or $2\pi$ radians), into a same rotational direction, as with portion (a-b-c) of 180° and each portions (c-d) and (e-a) of 90°, the resultant of all centrifugal forces of the masses (M) 120 along the trajectory (Traf) 150 will generate oscillations with an overall total work of a null value, as illustrated in FIG. 13.

In fact, this is essentially because, in the case of the GCFEVR-2 102, it is the linear/tangential velocity (V) which remains constant for all masses (M) 120, irrespective of their position along the eccentric closed trajectory (Traf) 150. In FIG. 13, as the ratio of the number of masses (M) 120 simultaneously located along the portion (a-b-c) over the ones simultaneously located along portions (c-d) and (e-a) is equal to (R(tr)/r(tr)), this ensures that such a trajectory (Traf) 150 could never generate a centrifugal force that could provide a non-null work in a continuous fashion (the value of the centrifugal force generated along portions (c-d) and (e-a) is (R(tr)/r(tr)) times larger than the one generated along portion (a-b-c)).

In order to go around this problem, it is necessary to cancel out the effect of centrifugal forces into the negative direction along the (y)-axis, hence avoid centrifugal forces, or their effects, along portions (c-d) and (e-a) of the trajectory (Traf) 150. This can be done in many different ways, as shown in the following, but not limiting, three examples.

Figure 14:
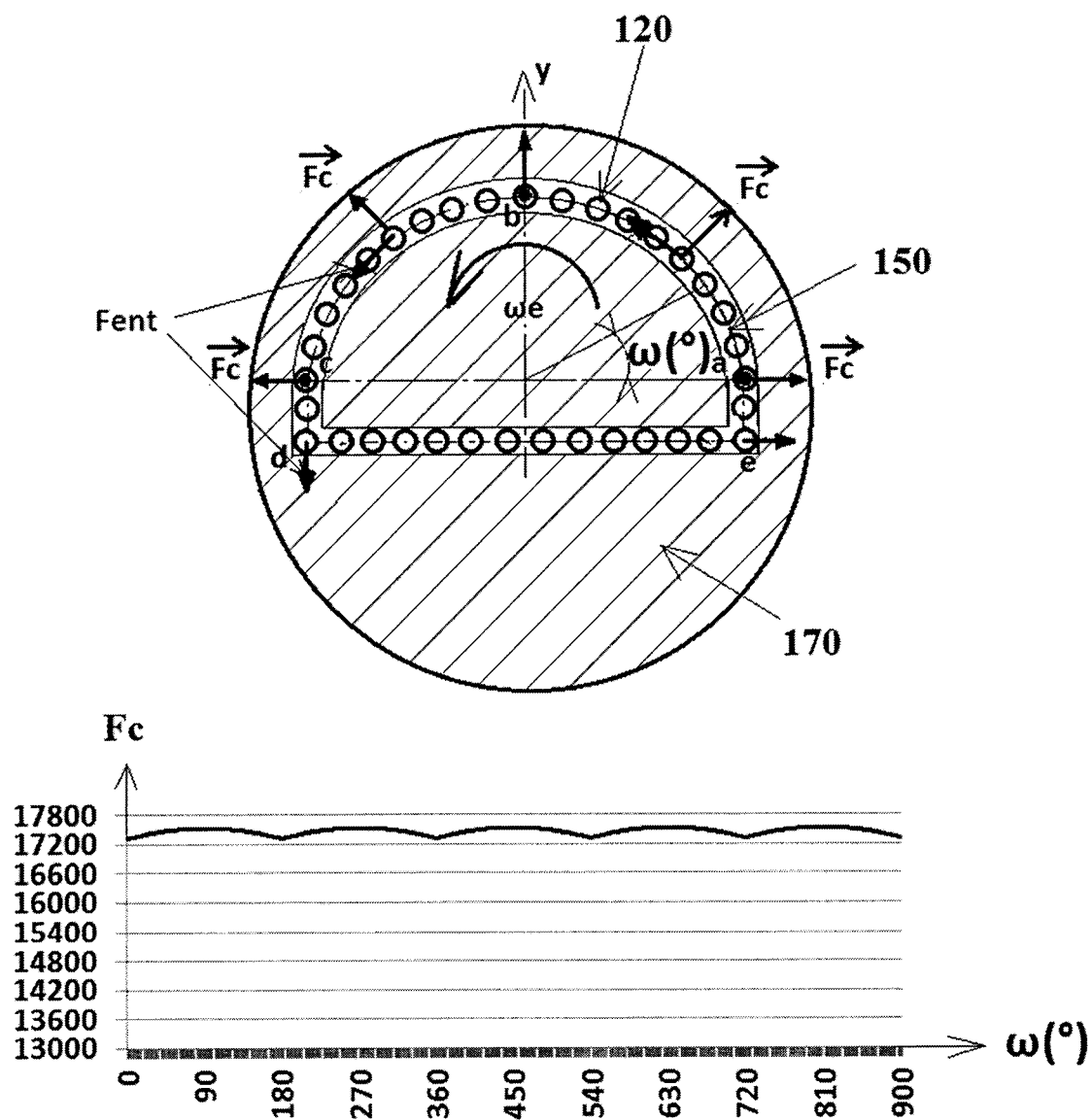
FIG. 14 is a schematic diagram plan view of the trajectory (Traf) of the masses (M) of a GCFEVR-2 similar to that of FIG. 11, having generally linear portions (c-d) (d-e) and (e-a), along with a typical curve of the value of the centrifugal forces generated by the masses (M), along the (y)-axis, for one complete lap of all masses (M) along the trajectory (Traf), with the resultant of the centrifugal forces being generally constant along the (y)-axis essentially cancel out one another.

First, in the example shown in FIG. 14, the eccentric closed trajectory (Traf) 150 is formed of a curved portion (a-b-c), which could be of constant or variable radius, where are generated centrifugal forces having a resultant always oriented into the positive direction along the (y)-axis and of a practically generally constant value (see schematic diagram of typical curve of FIG. 14), and three linear portions (c-d), (d-e) and (e-a) where no centrifugal force can be generated.

Along their trajectory (Traf) 150, masses (M) 120 are driven into motion via a mass driving member (Mte) 166 that could be implemented in many different ways, mechanical, electrical, hydraulic, etc. Because of this driving, each mass (M) 120 gets and stores a quantity of kinetic energy $[E_{C(M)}=(\frac{1}{2}) \cdot M \cdot V^2]$. When getting into contact with portion (d-e), at point (d) and after point (e), each mass (M) 120 transmits to the mass support member (SuM) 170 at point (d) a driving force (Fent) oriented toward the negative direction along the (y)-axis, and at point (e) a driving force (Fent) perpendicular to the (y)-axis. In such a case, the driving forces (Fent) at point (d) will oppose to the centrifugal forces generated along the curved portion (a-b-c). As the driving forces (Fent) are from the mass driving member (Mte) 166, hence from the external energy provided to put the masses (M) into motion by the shaft driving mechanism, they are totally independent from the centrifugal forces (Fc) and their effect onto the mass support member (SuM) 170 can be reduced, even cancelled, without any impact onto the centrifugal forces (Fc) generated into the curved portion (a-b-c).

Figure 15:
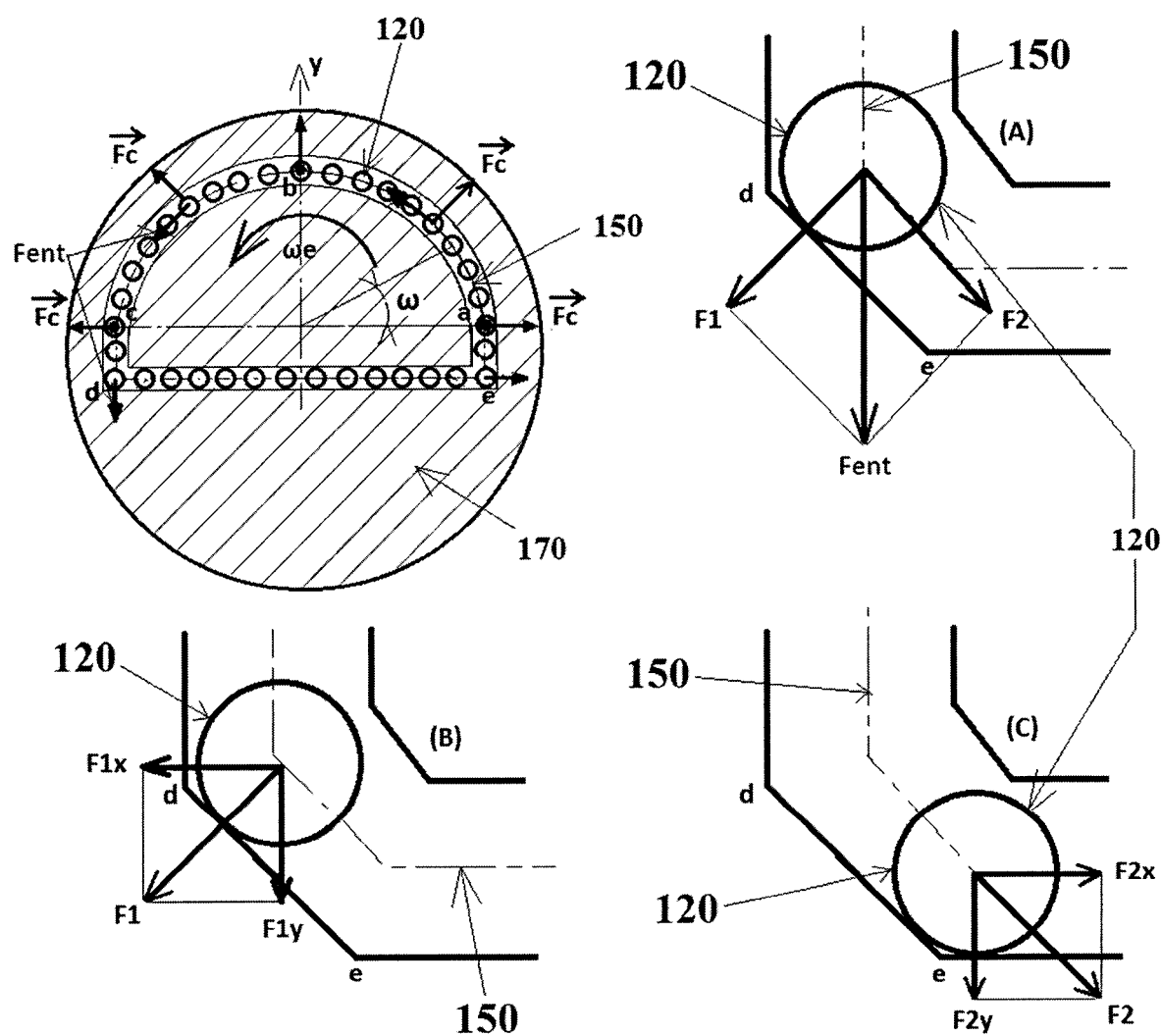
FIG. 15 is a schematic diagram plan view of the trajectory (Traf) of the masses (M) of a GCFEVR-2 similar to that of FIG. 11, having generally linear portions (c-d) (d-e) (e-f) (f-g) and (g-a), with portions (d-e) and (f-g) being generally angled (with an angle different than 0° and 90°) relative to the (y)-axis, with three enlarged sections A, B, and C of the portion (d-e) showing the how the driving force (Fent) acting on the mass support member (SuM) is divided along the two (x) and (y) axes.

Second, in the example shown in FIG. 15, the addition of inclined portions (d-e) and (f-g) into the trajectory (Traf) 150 relative to trajectory of FIG. 14, induces first component of the driving forces (Fent) along the (y)-axis (into the negative direction opposite the centrifugal forces generated into the curved portion (a-b-c)) but smaller in value than the corresponding force of FIG. 14. In fact, at point (d), the contact of the mass (M) with the plane (or surface) portion (d-e) induces two components (F1, F2) (see enlarged section A of FIG. 15). The component (F2) is used to drive the mass (M) along the portion (d-e) while the component (F1), as shown in enlarged section B of FIG. 15, is divided again into a sub-component (F1x) perpendicular to the (y)-axis and a sub-component (F1y) opposing to the centrifugal forces (Fc) generated into the curved portion (a-b-c). When arriving at point (e), in contact with plane (or surface) portion (e-f) (see enlarged section C of FIG. 15), the component (F2) is divided again into a sub-component (F2x) used to drive the mass (M) along the portion (e-f) and a sub-component (F2y) opposing to the resultant of the centrifugal forces (Fc) generated into the curved portion (a-b-c).

It is therefore obvious, when compared with the case of FIG. 14, the effect of the driving forces (Fent) opposing to the resultant of the centrifugal forces (Fc) generated into the curved portion (a-b-c) is smaller in value, for this case of FIG. 15. Concerning the effect of sub-components (F1x) and (F2x) onto the mass support member (SuM) 170, they could eventually be cancelled out by having two GCFEVR-2 aligned with one another into the (x)-axis but rotating in opposite directions.

Figure 16:
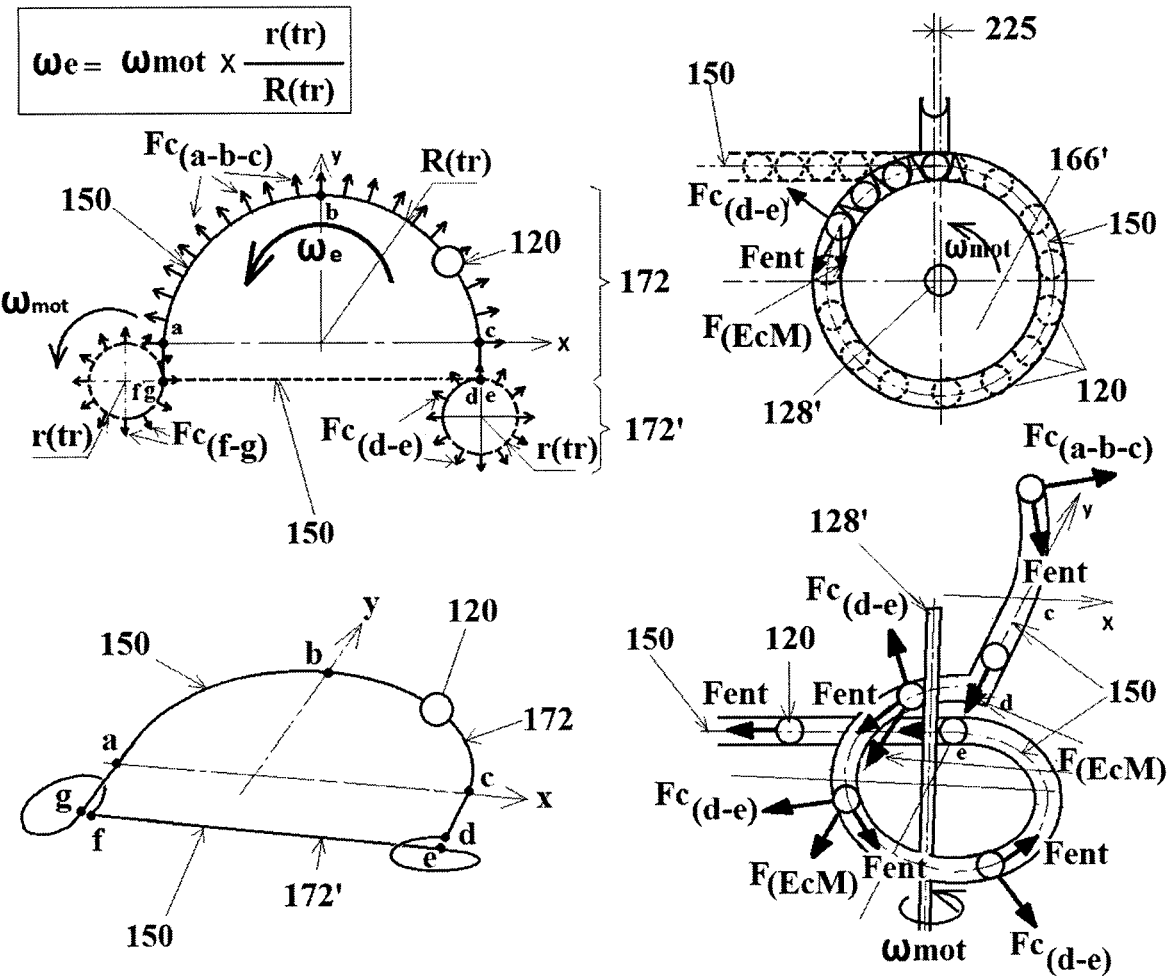
FIG. 16 is schematic diagram plan and top perspective views of the trajectory (Traf) of the masses (M) of a GCFEVR-2 similar to that of FIG. 11, having generally linear portions (c-d) (e-f) and (g-a) and 360°-curved portions (d-e) and (f-g), with corresponding enlarged section of the portions (c-d) and (d-e) showing the how the driving force (Fent) acting on the mass driving member (Mte) is divided along the two (x) and (y) axes.

Third, the example shown in FIG. 16, shows an embodiment for which only the resultant of the centrifugal forces (Fc(a-b-c)) generated into the curved portion (a-b-c) is supported by the mass support member (SuM) 170. In fact, masses (M) 120, while running along curved portions (d-e) and (f-g), will generates centrifugal forces (Fc(d-e)) and (Fc(f-g)) that do not have any resultant since these curved portions are closed curves of 360° (2π radians) each relative to the (x-y) plane.

The forces $(F_{(EcM)})$, due to the kinetic energy of the masses (M) 120 into motion, will, upon the contact of the masses (M) 120 with the mass driving member (Mte') 166' (having auxiliary rotating shafts (Axt') 128'), at points (d) and (f), drive the mass driving member (Mte') 166' (having its auxiliary rotating shafts (Axt') 128' slightly offset 225 relative to the direction of portion (c-d) and (e-f) respectively) into its rotational direction with a torque that will transfer their kinetic energy (from the masses 120 to the mass driving member (Mte') 166'). This quantity of energy is then returned to the masses (M) 120 by the mass driving member (Mte') 166' into the directions (e-f) and (g-a) (see enlarged sections of FIG. 16). In the example shown in FIG. 16, and more specifically in the lower left schematic perspective view, the masses (M) 120 essentially move down to a lower mass plane 172' between points (d) and (e), and move back up to the main mass plane 172 between points (f) and (g).

Other solutions (mechanical, hydraulic or other) are possible and allow, as in the above non-limiting three examples of FIGS. 14-16, the masses (M) 120 to follow a trajectory (Traf) 150 such that there would be acting onto the mass support member (SuM) 170 (into which the eccentric closed trajectory (Traf) 150 is formed) only a resultant of the centrifugal forces (Fc) into only one orientation and direction.

In all subsequent figures of the present application having GCFEVR-2s 102, it is to be understood that the respective eccentric closed trajectories (Traf) 150 are illustrated into a simplified manner in order to keep the figures clear for illustration purposes, but would obviously imply solutions as above to avoid having an overall cumulative curved portion of the trajectories 150 not being a multiple of 360° (or 2π radians), into a same rotational direction.

FIGS. 17 and 21 shows another embodiment of a GCFEVR-2 102 according to the present invention, similar to the GCFEVR-2 102 of FIG. 11, but with an eccentric closed trajectory (Traf) 150 defined into a mass support member (SuM) 170 into two parallel mass planes 172, 172' and independently driven with respective sets of arms (br) 224 (shown in radially broken lines) of two main parts (Mte1), (Mte2) 167, 168 of a mass driving member (Mte) 166, located on either sides of the mass support member (SuM) 170, and rotating in opposite rotational directions for the two mass planes 172, 172', via a rotational direction reversing member (Isrot) 226. The mass support member (SuM) 170 is typically located intermediate the two main parts (Mte1), (Mte2) 167, 168 of the mass driving member (Mte) 166, or in sandwich there between. In this embodiment, the masses (M) 120 follow an eccentric closed trajectory (Traf) 150 having two semi-circular main portions, in the two different mass planes 172, 172', connected to one another via out-of-plane connecting portions, as better seen in FIG. 56 hereinafter.

Figure 22:
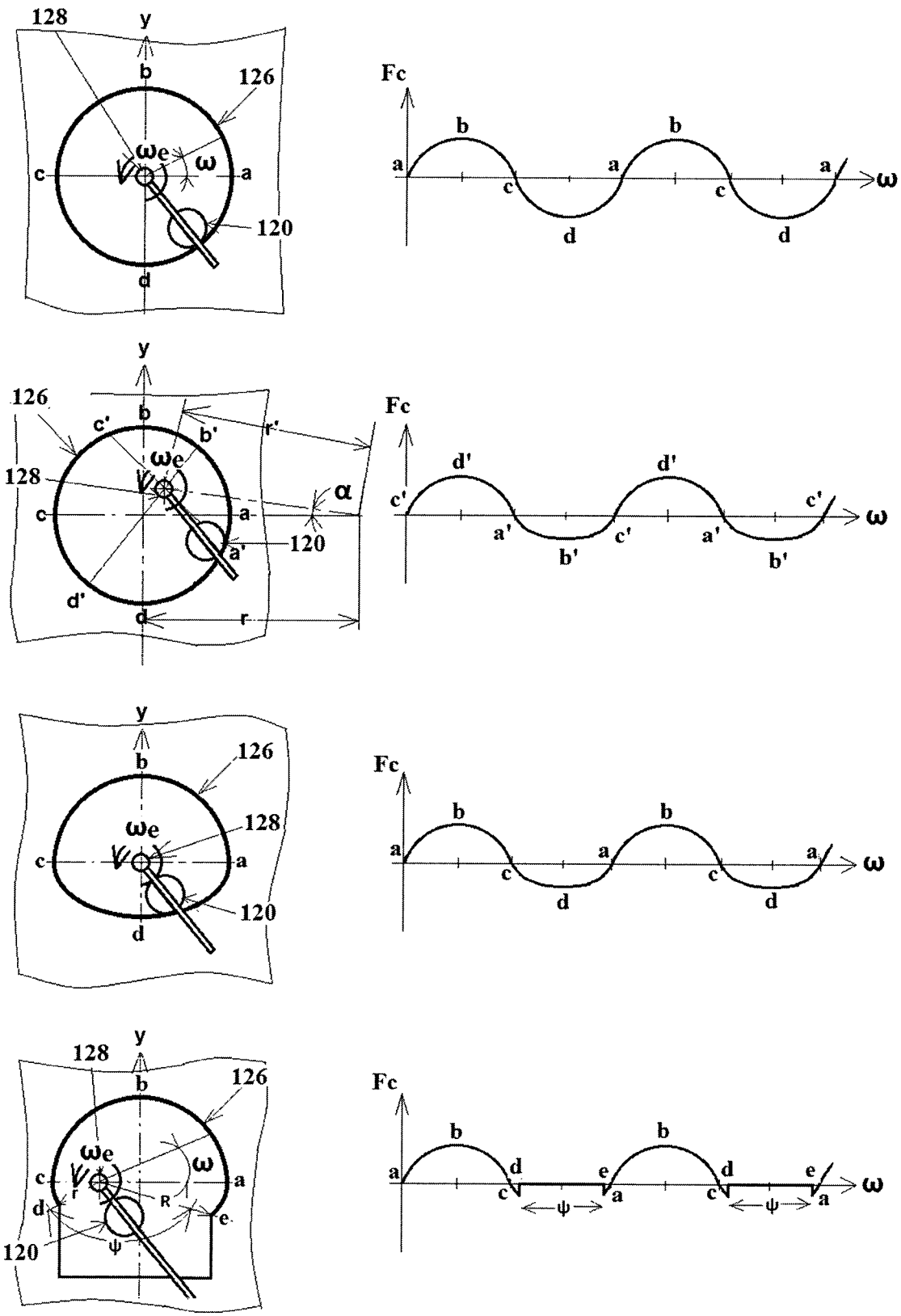
FIG. 22 are simplified schematic plan views of three different examples of embodiments of first type of generators of centrifugal forces from eccentrics with variable radius (GCFEVR-1s) according to the present invention, similar to the GCFEVR-1 of FIGS. 8, 9 and 18-20, along with corresponding simplified schematic diagram of a typical curve of the value of the centrifugal forces generated by the mass (M) along the (b-d) axis, or (b'-d') if applicable, for two 360-degree (2π-radian) rotations of the shaft (Axt), while being displaced along its eccentric closed trajectory (Traf); the uppermost example being a reference only for better understanding since the trajectory of the mass (M) is not eccentric (constant radius around 360°)

Further to the above, other embodiments of GCFEVR-1s 101 are also shown in FIG. 22 as examples, but with no limitations thereto. It is noted that the uppermost example (simplified schematic plan view with corresponding simplified schematic diagram of a typical curve) being a reference only for better understanding since the trajectory of the mass (M) 120 is not an eccentric with variable radius but a non-eccentric with constant radius. Each one of the three embodiments 101, similarly than the embodiment of FIGS. 6 and 7, is shown with a simplified schematic plan view with a corresponding simplified schematic diagram of a typical curve of the centrifugal forces (Fc) generated by the mass (M) 120 along the (b-d) axis (or y-axis), for one 720-degree (2π-radian) rotations of the shaft (Axt) 128 (angle ω), while being displaced along its eccentric closed trajectory (Traf)

150. For the first example of the three (second example from the top of the figure), the shape of the trajectory of the mass (M) 120 is modified by a displacement of the center of rotation relative to the geometric center (illustrated by angle α and variation of the distance r' (relative to r)) that changes the profile of the centrifugal forces (Fc) generated by the mass (M) 120 along the (b'-d') axis, as shown in the adjacent typical curve. For the second example of the three (third example from the top of the figure), the shape of the trajectory of the mass (M) 120 is modified by the modified shape of the bore that changes the profile of the centrifugal forces (Fc) generated by the mass (M) 120 along the (b-d) axis (or y-axis), as shown in the adjacent typical curve. For the bottommost example, the abutment contact of the mass (M) 120 with the perimeter of the bore (Tpi) 126 stops at point (d) and resumes at point (e). The angle ψ there between is therefore calculated as a function of corresponding respective radius (r) and (R) and, as it could be easily demonstrated, depends neither on the value of mass (M) 120 nor on the angular or rotational velocity (ωe) of the rotating shaft (Axt) 128 and mass (M) 120, as long as the rotational velocity (ωe) remains constant.

Figure 23:
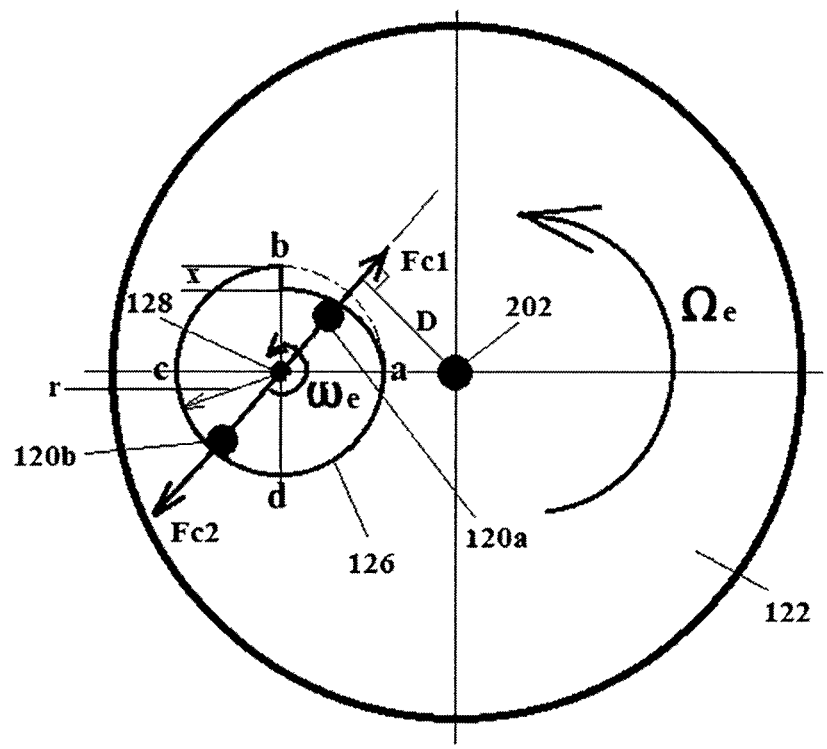
FIG. 23 is a simplified schematic plan section views of another example of an embodiment of first type of generator of centrifugal forces from eccentrics with variable radius (GCFEVR-1) according to the present invention, similar to the GCFEVR-1s of FIGS. 8, 9 and 18-20, along with a corresponding simplified schematic diagram of a typical curve of the value of the total torque of centrifugal forces generated by a pair of masses (M1, M2) about the main shaft (Axf) for one 360-degree (2π-radian) rotation of the rotating shaft (Axt), while being displaced along their eccentric closed trajectory (Traf); the present example being a sort of a mix of the last two examples of FIG. 22 with two diametrically opposed masses.
Figure 23:
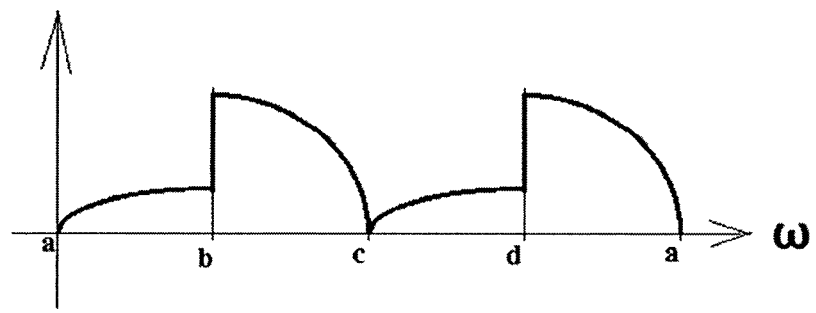

Further to the above, another embodiment of GCFEVR-1 101 is shown in FIG. 23 as a further example, but with no limitations thereto. The embodiment 101, similarly than the embodiment of FIGS. 6 and 7 and also a sort of mix embodiment of the last two embodiments of FIG. 22, is shown with a simplified schematic plan view with a corresponding simplified schematic diagram of a typical curve of the total torque (Ct) of the centrifugal forces (Fc1+Fc2) generated by the two, diametrically opposite, masses (M1, M2) 120a, 120b about the main shaft (Axf) 202, for one 360-degree (2π-radian) rotation of the rotating shaft (Axt) 128 (angle ω), while being displaced along their eccentric closed trajectory (Traf) 150. More specifically, along the portions (a-b) and (c-d) of the bore (Tpi) 126 of the plate (Pci) 122, the radius of the trajectory of mass (M1) 120a decreases from (r) to (r-x) (along portion (a-b)) while the radius of the trajectory of the other mass (M2) 120b remains constant at (r) (along portion (c-d)). This implies that the centrifugal force generated by mass (M2) 120b remains constant (Fc2=M2·ωe²·r) while the centrifugal force generated by mass (M1) 120a decreases from constant (Fc1=M1·ωe²·r) to (Fc2=M2·ωe²·(r-x)), such that the sum of the two, multiplied by the variable perpendicular distance (D) to the main shaft (Axf) 202 will generate a variable total torque (Ct) to rotate the plate (Tpi) 126. On the other hand, during the same time, a work (Fc1·x) had to be supplied (note: this value is true only if the angular velocity (ωe) of the GCFEVR-1 remains constant). For example, this work could be supplied by an external motor (not shown) driving the rotating shaft (Axt) 128. It is noted that the total torque (Ct) is independent from the amount of supplied work, since the supplied work would not change even if the distance between the rotating shaft (Axt) 128 and the main shaft (Axf) 202 would vary. Along portion (b-c) of the bore (Tpi) 126 of the plate (Pci) 122, mass (M1) freely slides along its support without generating any centrifugal force (Fc) onto the plate (Pci) 122 and gets into contact therewith at point (c), hence along a 90° (π/2 radian) angle rotation about the rotating shaft (Axt) 128 (as mentioned above with last embodiment of FIG. 22, this angle depends only on the values of (r-x) and (r), while being independent from the masses and their angular velocity). Along portion (d-a) of the bore (Tpi) 126 of the plate (Pci) 122, mass (M2) will generate a centrifugal force (Fc2) that will generate a torque onto the main shaft (Axf) 202 (via the plate (Pci) 122).

Looking at the typical shape of the total torque (Ct) generated onto the main shaft (Axf) 202 by the sum of the centrifugal forces (Fc1, Fc2) from a complete rotation of the two masses (M1, M2) 120a, 120b about the rotating axis (Axt) 128, one skilled in the art would understand that having a plurality of GCFEVR-1s properly angularly shifted relative to each other about the main shaft (Axf) 202 could generate an overall total torque (Ct) that would be substantially constant.

Figure 24:
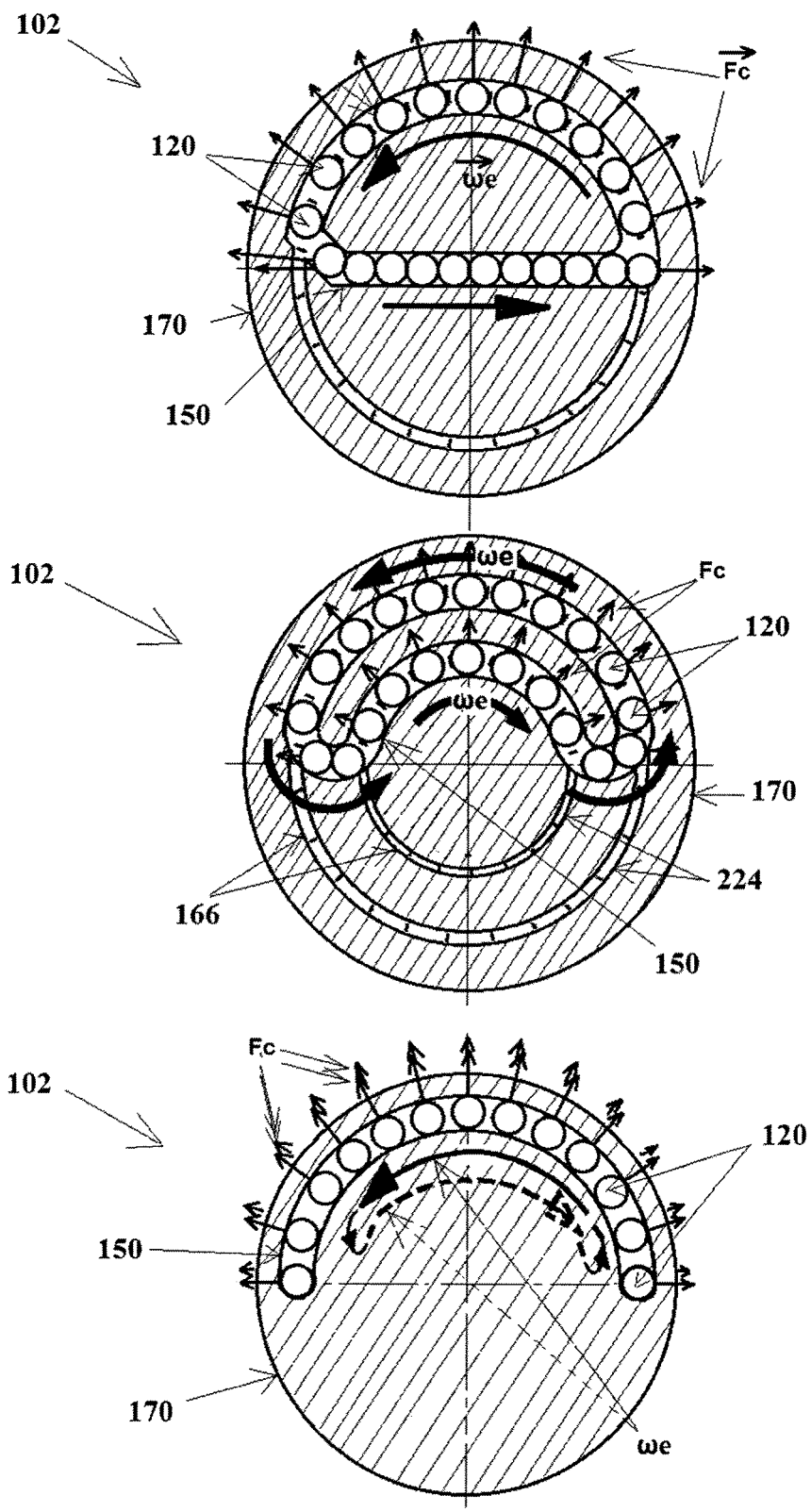
FIG. 24 are simplified schematic plan section views of different examples of embodiments of second type of generators of centrifugal forces from eccentrics with variable radius (GCFEVR-2s) according to the present invention, similar to the GCFEVR-2 of FIGS. 11, 17 and 21, with the masses (M) being displaced within a same mass plane in the upper two views and mainly within two parallel mass planes, and transitions there between, in the lowest view and better illustrated in FIG. 56 below and described in FIG. 79 below, the resulting centrifugal force of all centrifugal forces generated by all masses (M) having a same mass relative to one another always remains substantially constant in amplitude, in a same orientation and a same direction.
Figure 25:
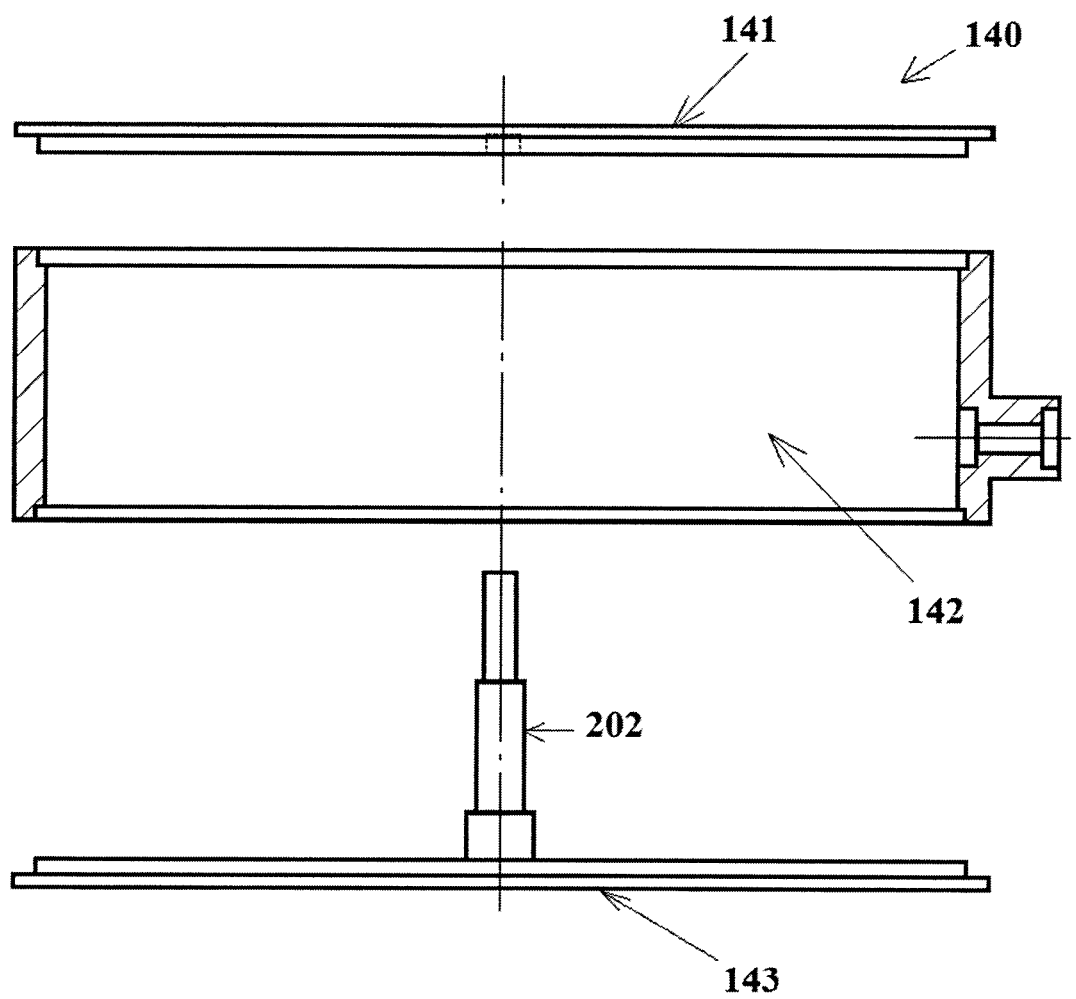
FIG. 25 is a schematic elevation view, showing the different parts of the fixed chassis of a machine (MGCFEVR) with rotating movement.
Figure 26:
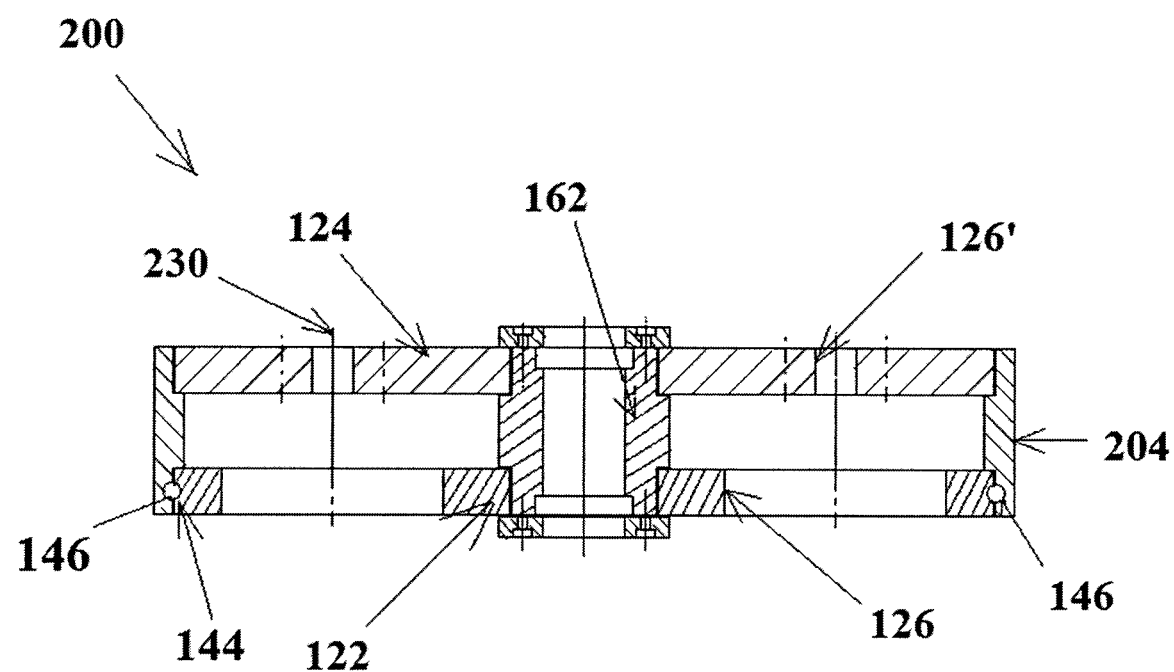
FIG. 26 is a schematic elevation section view, showing the different parts of the rotor assembly (Rot), without the moving parts of the GCFEVRs (case of the machine with rotating movement)
Figure 27:
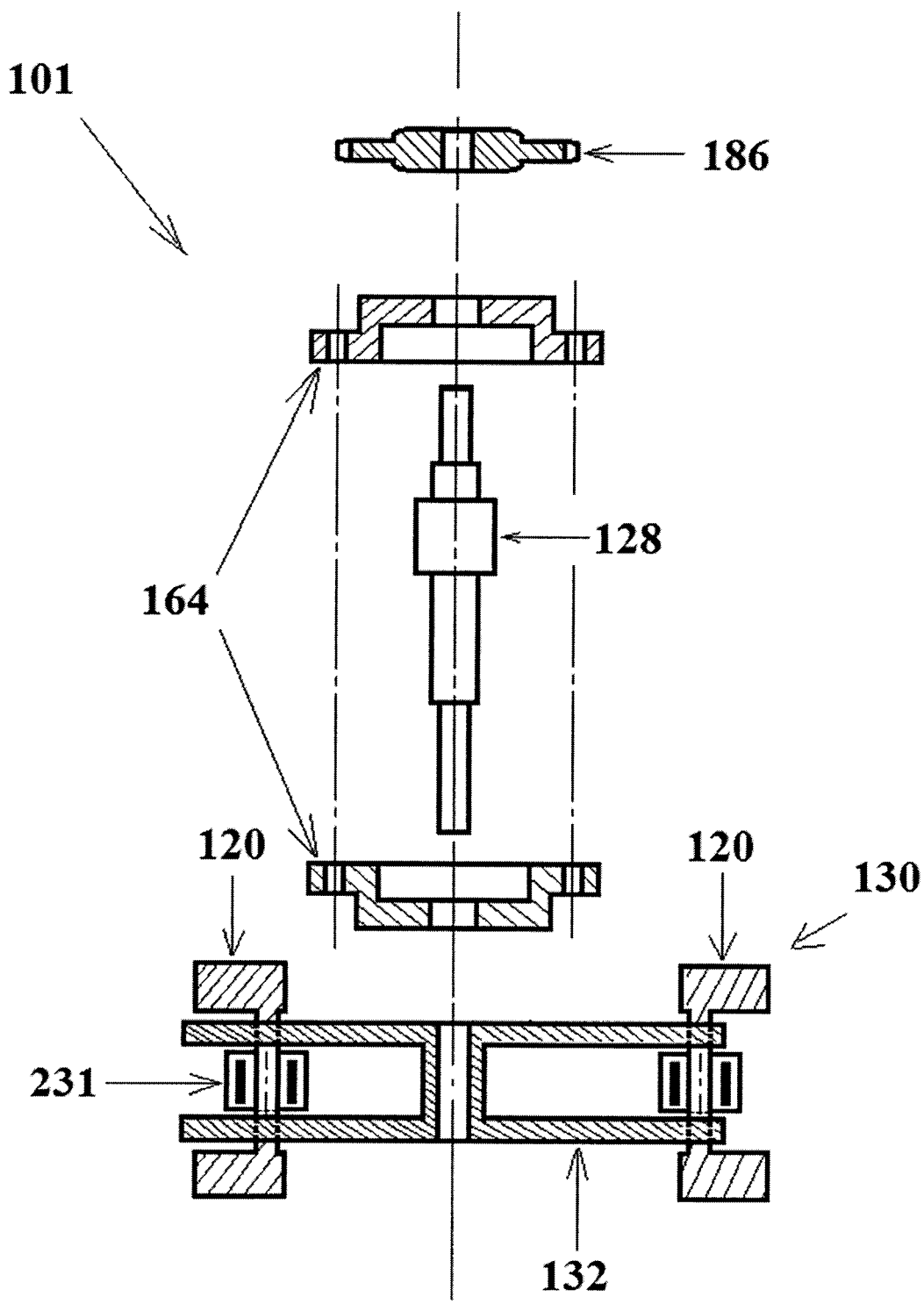
FIG. 27 is a schematic exploded elevation section view, showing the moving parts of a GCFEVR as shown in FIGS. 8 and 18 with a guiding bar (Fcht) and two masses (M)
Figure 28:
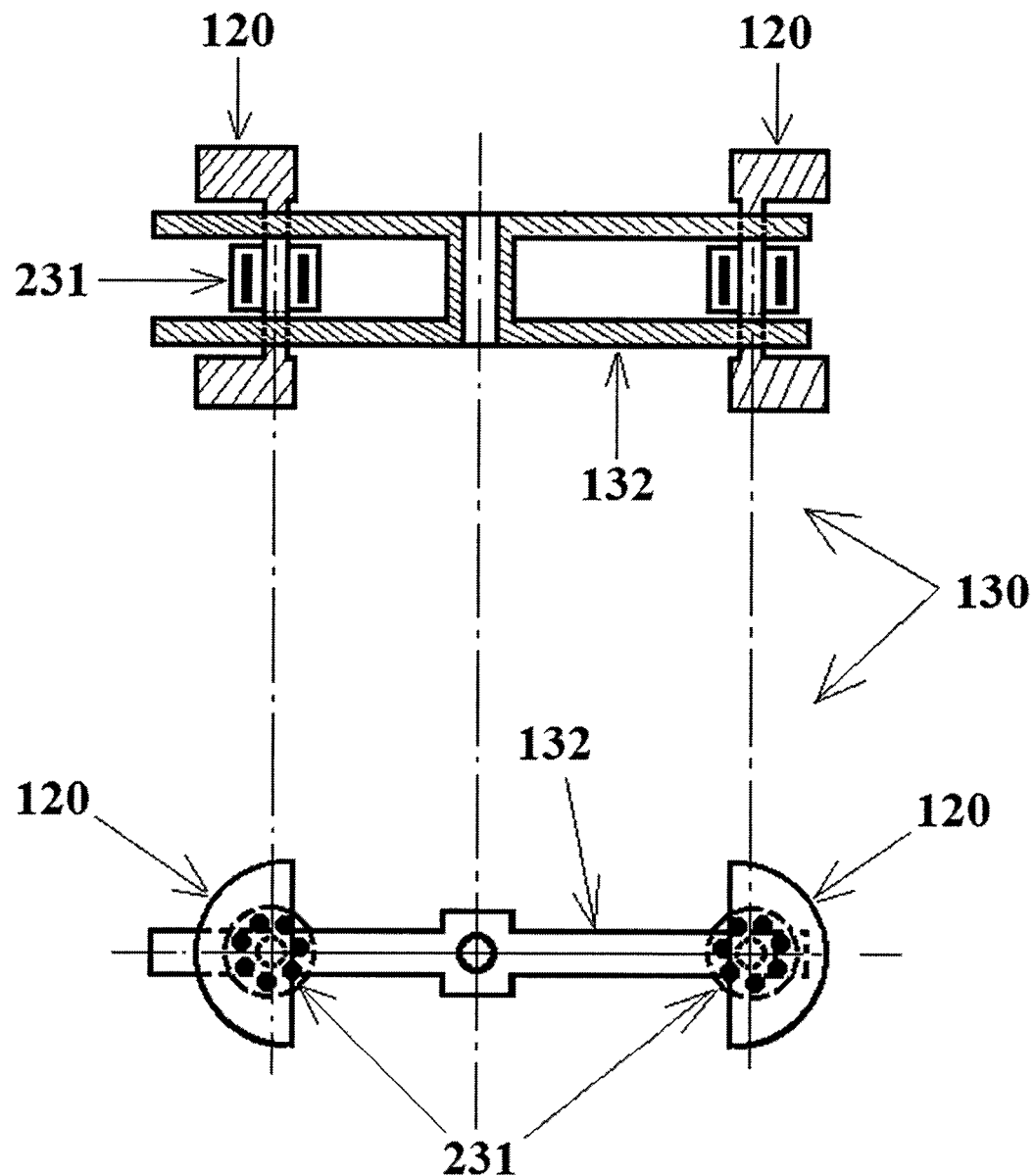
FIG. 28 is a schematic elevation section and plan view of the embodiment of FIG. 27.
Figure 29:
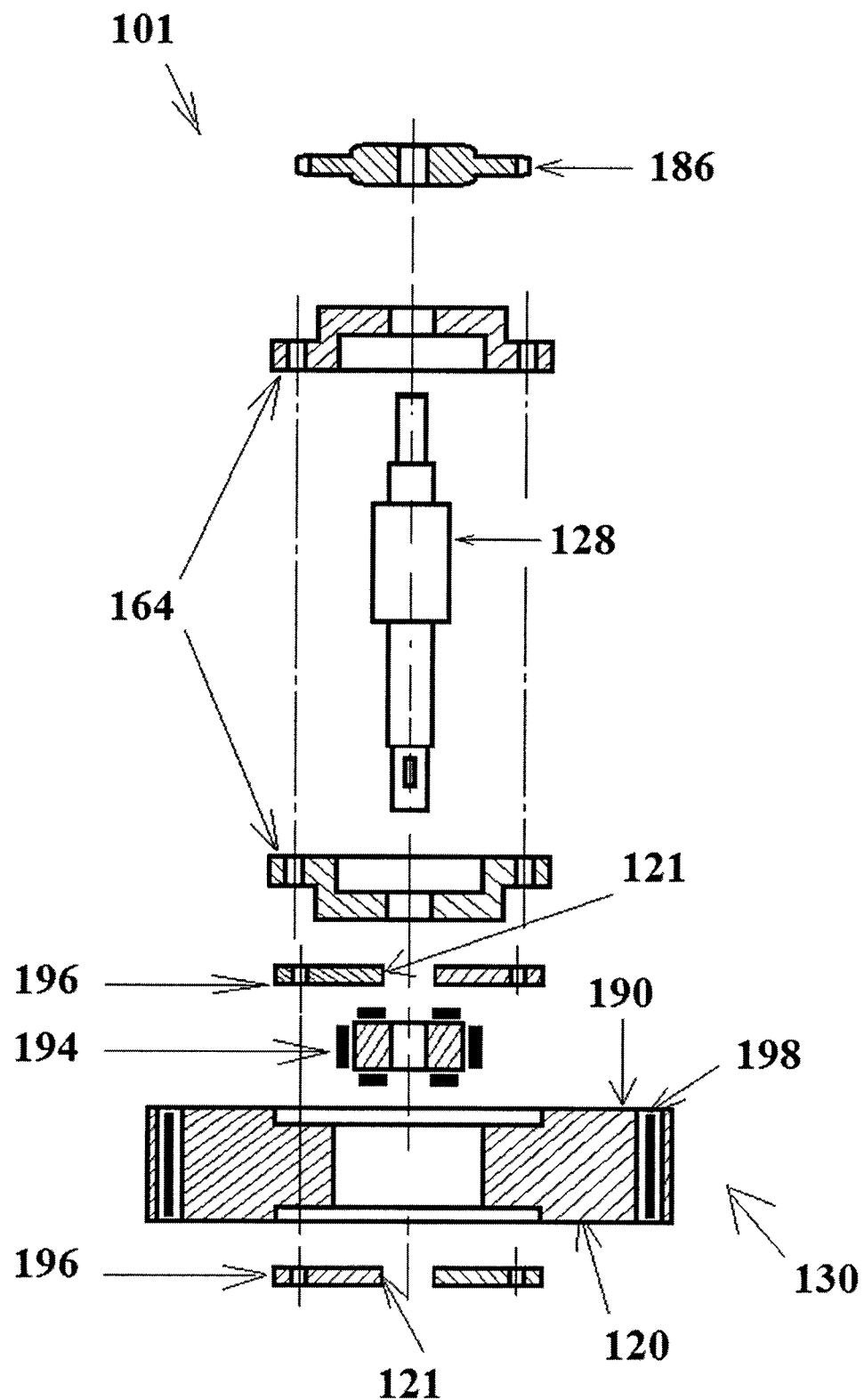
FIG. 29 is a schematic exploded elevation section view, showing the moving parts of a GCFEVR as shown in FIGS. 9 and 19 with an eccentric wheel (Re) of mass (M)
Figure 30:
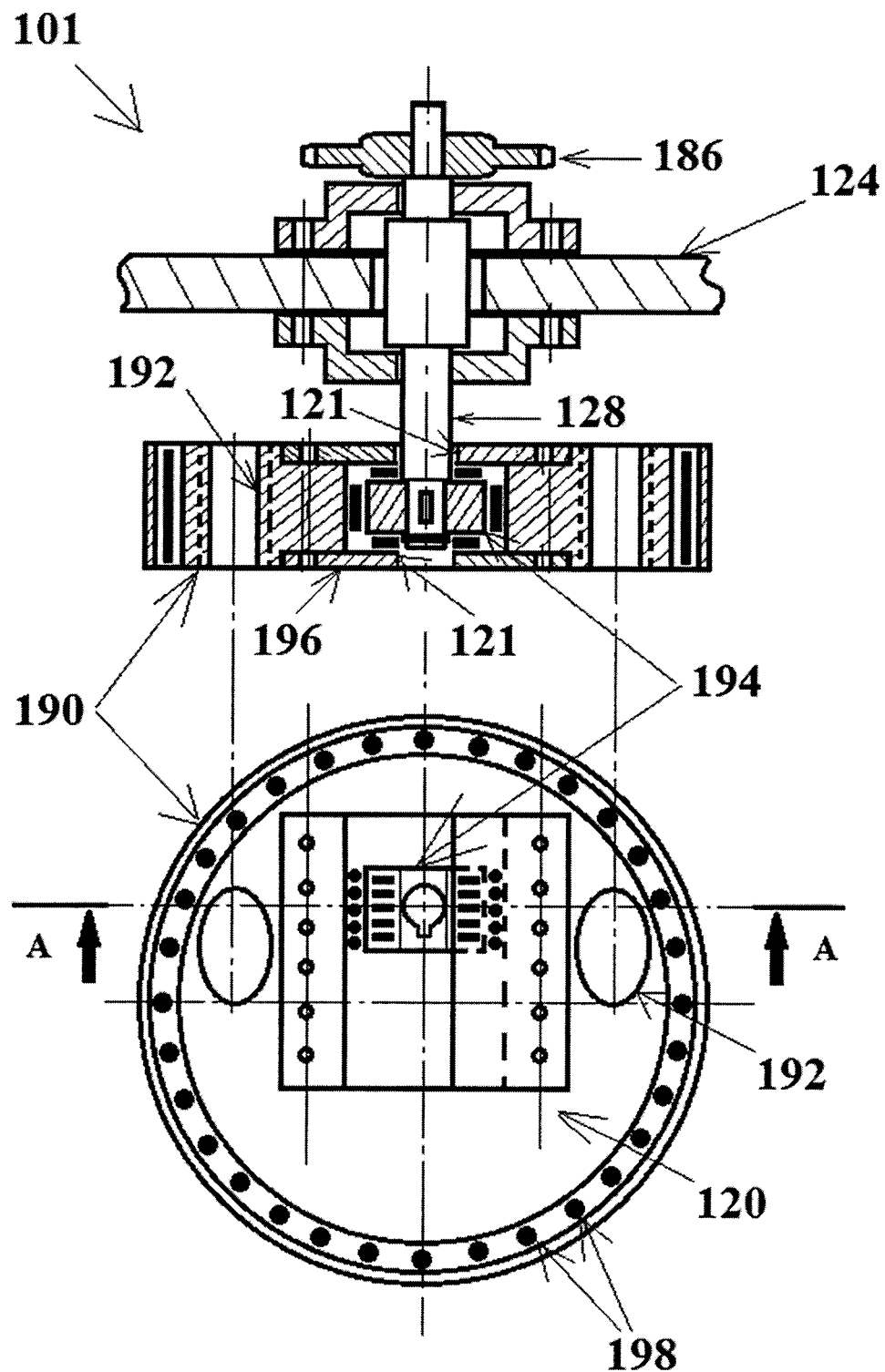
FIG. 30 is a schematic elevation section (taken along line A-A) and plan view, showing the embodiment of FIG. 29.
Figure 31:
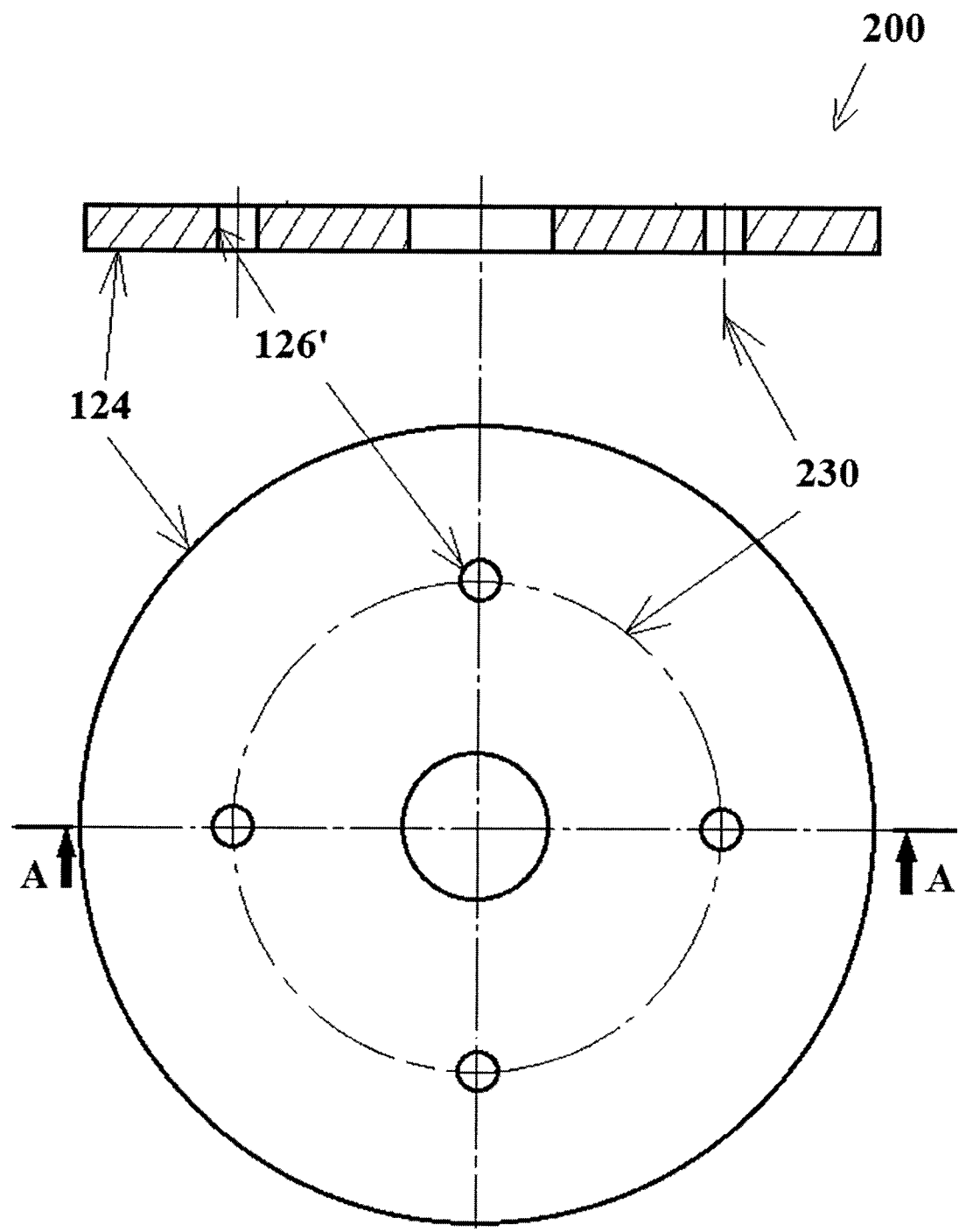
Figure 32:
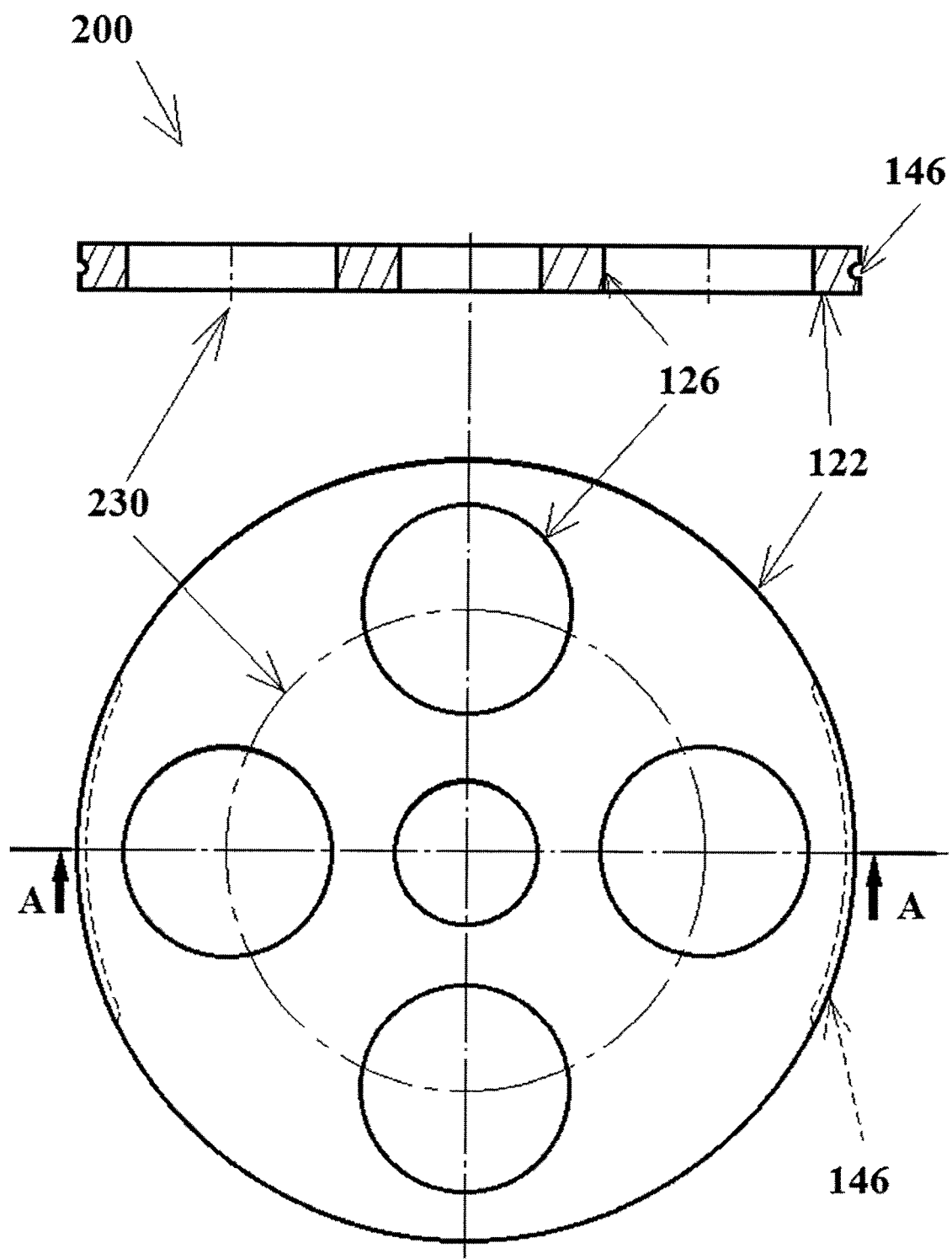
Figure 33:
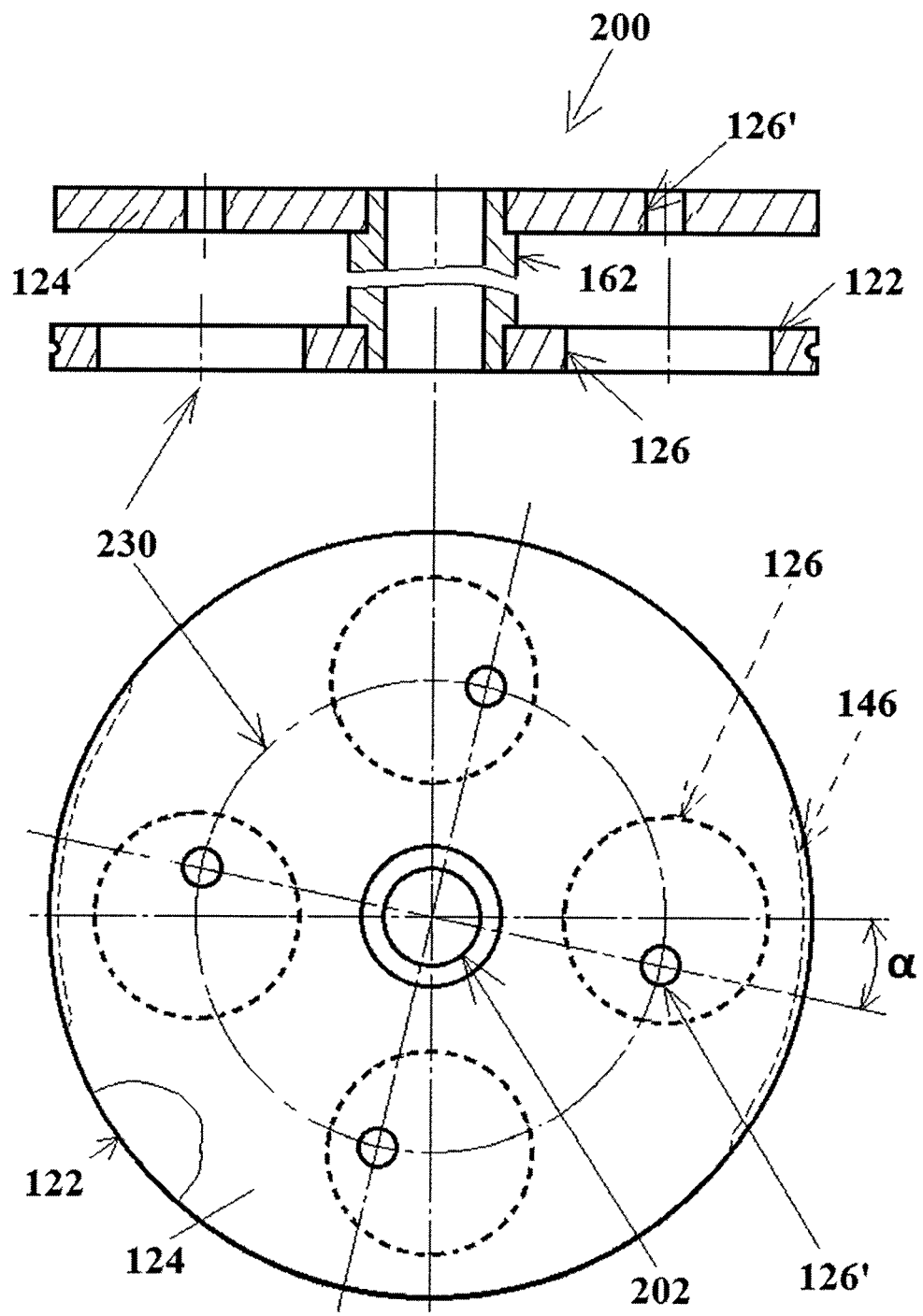
FIG. 33 is a schematic elevation section and plan views of the upper (Pcs) and lower (Pci) plates, superposed and with a shifting angle (α) that represents the eccentricity distance (e) of the GCFEVRs [e=α×r—with r being the radius of the virtual bore positioning circle (Cax)]
Figure 34:
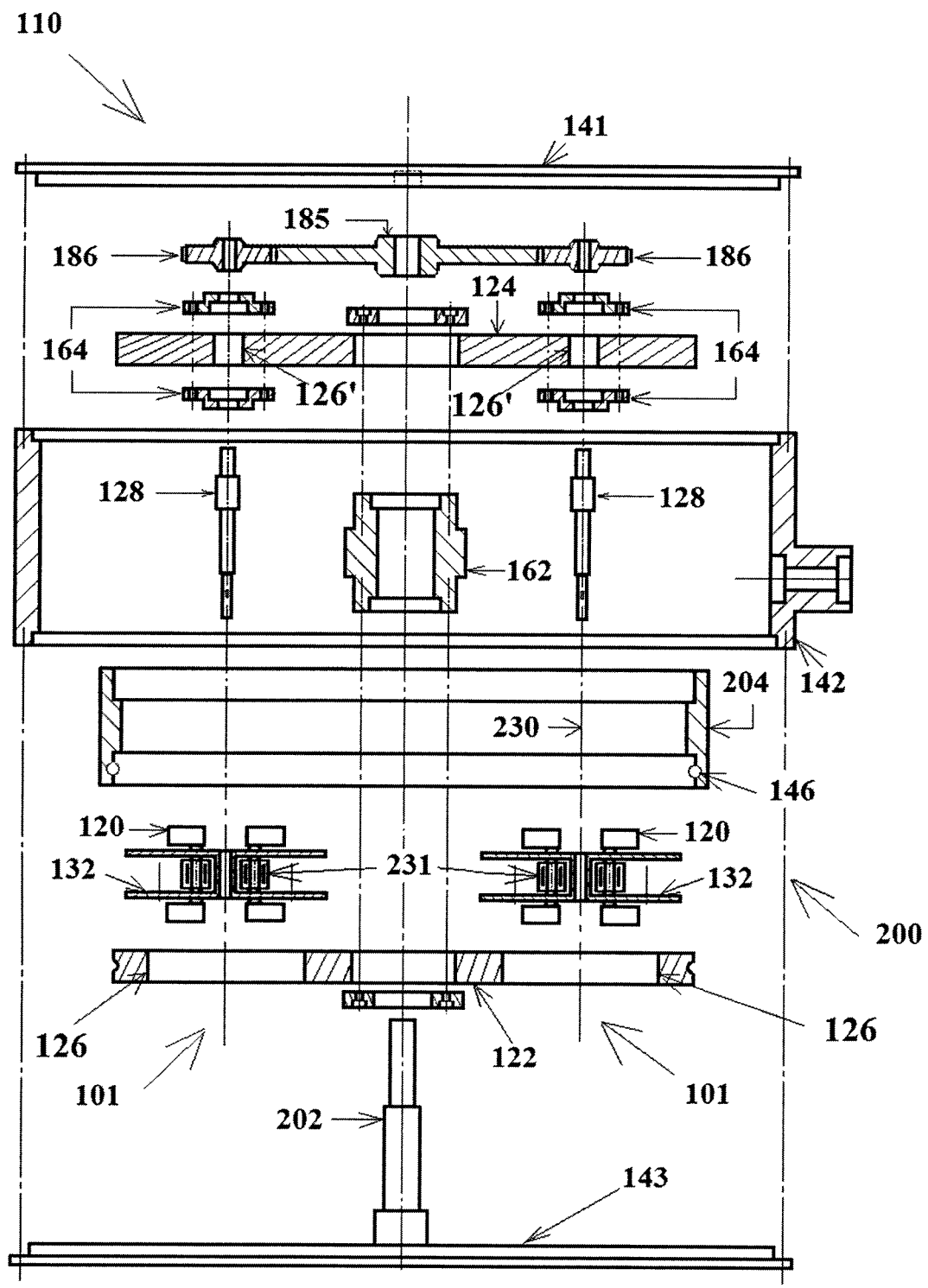
FIG. 34 is a schematic exploded section elevation view of the MGCFEVR with each GCFEVR as shown in FIGS. 27 and 28 having guiding bars (Fcht) and masses (M)
Figure 35:
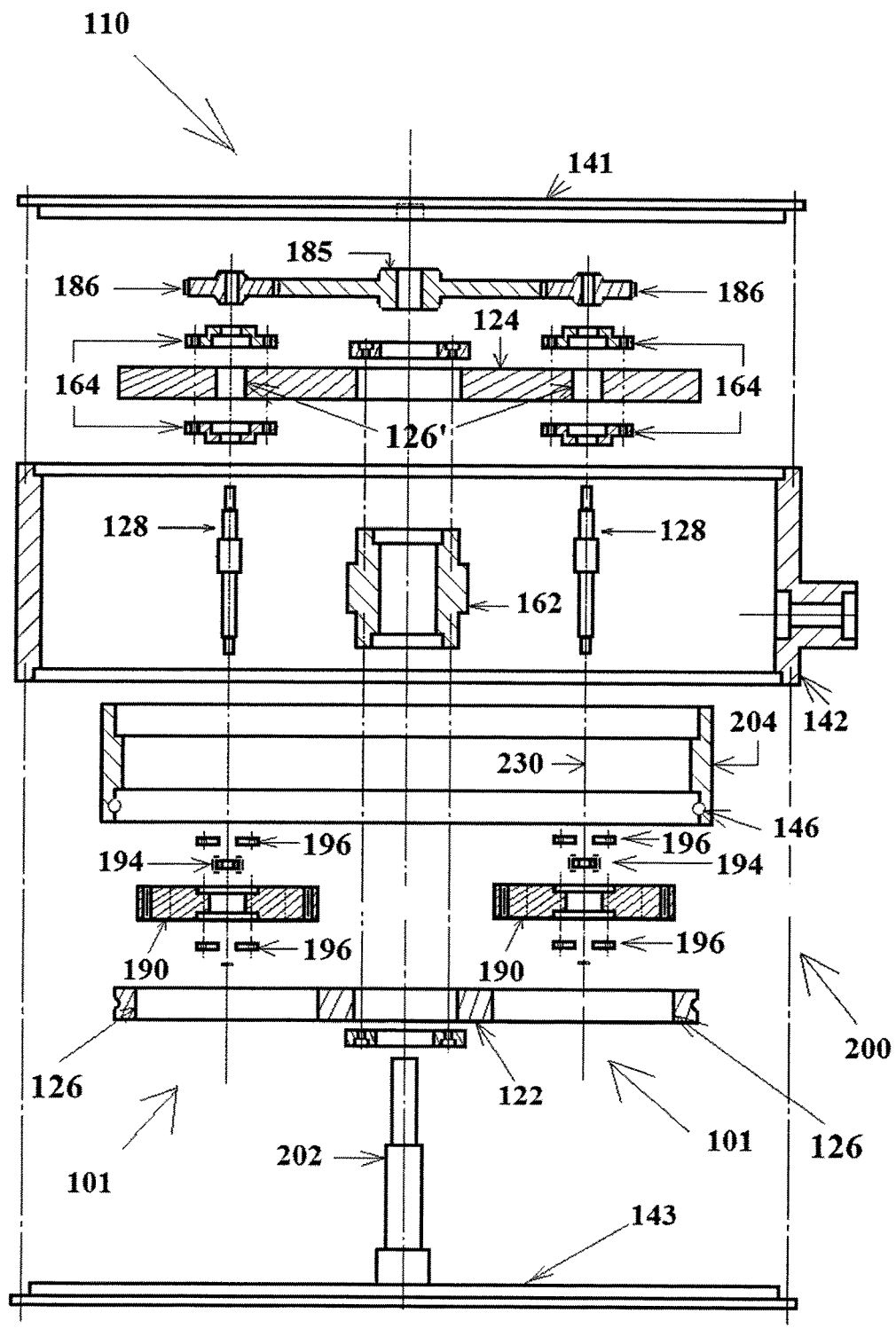
FIG. 35 is a schematic exploded section elevation view of the MGCFEVR with each GCFEVR as shown in FIGS. 29 and 30 having an eccentric wheel (Re) of mass (M)

Similarly, other embodiments of GCFEVR-2s 102 are also shown in FIG. 24 as examples, but with no limitations thereto. The uppermost embodiment is essentially the embodiment of FIG. 11. The second embodiment is similar to the first one except that instead of having a diametrically oriented rectilinear portion it has a second typically semi-circular portion of the eccentric closed trajectory (Traf) 150, of smaller (or larger) radius, which requires that the masses (M) 120, always remaining in a same mass plane 172 (as seen in FIG. 11), are independently driven with respective sets of arms (br) 224 of two main parts (Mte1) 167, (Mte2) 168 of the mass driving member (Mte) 166 that rotate in opposite directions (ω1) and (ω2), respectively. Finally, the last and bottommost embodiment is similar to the second one except that instead of having the second typically semi-circular portion of the eccentric closed trajectory (Traf) 150 on a same mass plane 172, it is in a second mass plane 172' generally parallel to the first one, as represented by the dotted line (ω2), with the masses being below, and therefore hidden by, the ones being in the first semi-circular portion (ω1). More details of this last embodiment are provided hereinabove and hereinafter with reference to FIGS. 17, 21, 55 and 56.

It is therefore a general object of the present invention to provide a machine generating centrifugal forces from an eccentric with variable radius (MGCFEVR) 110 comprising at least one generator of centrifugal forces from an eccentric with variable radius (GCFEVR) 100 functioning on the principle of exploitation of equilibrium forces of expansion (centrifugal forces) due to the expansion of our Universe, itself due to the black energy.

An advantage of the present invention is that the machine 110 functioning on the principle of exploitation of equilibrium forces of expansion (centrifugal forces), obtained from the generation of centrifugal forces (Fc) from eccentrics with variable radius, can be realized into a wide variety of different ways, and of sizes, for different gains at the output, while continuously exploiting the work from the centrifugal forces (Fc).

Another advantage of the present invention is that the machine 110 functioning on the principle of energy gain due to the work of the centrifugal forces, obtained by eccentrics with variable radius (MGCFEVR), can be realized into a wide variety of different ways, and of sizes, for different gains at the output that generate either a continuous or oscillating movement of rotation, as shown in FIGS. 8, 9, 10, 17, 23, 25 to 59 and 78.

A further advantage of the present invention is that the machine 110 functioning on the principle of energy gain due to the work of the centrifugal forces, obtained by eccentrics with variable radius (MGCFEVR), can be realized into a wide variety of different ways, and of sizes, for different gains at the output that generate either a continuous or oscillating rectilinear movement, as shown in FIGS. 11, 18, 19, 60 to 78.

Typically, the first 101 and second 102 generators of centrifugal forces from an eccentric with variable radius (GCFEVR-1, GCFEVR-2) can be either independent and fixed onto a corresponding machine MGCFEVR 110 with rotating movement or linear movement, or integrated into the machine MGCFEVR 110 itself.

In both cases, the MGCFEVR 110 typically includes an eccentric adjustment system (Eas) 144 selectively adjusting the position of the eccentric closed trajectory (Traf) 150 of the GCFEVR 100 relative to the corresponding bore (Tpi) 126 and mounting on the structure 140 therebetween.

In one embodiment, the eccentric adjustment system (Eas) 144 is a mechanical (or other) plate shifting mechanism (Sddp) 146 (as shown in FIGS. 8, 9, 18, 19, 26, 33 to 40, 48, 49, 76 and 77 and schematically represented by the broken line of the perimeter of the plate (Pci) 122 or (Pli) 123), the shifting (e, α) 152 of the center of the bore where the guiding bar (Fcht) 132 (or the eccentric wheel (Re) 190), a shifting or rotation of the center of the bore (Tpi) 126 relative to the center of the rotating shaft (Axt) 128 of said GCFEVR-1s 101.

Conveniently, depending on the desired usage, the shifting (e, α) 152 could be linear (e) 152 (a segment of a straight line—as shown in FIGS. 19 and 20), or angular (a) (a segment of an arc of a circle—as shown in FIGS. 8 and 9) in both cases of a machine 110 with rotating movement or with linear movement.

Alternatively, the eccentric adjustment system (Eas) 144 is a mechanical (or other) mass support rotation system (Srst) 148 (as shown in FIG. 74 and schematically represented by the broken line between the two mass support members (SuM) 170 of the GCFEVR-2s 102, allows the selective rotational shifting (θ) of the mass support member (SuM) 170 within the corresponding bore (Tpi) 126, and therefore the orientation of the resulting centrifugal force (Fc) generated by the respective GCFEVR-2s 102. If the rotational shifting (θ) of both GCFEVR-2s 102 are in the same rotational direction, this will simply change the orientation of the overall thrusting force (Fp). On the other hand, if the rotational shifting (θ) of both GCFEVR-2s 102 are in opposite rotational directions, this will reduce/increase, cancel (by having both centrifugal forces (Fc) opposing one another) or reverse the direction of the overall thrusting force (Fp).

Conveniently, a plurality of GCFEVRs 100 could be combined into a same MGCFEVR 110, according to the desired or required use, in order to generate either a continuous or oscillating force (along a rectilinear direction: translation) or a continuous or oscillating torque (along a circular direction: rotation), while eliminating all sources of vibration.

In one embodiment, the GCFEVRs 100 could be part of, according to their conception and arrangement, of a machine (MGCFEVR) 110 with rotating movement generating a torque and an angular velocity (hence a power) at the rotor assembly (Rot) 200 of the MGCFEVR 110, as shown in FIGS. 8, 9, 10, 17, 23, 25 to 59 and 78, or a machine (MGCFEVR) with linear movement generating a thrust along a straight direction, as shown in FIGS. 11, 18, 19, and 60 to 78.

In one embodiment, the rotating shaft (Axt) 128 of a GCFEVR 100 could be equipped with one mass driving member (Mte) 166 (simple or planar assembly having one bore (Tpi) 126—see FIGS. 33 to 47, 50 and 58 to 78) or a plurality of mass driving member (Mte) 166, along a same rotating shaft (Axt) 128 (multistage assembly in different parallel planes each having a respective bore (Tpi) 126—see FIGS. 48 and 49, 74, 55-57, and 79).

In one embodiment, the mass driving members (Mte) 166 of a GCFEVR 100 could be many of them, each equipped with a rotating shaft (Axt) 128 and all driving masses (M) 120 located within a same mass plane 172 or within multiple mass planes.

Conveniently, should it be the case of a machine with rotating movement or a machine with linear movement (MGCFEVR) 110, the position of the GCFEVRs 100 relative to one another, the direction of their respective rotations (of respective shafts (Axt) 128), and, in the case of GCFEVR-1s 101, the angular positions of their respective guiding bars (Fcht) 132 (or eccentric wheels (Re) 190) relative to one another must be so arranged as to generate a constant motor torque or linear thrust, while eliminating all sources of vibration, as further explained herein below.

Conveniently, in cases using GCFEVR-1s 101, the bore (Tpi) 126, allowing the transmission of the centrifugal forces (Fc) to the rotor assembly (Rot) 200 of the MGCFEVR 110 via the direct abutment contact with the masses (M) 120 on its perimeter, can have:

Multiple shapes (circular or others) allowing the transmission of centrifugal forces (Fc) to the rotor assembly (Rot) 200 with larger values in a specific direction of rotation of the rotor assembly 200 relative to the opposite direction.

A continuous or discontinuous abutment contact with the masses (M) 120 all along its perimeter to allow the transmission of the centrifugal forces (Fc) to the rotor assembly (Rot) 200 with larger values in a specific direction of rotation of the rotor assembly 200 relative to the opposite direction.

A mobile portion of the bore (Tpi) 126 (as section (c'-d-a') of FIG. 10) allowing centrifugal forces (Fc) acting thereon to be transmitted to the rotor assembly (Rot) 200 in the same specific direction of rotation as the ones acting on the fixed portion 127 of the same bore (Tpi) 126 (as section (a-b-c) of FIG. 10) via a torque orientation inverter (Ce) 210.

(II)—Machine Generating Centrifugal Forces from Eccentrics with Variable Radius (MGCFEVR), with Rotating Movement (II-1)—Case for which the GCFEVR 100 is an Independent Subsystem from and Fixed onto, or Mounted on the Machine 110 with Rotating movement.

According to another aspect of the present invention, as shown in FIGS. 8, 9, 10, 17, 23, 25 to 59 and 78, there is provided a machine 110 for generating mechanical energy with a rotating movement, via the generation of centrifugal forces from eccentrics with variable radius (MGCFEVR), said machine 110 comprising:

a fixed chassis (Ch, Ch1, Ch2, Ch3) 140, 141, 142, 143 having a main shaft (Axf) 202 around its geometric center for supporting a rotor assembly (Rot) 200 thereof;

the rotor assembly (Rot) 200 freely rotatably mounted on the main shaft (Axf) 202, said rotor assembly 200 comprising:

main bearing blocks (Pal1) 162 mounted on the main shaft (Axf) 202;

a generally circular first upper plate (Pcs) 124 mounted on the main bearing blocks (Pal1) 162 and having a plurality of pairs of upper bores (Tps) 166' angularly equidistant and respectively centered on a perimeter of an upper virtual bore positioning circle (Cax) 230 having its center intersecting the main shaft (Axf) 202, the upper bores (Tps) 166' of each pair are typically symmetrical relative to the main shaft (Axf) 202, each upper bore (Tps) 166' coaxially receives a respective rotating shaft (Axt) 128 of a corresponding GCFEVR 100 mounted therein; and a mechanical energy transmission mechanism (METM) such as a generally circular second lower plate (Pci) 122 freely rotatably mounted on the main bearing blocks (Pal1) 162;

a shaft driving system (sds) 180 connecting to the respective rotating shafts (Axt) 128 to selectively allow the rotation thereof.

The GCFEVRs 100 are directly fixed to the upper (Pcs) 124 and lower (Pci) 122 plates of the MGCFEVR 110 with their respective rotating shafts (Axt) 128 extending through corresponding upper bores (Tps) 126'.

Figure 41:
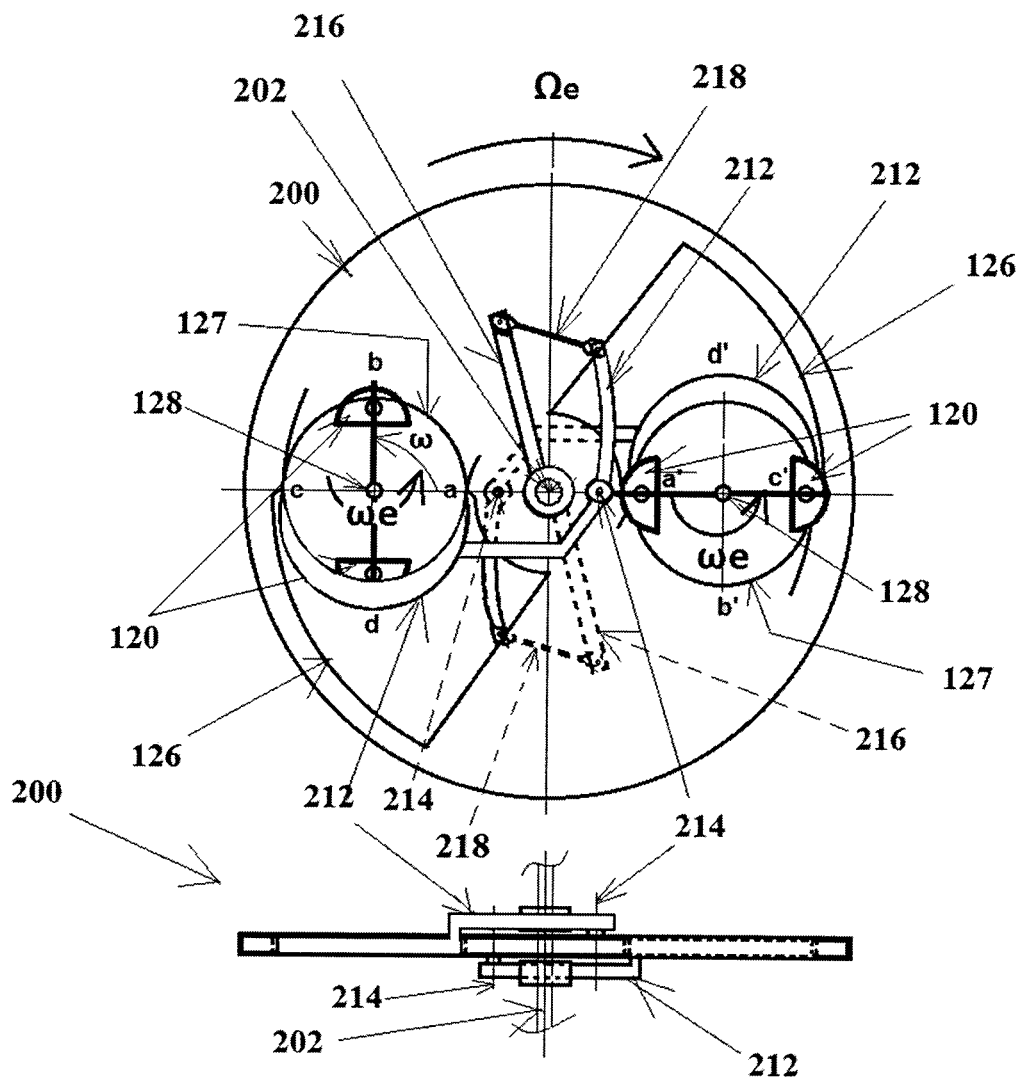
FIG. 41 are schematic plan and elevation views of another MGCFEVR-1 including two GCFEVR-1s similar to that of FIG. 10, each one having a torque orientation inverter (Ce) and two diametrically opposite masses (M), the two GCFEVR-1s having a rotating shaft (Axt) rotating with an angle shift of 90° (π/2 radian) relative to one another; a simplified schematic diagram of superposed typical curves of the value of the centrifugal forces generated by the masses (M) along the (y) axis for one 360-degree (2π-radian) rotation of both shafts (Axt)
Figure 41:
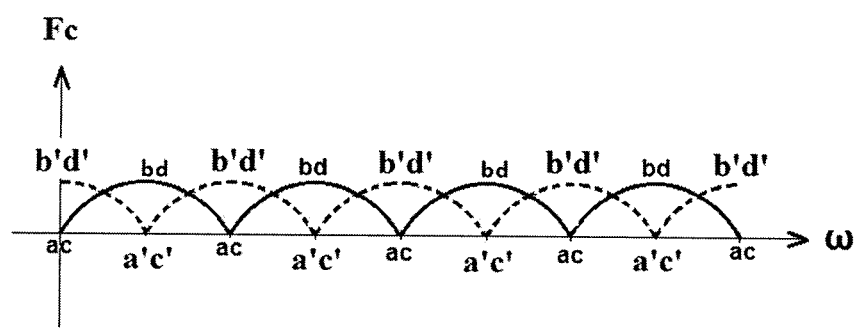

In FIG. 41, there is shown a schematic plan and elevation views of an embodiment of a rotor assembly (Rot) 200 of a MGCFEVR 110 including two GCFEVR-1s 101 similar to that of FIG. 10, each one having a torque orientation inverter (Ce) 210 and two diametrically opposite masses (M) 120. The two GCFEVR-1s 101 have a rotating shaft (Axt) 128 rotating with an angle shift of 90° ($\pi/2$ radian) relative to one another to improve on the uniformity of the output torque value as illustrated on the simplified schematic diagram of superposed typical curves of the value of the centrifugal forces (Fc) generated by the masses (M) 120 along the (y) axis for one 360-degree ($2\pi$-radian) rotation of both shafts (Axt) 128. An additional similar set of two GCFEVR-1s 101 with their respective rotating shaft (Axt) 128 rotating with an angle shift of 45° ($\pi/4$ radian) relative to the first set would obviously further improve on the constancy of the overall output torque of the MGCFEVR 110.

It is noted that in the case of the GCFEVR-1 101, the angular velocity ($\omega e$) of the masses (M) 120 along their eccentric closed trajectory (Traf) 150 remains constant, irrespective of their positions, such that the linear velocity of each masses (M) 120 varies according to the position of the mass along the trajectory (Traf) 150. This makes the values of the centrifugal forces (Fc) generated by the masses (M) 120, and supported by the bore (Tpi) 126, hence by the rotor assembly (Rot) 200, being proportional to the distance between the mass (M) 120 and the corresponding rotating shaft (Axt) 128.

(II-2)—Case for which the GCFEVR 100 is an Integral Part of the Machine 110 with Rotating Movement.

(II-2A)—Case for which the GCFEVR-1 101 is an Integral Part of the Machine 110 with Rotating Movement According to another aspect of the present invention, as shown in FIGS. 8, 9, 10, 25 to 54, 58, 59 and 78, there is provided a machine for generating mechanical energy with a rotating movement, via the generation of centrifugal forces from eccentrics with variable radius (MGCFEVR), said machine 110 comprising:

a fixed chassis (Ch, Ch1, Ch2, Ch3) 140, 141, 142, 143 having a main shaft (Axf) 202 around its geometric center for supporting a rotor assembly (Rot) 200 thereof;

the rotor assembly (Rot) 200 freely rotatably mounted on the main shaft (Axf) 202, said rotor assembly 200 comprising:

main bearing blocks (Pal1) 162 mounted on the main shaft (Axf) 202;

a generally circular first upper plate (Pcs) 124 mounted on the main bearing blocks (Pal1) 162 and having a plurality of pairs of upper bores (Tps) 126' angularly equidistant and respectively centered on a perimeter of an upper virtual bore positioning circle (Cax) 230 having its center intersecting the main shaft (Axf) 202, the upper bores (Tps) 126' of each pair are typically symmetrical relative to the main shaft (Axf) 202, each upper bore (Tps) 126' coaxially receives a respective shaft (Axt) 128 of a corresponding GCFEVR-1 101 with its bearing blocks (Pal2) 164 mounted therein;

a mechanical energy transmission mechanism (METM) such as a generally circular second lower plate (Pci) 122 freely rotatably mounted on the main bearing blocks (Pal1) 162, the lower plate (Pci) 122 having, respectively centered typically along said perimeter of said upper virtual upper circle (Cax) 230, for each said upper bore (Tps) 126', a corresponding lower bore (Tpi) 126, each lower bore (Tpi) 126 receives an eccentric mass system 130 (having a respective guiding bar (Fcht) 132 with sliding masses (M) 120 (or a sliding eccentric wheel (Re) 190)) and having a shape depending on the respective GCFEVR-1 101 mounted therein;

an eccentric adjustment system (Eas) 144 including at least one shifting mechanism (Sddp) 146, as schematically illustrated by a pair of channels 147 extending along the perimeter of the lower plate (Pci) 122 in FIGS. 26, 32-40, 48, and 49, mounting on the rotor assembly (Rot) 200 and connecting to both the lower plate (Pci) 122 and the upper plate (Pcs) 124 to selectively shift an angular position therebetween within a predetermined angle ($\alpha$), the shifting mechanism (Sddp) 146 ensuring:

a selective cancellation of a free rotating movement of the lower plate (Pci) 122 relative to the rotor assembly (Rot) 200, including the main bearing blocks (Pal1) 162 and the upper plate (Pcs) 124, when not shifting the angular position (when not varying angle ($\alpha$));

a transmission of significant efforts between the lower plate (Pci) 122 and the rotor assembly (Rot) 200 while preventing any variation of the selected angular position therebetween when not activated (or in a rest or stand-by position);

an angular shifting, within a predetermined angle ($\alpha$) (see FIG. 33), of the angular position of the lower plate (Pci) 122 relative to the rotor assembly (Rot) 200 and therefore relative to the upper plate (Pcs) 124, to angularly shift the position of the center of the bores (Tpi) 126 relative to the center of the respective upper bore (Tps) 126' along the virtual bore positioning circle (Cax) 230;

a shaft driving system (sds) 180 connecting to the respective rotating shafts (Axt) 128 to selectively allow the rotation thereof.

Conveniently, as shown in FIGS. 34-40 and 48-49, the GCFEVR-1s 101 are linked to the upper plate (Pcs) 124 of the rotor assembly (Rot) 200, via the respective bearing blocks (Pal2) 164, at the respective upper bore (Tps) 126'. This link is such that the end of the respective shaft (Axt) 128 supporting the guiding bar (Fcht) 132 (or eccentric wheel (Re) 190) is oriented towards the lower plate (Pci) 122, with each guiding bar (Fcht) 132 (or eccentric wheel (Re) 190) being inside the bore (Tpi) 126 around the bore positioning circle (Cax) 230 of the lower plate (Pci) 122.

Figure 45:
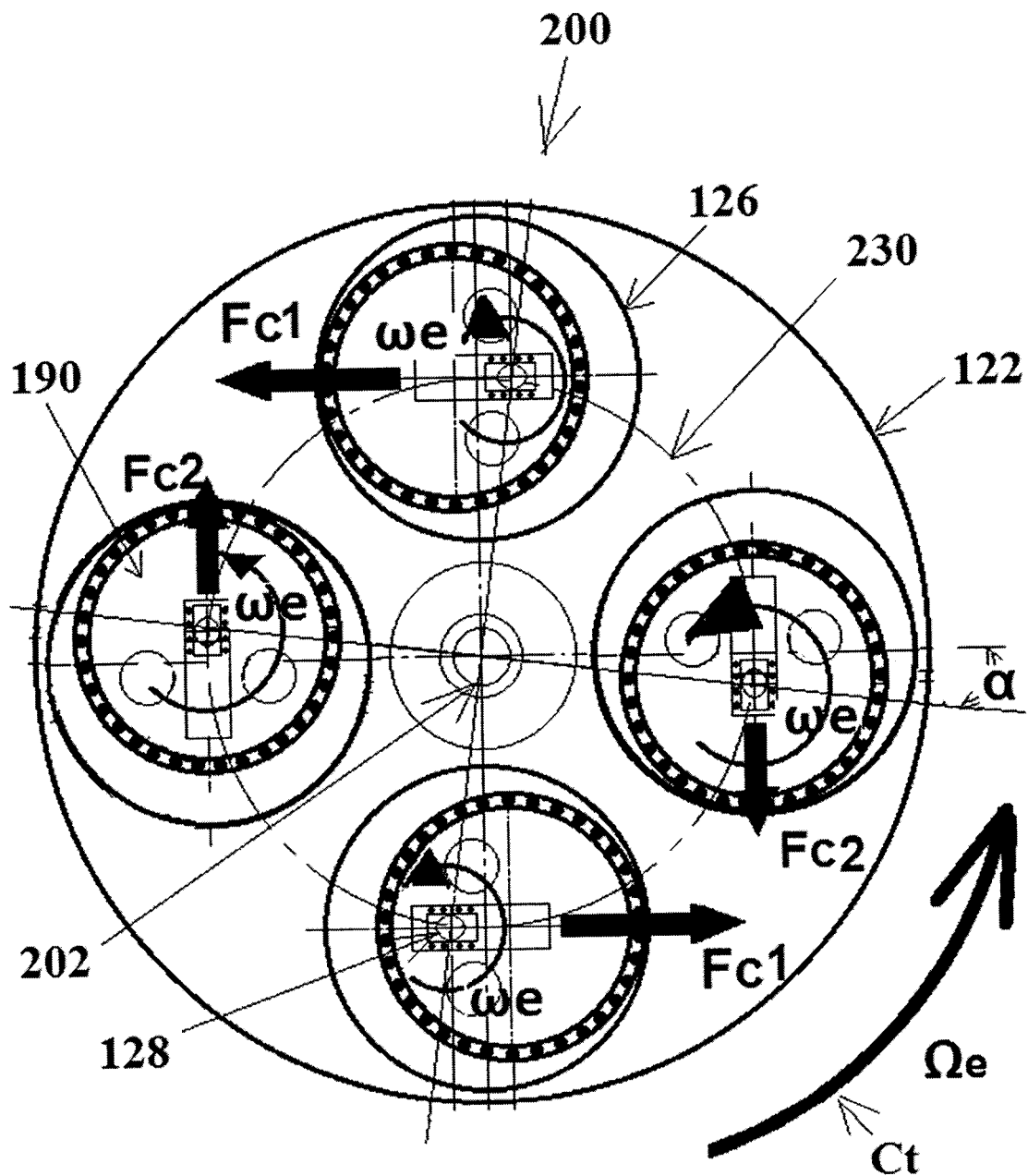
FIG. 45 is a schematic section plan view, taken along line A-A of FIG. 40, of the lower plate (Pci) of the rotor assembly (Rot) of the MGCFEVR, with each GCFEVR having an eccentric wheel (Re) of mass (M), showing the rotational direction of the moving (rotating) parts and the direction of the generated centrifugal forces, along with the rotating direction of the lower plate (Pci)

Conveniently, the diameter of the bores (Tpi) 126 of the lower plate (Pci) 122 is smaller than half the length of the guiding bar (Fcht) 132, in order that the masses (M) 120 always remain on the guiding bar (Fcht) 132 as better seen in FIGS. 10 and 42, or larger than the diameter of the eccentric wheel (Re) 190 better seen in FIG. 45, plus a distance allowing the desired shifting angle ($\alpha$).

In one embodiment, the U-shape of the guiding bar (Fcht) 132 enables a mounting (on either side of the plate (Pci) 122)

within the bore (Tpi) 126 located around the virtual lower bore positioning circle (Cax) 230 of the lower plate (Pci) 122, with the two sides of the U-shape being made to typically extend respectively over and bellow the lower plate (Pci) 122, as shown in FIGS. 36 to 39.

Figure 44:
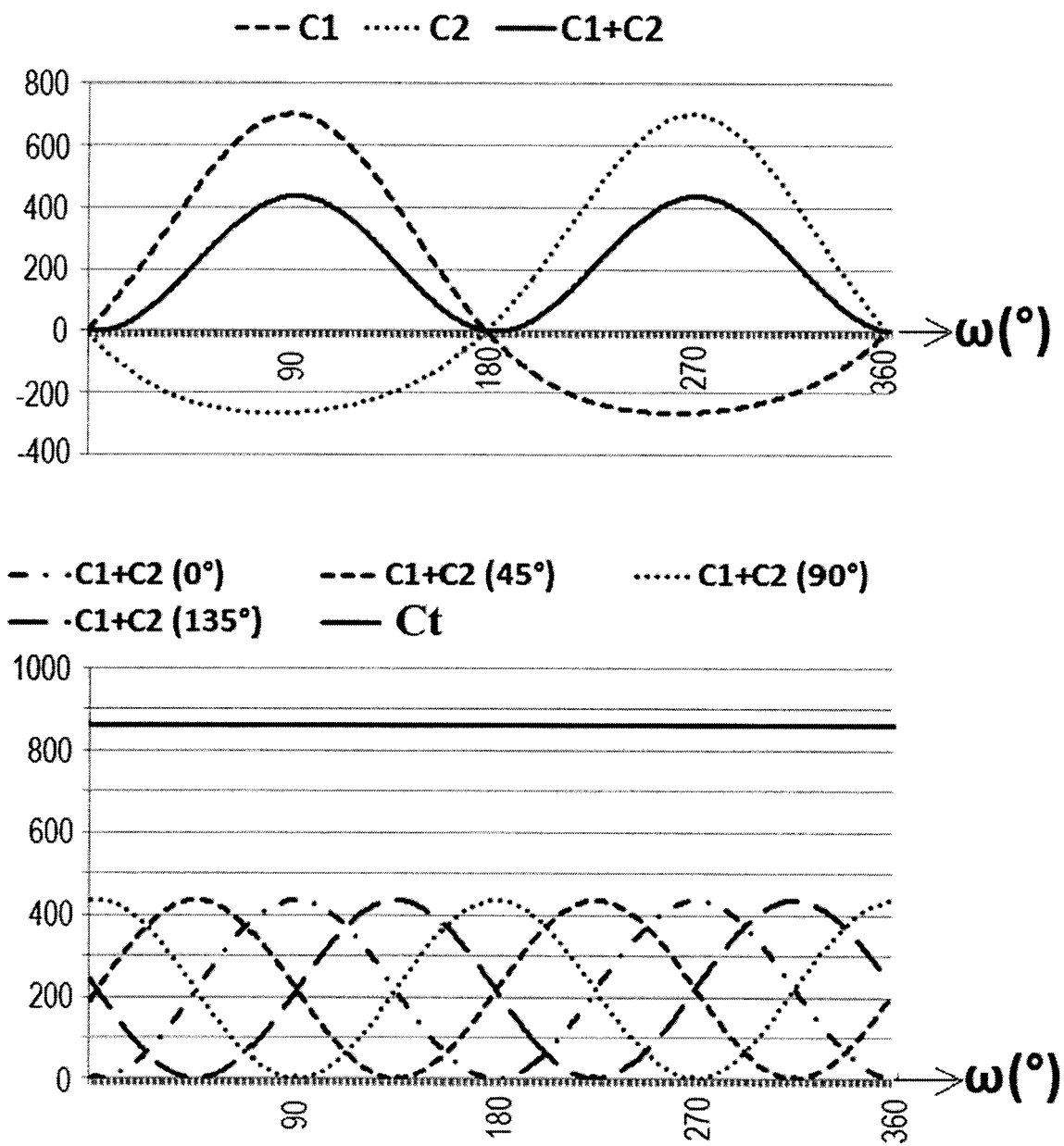
FIG. 44 is a schematic diagram of the typical (the values themselves being dependent on the specific physical characteristics of the machine) curves of the value of the motor torque (C1) (C2) from the centrifugal forces generated by the two masses (M) of only one GCFEVRs, along with the sum (C1+C2) thereof, and by the four GCFEVRs respectively positioned at 0°, 45°, 90° and 135° (as shown in FIG. 42) ((C1+C2(0°)), (C1+C2(45°)), (C1+C2(90°)) relative to each other, (C1+C2(135°))), along with the sum (C(Total)) thereof, for one 360-degree (2π-radian) rotation of the respective shaft (Axt) of the MGCFEVR of FIG. 36.

Conveniently, as shown in FIGS. 42 and 44, the guiding bars (Fcht) 132 of the GCFEVR-1s 101 should be disposed with adequate angles relative to one another, such as at least four GCFEVR-1s 101 respectively positioned at 0°, 45°, 90° and 135°, in order to prevent any vibration, and therefore ensure an essentially constant output torque with a properly balanced rotor assembly (Rot) 200.

Conveniently, the masses (M) 120, mounted on and guided within the guiding bar (Fcht) 132, are prevented from escaping therefrom solely because of their abutment contact inside the perimeter of the corresponding bore (Tpi) 126 they are located in. Conveniently, as shown in FIGS. 8, 18, 27, 28 and 34, the contact between the masses (M) 120 (each freely sliding along a respective longitudinal end of the guiding bar (Fcht) 132) and the lower plate (Pci) 122 (at the level of the bore (Tpi) 126 where they are located) is done via a mass rolling mechanism 232 minimizing the frictional forces (such as a ball bearing roller (Glr) or the like, as shown in FIGS. 8, 18, 27, 28, 34 and 36-39).

Conveniently, on the other end of each shaft (Axt) 128 opposite the guiding bar (Fcht) 132, relative to the upper plate (Pcs) 124, is attached a gear (Ena) 186, part of a shaft driving system (sds) 180, allowing to rotatably drive said shaft (Axt) 128 and consequently the corresponding guiding bar (Fcht) 132 and the masses (M) 120 mounted thereon, as shown in FIGS. 8, 27, 34-37 and 39.

Figure 36:
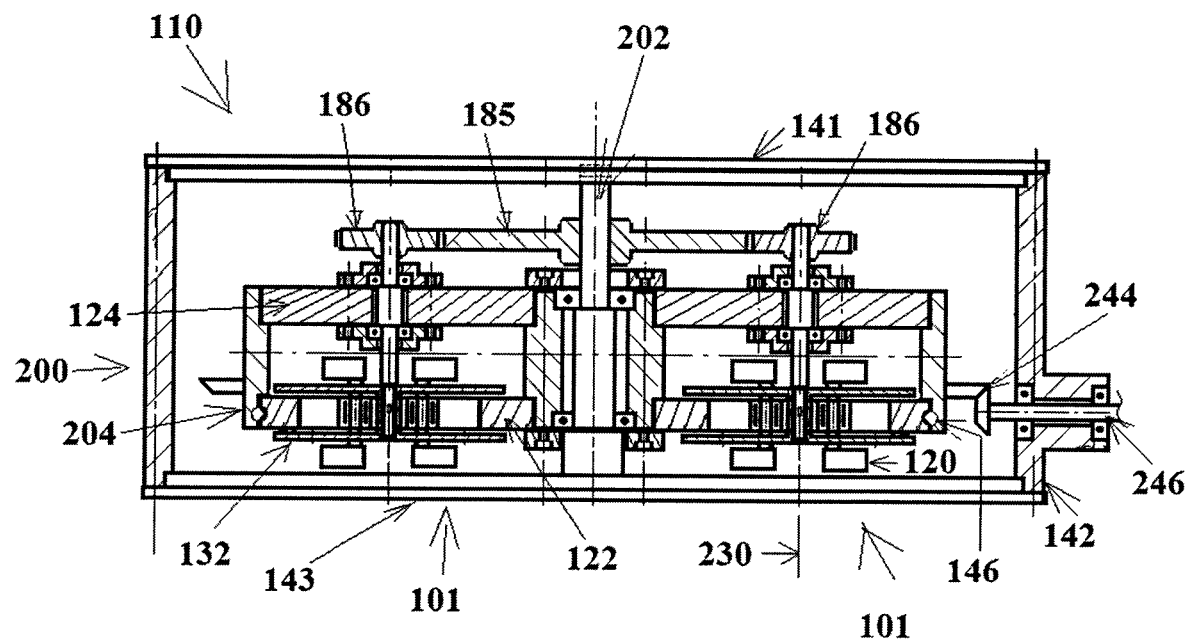
FIG. 36 is a schematic elevation section view of the MGCFEVR, with the rotor assembly (Rot) of FIG. 34, with each GCFEVR having guiding bars (Fcht) and masses (M), for which the rotation of the shafts (Axt) is done by the link of the gears (Ena) with the main gear (Enc) fixed to the main shaft (Axf) of the chassis.
Figure 39:
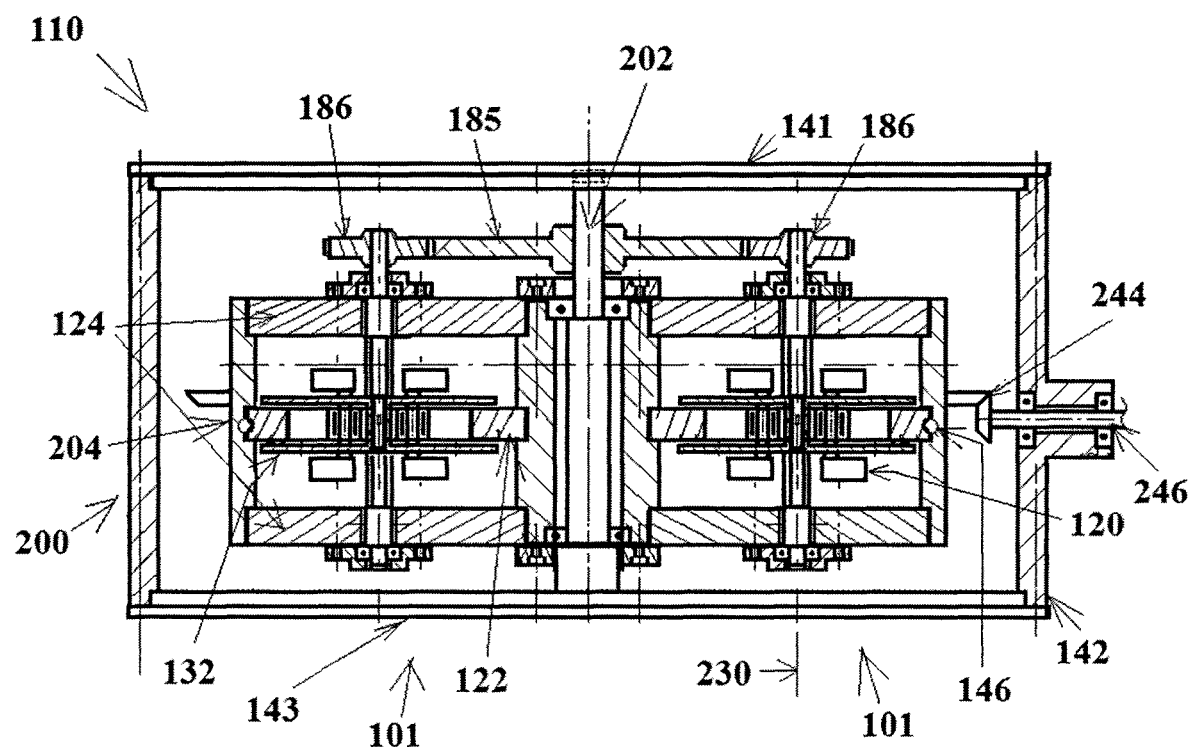
FIG. 39 is a schematic elevation section view of a MGCFEVR similar to the FIG. 36, with the rotor assembly (Rot) of FIG. 34, with each GCFEVR of the rotor assembly (Rot) having the shaft (Axt) supported at both ends via bearing blocks (Pal2) at the respective upper plates (Pcs)
Figure 40:
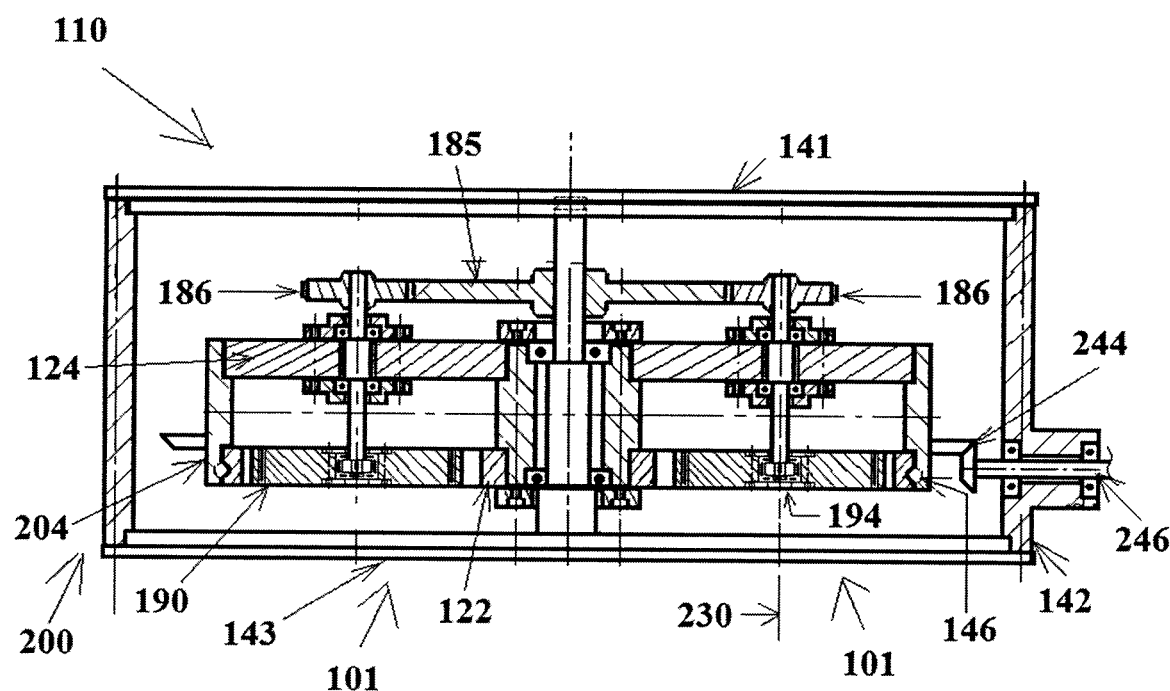
FIG. 40 is a schematic elevation section view of the MGCFEVR, with the rotor assembly (Rot) of FIG. 35, with each GCFEVR having an eccentric wheel (Re) of mass (M)

As shown in FIG. 39, when compared to FIG. 36, each shaft (Axt) 128 would preferably mounted with two bearing blocks (Pal2) 164 on respective upper plate (Pcs) 124, with the guiding bar (Fcht) 132 and the lower plate (Pci) 122 located there between, for improved stability, toughness and lifetime of the machine 110.

In one embodiment, the eccentric wheel (Re) 190, typically made out of a solid wheel having weight relief openings 192 on one side in order to physically shift its center of mass (cg) 156 away from its geometrical center, includes a radial slot 121 extending in a direction defined by the segment between the geometrical center and the center of mass 156. The shaft (Axt) 128 extends perpendicularly to the eccentric wheel (Re) 190 and through the wheel slot 121. The eccentric wheel (Re) 190 mounts onto the shaft (Axt) 190 via a linear guide roller (Ggl) 194 formed of an internal mounting block slidably freely rolling along the wheel slot 121 and between two side plates 196 of the wheel (Re), as shown in FIGS. 9, 19, 29, 30, 35 and 40.

Figure 47:
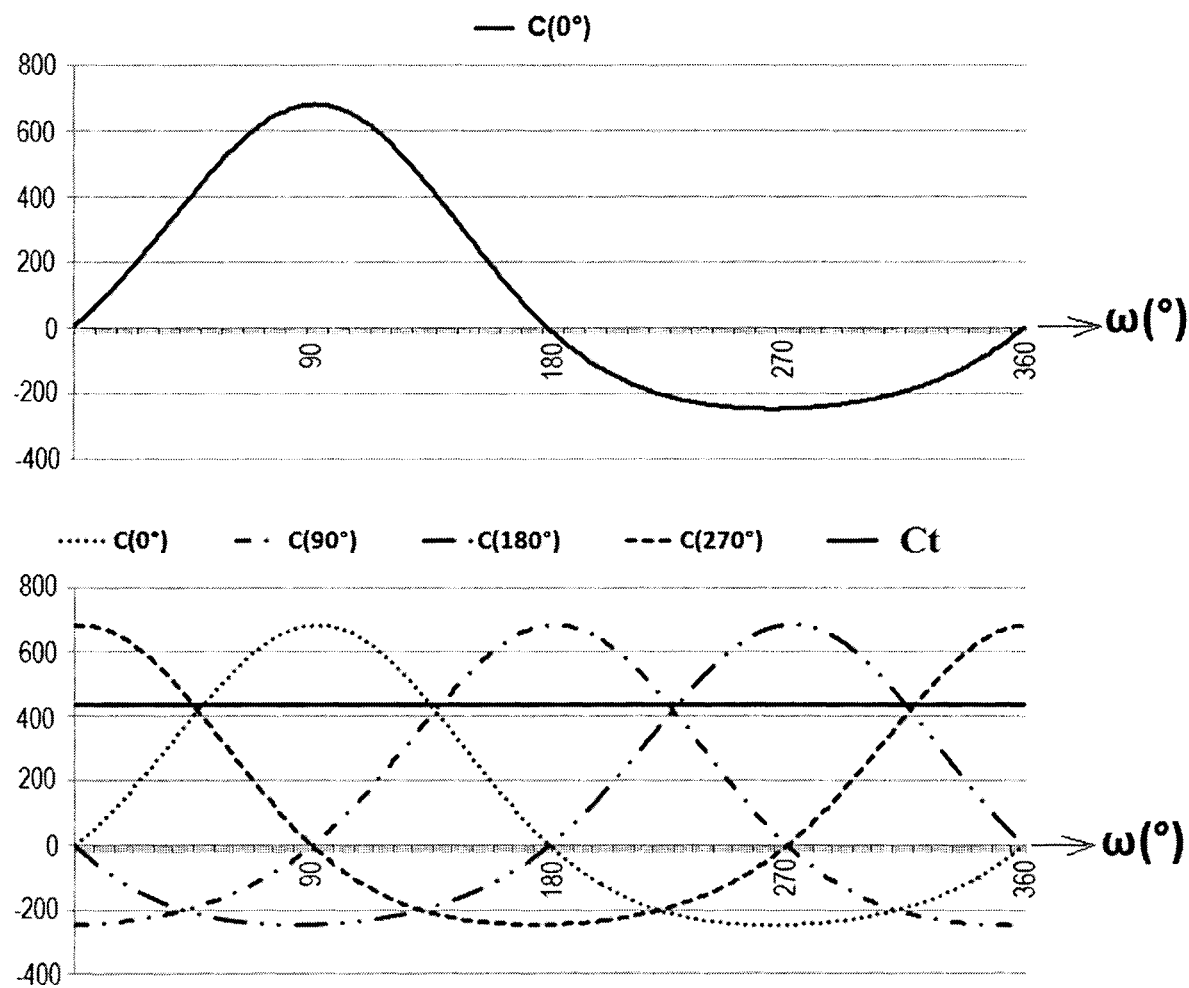
FIG. 47 is a schematic diagram of the typical curves of the value of the motor torque (C(0°)) from the centrifugal forces generated by the mass (M) of only one GCFEVR, and by the four GCFEVRs respectively positioned at 0°, 90°, 180° and 270° (as shown in FIG. 45) ((C(0°)), (C(90°)), (C(180°)), (C(270°))) relative to each other, along with the sum (C(Total)) thereof, for one 360-degree (2π-radian) rotation of the respective shaft (Axt) of the MGCFEVR of FIG. 40.
Figure 48:
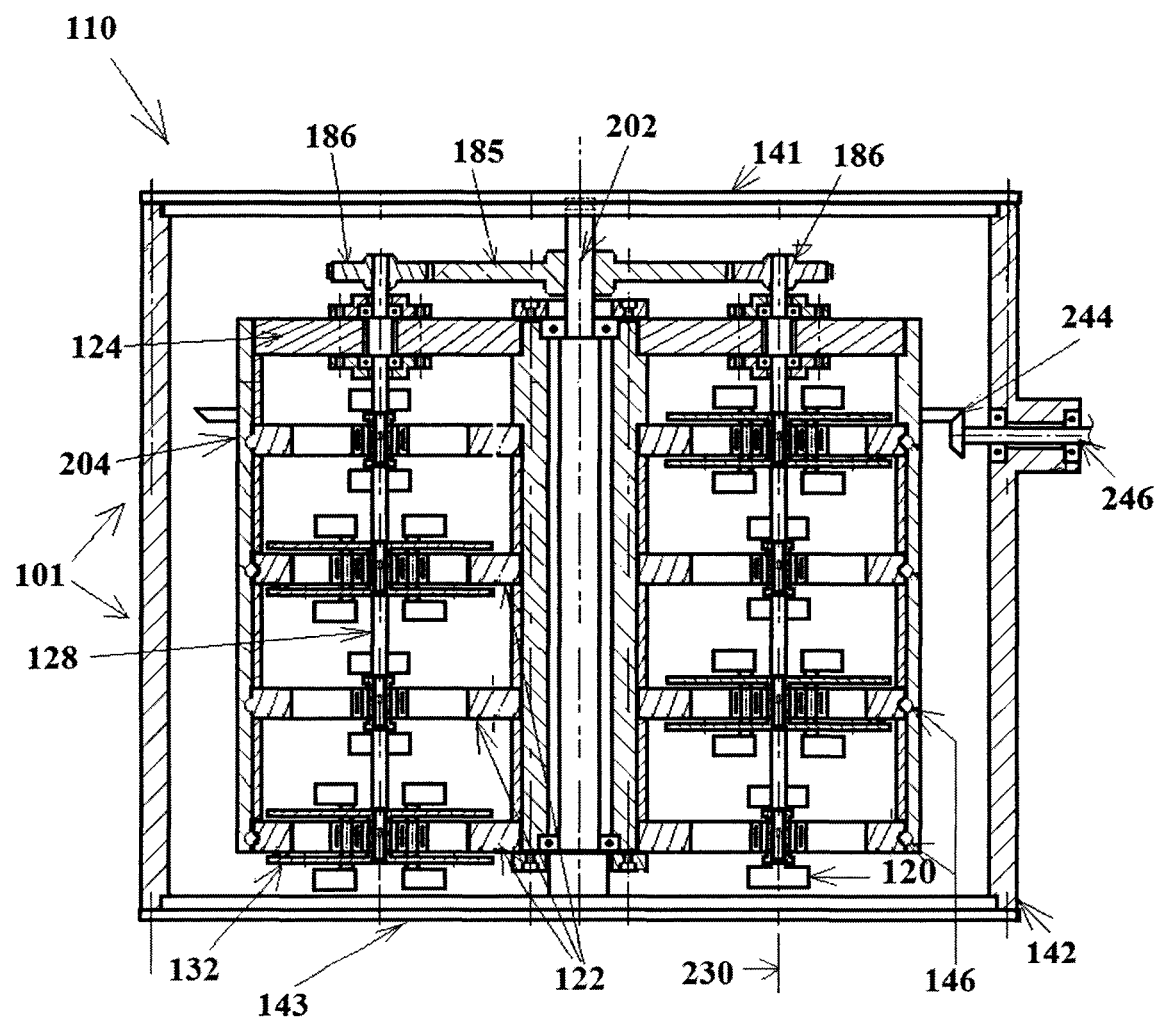
FIG. 48 is a schematic elevation section view of the MGCFEVR with each GCFEVR having guiding bars (Fcht) and masses (M) assembled in stages and angularly shifted relative to one another with appropriate shifting angles, as four layers of the rotor assembly (Rot) of FIG. 34 assembled on top of one another (with four GCFEVRs on each shaft (Axt)), allowing the cancellation of all vibrations (at each shaft) and the generating of a constant motor torque.
Figure 49:
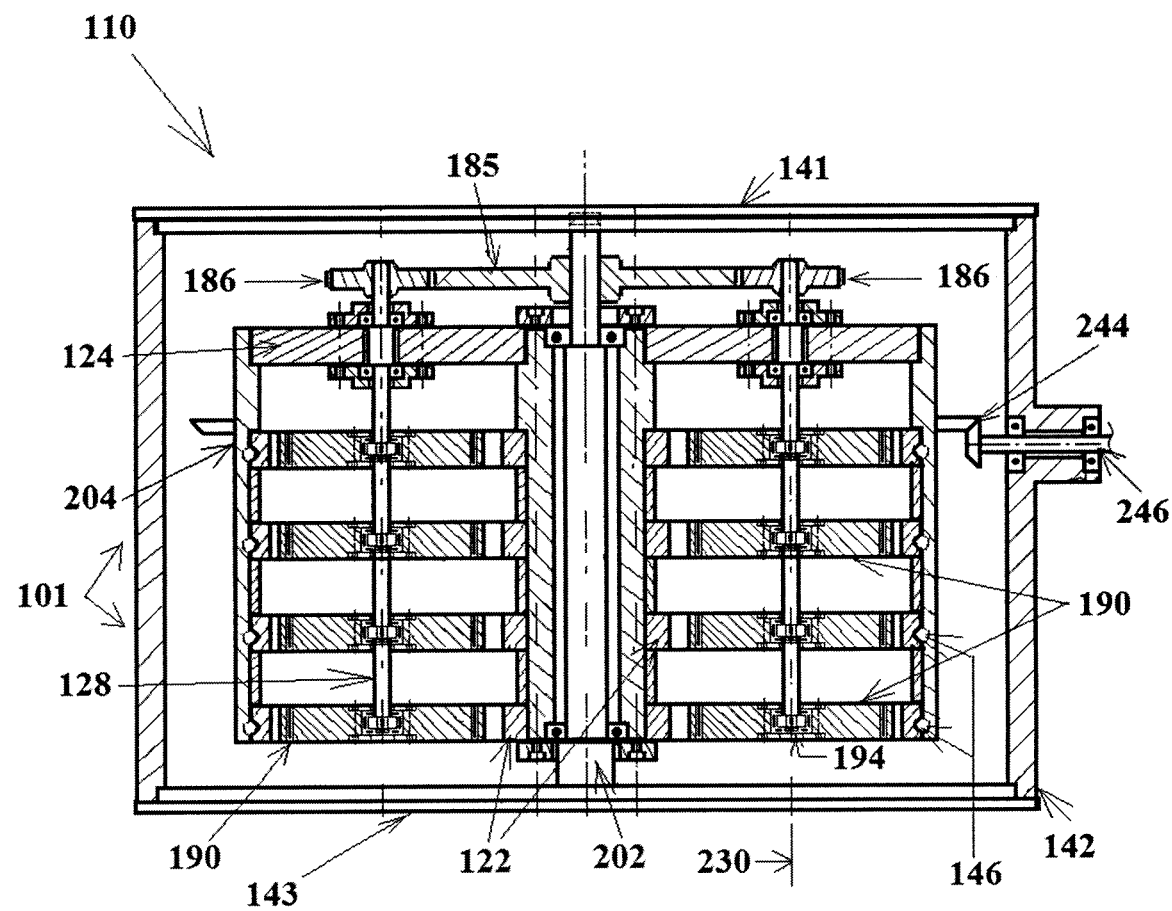
FIG. 49 is a schematic elevation section view of the MGCFEVR with each GCFEVR having an eccentric wheel (Re) of mass (M) assembled in stages and angularly shifted relative to one another with appropriate shifting angles, as four layers or stages of the rotor assembly (Rot) of FIG. 35 assembled on top of one another (with four GCFEVRs on each shaft (Axt)), allowing the cancellation of all vibrations and the generating of a constant motor torque, with increased output torque.

Conveniently, as shown in FIGS. 45 and 47, the eccentric wheels (Re) 190 of the GCFEVR-1s 101 should be disposed with adequate angles relative to one another, such as at least four GCFEVR-1s 101 respectively positioned at 0°, 90°, 180° and 270°, in order to prevent any vibration, and therefore ensure an essentially constant output torque with a properly balanced rotor assembly (Rot) 200 of the machine 110.

Conveniently, the eccentric masses (M) 190, 120, mounted on and guided on their respective shaft (Axt) 128, are prevented from escaping therefrom solely because of their abutment contact inside the perimeter of the corresponding bore (Tpi) 126 they are located in via and external roller bearings 198 or the like located at the outer periphery of the wheels (Re) 190, as shown in FIGS. 9, 19, 29, and 30, to prevent friction between the eccentric wheel (Re) 190 and lower plate (Pci) 122 at the inside of the lower bore (Tpi) 126.

Conveniently, on the other end of each shaft (Axt) 128 opposite the eccentric wheel (Re) 190, relative to the upper plate (Pcs) 124, is attached a gear (Ena) 186, part of a shaft driving system (sds) 180, allowing to rotatably drive said shaft (Axt) 128 and consequently the corresponding eccentric wheel (Re) 190 and the mass (M) 120 mounted thereon, as shown in FIGS. 18, 29, 30, 35 and 40.

Typically, as shown in FIGS. 10 and 41, the rotor assembly (Rot) 200 includes a ring (or cylindrical wall or crown) (Bg) 204 with an internal diameter adapted to receive an outer diameter of upper (Pcs) 124 and lower (Pci) 122 plates therein. The ring (Bg) 204 is typically fixed relative to the upper plate (Pcs) 124, while the lower plate (Pci) 122 is freely rotatably mounted into the ring (Bg) 204, via the plate shifting mechanism (Sddp) 146. The upper (Pcs) 124 and lower (Pci) 122 plates are of circular shapes in this case.

In one embodiment, as shown in FIGS. 10 and 41, the eccentric close trajectory (Traf) 150 has two portions, identical or not. A first portion is defined by the body of the lower plate (Pci) 122 of the rotor assembly (Rot) 200 itself, more specifically by a section 127 of a lower bore (Tpi) 126 formed therein. A second portion is formed by a first end of a lever arm (Brle) 212 connected to a lever shaft (o) 214 freely rotatably mounted on rotor assembly (Rot) 200 via fixed bearing blocks (not shown). The lever shaft (o) 214 is located, on the rotor assembly (Rot) 200, on the opposite side from the corresponding rotating shaft (Axt) 128 relative to an axis extending through its center of rotation (main shaft (Axf) 202) and perpendicular to the axis extending through both the corresponding rotating shaft (Axt) 128 and the main shaft (Axf) 202. The second end of the lever arm (Brle) 212, opposite the first end relative to the layer shaft (o) 214, is connected, via a connecting rod (Bie) 218, to a free wheel (Rli) 216 mounted on the main shaft (Axf) 202 of the chassis (Ch) 140. This free wheel (Rli) 216 freely rotates in the rotational direction of the rotation of the rotor assembly (Rot) 200, while being blocked from rotating in the opposite direction relative to the rotor assembly (Rot) 200. When the centrifugal forces (Fc) act on that second portion of the trajectory (Traf) 150, namely the first end of the lever arm (Brle) 212, into the opposite direction of the rotational direction of the rotor assembly (Rot) 200, the second end of the lever arm (Brle) 212 pushes onto the free wheel (Rli) 216 via the connecting rod (Bie) 218 into its blocked direction. This blocking effect therefore induces onto the lever shaft (o) 214, hence onto the rotor assembly (Rot) 200, a reacting force (Fen) generating a torque thereon in the same rotational direction of the rotor assembly (Rot) 200, i.e. in the same rotational direction as the centrifugal force (Fc) torque acting directly onto the first portion 127 of the trajectory (Traf) 150 formed into the rotor assembly (Rot) 200. Therefore, no matter where the mass (M) 120 is located along its eccentric closed trajectory (Traf) 150, the torque generated by the centrifugal forces (Fc) onto the rotor assembly (Rot) 200 always remains in the same rotational direction. The lever arm (Brle) 212, the lever shaft (o) 214, the connecting rod (Bie) 218 and the free wheel (RIO 214 form a torque orientation inverter (Ce) 210 of the GCFEVR-1 101.

Figure 51:
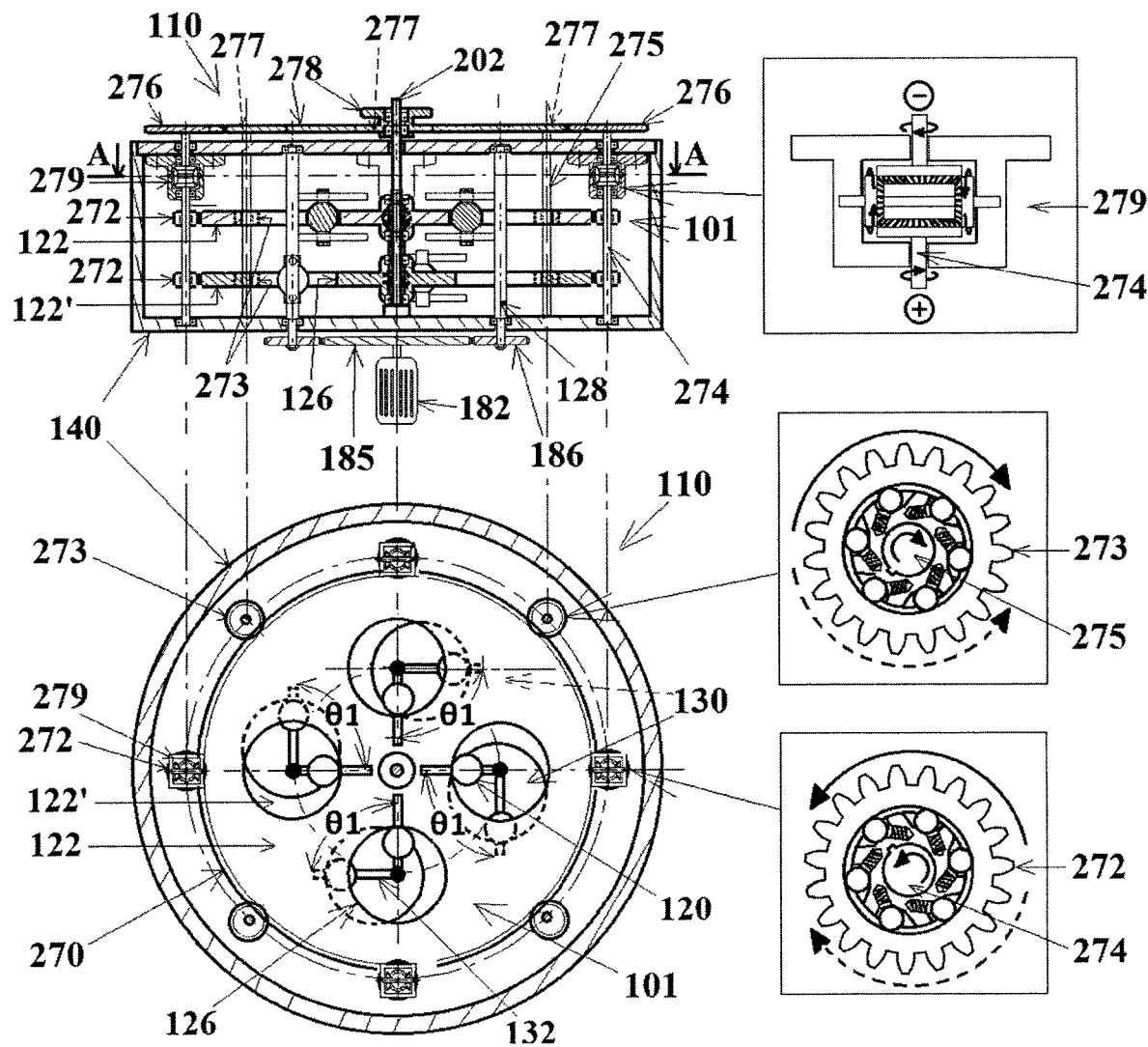
FIG. 51 are schematic plan and elevation views of another MGCFEVR-1 with oscillating rotational movement, including eight GCFEVR-1s (four (4) per lower plate (Pci) and two (2) per rotating shafts (Axt)) similar to that of FIG. 8, each one having a single mass (M) along the respective guiding bar (Fcht); each lower plate (Pci) includes gear teeth at its outer periphery that meshes with two series of free wheel sprockets (EL1, EL2) mounted on respective sprocket shafts (Axi1, Axi2); each sprocket shaft also carries an intermediate gear ((Eni1, Eni2) that meshes with an output gear (Eno) for transmission of the generated power torque generated by the GCFEVR-1s via an rotational oscillation of the lower plates due to the masses (M); one series of sprocket shafts are connected to their respective intermediate gear via a rotational direction reversing member (SISR), and each series of sprocket shafts are adapted to transmit the generated torque via the free wheel sprockets adapted to freely rotate in opposite directions from one series to another.

In one embodiment, as schematically shown in FIGS. 51 to 54, there is shown another MGCFEVR 110 using GCFEVR-1s 101 and having rotationally oscillating rotating lower plates (Pci) 122 with an oscillating rotation motion instead of a continuously rotating motion in a same direction. In the embodiment shown, there are a top first lower plate 122 and a bottom second lower plate 122', as shown in FIG. 51.

In this embodiment, the rotating shafts (Axt) 128 are freely rotatably mounted on the chassis (Ch) 140 via bearing blocks. Each rotating shaft 128 carries an eccentric mass system 130, such as a guiding bar 132 with only one mass 120 or an eccentric wheel 190, per lower plate 122, and extends through the center of the corresponding lower bore (Tpi) 126. Each lower plate 122, 122' is freely rotatably mounted on the main shaft (Axf) 202.

The rotation of each rotating shaft 128 via the motor (Mot) 182, the main gear (Enc) 185 and the respective gear (Ena) 186, driving the respective eccentric mass system 130, applies centrifugal forces having a direction depending on the position of the mass (M) 120, thereby forcing the lower plate 122, 122' to rotatably oscillate about the main shaft 202 in both sides of the rotating shaft 128. With all of the masses (M) 120 of the eccentric mass systems 130 simultaneously oriented in the same angular direction relative to the main shaft (Axf) 202, the value of the torque acting on the lower plate 122, 122', due to the centrifugal forces (Fc) has a sinusoidal shape in the tangential (or circumferential) direction, as shown in the first curve '122(Pci)' of FIG. 53 (with arbitrary min and max torque values +T and −T).

Figure 52:
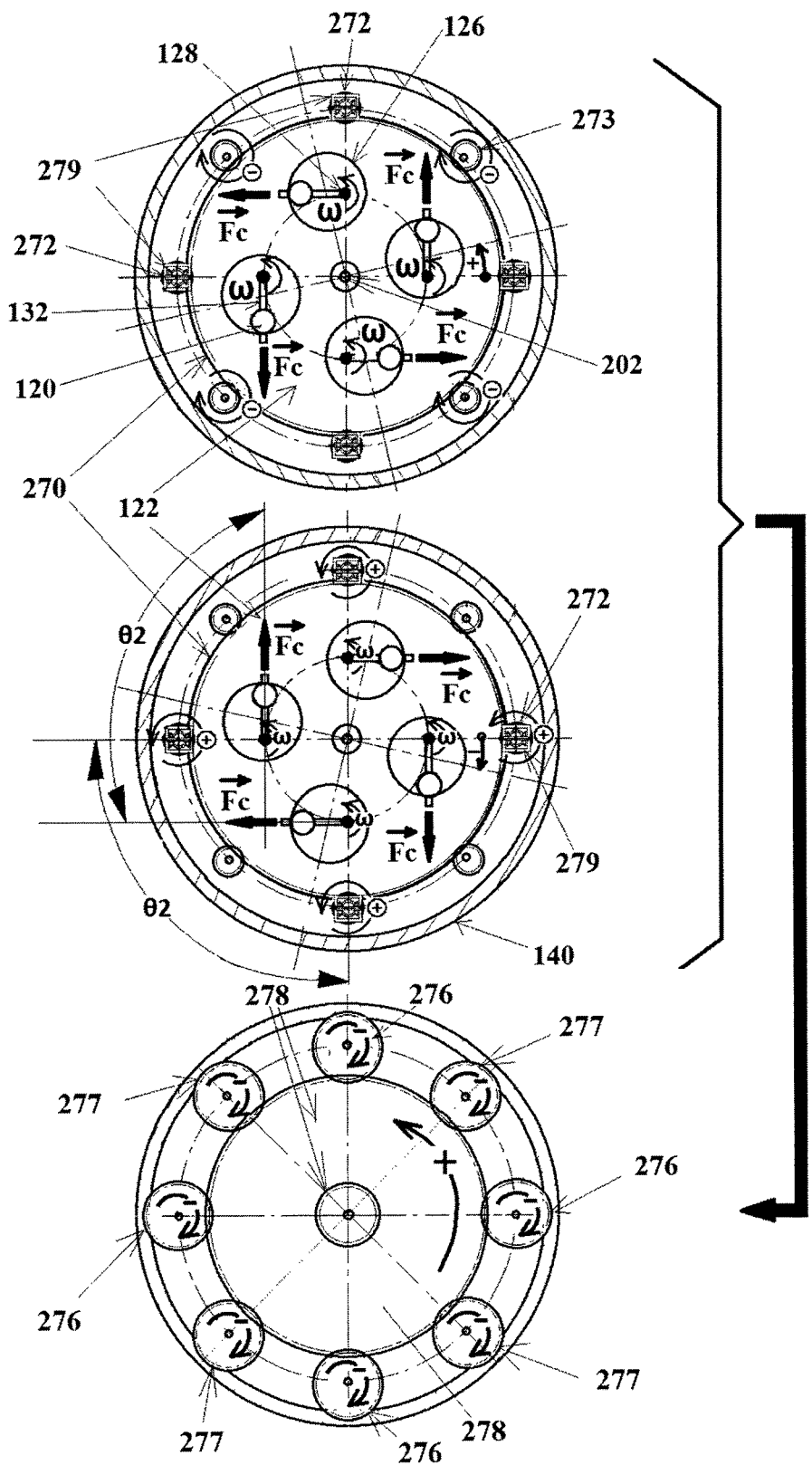
FIG. 52 are schematic views of one the lower pates of the MGCFEVR-1 of FIG. 51 when rotating in both rotational directions, with a corresponding top plan view showing the rotation of the intermediate gears and output gear.
Figure 53:
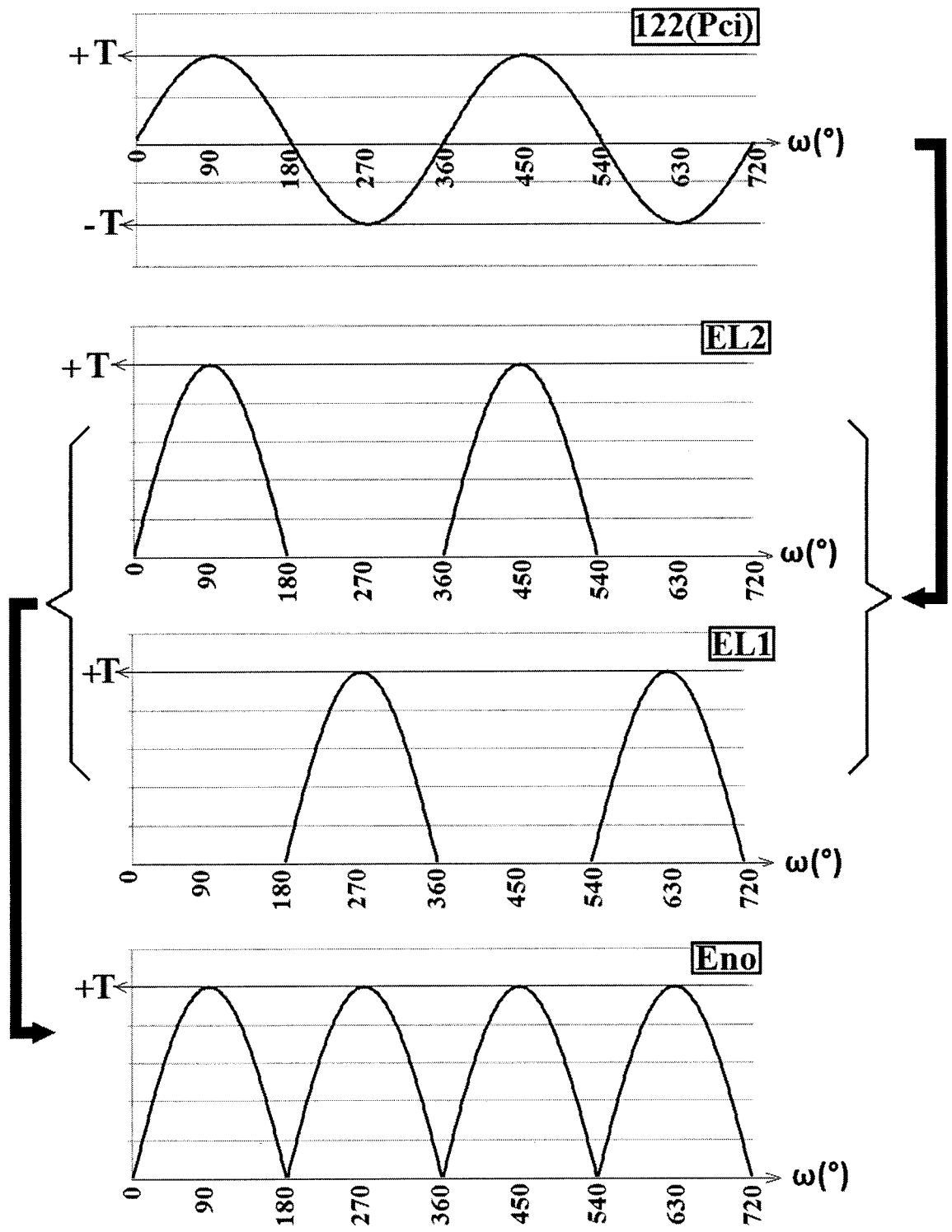
FIG. 53 are schematic diagrams of the typical curve of the output torque generated by all four (4) GCFEVR-1s of a same lower plate (Pci) of FIG. 52, with the typical oscillating sinusoidal torque curve generated at the lower plate (Pci) being separated by the two series of free wheel sprockets (EL1, EL2) as shown by the following two curves, and then recombined at the output gear as shown by the last curve.

Typically, the outer periphery of the lower plates 122, 122' include gear teeth 270 or the like in order to drive, via its oscillating motion, series of free wheel sprockets (EL1, EL2) 272, 273 mounted on respective freely rotatable sprocket shafts (Axi1, Axi2) 274, 275, as shown in FIGS. 51 and 52. A first series of free wheel sprockets (EL1) 272 are adapted to transmit rotating motion of the respective sprocket shaft (Axi1) 274 in a first rotational direction (as indicated by a solid arrow in the lowermost enlarged detail of FIG. 51) and to freely rotate thereabout in an opposite second rotational direction (as indicated by a stippled arrow in the lowermost enlarged detail of FIG. 51). Inversely, the second series of free wheel sprockets (EL2) 273 are adapted to transmit rotating motion of the respective sprocket shaft (Axi2) 275 in the second rotational direction (as indicated by a solid arrow in the middle enlarged detail of FIG. 51) and to freely rotate thereabout in the opposite first rotational direction (as indicated by a stippled arrow in the middle enlarged detail of FIG. 51). Preferably, the sprockets (EL1, EL2) 272, 273 and corresponding shafts (Axi1, Axi2) 274, 275 are mounted into an alternating fashion around the lower plates 122, 122', as shown in FIGS. 51 and 52.

The sprocket shafts 274, 275 carry respective intermediate gear (Eni1, Eni2) 276, 277 used to transmit the movement and the driving torque to an output gear (Eno) 278 used to transmit the generated total torque (Ct) to an external load, apparatus or the like.

When oscillating into the second rotational direction (for example negative or clockwise direction of FIGS. 51 to 54), the lower plate 122 drives: 1) the sprockets (EL1) 272 into the first rotational direction (positive or counterclockwise direction of our example of FIGS. 51 to 54), which in turn drive the corresponding sprocket shafts (Axi1) 274 by transmitting its torque thereto. The sprocket shafts (Axi1) 274 are connected to the respective intermediate gear (Eni1) 276 via a respective rotational direction reversing member (SISR) 279 in order to drive the intermediate gears (Eni1) 276 into the second rotational direction (see first enlarged detail of FIG. 51); 2) the sprockets (EL2) 273 into the first rotational direction, which in turn rotate freely about the corresponding sprocket shafts (Axi2) 275 without transmitting any torque. This makes the free wheel sprockets (EL1) 272 and their corresponding sprocket shafts (Axi1) 274 to transmit only the torque oriented into the second rotational direction, thereby transmitting only the negative portion of the sinusoidal curve, as shown by the 'EL1' curve of FIG. 53.

Alternatively, when oscillating into the first (positive) rotational direction, the lower plate 122 drives: 1) the sprockets (EL2) 273 into the second rotational direction, which in turn drive the corresponding sprocket shafts (Axi2) 275 by transmitting its torque thereto. The sprocket shafts (Axi2) 275 are directly connected to the respective intermediate gear (Eni2) 277 in order to drive the intermediate gears (Eni2) 277 into the second rotational direction; 2) the sprockets (EL1) 272 into the second rotational direction, which in turn rotate freely about the corresponding sprocket shafts (Axi1) 274 without transmitting any torque. This makes the free wheel sprockets (EL2) 273 and their corresponding sprocket shafts (Axi2) 275 to transmit only the torque oriented into the first rotational direction, thereby transmitting only the positive portion of the sinusoidal curve, as shown by the 'EL2' curve of FIG. 53.

Irrespective of the rotational direction of the lower plate 122, all intermediate gear (Eni1, Eni2) 276, 277 always rotate into a same rotational direction (the second negative direction in the present example of FIGS. 51 to 54). Because of the meshing of the intermediate gear (Eni1, Eni2) 276, 277 with the output gear (Eno) 278, the latter always transmits a total torque (Ct) into a same rotational direction (the first positive direction in the present example, as shown by the 'Eno' curve of FIG. 53).

Figure 54:
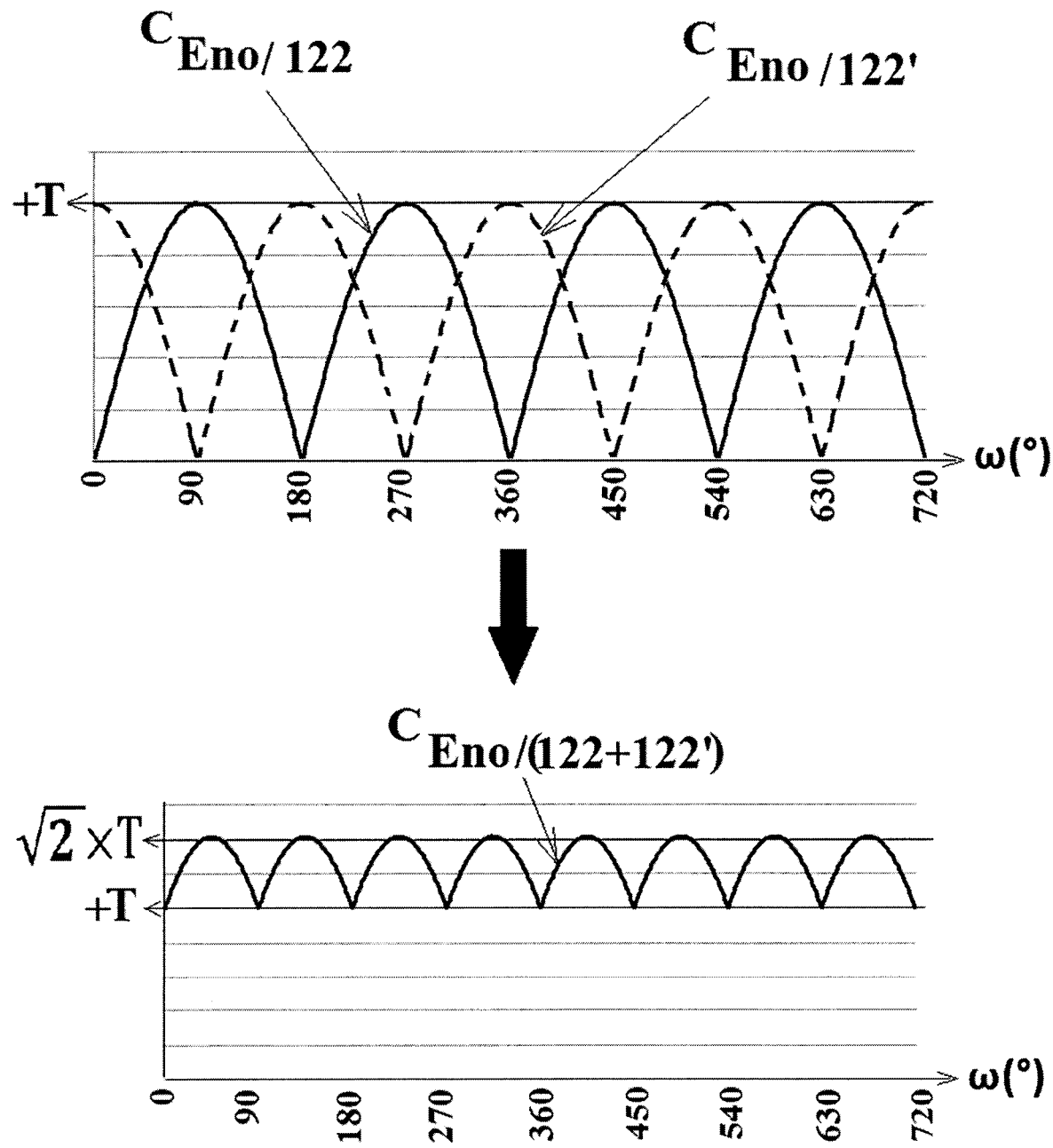
FIG. 54 are schematic diagrams of the typical curves of the separated recombined torque of FIG. 53 for each lower plates as shown by the solid and stippled lines of the first diagram, with the sum of the two curves being shown on the last diagram as the total output torque of the MGCFEVR-1 of FIG. 51.

In order to obtain a more uniform output torque at the output gear (Eno) 278, the bottom second lower plate 122' has been added with the mass eccentric systems 130 thereof being essentially shifted by an angle θ1 of 90° (π/2 radians) relative to the mass eccentric systems 130 of the top first lower plate 122 (as shown in FIG. 51). FIG. 54 shows the two curves ($C_{Eno/122}$, $C_{Eno/122'}$) of the output torque generated by the two lower plates 122, 122', in solid and dashed lines respectively (with arbitrary maximum torque value T), with the resulting output torque ($C_{Eno/(122+122')}$) of the sum of the two (with arbitrary maximum torque value T·SQRT (2)). Similarly, if 'n' lower plates are used, the shift angle θ1 of the masses (M) 120 of the mass eccentric systems 130 between successive lower plates 122 would preferably be of 180°/n (π/n radians).

Although four (4) GCFEVR-1s are equally spaced apart on each lower plate 122, 122', any number of GCFEVR-1s could be considered (the more GCFEVR-1s, the larger the total output torque Ct), all being generally equally circumferentially spaced apart from one another, and have a shifting angle θ2 of the respective mass 120 of the mass eccentric systems 130 between adjacent GCFEVR-1s equal to the angle between their respective rotating shafts (Axt) 128 relative to the main shaft (Axf) 202 (as shown in FIG. 52).

Obviously, the rotational velocity (ωe) of all of the GCFEVR-1s would need to be limited in order to ensure that the mass eccentric systems 130 operate properly with each rotating shaft (Axt) 128 always remaining spaced from the periphery of its respective lower bore (Tci) 126.

(II-2B)—Case for which the GCFEVR-2 102 is an Integral Part of the Machine 110 with Rotating Movement According to another aspect of the present invention, as shown in FIGS. 17 and 55-57, there is provided a machine for generating mechanical energy with a rotating movement, via the generation of centrifugal forces from eccentrics with variable radius (MGCFEVR), said machine 110 comprising:

a fixed chassis (Ch, Ch1, Ch2, Ch3) 140, 141, 142, 143 having a main shaft (Axf) 202 around its geometric center for supporting a rotor assembly (Rot) 202 thereof;

the rotor assembly (Rot) 200 freely rotatably mounted on the main shaft (Axf) 202, said rotor assembly 200 comprising:

main bearing blocks (Pal1) 162 mounted on the main shaft (Axf) 202;

a generally circular first upper plate (Pcs) 124 mounted on the main bearing blocks (Pal1) 162 and having a plurality of pairs of upper bores (Tps) 126' angularly equidistant and respectively centered on a perimeter of an upper virtual bore positioning circle (Cax) 230 having its center intersecting the main shaft (Axf) 202, the upper bores (Tps) 126' of each pair are typically symmetrical relative to the main shaft (Axf) 202, each upper bore (Tps) 126 coaxially receives a respective shaft (Axt) 128 of a corresponding GCFEVR-2 102 with its bearing blocks (Pal2) 164 mounted therein;

a mechanical energy transmission mechanism (METM) such as a generally circular second lower plate (Pci) 122 freely rotatably mounted on the main bearing blocks (Pal1) 162, the lower plate (Pci) 122 having, respectively centered typically along said perimeter of said upper virtual upper circle (Cax) 230, for each said upper bore (Tps) 126', a corresponding lower bore (Tpi) 126, each lower bore (Tpi) 126 receives an eccentric mass system 130 (having a respective mass support member (SuM) 170 with an eccentric closed trajectory (Traf) 150 formed therein, along with masses (M) 120 therealong and a respective mass driving member (Mte) 166 fixedly mounted onto the corresponding rotating shaft (Axt) 166) therein and having a shape depending on the respective GCFEVR-2 102 mounted therein;

an eccentric adjustment system (Eas) 144 including at least one mass support rotation system (Srst) 148, as schematically illustrated by a worm screw mechanism or the like shown in dotted lines in FIG. 74, mounting on the rotor assembly (Rot) 200 and connecting to both the lower plate (Pci) 122 and the mass support members (SuM) 170 to selectively shift an angular position between the mass support members (SuM) 170 relative to the respective lower bore (Tpi) 126 of the rotor assembly (Rot) 200 within a predetermined angle (θ), the mass support rotation system (Srst) 148 ensuring:

a selective cancellation of a free rotating movement of the mass support members (SuM) 170 relative to the respective lower bore (Tpi) 126 of the rotor assembly (Rot) 200, when not shifting the angular position, i.e. when not activated (when not activating the support rotation system (Srst) 148 or modifying the predetermined angle (θ) or in a rest or stand-by position);

an angular shifting, within a predetermined angle (θ), up to 360° or ($2\pi$ radians)—see FIG. 74, of an angular position of the mass support members (SuM) 170 relative to the respective lower bore (Tpi) 126 of the rotor assembly (Rot) 200, to selectively angularly shift the angular direction of the total centrifugal force (Fc) generated by the respective GCFEVR-2 102, and therefore the centrifugal force torque generated by the MGCFEVR 110;

a shaft driving system (sds) 180 connecting to the respective rotating shafts (Axt) 128 to selectively allow the rotation thereof.

In one embodiment, the link between each of the GCFEVR-2s 102 and the corresponding upper bore (Tps) 126' of the upper plate (Pcs) 124 allows the respective mass driving member (Mte) 166 to be oriented towards the lower plate (Pci) 122, with each said mass support member (SuM) 170 being located within a respective lower bore (Tpi) 126 centered onto the upper virtual bore positioning circle (Cax) 230.

Typically, a gear (Ena) 186, part of the shaft driving system (sds) 180, attaches to each rotating shaft (Axt) 128 to rotatably drive said shaft (Axt) 128 and corresponding said mass driving member (Mte) 166, such as arms (br) 224 or the like as shown in FIGS. 11-17, 23, 55, 56, and 79, and the movement of corresponding masses (M) 120 along the eccentric closed trajectory (Traf) 150.

Figure 55:
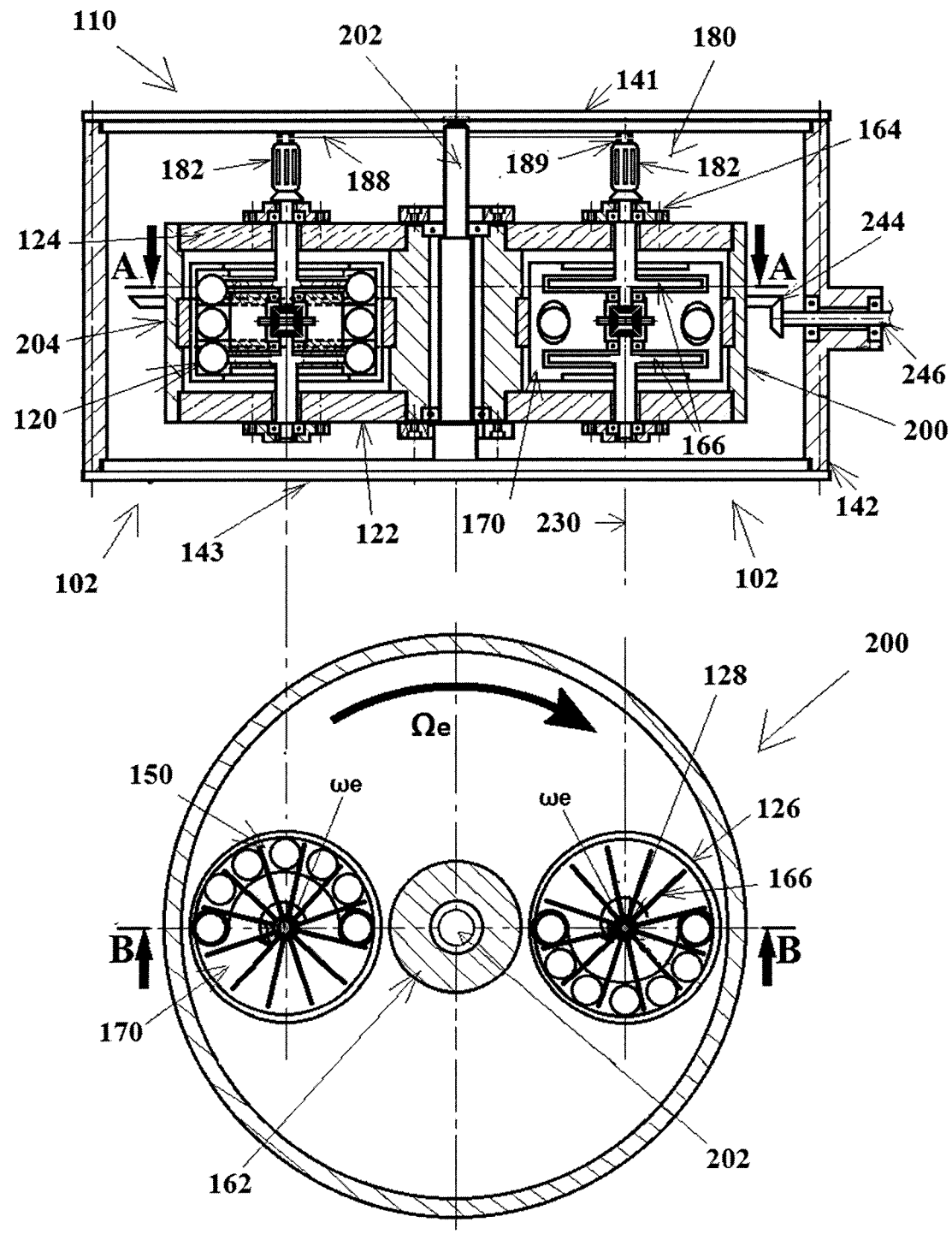
FIG. 55 are schematic section elevation section view, similar to that of FIG. 38, and schematic section plan view taken along lines B-B and A-A of one another, respectively, showing two GCFEVR-2s, similar to that of FIG. 11, with their respective mass support member (SuM) mounted on the rotor assembly (Rot) and oriented to provide a centrifugal torque with a same orientation relative to the main shaft (Axf)
Figure 56:
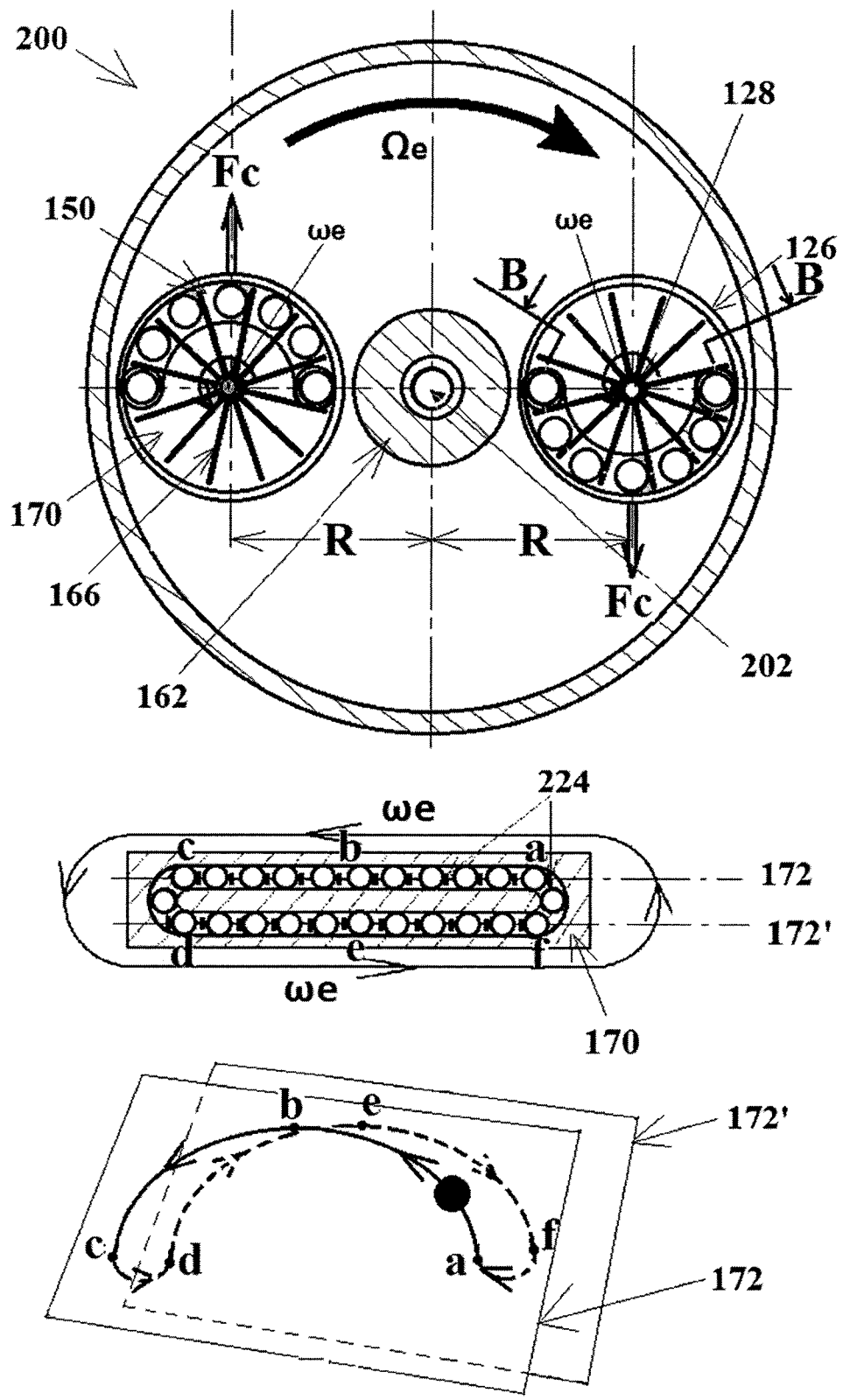
FIG. 56 are a schematic section elevation view of FIG. 55 with a schematic section planar spread out view taken along line B-B of the elevation view showing the two main mass planes of the eccentric closed trajectory (Traf) followed by the masses (M) of a GCFEVR-2, and a schematic perspective view illustrating the directional displacement of the masses (M) along the trajectory (Traf)
Figure 57:
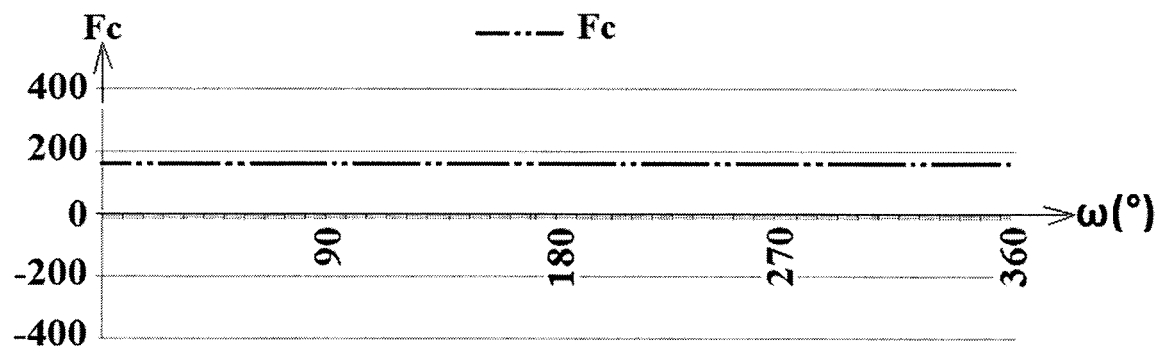
FIG. 57 is schematic diagrams of the typical curve of the value of the motor resulting centrifugal force (Fc) of one of the GCFEVR-2 of FIGS. 55 and 56 for one 360-degree (2π-radian) rotation of the respective shaft (Axt), and of the typical curve of the value of the motor resulting centrifugal torque (C=2×Fc R) of both GCFEVR-2s of FIGS. 55 and 56, for one 360-degree (2π-radian) rotation of both rotating shafts (Axt) located at a radial distance (R) relative to the main shaft (Axf)
Figure 57:
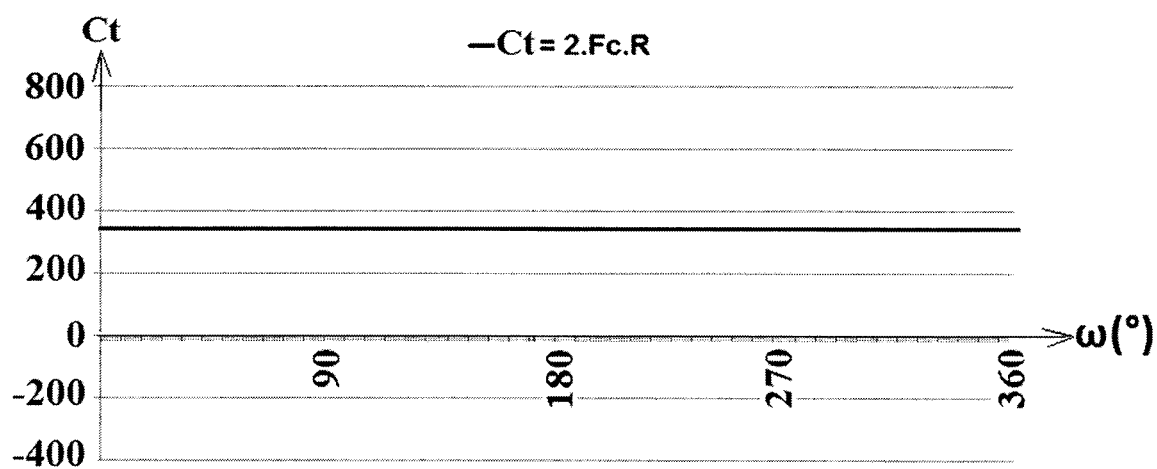

Typically, as shown in FIG. 55, the rotor assembly (Rot) 200 includes a ring (or cylindrical wall or crown) (Bg) 204 with an internal diameter adapted to receive an outer diameter of upper (Pcs) 124 and lower (Pci) 122 plates therein. The ring (Bg) 204 is typically fixed relative to both the upper (Pcs) 124 and lower (Pci) 122 plates. The upper (Pcs) 124 and lower (Pci) 122 plates are preferably of circular shapes in this case.

(II-2C)—Case for which Either the GCFEVR-1 101 or the GCFEVR-2 102 is an Integral Part of the Machine 110 with Rotating Movement In one embodiment, there are as many GCFEVRs 100 as required based on the quantity of bores (Tpi or Tps) 126, 126' there are in the corresponding plate (Pci or Pcs) 122, 124 where they are mounted in. Each GCFEVR 100 exploits the work of the equilibrium forces of expansion (centrifugal forces (Fc)), independently from the others.

Conveniently, as shown in FIGS. 44 and 47, the number of GCFEVRs 100, and their disposition relative to one another can generate a total motor torque (Ct) of constant value continuously driving the rotor assembly (Rot) 200 into one rotational direction.

In one embodiment, the ring (Bg) 204 includes flyweights (not shown) used to return the shifting angle ($\alpha$) (angular shifting between the upper (Pcs) 124 and lower (Pci) 122 plates) toward zero under the effect of the centrifugal forces (Fc) due to the rotation of the rotor assembly (Rot) 200, which will allow to limit the maximum angular velocity ($\Omega e$) thereof.

Conveniently, the eccentric adjustment system (Eas) 144, the plate shifting mechanism (Sddp) 146 or the mass support rotation system (Srst) 148, changes the shifting angle ($\alpha$), (θ) enough to start reversing the direction of the shifting angle ($\alpha$), (θ), from a neutral position with no resulting centrifugal force torque of the rotor assembly (Rot) 200, and consequently the direction of the centrifugal forces (Fc) from the GCFEVRs 100, such that the motor torque (Ct) rotatably driving the rotor assembly (Rot) 200 becomes a braking torque. More specifically, the eccentric adjustment system (Eas) 144 could include flyweights (not shown) or the like.

Conveniently, the eccentric adjustment system (Eas) 144 includes flyweights (not shown) mounted thereon and used as limiters of the angular velocity ($\Omega e$) of the rotor assembly (Rot) 200 (safety limiters in case of inadvertent malfunction of the eccentric adjustment system (Eas) 144).

Figure 37:
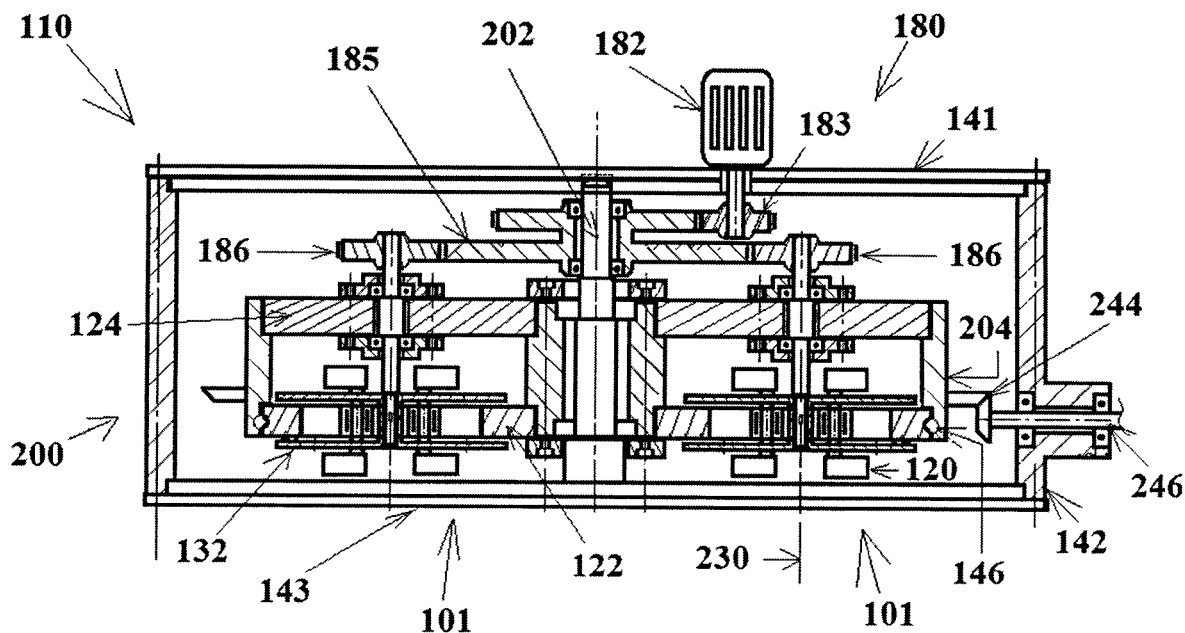
FIG. 37 is a schematic elevation section view of the MGCFEVR, with the rotor assembly (Rot) of FIG. 34, with each GCFEVR having guiding bars (Fcht) and masses (M), for which the rotation of the shafts (Axt) is done by the link of the gears (Ena) with the main gear (Enc) freely rotatably mounted on the main shaft (Axf) of the chassis and driven by an electric motor fixedly mounted on the chassis.

In one embodiment of the MGCFEVR 110 with rotating movement, the gears (Ena) 186, part of the shaft driving system (sds) 180, attached to the respective shaft (Axt) 128 of the GCFEVRs 100 [angularly spread along the upper virtual bore positioning circle (Cax) 230 of the upper plate (Pcs) 124 and independent from one another] are either in meshing engagement with a main gear (Enc) 185 (as an example, as shown in FIGS. 34, 35, 36, 37, 39, 40, 48, and 49) centered about the main shaft (Axf) 202, the main gear (Enc) 185 can be either fixed to the main shaft (Axf) 202 of the fixed chassis (Ch) 140 (hence non-moving) (as shown in FIGS. 34, 35, 36, 39, 40, 48, and 49), or free in rotation relative thereto (as shown in FIG. 37) for being rotatably driven by an electric motor (Mot) 182 or the like, via a motor gear (Enm) 183 meshing therewith, and thereby allowing control of the rotation thereof to control the value of the output torque (Ct).

Figure 58:
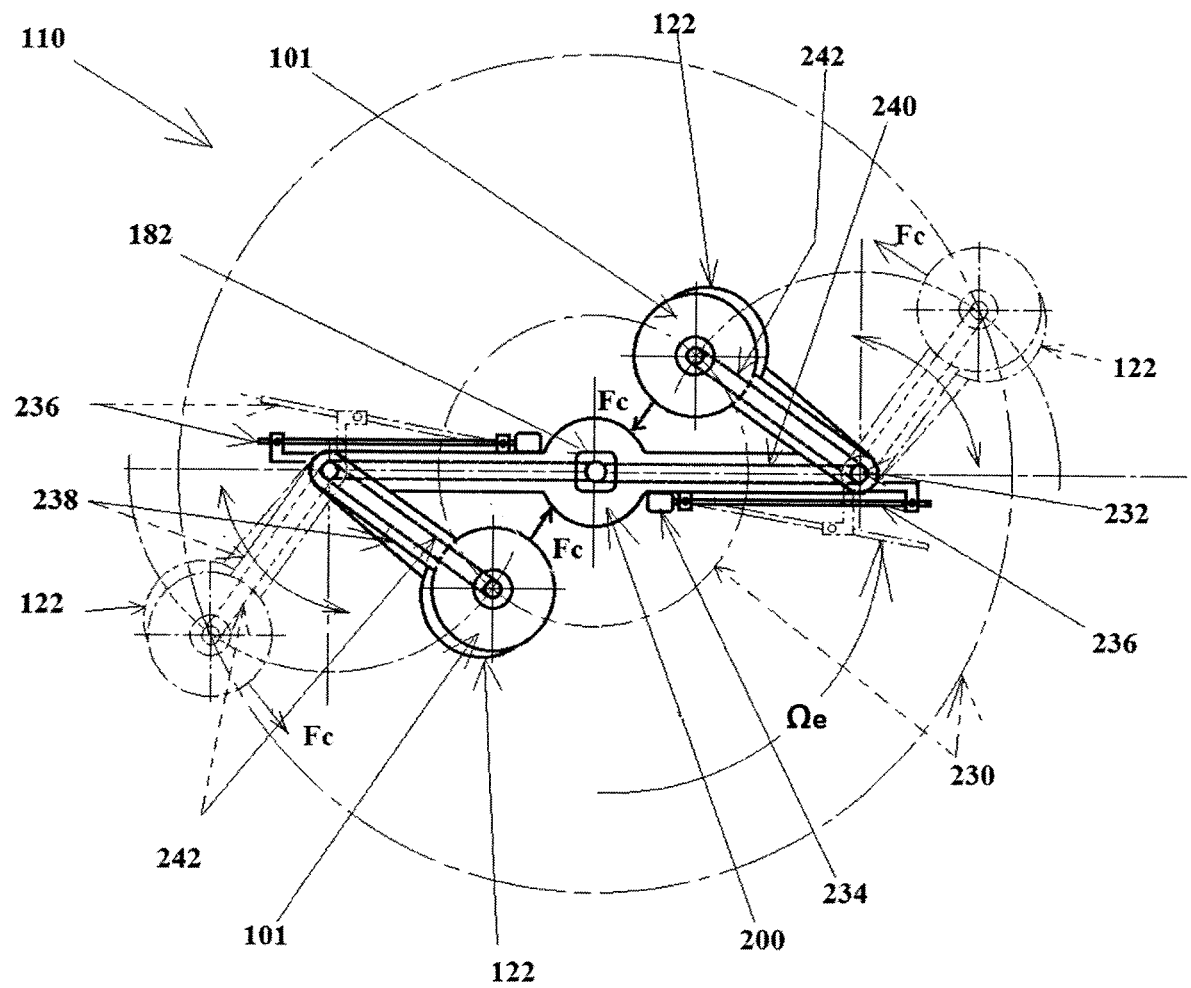
FIG. 58 is a schematic plan view of an embodiment of a MGCFEVR having a variable radius of the virtual bore positioning circle (Cax) allowing for the variation of the driving torque applied onto the rotor assembly (Rot) by the centrifugal forces generated by the different GCFEVR-1s by the rotation of the respective lower plates (Pci) with GCFEVR-1s connected thereto.

In one embodiment, as schematically shown in FIG. 58, the upper virtual bore positioning circle (Cax) 230 of the shaft driving system (sds) 180 has a variable radius simultaneously at both the upper (Pcs) 124 and lower (Pci) 122 plates. Variation of the size of the upper virtual bore positioning circle (Cax) 230 induces a corresponding variation of the motor torque (Ct) applied by the centrifugal forces (Fc) generated by the GCFEVR-1$s$ 101 onto the rotor assembly (Rot) 200. In this embodiment, the GCFEVR-1$s$ 101 rotate along with the corresponding lower plate (Pci) 122 about a respective secondary driving shaft (Ax2) 232 via respective secondary motors (Mot2) 234 rotating corresponding motor/worm screw assembly 236 or the like connecting to a freely rotatably mounted supporting arm (ar2) 238 of the GCFEVR-1 101. Each lower plate (Pci) 122, having the lower bore (Tpi) 126 formed therein, rotates about its secondary driving shaft (Ax2) 232 and the direction of the resultant of the centrifugal forces (Fc) varies accordingly depending on the orientation of the corresponding GCFEVR-1 101, as shown in solid and dotted lines in FIG. 58. The GCFEVR-1$s$ 101 are typically rotated about their respective rotating shaft (Axt) 128 via a secondary driving chain or the like 242 between the rotating shaft (Axt) 128 and the secondary driving shaft 232, and a primary driving chain or the like 240 between the secondary driving shaft 232 and the main shaft 202 (on the rotor assembly (Rot) 200). In this embodiment, the resultant of the centrifugal forces (Fc) cannot be always perpendicular to the main shaft 202. It is noted that a too small radius of the virtual bore positioning circle (Cax) 230 could induce a change of the direction of rotation of the rotor assembly (Rot) 200.

Figure 59:
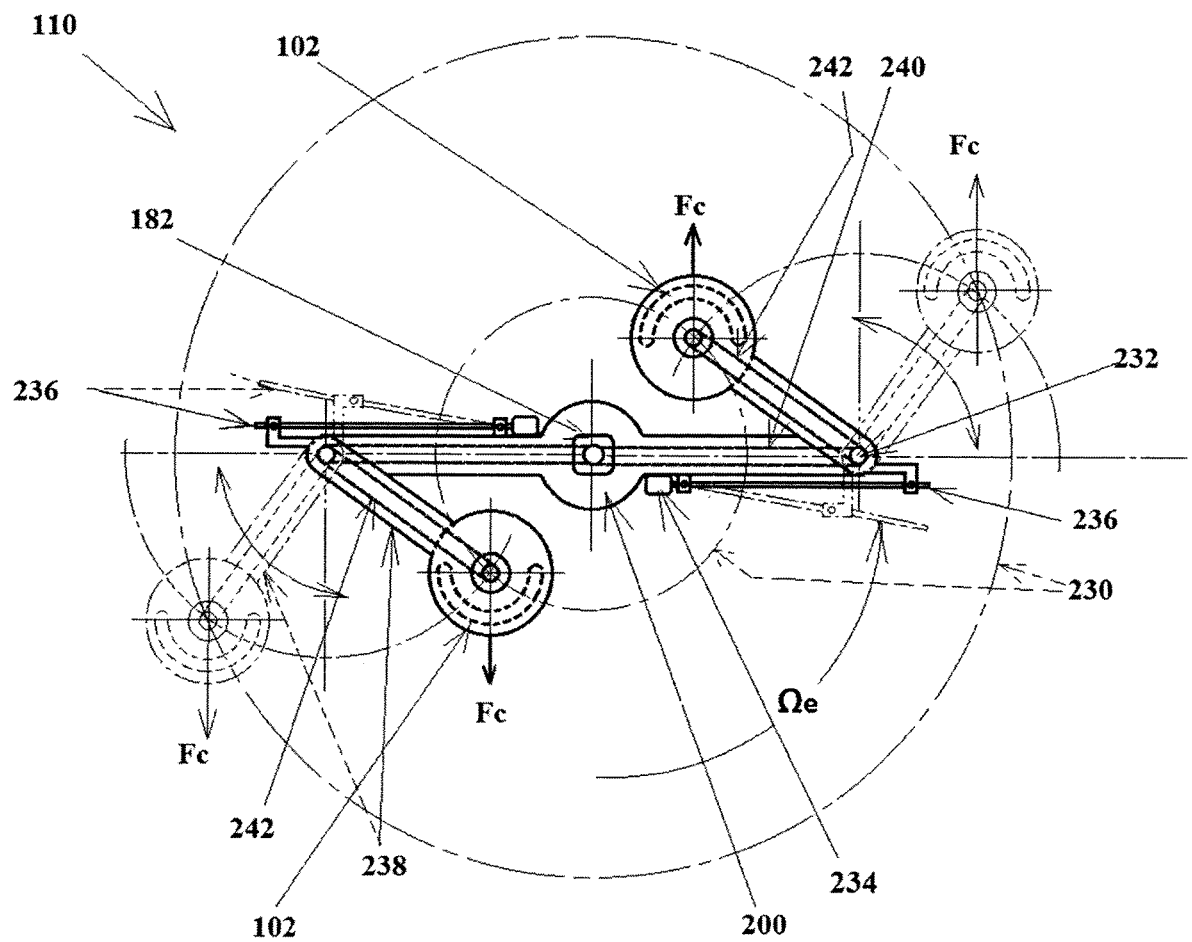
FIG. 59 is a view similar to FIG. 58 of an embodiment of a MGCFEVR having a variable radius of the virtual bore positioning circle (Cax) allowing for the variation of the driving torque applied onto the rotor assembly (Rot) by the centrifugal forces generated by the different GCFEVR-2s by the rotation of the respective lower plates (Pci), mass support members (SuM) of GCFEVR-2s connected thereto.

In one embodiment, as schematically shown in FIG. 59, the variation of the size of the upper virtual bore positioning circle (Cax) 230, similarly to the embodiment of FIG. 58, induces a corresponding variation of the motor torque (Ct) applied by the centrifugal forces (Fc) generated by the GCFEVR-2$s$ 102. In this embodiment, mass support member (SuM) 170 of each GCFEVR-2 102 can also be rotated, especially as the size of the virtual bore positioning circle (Cax) 230 varies, to ensure, for example, that the direction of the resultant of the centrifugal forces (Fc) essentially remains perpendicular to the x1-x2 axis, as shown in FIG. 59, or perpendicular to the main shaft (Axf) 202 of the rotor assembly (Rot) 200 (which is quite complex to do with the embodiment shown in FIG. 58 that uses GCFEVR-1$s$ 101).

Figure 38:
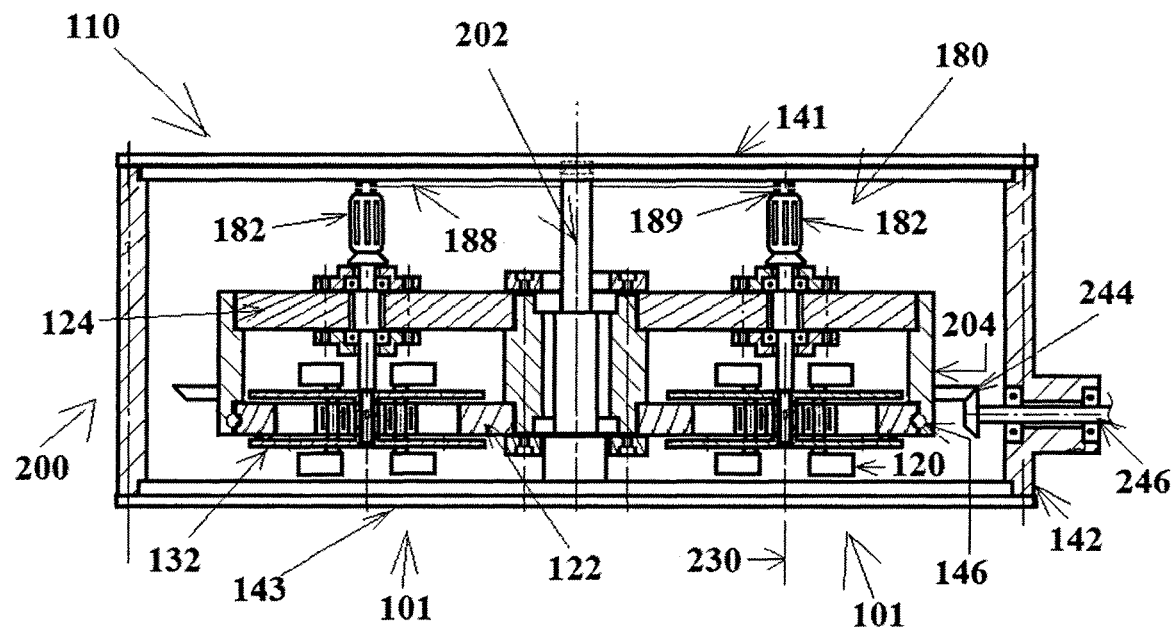

In one embodiment, the shafts (Axt) 128 could be driven in rotation by the shaft driving system (sds) 180 including a single electric motor (Mot) 182 (as shown in FIG. 37, with the main gear (Enc) 185 freely rotating relative to the main shaft (Axf) 202 of the chassis 140) or, in another embodiment, by a plurality of electric motors (Mot) 182 (one motor (Mot) 182 for each shaft (Axt) 128 and electrically connecting to an electric rail (Raa) 188 via brushes (Bal) 189 or the like, as shown in FIG. 38, in replacement of the gears (Enc) 185 and (Ena) 186). These motors 182 could be with variable (or constant) output speed.

In one embodiment (as shown in FIG. 37 for example), when the main gear (Enc) 185, centered about the main shaft (Axf) 202, is freely rotatably mounted thereon, a mechanical (or other type) shaft driving system linked to the rotor assembly (Rot) 200 acts according to the following points:
 when the rotor assembly (Rot) 202 is in movement, a selectable link (not shown) of the system ensures that the main gear (Enc) 185 is fixed relative to the main shaft (Axf) 202 of the chassis 140, thereby allowing the rotational driving of gears (Ena) 186 of the GCFEVRs 100;
 for a maximum angular velocity ($\Omega e$) not to exceed, said system frees up the selectable link (not shown) between the main gear (Enc) 185 from the main shaft (Axf) 202 of the chassis 140 and fixes it to the rotor assembly (Rot) 200, in order to cancel the rotation of the shafts (Axt) 128 of the GCFEVRs 100 and thereby limit the rotational velocity ($\Omega e$) of the rotor assembly (Rot) 200.

Alternatively (as shown in FIGS. 37 and 38), all the shafts (Axt) 128 of the GCFEVRs 100 are rotatably driven by a single electric motor (or a respective motor 182 for each shaft 128) (Mot) 182 adapted to stop functioning when the rotor assembly (Rot) 200 reaches its maximum angular velocity ($\Omega e$). This motor (or motors) (Mot) 182 can be controlled via an electronic (or other type) system continuously monitoring the rotational velocity ($\Omega e$) of the rotor assembly (Rot) 200.

In one embodiment, the movement of the masses (M) 120 is independently generated for each mass 120, via different mass driving mechanisms (Mte) 166, such as, but not limited to, mechanical and/or electrical mechanisms (as an electric motor incorporated into or being each mass—see FIG. 78) and/or magnetic fields, in which cases the masses (M) 120 would typically follow predefined eccentric closed trajectories (Traf) 150, for either GCFEVR-1 101 or GCFEVR-2 102.

In one embodiment, the output power (torque) (Ct) generated by the rotor assembly (Rot) 200 can be directly (by having an output shaft of the rotor assembly (Rot) 200 extending outside of the chassis—not shown) or indirectly (by a gear train (Entc) 244 inside the chassis 140 and having an output shaft (Axtc) 246 extending out therefrom, as shown in FIGS. 36 to 40, 48 and 49) transmitted to the exterior of the chassis 140.

(III)—Machine Generating Centrifugal Forces from Eccentrics with Variable Radius (MGCFEVR) 110, with Linear Movement (III-1)—Case for which the GCFEVR 100 is an Independent Subsystem from and Fixed onto, or Mounted on the Machine 110 with Linear Movement.

According to another aspect of the present invention, as shown in FIGS. 18, 19, 21, 60 to 77, there is provided a machine 110 for generating mechanical energy with a straight or linear movement (a thrusting force), via the generation of centrifugal forces from eccentrics with variable radius (MGCFEVR), said machine 110 comprising:
 a fixed chassis (C, Ch1, Ch2, Ch3) 140, 141, 142, 143 having:
  an upper plate (Pls) 125, or a structure or a substantially planar section of a structure having a plurality of upper bores (Tps) 126' coaxially receiving a respective shaft (Axt) 128 of a corresponding GCFEVR 100 mounted therein;
 a mechanical energy transmission mechanism (METM) such as a lower plate (Pli) 123; and at least one intermediate plate (Ch2) 142 generally perpendicular to the upper 125 and lower 123 plates and connected thereto;

wherein the upper plate (Pls) 125, the lower plate (Pli) 123 and the at least one intermediate plate 142 defining a chassis volume receiving GCFEVRs 100 therein, the GCFEVRs 100 connecting to the upper plate (Pls) 125 via the respective rotating shaft (Axt) 128 and to the lower plate (Pli) 123;

a shaft driving system 180 mounting on the chassis 140 to selectively allow the rotation of the respective rotating shafts (Axt) 128 within the chassis 140.

(III-2)—Case for which the GCFEVR 100 is an Integral Part of the Machine 110 with Linear Movement.

(III-2A)—Case for which the GCFEVR-1 101 is an Integral Part of the Machine 110 with Linear Movement According to another aspect of the present invention, as shown in FIGS. 18, 19, 21, 60 to 77, there is provided a machine 110 for generating mechanical energy with a straight or linear movement (a thrusting force (Fp)), via the generation of centrifugal forces from eccentrics with variable radius (MGCFEVR), said machine 110 comprising:

a fixed chassis (C, Ch1, Ch2, Ch3) 140, 141, 142, 143 having;

an upper plate (Pls) 125, or a structure or a substantially planar section of a structure having a plurality of upper bores (Tps) 126' coaxially receiving a respective shaft (Axt) 128 of a corresponding GCFEVR-1 101 mounted therein;

a mechanical energy transmission mechanism (METM) such as a lower plate (Pli) 123 having a plurality of lower bores (Tpi) 126 each corresponding to one of the upper bore (Tps) 126' and coaxially receiving an eccentric mass system 130 (having a respective guiding bar (Fcht) 132 with sliding masses (M) 120 (or a sliding eccentric wheel (Re) 190)) of the respective GCFEVR-1 101 therein; and at least one intermediate plate 142 generally perpendicular to the upper 125 and lower 123 plates and connected thereto;

an eccentric adjustment system (Eas) 144 including at least one shifting mechanism (Sddp) 146 mounting on the chassis 140 to selectively translationally (linearly slidable) shift the lower plate (Pli) 123 relative to the upper plate (Pls) 125 by a predetermined shifting distance (e) 152 (via a worm gear or any other technical means), the shifting mechanism (Sddp) 146 ensuring:

a transmission of significant efforts between the lower plate (Pli) 123 and the chassis 140 while preventing any variation of the selected positioning shift therebetween, when not activated (or in a rest or stand-by position); and a selectable linear shifting, via translation by the shifting distance (e) 152, of a position of the lower plate (Pli) 123 relative to the chassis 140 and therefore relative to the upper plate (Pls) 125, to simultaneously linearly shift the position of the center of the lower bores (Tpi) 126 relative to the center of the respective upper bores (Tps) 126'; and a shaft driving system (sds) 180 connecting to the respective rotating shafts (Axt) 128 to selectively allow the rotation thereof.

Typically, the GCFEVR-1s 101 are linked to the upper plate (Pls) 125 of the chassis 140, via bearing blocks (Pal2) 164, at the respective upper bore (Tps) 126', in such a way that the end of the shaft (Axt) 128 supporting the eccentric mass system 130 (guiding bar (Fcht) 132 or eccentric wheel (Re) 190) is oriented towards the lower plate (Pli) 123, each guiding bar (Fcht) 132 (or eccentric wheel (Re) 190) being inside the corresponding lower bore (Tpi) 126 of the lower plate (Pli) 123, similarly to the explanation provided herein above for the MGCFEVR 110 with rotating movement with GCFEVR-1s 101.

Typically, when the shifting distance (e) 152 is different than zero, the number of GCFEVR-1s 101 (generally having an overall number of rotating masses (M) 120 being a multiple of eight (8), as shown in FIGS. 64 and 72), and their predetermined disposition relative to one another can generate a thrusting force (Fp) of constant value continuously driving the chassis 140 into one straight trajectory collinear with the direction of the shifting distance (e) 152 (relative to the rest or neutral position (e=0)).

Typically, similarly to the explanation provided herein above for the MGCFEVR 110 with rotating movement with GCFEVR-1s 101, the diameter of the bores (Tpi) 126 of the lower plate (Pli) 123 is smaller than half the length of the guiding bar (Fcht) 132, or larger than the diameter of the eccentric wheel (Re) 190, plus a distance allowing the desired shifting distance (e) 152.

In one embodiment, similarly to the explanation provided herein above for the MGCFEVR 110 with rotating movement with GCFEVR-1s 101, a U-shape of the guiding bar (Fcht) 132 enables a mounting (on either side of the plate 123) within the lower bore (Tpi) 126 located on the lower plate (Pli) 123.

Figure 60:
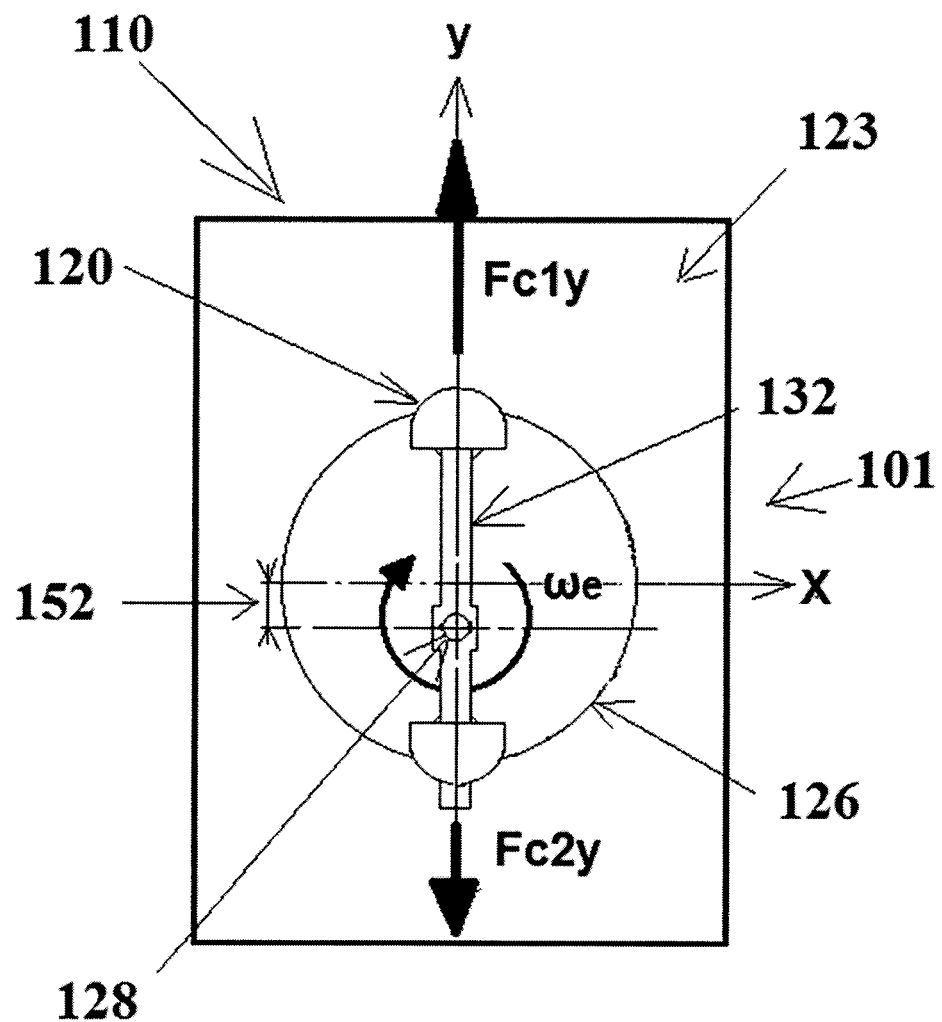
FIG. 60 is a schematic plan view of the lower plate (Pli) of a MGCFEVR with linear movement and having one GCFEVR as shown in FIG. 18, with a guiding bar (Fcht) and masses (M), the MGCFEVR generates a positive oscillating thrusting force (Fp) along the (y) axis, since the shifting distance of the shaft (Axt) is in the (y) axis.
Figure 61:
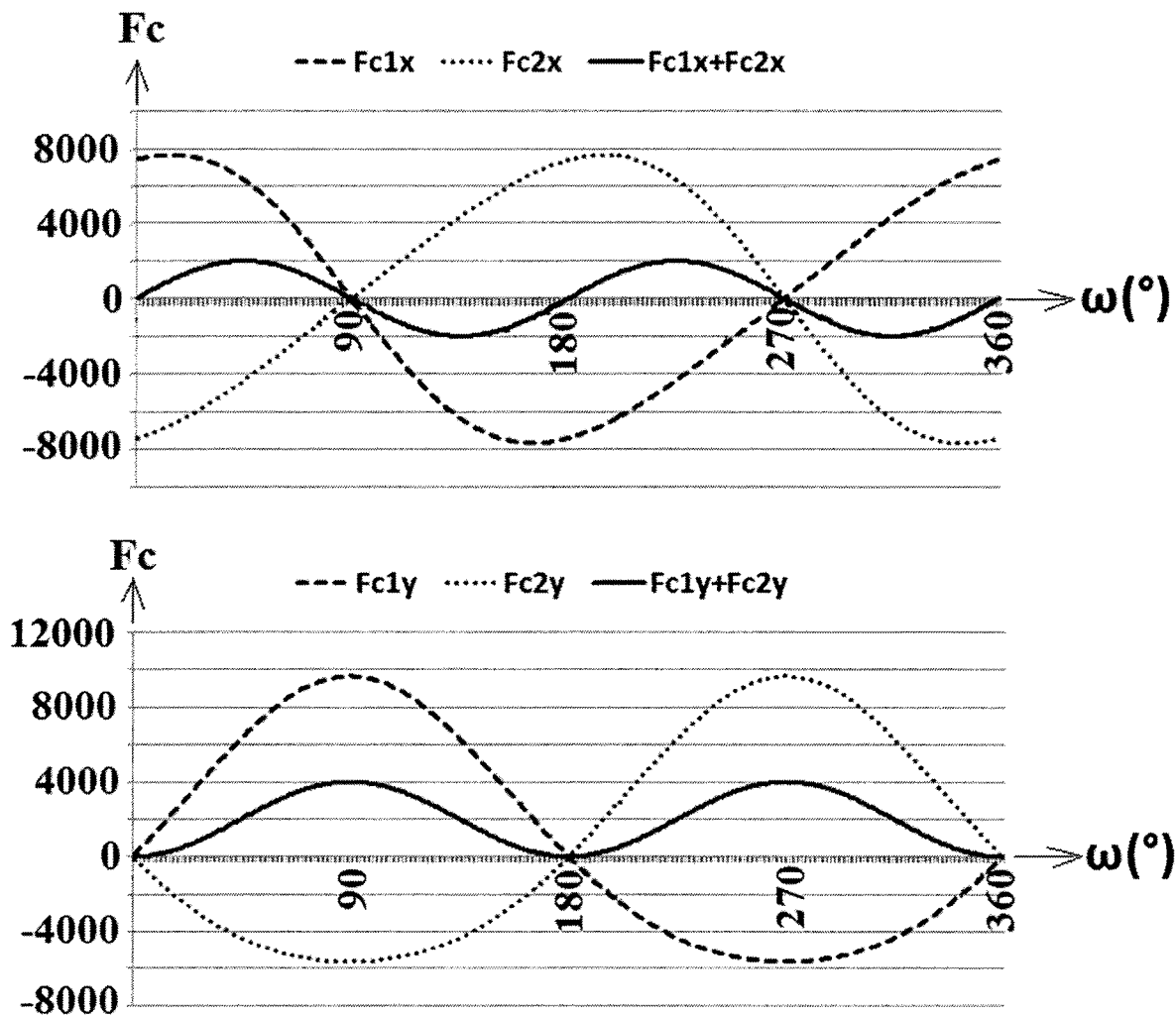
FIG. 61 is a schematic diagram of the typical curves of the value of the centrifugal forces (Fc1$x$), (Fc2$x$), (Fc1$y$), (Fc2$y$) and the sum thereof generated by the two masses (M) of the GCFEVR of FIG. 60, along axes (x) and (y) respectively, for one 360-degree (2π-radian) rotation of the shaft (Axt), for which MGCFEVR the total thrusting force along the (x) axis is slightly oscillating positively and negatively, while being positive and oscillating along the (y) axis.

Conveniently, the guiding bars (Fcht) 132 (or eccentric wheels (Re) 190) of the GCFEVR-1s 101 should be disposed with adequate positions relative to one another in order to prevent any vibration and generate a total thrusting force (Fp) into a straight trajectory and into a single direction (function of the direction of the linear shifting distance (e) 152 relative to the rest or neutral position (e=0)), generally with a number of rotating masses (M) 120 being a multiple of eight as explained hereinabove and shown in FIGS. 60 and 72.

Typically, the masses (M) 120, mounted on and guided within the guiding bar (Fcht) 132, are prevented from escaping therefrom solely because of their contact inside the inner perimeter of the corresponding lower bore (Tpi) 126 they are located in (along the eccentric closed trajectory (Traf) 150).

Typically, the contact between the masses (M) 120 (each freely sliding along a respective longitudinal end of the guiding bar (Fcht) 132 or via their slot 121) and the lower plate (Pli) 123 (at the level of the lower bore (Tpi) 126 where they are located) is done via a mass rolling mechanism or the like minimizing the frictional forces (such as a ball bearing roller (Glr) 232, a linear guide roller (Ggl) 194 or the like).

Typically, the lower bores (Tpi) 126 extending through the lower plate (Pli) 123, and allowing for the transmission of the centrifugal forces (Fc) onto the chassis 140 via its direct abutment contact with the masses (M) 120, could have:

multiple shapes (circular or any other shape) allowing for the transmission of the centrifugal forces (Fc) onto the lower plate (Pli) 123, with larger values when oriented into a predetermined direction (eccentricity);

either a continuous or a discontinuous abutment contact with the lower plate (Pli) 123, with larger values when oriented into a predetermined direction.

Conveniently, at the other end of each shaft (Axt) 128 opposite the guiding bar (Fcht) 132 or eccentric wheel (Re) 190, relative to the upper plate (Pls) 125, is attached a gear (Ena) 186, part of the shaft driving system (sds) 180, allowing to rotatably drive said shaft (Axt) 128 and consequently the corresponding guiding bar (Fcht) 132 and the masses (M) 120 (or eccentric wheel (Re) 190 of mass (M) 120) mounted thereon.

(III-2B)—Case for which the GCFEVR-2 102 is an Integral Part of the Machine 110 with Linear Movement According to another aspect of the present invention, as shown in FIGS. 21, 60 to 73, 76, and 77, there is provided a machine 110 for generating mechanical energy with a straight or linear movement (a thrusting force (Fp)), via the generation of centrifugal forces from eccentrics with variable radius, said machine 110 comprising:

- a fixed chassis (C, Ch1, Ch2, Ch3) 140, 141, 142, 143 having;
  - an upper plate (Pls) 125, or a structure or a substantially planar section of a structure having a plurality of upper bores (Tps) 126' coaxially receiving a respective shaft (Axt) 128 of a corresponding GCFEVR-2 102 mounted therein;
  - a mechanical energy transmission mechanism (METM) such as a lower plate (Pli) 123 having a plurality of lower bores (Tpi) 126 each corresponding to one of the upper bore (Tps) 126' and receiving a respective mass support member (SuM) 170 and the corresponding masses (M) 120 of the respective GCFEVR-2 102 therein; and
  - at least one intermediate plate 142 generally perpendicular to the upper 125 and lower 123 plates and attached thereto;
- an eccentric adjustment system (Eas) 144 including at least one mass support rotation system (Srst) 148 mounting on the chassis 140 to selectively rotatably shift the respective mass support member (SuM) 170 relative to the corresponding lower bore (Tpi) 126 by a predetermined angle (α) (via a worm gear or any other technical means), the at least one mass support rotation system (Srst) 148 ensuring:
  - a transmission of significant efforts between the mass support members (SuM) 170 and the lower plate (Pli) 123 while preventing any variation of the selected angle positioning therebetween, when not activated (or in a rest or stand-by position); and
  - an angular shifting, within a predetermined angle (α), up to 360° or (2π radians)—see FIG. 74, of an angular position of the mass support members (SuM) 170 relative to the respective lower bore (Tpi) 126 of the lower plate (Pli) 123, to selectively angularly shift the angular direction of the total centrifugal force (Fc) generated by the respective GCFEVR-2 102, and therefore the centrifugal force thrust (Fc) generated by the MGCFEVR 110.

Typically, the GCFEVR-2s 102 are linked to the upper plate (Pls) 125 of the chassis 140, via bearing blocks (Pal2) 186, at the respective upper bores (Tps) 126', in such a way that the end of the shaft (Axt) 128 supporting the mass support member (SuM) 170, and the corresponding mass driving member (Mte) 166, positioned into the respective lower bore (Tpi) 126 is oriented towards the lower plate (Pli) 123, similarly to the explanation provided herein above for the MGCFEVR 110 with rotating movement with GCFEVR-2s 102.

Typically, the GCFEVR-2s 102 and the corresponding mass support members (SuM) 170 are adequately located (oriented) relative to one another to avoid any vibrations while generating an overall resulting thrusting force (Fp) oriented in a single orientation and direction.

Typically, the eccentric closed trajectory (Traf) 150 of the different masses (M) 120 and formed within the corresponding mass support member (SuM) 170 can be of a wide variety of shapes and even forcing the respective masses (M) 120 to move into different mass planes.

Conveniently, on the other end of the shaft (Axt) 128 of each GCFEVR-2 102 opposite the mass support member (SuM) 170, relative to the upper plate (Pcs) 125, is attached a gear (Ena) 186, part of a shaft driving system (sds) 180, allowing to rotatably drive said shaft (Axt) 128 and consequently the rotation of the corresponding mass driving member (Mte) 166 mounted thereon, as shown in FIGS. 11, 16, and 21.

(III-2C)—Case for which Either the GCFEVR-1 101 or the GCFEVR-2 102 is an Integral Part of the Machine 110 with Linear Movement In one embodiment, as many GCFEVRs 100 as required than the number of bores (Tpi or Tps) 126, 126' there is in the corresponding plate (Pli or Pls) 123, 125 where they are mounted. Each GCFEVR 100 exploits the work of the equilibrium forces of expansion (centrifugal forces (Fc)), independently from the others.

Figure 65:
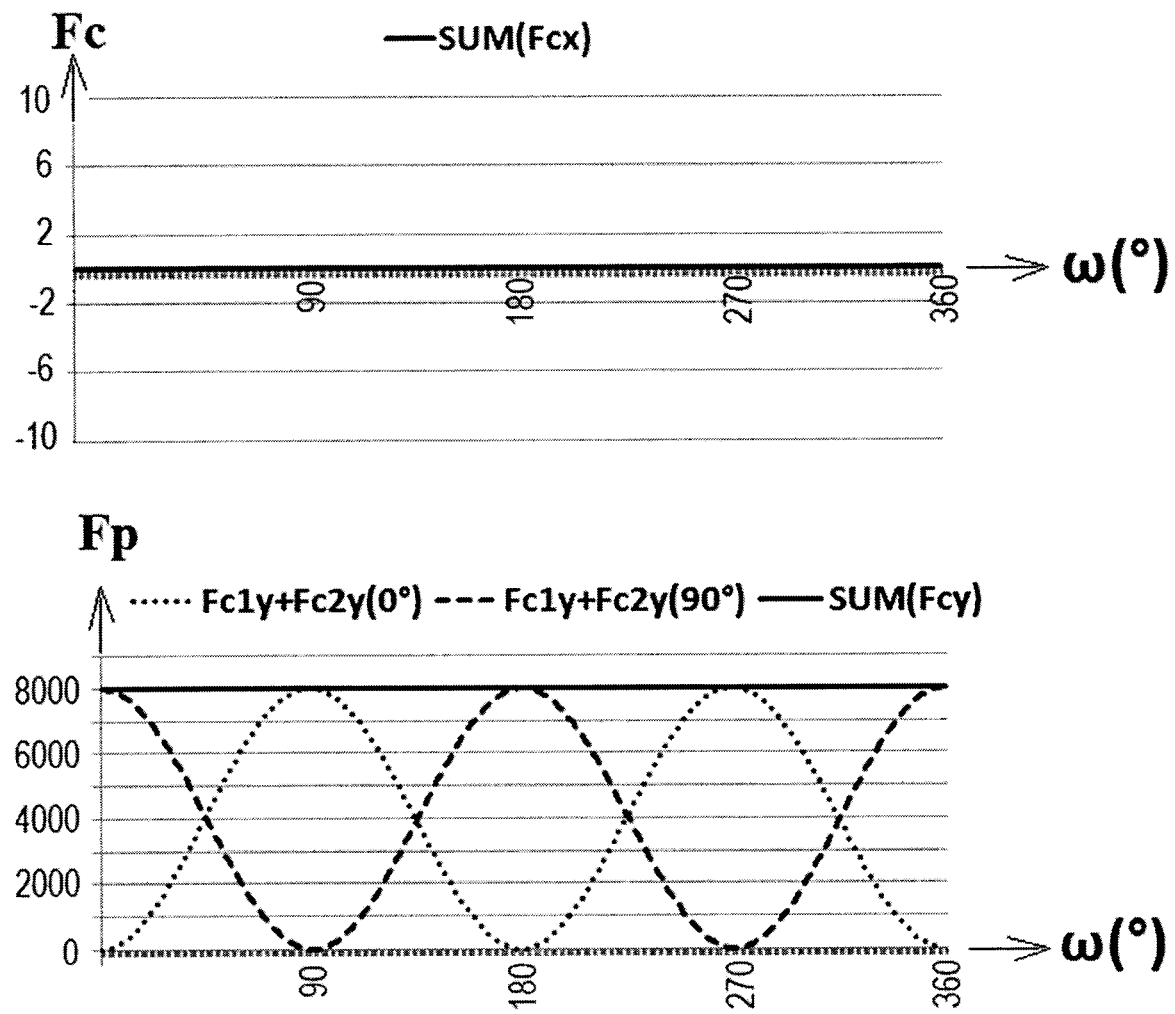
FIG. 65 is a schematic diagram of the typical curves of the value of the centrifugal forces (Fc1$x$), (Fc2$x$), (Fc1$y$), (Fc2$y$) and the sum thereof generated by the two masses (M) of all four GCFEVRs of FIG. 64, along axes (x) and (y) respectively, for one 360-degree (2π-radian) rotation of the respective shaft (Axt), for which MGCFEVR the total thrusting force along the (x) axis is constantly null, while being positive and constant along the (y) axis.
Figure 66:
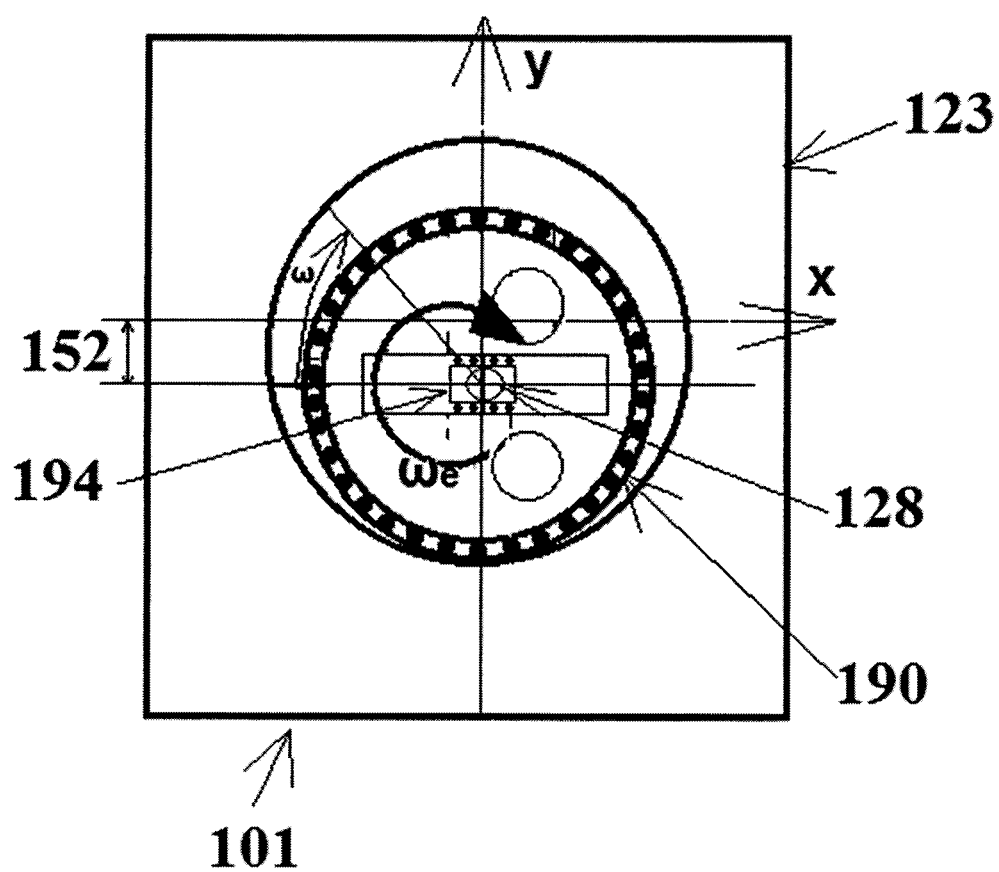
FIG. 66 is a schematic plan view of the lower plate (Pli) of a MGCFEVR with linear movement and having one GCFEVR as shown in FIG. 19, having an eccentric wheel (Re) of mass (M), the MGCFEVR generates a resulting positive (the positive magnitude being larger than the negative magnitude) and oscillating thrusting force (Fp) along the (y) axis, since the shifting distance of the shaft (Axt) is in the (y) axis.
Figure 67:
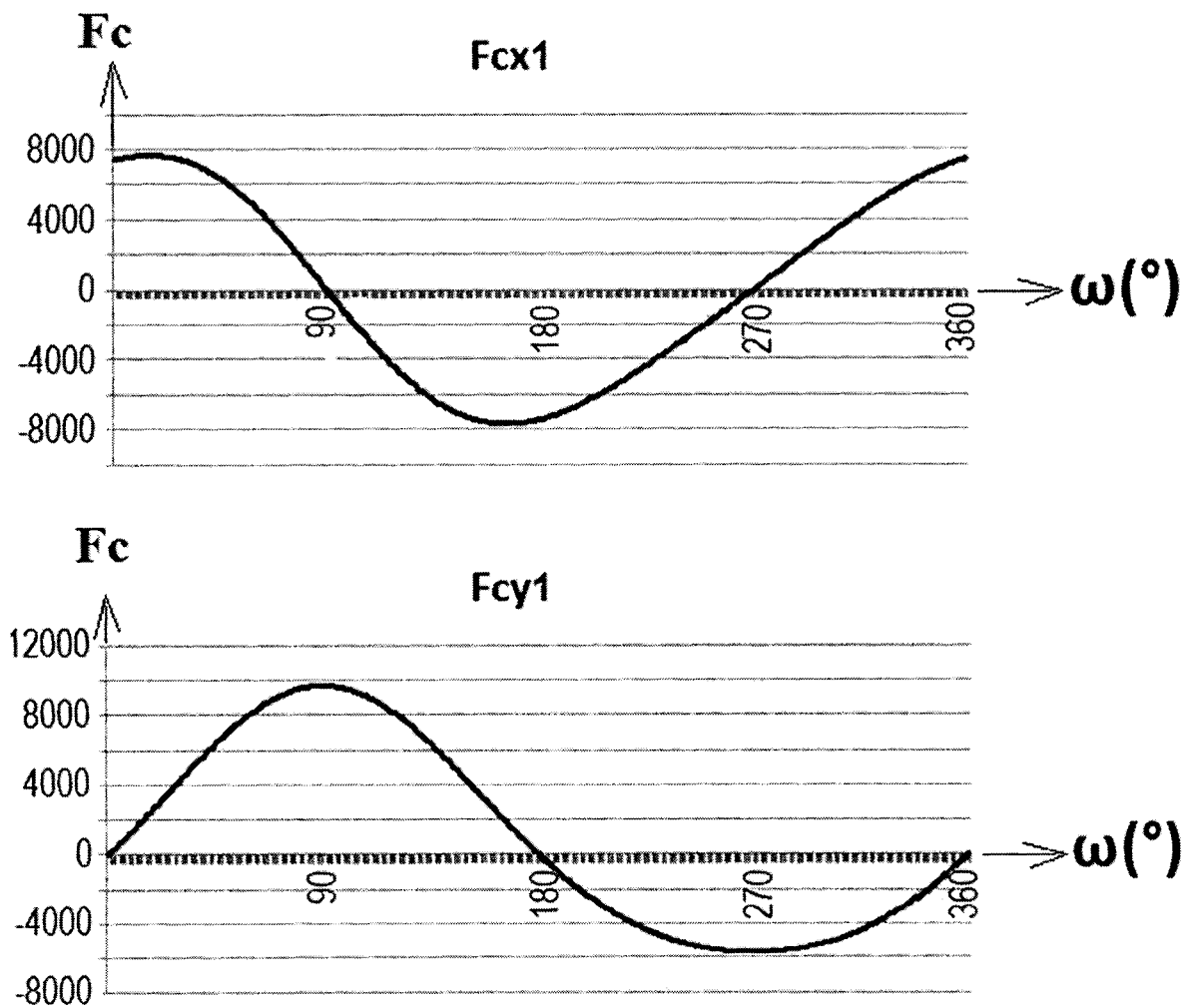
FIG. 67 is a schematic diagram of the typical curves of the value of the centrifugal forces (Fc$x$1), (Fc$y$1) generated by the mass (M) of the GCFEVR of FIG. 66, along axes (x) and (y) respectively, for one 360-degree (2π-radian) rotation of the shaft (Axt), for which MGCFEVR the total thrusting force along the (x) axis is oscillating positively and negatively, while being resulting positive and oscillating along the (y) axis.
Figure 68:
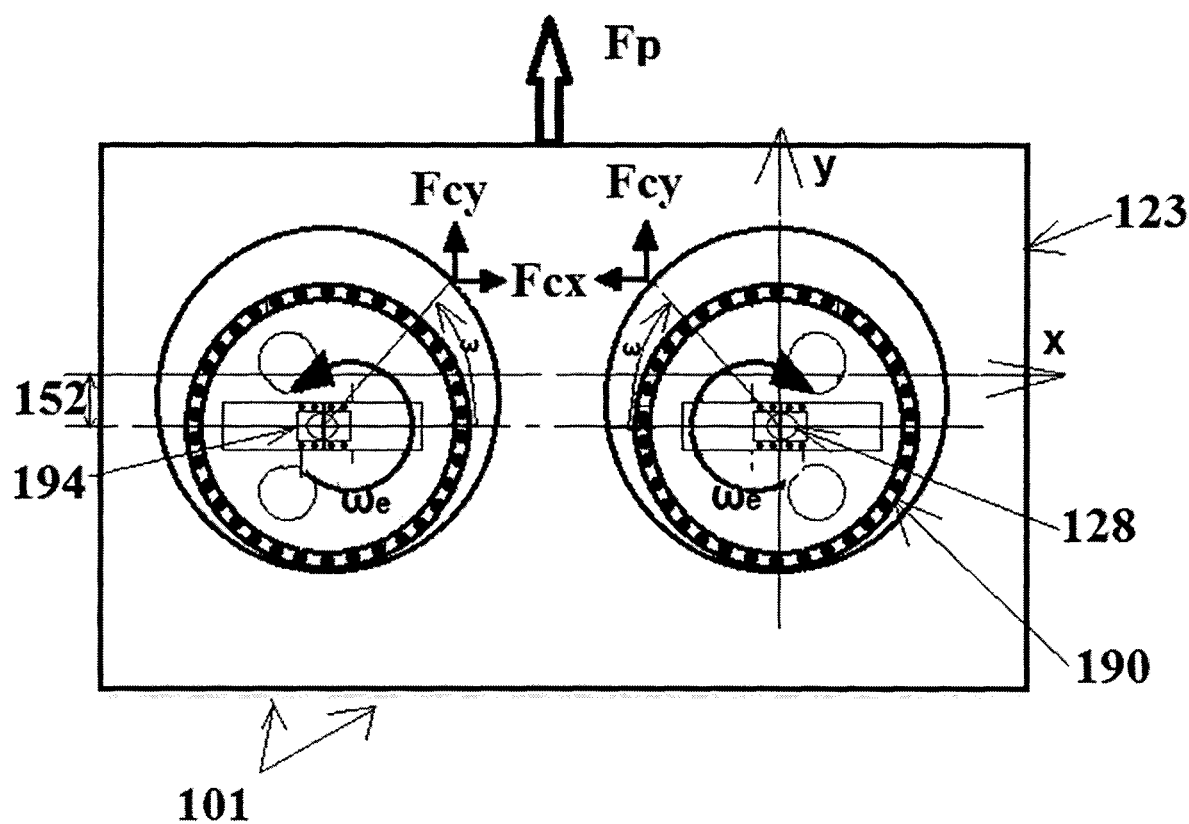
FIG. 68 is a schematic plan view of the lower plate (Pli) of a MGCFEVR with linear movement having two GCFEVRs as shown in FIG. 19 and oriented 180° relative to one another in a direction perpendicular to the direction of the thrusting force (Fp), and having an opposite rotational directions, with each GCFEVR having an eccentric wheel (Re) of mass (M), the MGCFEVR showing the direction of the thrusting force (Fp) (the (y) axis in the present case) along with the corresponding rotational directions of the two shafts (Axt); the MGCFEVR generates a resulting positive and oscillating thrusting force (Fp) along the (y) axis, since the shifting distance of the shaft (Axt) is in the (y) axis.
Figure 69:
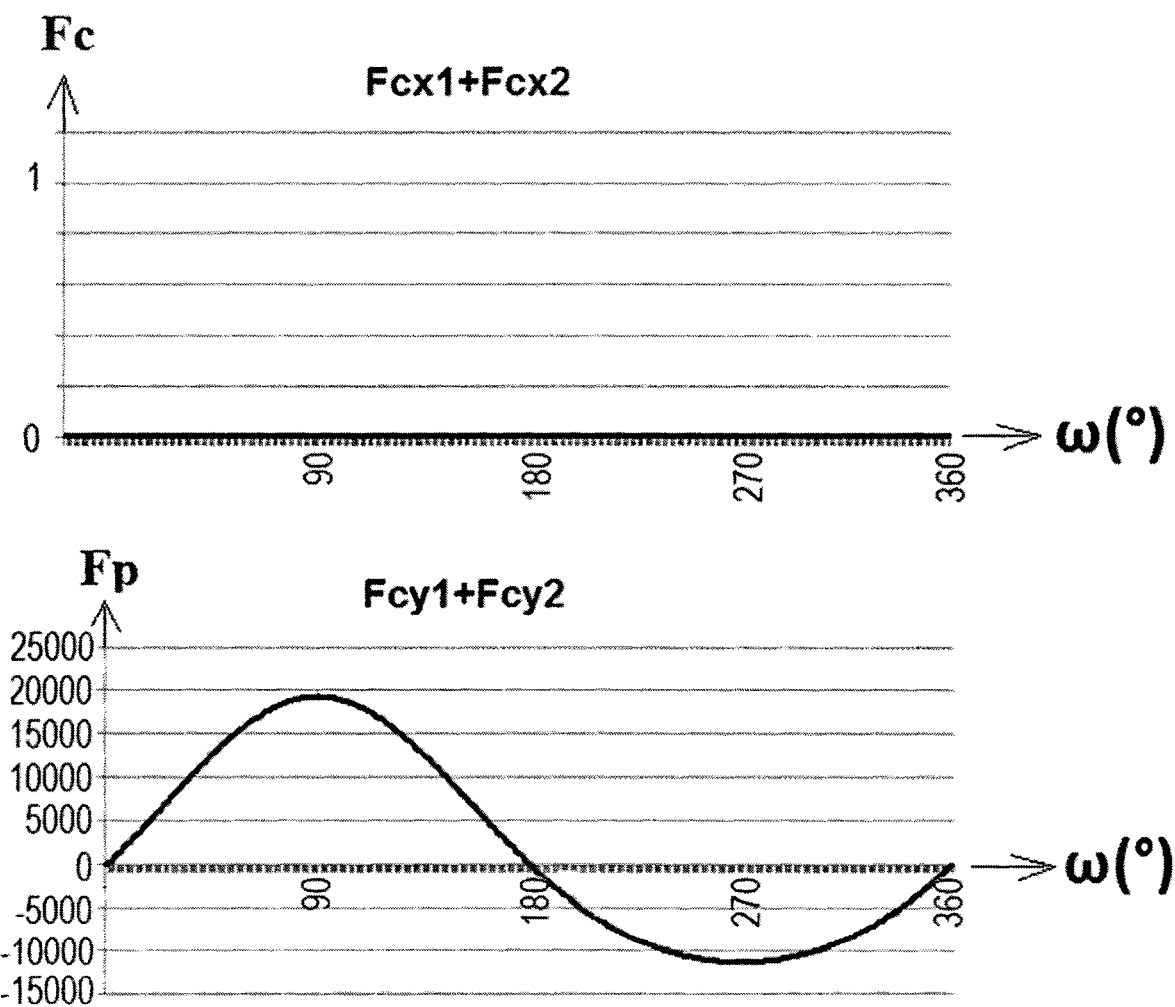
FIG. 69 is a schematic diagram of the typical curves of the value of the sum of the centrifugal forces (Fc$x$1)+(Fc$x$2) and (Fc$y$1)+(Fc$y$2) and generated by the masses (M) of the all two GCFEVRs of FIG. 68, along axes (x) and (y) respectively, for one 360-degree (2π-radian) rotation of the shafts (Axt), for which MGCFEVR the total thrusting force along the (x) axis is constantly null, while being resulting positive and oscillating along the (y) axis.
Figure 70:
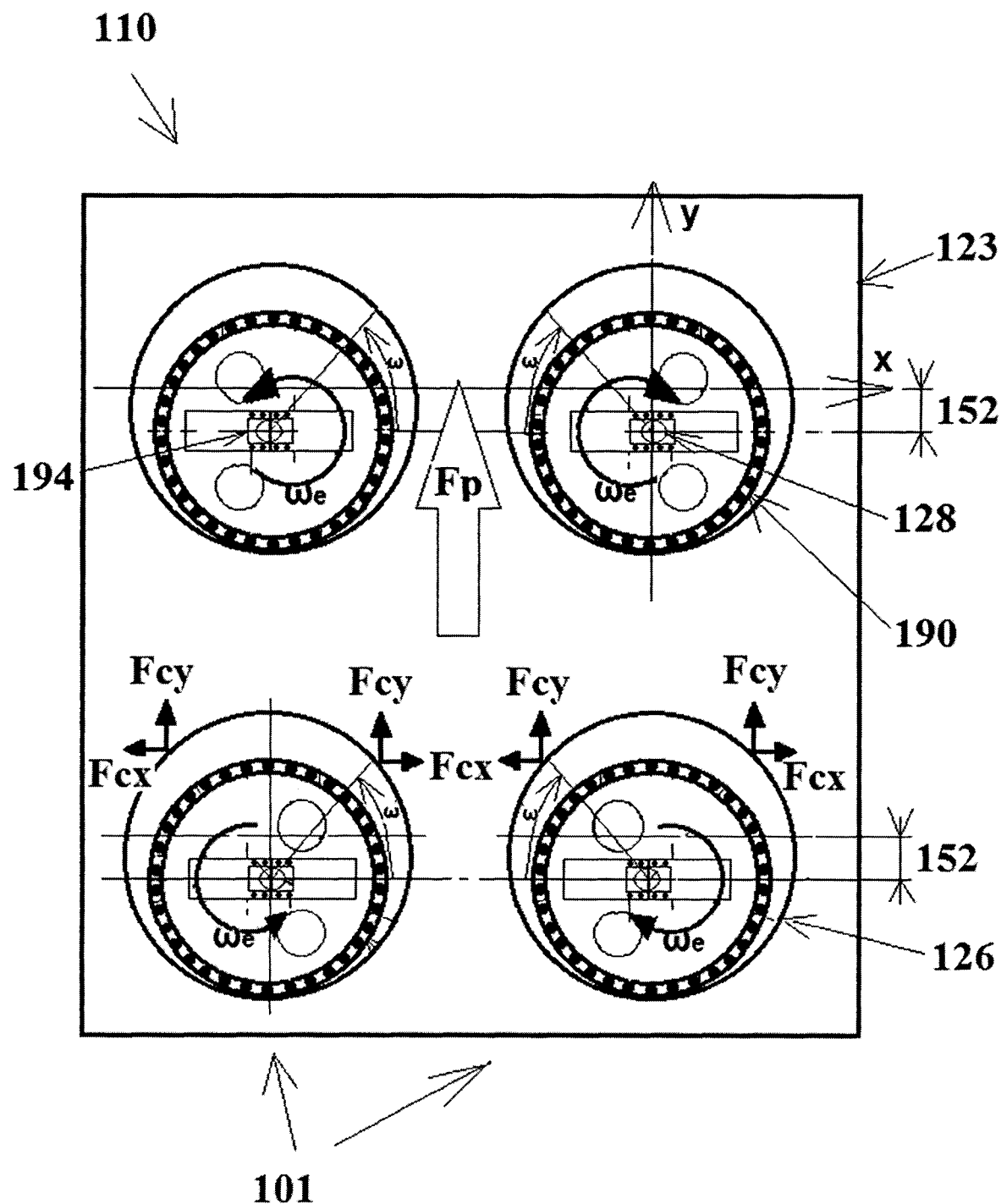
FIG. 70 is a schematic plan view of the lower plate (Pli) of a MGCFEVR with linear movement generating a constant thrusting force (Fp) and having four GCFEVRs as shown in FIG. 19 and oriented 180° relative to one another in a direction perpendicular to the direction of the thrusting force (Fp) and having an opposite rotational directions per pair (as shown in FIG. 68), and both pairs having the same orientation and rotating into the opposite direction relative to one another, with each GCFEVR having an eccentric wheel (Re) of mass (M), showing the direction of the thrusting force (Fp) along with the corresponding rotational directions of the four shafts (Axt)
Figure 71:
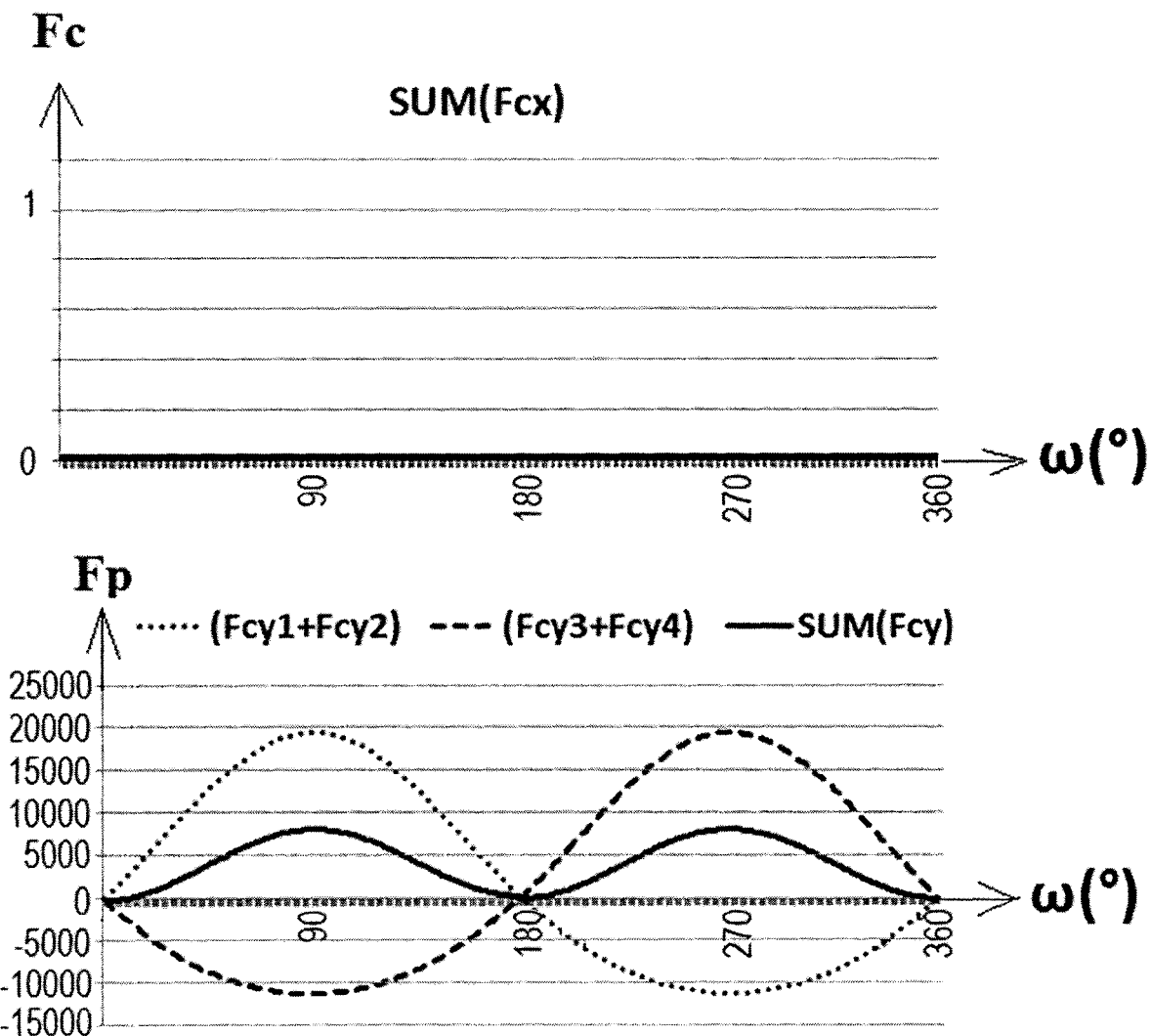
FIG. 71 is a schematic diagram of the typical curves of the value of the sum of the centrifugal forces (Fc$x$) along the (x) axis, and the sum of each pair (Fc$y$1+Fc$y$2) and (Fc$y$3+Fc$y$4) along the (y) axis and the sum (Fc$y$) thereof generated by the masses (M) of the all four GCFEVRs of FIG. 70 of both pairs, for one 360-degree (2π-radian) rotation of the shafts (Axt), for which MGCFEVR the total thrusting force along the (x) axis is constantly null, while being positive and oscillating along the (y) axis.

Conveniently, as shown in FIGS. 65, 73 and 75, the number of GCFEVRs 100, and their predetermined disposition (and orientation) relative to one another can generate an output force or thrust (Fp) of constant value continuously driving the chassis (Ch) 140 into a straight or linear trajectory, in a same direction.

Typically, the gears (Ena) 186, part of a shaft driving system (sds) 180, attached to the respective shaft (Axt) 128 of the GCFEVRs 100 are either adapted to be in meshing engagement with a main pinion rack (not shown—as an example) located on a track (not shown) onto which the machine (MGCFEVR) 110 with linear movement is located, or free in rotation relative thereto for being rotatably driven by an electric motor 182 or the like (as shown in FIGS. 76 and 77).

More specifically, similarly to the explanation provided herein above for the MGCFEVR 110 with rotating movement, the shafts (Axt) 128 could be driven in rotation by a single electric motor (Mot) 182 or independently by a plurality of electric motors (Mot) 182 (one motor 182 for each shaft (Axt) 128). These motors (Mot) 182 could be with variable or constant output speed.

In one embodiment, the shafts (Axt) 128 are driven in rotation by a single electric motor (Mot) 128 (or one motor 182 for each shaft (Axt) 128) that could stop when the MGCFEVR 110 with linear movement (or the external structure the machine 110 in mounted on and moves into linear movement) reaches its maximum predetermined linear velocity. This motor (Mot) 182 (or motors) can be controlled via an electronic (or other type) system continuously monitoring the (linear) velocity of the MGCFEVR 110 or the external structure it is mounted on.

Conveniently, the output thrust (Fp) generated by the machine (MGCFEVR) 110 with linear movement can be transmitted to any body that has to be driven into movement, by the simple attachment of said MGCFEVR 110 onto the body.

(IV)—Functioning Principle of the Machine Generating Centrifugal Forces from Eccentrics with Variable Radius (MGCFEVR)

When a shaft rotatably drives a mass, which center of gravity is shifted relative to the rotation center (eccentric), the mass generates centrifugal forces (Fc) with central direction extending through the center of gravity of the mass and the center of the rotation of the shaft. These centrifugal forces (Fc) have directions that rotate along with the shaft and are always oriented away from the shaft, thereby generating an eccentric out of balance that creates vibrations. This is the principle used in the industry dealing with vibrating screen decks for example. In this specific case, the generated centrifugal forces are directly carried by the rotating shaft and are constant in value (for a given rotational or angular velocity of the rotating shaft), notwithstanding their direction.

The principle of generating centrifugal forces with eccentric of variable radius consists of:

generating a degree of freedom (radial translation) between the shaft 128 and the mass (M) 120 driven thereby (by example with a channel or slot along the direction extending through the center of rotation and the center of gravity of the rotatably driven mass (M)), preferably while essentially preventing the shaft 128 from carrying the centrifugal forces (Fc);

making sure that the assembly, rotating shaft 128 and driven mass 120, is locally inside of a bore 126 that will prevent the mass (M) 120 from escaping from its link with the shaft 128 of from transmitting the centrifugal forces (Fc) it generates to the shaft 128 over at least a portion of its eccentric trajectory 150. In return, preferably, this means that the bore 126 essentially carries most of the effects of the centrifugal forces (Fc) instead of the shaft 128.

The bore 126 (or the eccentric closed trajectory (Traf) 150 of the masses (M) 120) has to be machined inside a piece that is part of the assembly comprising the shaft 128 rotatably driving the mass (M) 120. (When the center of the bore 126 coincides with the center (axis) of rotation of the shaft 128, this is the case of the above vibrating screen deck with eccentric with constant radius.)

The bore 126 (or the eccentric closed trajectory (Traf) 150 of the masses (M) 120) has to allow, over a 360° ($2\pi$ radians) rotation, for the variation of the distance between the center of gravity 156 of each mass (M) 120 and the center of the rotating shaft (Axt) 128 driving said mass (M) 120 into movement (variable radius).

The bore 126 (or the eccentric closed trajectory (Traf) 150 of the masses (M) 120) has to be closed within one 172 or a plurality of mass planes, and within at least a portion of the circular surface area defined by the corresponding mass driving members (Mte) 166 of the masses (M) 120 linked to the rotating shaft (Axt) 128.

(V)—Functioning of the Machine Generating Centrifugal Forces from Eccentrics with Variable Radius (MGCFEVR), with Rotating Movement In one embodiment, the driving in rotation of the rotor assembly (Rot) 200 about the main shaft (Axf) 202 generates (because of the link between the gears (Ena) 186 and the main gear (Enc) 185 fixed to the respective shafts (Axt) 128 of the GCFEVRs 100 and to the main shaft (Axf) 202 of the chassis 140, respectively) the rotation of the shafts (Axt) 128 of the GCFEVRs 100 driving, into their rotational movements, the eccentric mass system (Eas) 130 (as guiding bars (Fcht) 132 and the like) and the masses (M) 120 linked thereto (see FIGS. 42, 43, 45, 47, 51, 55, and 56).

The MGCFEVR 110 with rotating movement includes two (2) subsets that could be totally independent from one another in relation with their respective movement. These two subsets are:

1. a rotor assembly (Rot) 200 freely rotating about a fixed main axis (Axf) 202 of the chassis (Ch) 140 of the MGCFEVR 110; and
2. at least one GCFEVR 100 mounted on or integrated into the rotor assembly (Rot) 200.

The at least one GCFEVR subset typically starts functioning (rotating about its respective rotating shaft (Axt) 128), for example, using an electric motor 182 or the like. The rotation of the GCFEVR 100 does not directly rotate the rotor assembly (Rot) 200. The rotor assembly (Rot) 200 can be blocked from rotating without having any incidence or effect onto the functioning of the at least one GCFEVR 100.

The functioning (rotation) of the at least one GCFEVR 100 generates centrifugal forces (Fc) into a predetermined direction. The fact that the at least one GCFEVR 100 is mounted on or integrated into the rotor assembly (Rot) 200 makes the latter undergoing the effect of the centrifugal forces (Fc).

Accordingly, the centrifugal forces (Fc) will act onto the rotor assembly (Rot) 200 as external forces, each generating a torque relative to the center of the rotor assembly (about the axis of the main shaft (Axf) 202), thus generating a motor torque (Ct) forcing the rotation of the rotor assembly (Rot) 200.

The fact that the rotor assembly (Rot) 200 will undergo this continuous motor torque (Ct) (as long as the at least one GCFEVR 100 operates) will ensure enough input of energy to the rotor assembly (Rot) 200 for a continued rotation, with increasing angular speed ($\Omega e$). This will make the rotational velocity (f)e) of the rotor assembly 200 reaching unbearable limits for the strength of the materials themselves. An eccentric adjustment system (Eas) 144 including a rotational speed limiting mechanism (Sddp) 146 allowing to limit the angular velocity (De) of the rotor assembly (Rot) 200 is therefore required and can be done, for example, in the following ways:

In the case of the GCFEVR-1 101:

the reduction of the shifting angle ($\alpha$) will reduce the values of the centrifugal forces (Fc) down to their cancellation for a shifting angle ($\alpha$=zero). A shifting angle ($\alpha$) in the opposite direction will reverse the direction of the centrifugal forces (Fc) that will act as a braking torque in the reverse direction than the direction of rotation of the rotor assembly (Rot) 200. This shifting of the angle ($\alpha$) can be done via different technical means.

the use of flyweights (not shown) linked to the rotor assembly (Rot) 200 and that will move radially away depending on the rotational or angular velocity ($\Omega e$) thereof (under the effect of centrifugal forces (Fc)) driving, along with their displacement, either the gradual reduction of the shifting angle ($\alpha$) or the gradual application of a brake mechanism (not shown). The value of the maximum angular velocity would therefore be dependent on the (tunable) stresses of compression springs applied onto the flyweights or the like.

in the case where the rotating shafts (Axt) 128 of the GCFEVR-1s 101 are rotatably driven by an electric motor(s) (Mot) 182, as in FIGS. 37 and 38, it would only require to remove the electric power from said motor(s) 182 to stop the increase of the angular velocity ($\Omega e$) of the rotor assembly (Rot).

other means (mechanical or others) can be considered and/or used.

In the case of the GCFEVR-2 102:

it is only needed to rotate the respective mass support member (SuM) 170 relative to its corresponding lower bore (Tpi) 126 it is mounted on, to vary the angular direction (θ) of the resulting centrifugal forces (Fc) applied onto the rotor assembly (Rot) 200. This rotation of the mass support members (SuM) 170 will vary the value of the rotating torque (Ct) applied onto the rotor assembly (Rot) 200, even down to a null value, and could even reverse its rotational direction (with a same value with a rotational direction of 180° (or π radians)).

The full or complete stop of the rotor assembly (Rot) 200 can always be obtained via a simple mechanical brake or the like, especially once the effect of the centrifugal forces (Fc) onto the rotor assembly (Rot) 200 is cancelled (or back to zero).

Figure 50:
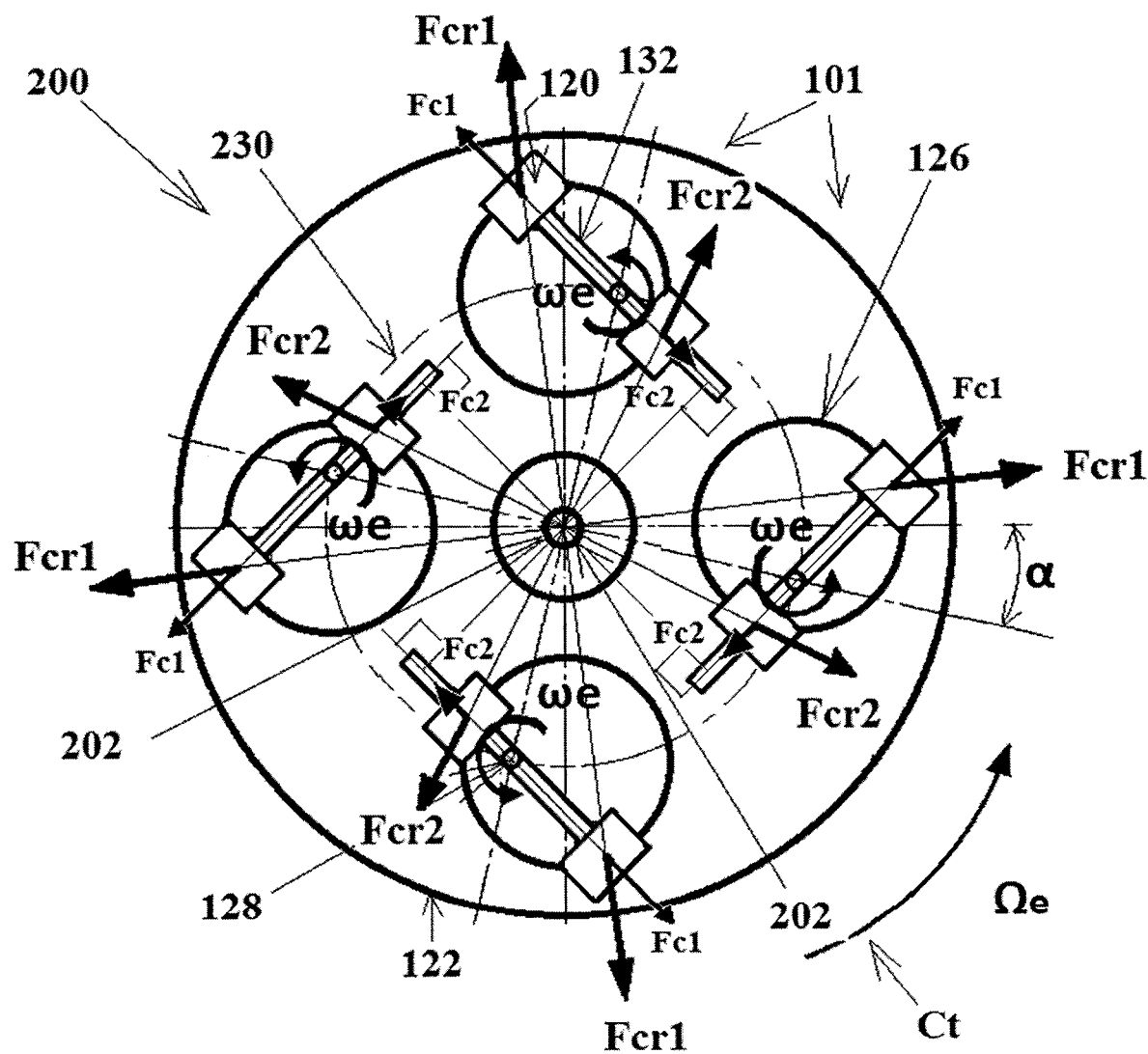
FIG. 50 is a schematic elevation view, showing the centrifugal forces (Fcr1) and (Fcr2), due to the rotation of the rotor assembly (Rot), applied onto the masses (M) of the different GCFEVRs of the MGCFEVR of FIG. 34.

An advantage of the MGCFEVR 110 with rotating movement is that the rotation of the rotor assembly (Rot) 200 generates, on masses (M) 120, other centrifugal forces (Fcr1) and (Fcr2), which drive:

In the case of the GCFEVR-1 101: (as shown in FIG. 50)
  force components (Fcr1), (Fcr2) that add up to the centrifugal forces (Fc) originating from the output motor torque (Ct) rotating the rotor assembly (Rot) 200;
  force components (Fcr1), (Fcr2) forming motor torques or brake torques acting on the rotating shafts (Axt) 128 and the mass driving member (Mte) 166 in the form of the guiding bars (Fcht) 132 (or eccentric wheels (Re) 190) or the like.

In order for these force components (Fcr1), (Fcr2) to generate a motor torque, the direction of rotation of the rotating shafts (Axt) 128 and the guiding bars (Fcht) 132 (or the eccentric wheels (Re) 190) has to be appropriately selected, with all shifting angles (a) having the same orientation and value, as explained hereinabove and shown throughout FIGS. 20 and 42-47.

In the case of the GCFEVR-2 102:
  force components (Fcr1), (Fcr2) that add up to the centrifugal forces (Fc) originating from the output motor torque (Ct) rotating the rotor assembly (Rot) 200;
  force components (Fcr1), (Fcr2) that could intervene onto the rotating shaft (Axt) 128 of the GCFEVR-2 102 do cancel each other out. This is essentially due to the shape of the eccentric closed trajectory (Traf) 150 into which the masses (M) 150 circulate.

For its exploitation, the energy and the power of the rotor assembly (Rot) 200 can be transmitted externally of the chassis (Ch) 140 in a multiple ways, either mechanical or others (example of a gear train (Entc) 244 between the rotor assembly (Rot) 200, for the GCFEVR-1 101, and an output power shaft (Axtc) 246 transmitting that power out of the chassis (Ch), as shown in FIGS. 36 to 40, 48, 49, 51, 52 and 55).

Figure 43:
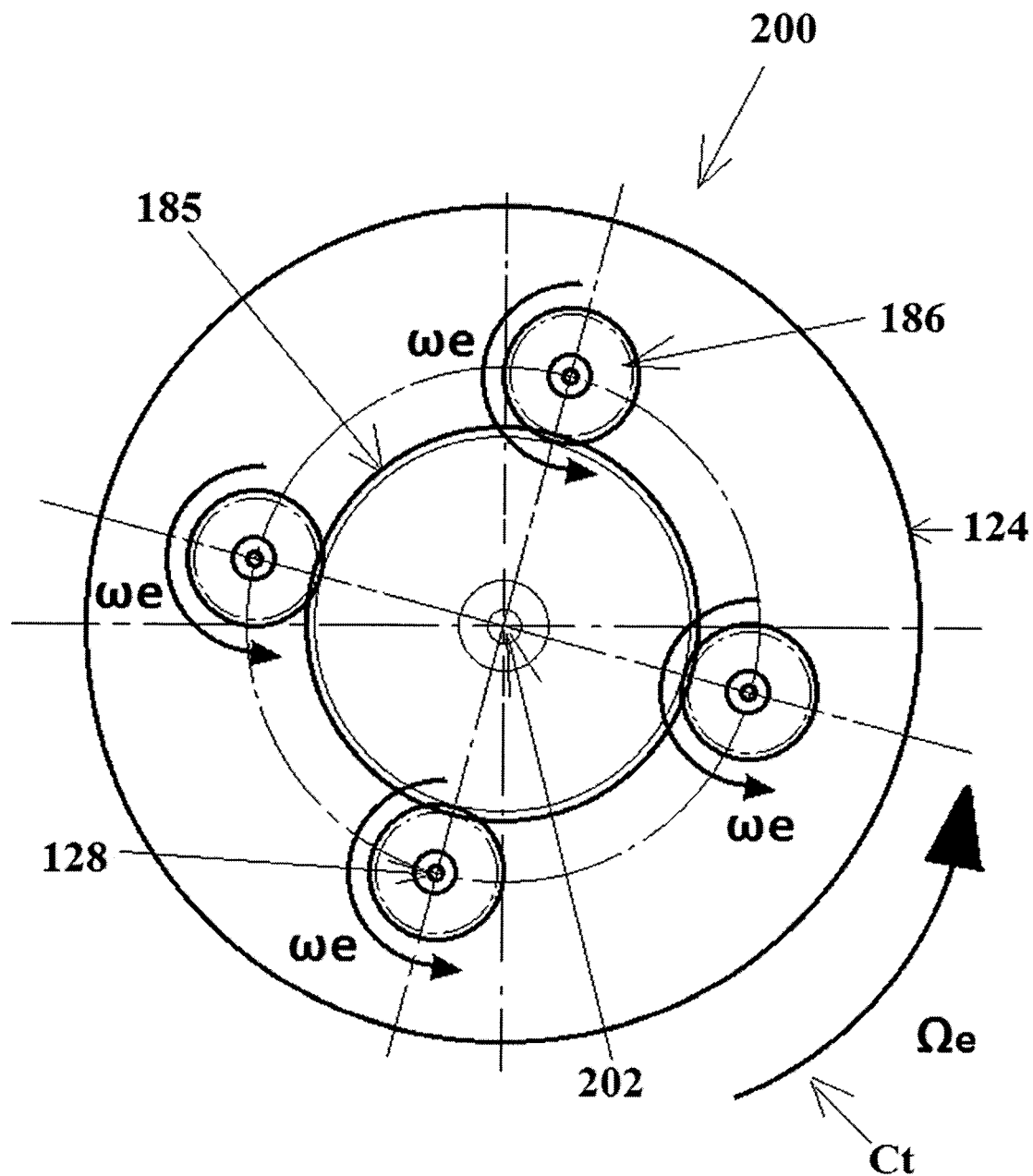
FIG. 43 is a schematic section plan view, taken along line B-B of FIG. 36, of the upper plate (Pcs) of the rotor assembly (Rot) of the MGCFEVR, showing the rotational direction of the moving (rotating) parts and the direction of the generated centrifugal forces, along with the rotating direction of the lower upper plate (Pcs) and the gears (Ena) meshing with the main gear (Enc)

More specifically, when each GCFEVR-1 101 includes a guiding bar (Fcht) 132 and two sliding masses (M) 120, a minimum of two GCFEVR-1s 101 oriented 90° relative to one another are required to get a constant output torque (Ct), with the two GCFEVR-1s 101 preferably equally angularly spread (180°) apart from each other within the rotor assembly (Rot) 200. Preferably, as shown in FIGS. 42 to 44, for better dynamic balance of the rotor assembly (Rot) 200, a minimum of four GCFEVR-1s 101 equally angularly spread (90°) apart within the rotor assembly (Rot) 200 and respectively positioned at 0°, 45°, 90° and 135° respectively, relative to each other. Preferably, for even better dynamic balance of the rotor assembly (Rot) 200, a multiple of these four GCFEVR-1s 101 equally angularly spread apart within the rotor assembly (Rot) 200 and respectively positioned at 0°, 45°, 90° and 135° (per group of four) relative to each other (not shown) is required.

Figure 46:
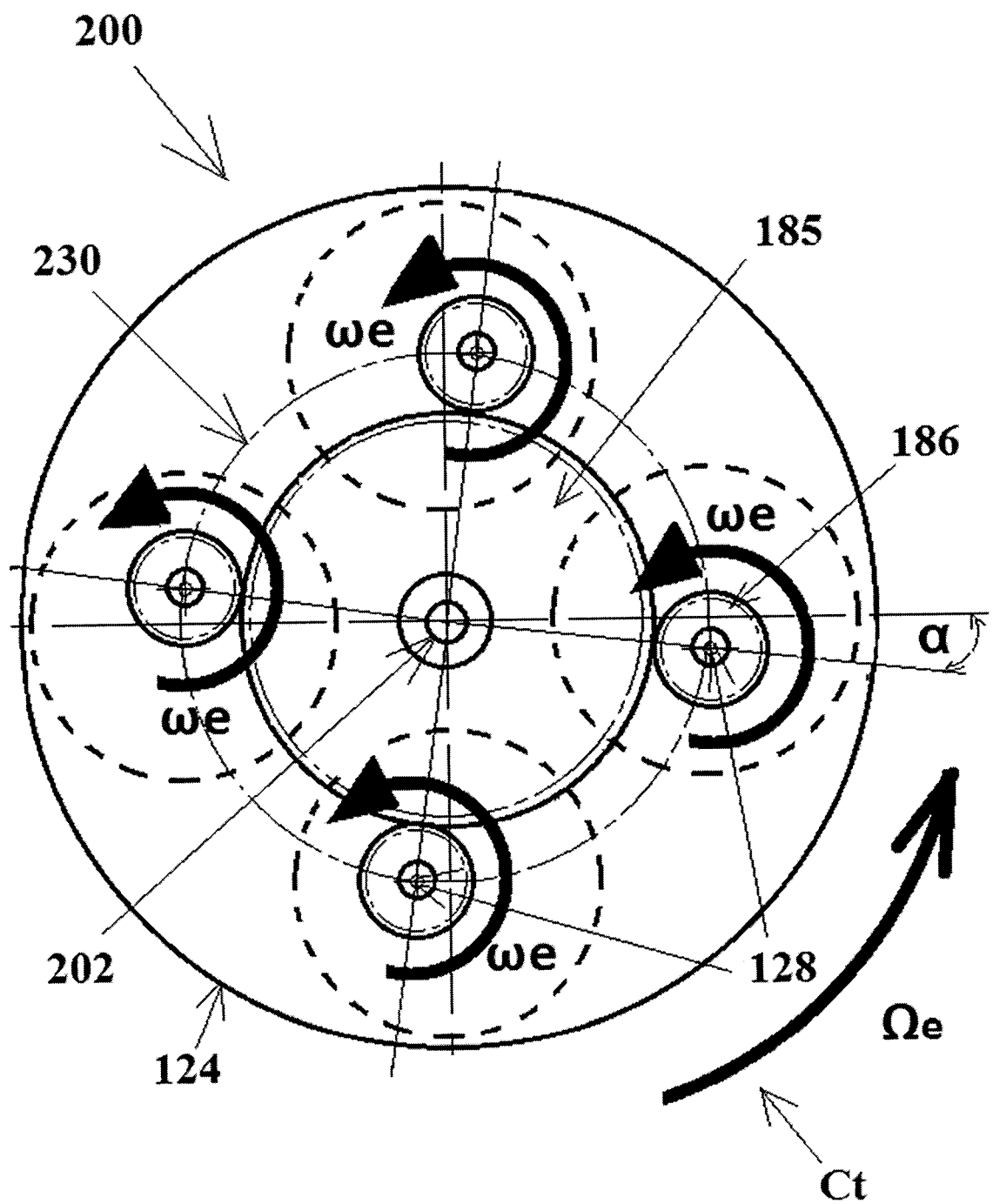
FIG. 46 is a schematic section plan view, taken along line B-B of FIG. 40, of the upper plate (Pcs) of the rotor assembly (Rot) of the MGCFEVR, showing the rotational direction of the moving (rotating) parts and the direction of the generated centrifugal forces, along with the rotating direction of the lower upper plate (Pcs) and the gears (Ena) meshing with the main gear (Enc)

Alternatively, when each GCFEVR-1 101 includes a slidable eccentric wheel (Re) 190 of mass (M) 120, a minimum of four GCFEVR-1s 101 oriented 90° relative to one another are required to get a constant output torque (Ct), with the four GCFEVR-1s 101 preferably equally angularly spread (90°) apart from each other within the rotor assembly (Rot) 200, as shown in FIGS. 45 to 47. Preferably, for better dynamic balance of the rotor assembly (Rot) 200, a multiple of these four GCFEVR-1s 101 equally angularly spread apart within the rotor assembly (Rot) 200 and respectively positioned at 0°, 90°, 180° and 270° (per group of four) relative to each other (not shown) is required.

Examples of Use of this Machine:
The MGCFEVR 110 can be used:
  to generate electrical energy by having the power torque feeding a electric generator;
  as an engine for all types of ground vehicles and others.

(VI)—Functioning of the Machine Generating Centrifugal Forces from Eccentrics with Variable Radius (MGCFEVR), with Linear Movement The MGCFEVR 110 with linear movement includes two (2) subsets that could be totally independent from one another in relation with their respective movement. These two subsets are:
  1. a chassis (Ch) 140 of the MGCFEVR 110; and
  2. at least one GCFEVR 100 mounted on or integrated into the chassis (Ch) 140.

The at least one GCFEVR 100 subset typically starts functioning (rotating about its respective rotating shaft (Axt) 128), for example, using an electric motor 182, a MGCFEVR 110 with rotating movement or the like. The rotation of the GCFEVR 100 does not directly generate movement of the chassis (Ch) 140. The moving chassis (Ch) 140 can be blocked from any movement without having any incidence or effect onto the functioning of the at least one GCFEVR 100.

The functioning (rotation) of the at least one GCFEVR 100 generates centrifugal forces (Fc) into a predetermined direction. The fact that the at least one GCFEVR 100 is mounted on or integrated into the chassis (Ch) 140 makes the latter undergoing the effect of the centrifugal forces (Fc).

Accordingly, the centrifugal forces (Fc) will act onto the entire chassis (Ch) 140 as external forces, each generating a thrust according to their direction and orientation of the respective GCFEVR 100. This direction of the centrifugal forces (Fc) could be modified with the rotation of the mass support members (SuM) 170 relative to the respective lower bore (Tpi) 126 in the case of GCFEVR-2s 102 for example.

The energy and the power of the chassis (Ch) 140 can be transmitted to any machine (or vehicle or the like) containing the MGCFEVR 110 with linear movement.

The rotation of the shafts (Axt) 128 produces the generation of a resulting force from the centrifugal forces (Fc) along a predetermined direction (in line with the shifting distance (e)), such that the entire chassis 140 therefore undergoes a constant thrusting force (Fp) into that predetermined direction, due to the centrifugal forces (Fc).

The values of the shifting distance (e) and the rotational or angular velocity (ωe) are the parameters determining the variation of the value of the output thrust (Fp).

Any body linked to or carrying this MGCFEVR 110 with linear movement will directly undergo the thrusting force (Fp) generated thereby.

To achieve this, the direction of rotation of the rotating shafts (Axt) 128 and the eccentric mass system 130 (guiding bars (Fcht) 132, the eccentric wheels (Re) 190, mass support member 170 with mass driving member 166 and the like) has to be appropriately selected, with all shifting distances (e) or rotation angle (θ) having the same orientation and value, as explained hereinabove and shown throughout FIGS. 12, 20 and 60-75.

More specifically, when each GCFEVR-1 101 includes a guiding bar (Fcht) 132 and two sliding masses (M) 120, a minimum of four GCFEVR-1s 101 are required to get a constant output thrusting force (Fp), with the two GCFEVR-1s 101 of each pair oriented 90° relative to one another and having a same rotational direction, and both pairs rotating into the opposite direction relative to one another while being in a same orientation, as shown in FIGS. 64 and 65. Preferably, for even better dynamic balance (reduced vibrations) of the MGCFEVR 110, a multiple of these four GCFEVR-1s 101 equally angularly oriented relative to each other (not shown) within the MGCFEVR 110 is required.

Alternatively, when each GCFEVR-1 101 includes a slidable eccentric wheel (Re) 190 of mass (M) 120, a minimum of eight GCFEVR-1s 101 are required to get a constant output thrusting force (Fp), with two sets of four GCFEVR-1s 101 oriented 90° relative to one another, and each set having two pairs of GCFEVR-1s 101 having the same orientation and rotating into the opposite direction relative to one another, with each pair having GCFEVR-1s 101 oriented 180° relative to one another in a direction perpendicular to the direction of the thrusting force (Fp) and having opposite rotational directions, as shown in FIGS. 72 and 73. Preferably, for even better dynamic balance (reduced vibrations) of the MGCFEVR 110, a multiple of these eight GCFEVR-1s 101 equally angularly oriented relative to each other (not shown) within the MGCFEVR 110 is required.

Examples of Use of this Machine:
easy application of a thrusting force to any transit vehicle essentially following a track such as ferries, boats, trains, etc.
engine for the aerospace field, as for spacecrafts, or for watercrafts, or underwater vehicles, etc.
the possibility to cancel the gravitational weight of a body, by providing the thrusting force in a direction opposite to that of the gravity.

(VII)—Remarks on the Functioning of the Machine Generating Centrifugal Forces from Eccentrics with Variable Radius (MGCFEVR)

The MGCFEVR 110 can be used to generate a movement (rotation or linear) in a continuous way, but also in an alternating way by programming a change of the direction of the generated centrifugal forces (Fc) such that the motor thrust (Fp) or the motor torque (Ct) reverses its direction, that will first brake the original movement before restarting in the other direction, after reaching a null thrust or torque value there between.

Advantages of the Machine Generating Centrifugal Forces from Eccentrics with Variable Radius (MGCFEVR)

To generate mechanical energy under the form of either a rotating movement or a linear thrust, the MGCFEVR 110 exploits a source of energy which:
is endless;
is everywhere in the Universe, therefore exploitable outside of the atmospheric environment, and no need of carrying it;
completely green (without any pollution);
easy to access;
usable by everybody;
almost free (of charge);

the output thrust (Fp), in the case of the machine with linear movement, is totally independent of any specific environment the machine is in, to operate.

Alternatives

Although the invention described hereinabove and shown in the figures is represented has being into a generally horizontal orientation plane, one having ordinary skills in the art would easily understand that any other plane (non-horizontal) could be considered without deviate from the scope of the present invention.

Furthermore, it would be obvious that many different technical solutions could considerably reduce the different frictional coefficients, and therefore reduce the overall internal resistive work of the machine 110.

In one embodiment, the masses (M) 120 could not abut onto the perimeter of the corresponding lower bore (Tpi) 126 but rather abut onto a stopper (not shown) on the guiding bar (Fcht) 132 or an end of the internal slot 121 (in the case of an eccentric wheel (Re) 190), for at least an angular section of their trajectory 150 in which they are closer to the geometrical center of their respective lower bore (Tpi) 126 than the their respective center of rotation. It is noted that in such a case, along the portion of their trajectory 150 in which the masses (M) 120 abut their respective stopper, the output torque or thrust generated would be transmitted via their respective shaft (Axt) 128 instead of via the lower plate (Pci) 122 or (Pli) 123.

As shown in FIG. 78, such an alternative embodiment is illustrated, in which the two masses (M) 120 sliding along the guiding bar (Fcht) 132 are electric motors (Mot) 182 that enable the rotation of the moving parts (guiding bar (Fcht) 132, motors (Mot) 182 and a freely rotatably mounted shaft (Axt) 128) within a bore (Tpi) 126 extending through a lower plate (Pci), (Pli), 122, 123 and the bore 126 mechanically linking to the motors 182 via a gear system 250 including a motor gear (Enm) 183 extending externally around motor 182 thereof and meshing with a internal gear 254 of the bore 126, or the like.

Although not illustrated in all embodiments, as shown in FIG. 39, when compared to FIG. 36, there are shown bearing blocks (Pal2) 186 at both ends of each shaft (Axt) 128, which is the preferred configuration in order to improve smoothness and avoid shaft vibrations during operation of the machine 110. Most embodiments are illustrated with only one bearing blocks (Pal2) 186 rotatably supporting each shaft (Axt) 128 essentially for better clarity of the Figures.

Although not illustrated in the figures (hence not specifically described), it would be obvious to one having ordinary skills in the art that other conceptions of the GCFEVR 100, 101, 102 and the MGCFEVR 110 could be considered, and that any substitution of GCFEVRs 100, 101, 102 could be performed amongst most of the different embodiments shown and described herein above (although some substitutions would not be possible depending of the type of MGCFEVR 110) without deviate from the scope of the present invention.

(VIII)—Balance of Energy for an Embodiment of the Machine Generating Centrifugal Forces from Eccentrics with Variable Radius (MGCFEVR)

The following demonstration shows that the power generated by the rotor assembly (Rot) 200 of a MGCFEVR 110 is not directly provided by the motors 182 powering the GCFEVRs 100, but only indirectly via the generation of centrifugal forces (Fc), as opposed to the same machine not equipped with GCFEVRs 100 but only motors 182 in which the power of the rotor assembly 200 is directly provided by the motors 182. It is noted that the non-numeral references used hereinafter do not necessarily coincide with the corresponding non-numeral references used herein above.

Considering the case of a MGCFEVR 110 with rotating movement and equipped with GCFEVR-2s 102 having an eccentric closed trajectory (Traf) 170 located on two mass planes 172, 172', as shown in FIG. 79.

The components forming the mobile portion driven in rotation by the motor (Mot) 182 of the GCFEVR-2 102 are the rotating shaft (Axt) 128, the mass driving members (Mte) 166, the gears of the rotation direction inverter (Isrot) 226 and the masses (M) 120, all forming a rotating group (EnsT) 260 having a moment of inertia (J(EnsT)) relative to the center of the rotating shaft (Axt) 128.

In order to drive the rotating group 260 up to a predetermined rotational velocity (ω), the motor 182 must supply an energy (Ef) equals to:

$$Ef = (E_\omega + E_{frot}) = \left(\frac{1}{2} \times J_{EnsT} \times \omega^2\right) + E_{frot}$$

If the resisting (friction) forces (Efrot) are neglected, the law of conservation of energy requires that all the supplied energy (Ef=Eω) is stored, in the form of kinetic energy, into the rotating group (EnsT) 260 since it does not undergo any external force that could dissipate that supplied energy (or a portion thereof). The only forces that get applied onto the rotating group (EnsT) 260 are the centrifugal forces (Fc) generated by the masses (M) 120 and they are centrally oriented (their direction always extend through the center of rotation) such that they do not generate any rotational torque that could oppose to the rotational movement. This means that the supplied energy (Ef) remains totally stored within the rotating group (EnsT) 260 and is not dissipated by any external force. In practice, this supplied energy (Ef) is only dissipated by the friction due to the rolling (or displacement of the masses (M) 120 along the trajectory (Traf) 150 of, or formed into, the mass support member (SuM) 170.

The above means that, once the motor (Mot) 182 has supplied the energy (Ef=Eω+Efrot) required to bring the rotating group (EnsT) 260 up to the predetermined rotational velocity (ω), the motor (Mot) 182 only needs to supply enough energy (Efrot) required to compensate all the frictional forces while maintaining the rotational velocity (ω) of the rotating group (EnsT) 260 constant. The frictional forces can be minimized via a proper conception and a good lubrication, such that the supplied energy would be as low as possible.

We have to remind that the functioning of the GCFEVR-2 102 at a constant rotational velocity (ω) and the maintaining of the velocity requires, at the beginning, an energy equals to (Ef) (see equation above), and in a continuous fashion thereafter, a minimal and constant amount of energy (Efrot) to counteract the frictional forces and prevent them from dissipating the energy (Eω) stored into the rotating group (EnsT) 260.

And, the fact of maintaining the functioning of a GCFEVR 102 at a constant rotational velocity (ω) generates, onto the support where it is connected to, constant centrifugal forces (Fc).

Now referring to FIG. 80 representing a MGCFEVR 110 equipped with four (4) GCFEVR-2s 102 identical to each other, meaning that having these four GCFEVR-2s 102 rotating at the same rotational velocity (ω), each GCFEVR-2 102 consumes the same amount of energy and generates the same resultant of centrifugal forces (Fc).

As represented in FIG. 80, the two GCFEVR-2s (G1) and (G2) are located at a distance (R(1-2)) from the center of rotation of the rotor assembly (Rot) 200 they are connected to, and the two GCFEVR-2s (G3) and (G4) are located at a distance (R(3-4)) from the center of rotation of the rotor assembly (Rot) 200 they are connected to, with distance (R(3-4)) being twice the distance (R(1-2)).

It is therefore obvious that the rotor assembly (Rot) 200 with the four GCFEVR-2s 102 has a constant moment of inertia (Jrot) relative to the center of rotation, and this remains valid with the functioning of one or more of the four GCFEVR-2s 102.

In the first case, if only (G1) and (G2) are being respectively driven at the same rotational velocity (ω), each will require the same quantity of energy and will generate a resultant of the centrifugal forces (Fc) remaining constant as long as the rotational velocity (ω) remains constant. These resultants (Fc) will apply onto the rotor assembly (Rot) 200 at a distance (R(1-2)) on either side of the axis of rotation of the rotor assembly (Rot) 200. The torque (C(1-2)) acting on the rotor assembly (Rot) 200 will therefore be equal to:

$$C_{(1-2)} = 2 \times Fc \times R_{(1-2)}$$

In the second case, if only (G3) and (G4) are being respectively driven at the same rotational velocity (ω), each will require the same quantity of energy and will generate a resultant of the centrifugal forces (Fc) remaining constant as long as the rotational velocity (ω) remains constant. These resultants (Fc) will apply onto the rotor assembly (Rot) 200 at a distance (R(3-4)) on either side of the axis of rotation of the rotor assembly (Rot). The torque (C(3-4)) acting on the rotor assembly (Rot) 200 will therefore be equal to:

$$C_{(3-4)} = 2 \times F_c \times R_{(3-4)} = 4 \times Fc \times R_{(1-2)} = 2 \times C_{(1-2)}$$

Since, in this example, R(3-4)=2×R(1-2).

For a rotation of the rotor assembly (Rot) 200 by an angle (α), the work T(1-2) that is transmitted to the rotor assembly (Rot) 200 is, in the first case above:

$$T_{(1-2)} = C_{(1-2)} \times \alpha = \frac{1}{2} \times J_{rot} \times \alpha'^2_{(1-2)}$$

From this, the rotational or angular velocity (α'(1-2)) that the rotor assembly (Rot) 200 will reach after a rotation angle (α) is:

$$\alpha'_{(1-2)} = \sqrt{\frac{2 \times C_{(1-2)} \times \alpha}{J_{rot}}} = 2 \times \sqrt{\frac{F_c \times R_{(1-2)} \times \alpha}{J_{rot}}}$$

The rotor assembly (Rot) 200 will have, in this first case, a power of:

$$P_{(1-2)} = C_{(1-2)} \times \alpha'_{(1-2)}$$

$$P_{(1-2)} =$$

-continued $$2 \times Fc \times R_{(1-2)} \times 2 \times \sqrt{\frac{F_c \times R_{(1-2)} \times \alpha}{J_{rot}}} = 4 \times \sqrt{\frac{Fc^3 \times R_{(1-2)}^3 \times \alpha}{J_{rot}}}$$

$$P_{(1-2)} = 4 \times \sqrt{\frac{Fc^3 \times R_{(1-2)}^3 \times \alpha}{J_{rot}}}$$

And similarly for the second case above, the work T(3-4) transmitted to the rotor assembly (Rot) 200 is:

$$T_{(3-4)} = C_{(3-4)} \times \alpha = 2 \times C_{(1-2)} \times \alpha = \frac{1}{2} \times J_{rot} \times \alpha'^2_{(1-2)}$$

From this, the rotational or angular velocity ($\alpha'$(3-4)) that the rotor assembly (Rot) 200 will reach after a rotation angle ($\alpha$) is:

$$\alpha'_{(3-4)} = \sqrt{\frac{4 \times C_{(1-2)} \times \alpha}{J_{rot}}} = 2 \times \sqrt{\frac{2 \times F_c \times R_{(1-2)} \times \alpha}{J_{rot}}}$$

The rotor assembly (Rot) 200 will have, in this second case, a power of:

$$P_{(3-4)} = C_{(3-4)} \times \alpha'_{(3-4)}$$

$$P_{(3-4)} = 4 \times Fc \times R_{(1-2)} \times 2 \times \sqrt{\frac{2 \times F_c \times R_{(1-2)} \times \alpha}{J_{rot}}}$$

$$P_{(3-4)} = 8 \times \sqrt{2} \times \sqrt{\frac{Fc^3 \times R_{(1-2)}^3 \times \alpha}{J_{rot}}} = 11,$$

$$3 \times \sqrt{\frac{Fc^3 \times R_{(1-2)}^3 \times \alpha}{J_{rot}}}$$

$$P_{(3-4)} = 11, 3 \times \sqrt{\frac{Fc^3 \times R_{(1-2)}^3 \times \alpha}{J_{rot}}}$$

If we take ($\alpha=2\pi$), after one complete rotation, we would have (with constants being rounded):

$$P_{(1-2)} = 10 \times \sqrt{\frac{Fc^3 \times R_{(1-2)}^3}{J_{rot}}}$$

and $$P_{(3-4)} = 28, 32 \times \sqrt{\frac{Fc^3 \times R_{(1-2)}^3}{J_{rot}}}$$

Therefore, it is obvious that locating the GCFEVR-2 102 further away from the center of the rotor assembly (Rot) 200 increases the power thereof. And this without increasing the power (Ef/second) of the motor (Mot) 182 driving the GCFEVR-2 102 since the angular velocity ($\omega$), and consequently the centrifugal forces (Fc), remains constant.

In a general way, if we attach a GCFEVR 100 to a rotor assembly (Rot) 200 at a distance (radius—r) from the center of rotation of the rotor assembly 200 and we drive the GCFEVR 100 at a constant rotational velocity, the GCFEVR 100 will generate a constant centrifugal force (Fc) applied onto the rotor assembly (Rot) 200 as an external force (while consuming a minimal and constant, over time, amount of energy due to the frictional forces). This give: (1) a minimal and constant energy consumption of the GCFEVR 100, (2) a constant centrifugal force (Fc), and (3) a torque C(Rot) driving the rotor assembly (Rot) 200 into rotation equals to:

$$C_{(Rot)} = Fc \times r$$

The rotor assembly (Rot) 200 will therefore have, after a 360° (or $2\pi$ radians) rotation, a power (P(Rot)) of:

$$P_{(Rot)} = \sqrt{\frac{4 \times \pi \times Fc^3}{J_{rot}}} \times \sqrt{r^3}$$

with (1) (Jrot) being a constant (moment of inertia of the group consisting of the rotor assembly (Rot) 200 and the GCFEVR 100), and (2) (Fc) being also a constant (centrifugal force generated by the GCFEVR 100 and applied onto the rotor assembly (Rot) 200).

We therefore get an equation of the power (P(Rot)) developed by the rotor assembly (Rot) 200, after a complete rotation thereof, in the form of:

$$P_{(Rot)} = \text{Constant} \times \sqrt{r^3}$$

Accordingly, a typical curve of the power (P(Rot)) developed by the rotor assembly (Rot) 200, for a predetermined rotation angle ($\alpha$), varying with the distance (r) of the location of the GCFEVR 100 relative to the center of rotation of the rotor assembly (Rot) 200 is shown in FIG. 81, with a low power consumption of the GCFEVR 100.

If we expand the above equation, by incorporating the value of the centrifugal force (Fc), we get:

$$P_{(Rot)} = \sqrt{\frac{4 \times \pi \times M^3 \times R_M^3 \times r^3}{J_{rot}}} \times \omega^3$$

with: (1) (M) 120 being a constant (masses generating centrifugal forces), (2) ($R_M$) being a constant (radius of the trajectory (Traf) 150 of the masses (M) 120 relative to the center of the rotating shaft (Axt) 128 of the GCFEVR 100), (3) ($\omega$) being a constant (angular velocity of the rotating shaft (Axt) 128 driving the masses (M) 120 into their movement along the trajectory (Traf) 150), and (4) (r) being also a constant (distance between the center of the rotating shaft (Axt) 128 of the GCFEVR 100 and the center of rotation of the rotor assembly (Rot) 200).

This highlights the fact that, for a constant power consumption (Ef) of the GCFEVR 100 (which induces a constant angular velocity ($\omega$) of the rotating shaft (Axt) 128 thereof), the value of the power (P(Rot)) of the rotor assembly (Rot) 200 varies depending on the three (3) parameters (M, $R_M$, and r).

This proves that the energy inducing the rotation of the rotor assembly (Rot) 200 and the energy inducing the rotation of the GCFEVR 100 are totally independent from one another.

For a better understanding of the above, the following illustrates a similar case with a conventional mechanics machine wherein the rotor assembly (Rot) 200 is driven into rotation directly by the motors (Mot) 182, as shown in the schematic diagram of FIG. 82.

Each motor (Mot) 182 is mounted onto the rotor assembly (Rot) 200 and a sprocket (Eng) 262 of radius (Reng) mounted at the end of the shaft 128 meshes with a corresponding crown gear (Cor(1-2)) 264 or (Cor(3-4)) 266 fixed to the chassis 140. By activating the motor 182 (generating a motor torque ($C_{mot}$)), the sprocket 262 meshing with the fixed crown gear 264, 266 induces a force (F) acting onto the rotor assembly (Rot) 200 perpendicularly to the corresponding shaft 128 of the motor 182. This generates a torque ($C_{Rot}$) acting on the rotor assembly (Rot) 200 equals to the force (F) times the distance between the center of rotation of the rotor assembly 200 and the center of the shaft of the motor 182—radius (R(i)) represented, by example by R(1-2) in FIG. 82, such that:

$$C_{Rot} = F \times R_i$$

with $$F = \frac{C_{mot}}{R_{eng}}$$

then $$C_{Rot} = \frac{C_{mot}}{R_{eng}} \times R_i$$

The angular velocity ($\omega_{Rot}$) of the rotor assembly (Rot) 200 is due to the angular velocity ($\omega_{mot}$) of the motor 182 and is:

$$\omega_{Rot} = \frac{\omega_{mot} \times R_{eng}}{R_i}$$

This gives the equation of the power ($P_{Rot}$) of the rotor assembly (Rot) 200 as:

$$P_{Rot} = C_{Rot} \times \omega_{Rot}$$

$$P_{Rot} = \frac{C_{mot}}{R_{eng}} \times R_i \times \frac{\omega_{mot} \times R_{eng}}{R_i}$$

$$\boxed{P_{Rot} = C_{mot} \times \omega_{mot}}$$

This last equation shows that the power ($P_{Rot}$) of the rotor assembly (Rot) 200 only depends on the power of the motor 182 and no other parameter. This is due to the fact that the energy inducing rotation of the rotor assembly (Rot) 200, in this case of FIG. 82, is the energy transmitted by the motor 182.

When applying the first principle of Thermodynamics (Law of the conservation of energy), the energy considered is only the energy supplied by the motor 182. But, in the case of the MGCFEVR 110 equipped with GCFEVRs 100, the application of the Law of the conservation of energy must account for, in addition to the energy supplied by the motor 182, the energy induced by the existence of the centrifugal forces (Fc), namely (as described hereinabove), the energy inducing (driving) the expansion of the Universe.

All the explanations provided into this balance of energy section have been confirmed by a prototype from which we can perfectly distinguish the independence of the energy inducing the rotation of the rotor assembly (Rot) 200 and the energy inducing the rotation of the GCFEVR 100. In fact, braking the rotor assembly (Rot) 200 or allowing it to freely rotate does not modify or affect the consumption or the speed of the motor 182 driving the rotating shaft (Axt) 128 of the GCFEVR 100 at all.

Although the present invention has been described with a certain degree of particularity, it is to be understood that the disclosure has been made by way of example only and that the present invention is not limited to the features of the embodiments described and illustrated herein regarding the principle of functioning of machines with the principle of the generation of centrifugal forces from eccentrics with variable radius and their applications within machines with rotating movement or linear thrusting force, but includes all variations and modifications within the scope of the invention as hereinafter claimed.

I claim:

1. A generator of centrifugal forces from an eccentric with variable radius for mounting on a chassis having a mechanical energy transmission mechanism (METM) and a rotating shaft plate mounting thereon, the mechanical energy transmission mechanism (METM) having at least a section of a bore formed thereon, said generator comprising:

a rotating shaft for freely rotatably connecting to the rotating shaft plate, said rotating shaft including a mass driving member rotatably integral therewith and driving in rotation at least one mass along an eccentric closed trajectory linkable to the mechanical energy transmission mechanism (METM), said eccentric closed trajectory being one of the at least a section of the bore and a mass support member mountable into the at least a section of the bore; said eccentric closed trajectory including a varying radius of a position of said at least one mass therealong about said rotating shaft, said eccentric closed trajectory allowing the mechanical energy transmission mechanism (METM) to carry at least a portion of a centrifugal force (Fc) generated by said at least one mass over the at least a section of the bore when said at least one mass is displaced along said varying radius about said rotating shaft; and a shaft driving system selectively driving the rotating shaft and the mass driving member in rotation within the at least a section of the bore.

2. A machine generating mechanical energy by exploiting the generation of centrifugal forces comprising:

the chassis having the mechanical energy transmission mechanism (METM) and the rotating shaft plate mounting thereon, the mechanical energy transmission mechanism (METM) having at least the section of at least one bore formed thereon; and at least one generator as defined in claim rotatably mounting on the rotating shaft plate with the eccentric closed trajectory being one of the at least a section of the at least one bore and the mass support member mountable into the at least a section of the at least one bore, said eccentric closed trajectory allowing the mechanical energy transmission mechanism (METM) to carry at least a portion of a centrifugal force (Fc) generated by said at least one mass over the at least a section of the at least one bore when said at least one mass is displaced along said varying radius about said rotating shaft, said at least a portion of the centrifugal force (Fc) being available for transmission as an output energy from said machine generating mechanical energy by exploiting the generation of said centrifugal forces.

3. A machine as defined in claim 2, wherein the rotating shaft plate is a second plate, and wherein the mechanical energy transmission mechanism (METM) includes a first plate having the at least a section of a bore formed therein.

4. A machine as defined in claim 3, further including an eccentric adjustment system selectively adjusting a position of the eccentric closed trajectory of the at least one generator relative to the at least one bore, and being operatively located between the at least one generator and the first plate.

5. A machine as defined in claim 4, wherein said mass support member includes a main body having the eccentric closed trajectory formed therein for each one of said at least on bore, and, for each said main body, said at least one mass includes a plurality of masses located along the eccentric closed trajectory, the plurality of masses being free to move radially relative to a center of respective said bore, the mass driving member displacing the plurality of masses along the eccentric closed trajectory.

6. A machine as defined in claim 5, wherein the plurality of masses located in a respective one said eccentric closed trajectory are located on a plurality of mass planes being generally perpendicular to the respective rotating shaft.

7. A machine as defined in claim 4, wherein the eccentric adjustment system is a mass support rotation system selectively displacing the mass support member relative to the at least one bore and being operatively located therebetween.

8. A machine as defined in claim 2, wherein the machine further includes a main shaft freely rotatably mounted onto the chassis with the first and second plates mounted thereon, the main shaft and the first and second plates forming a rotor assembly, thereby defining a machine with rotating movement.

9. A machine as defined in claim 8, wherein the first and second plates are fixedly mounted onto the main shaft, the machine further including a mass support rotation system being operatively located between the first plate and the mass support member and selectively displacing the mass support member relative to the at least one bore in rotation about the rotating shaft so as to selectively adjust an eccentric of the eccentric closed trajectory of the at least one mass, thereby varying centrifugal forces (Fc) generated by the at least one mass and transmitted onto the rotor assembly and adjusting an output torque (Ct) applied onto the main shaft.

10. A machine as defined in claim 2, wherein first and second plates are fixedly mounted on the chassis, the machine further including a mass support rotation system being operatively located between the first plate and the mass support member and selectively displacing the mass support member relative to the at least one bore in rotation about the rotating shaft so as to selectively adjust an eccentric of the eccentric closed trajectory of the at least one mass, thereby varying centrifugal forces (Fc) generated by the at least one mass and transmitted onto the chassis and adjusting an output thrusting force (Fp) applied thereon, and defining a machine with linear movement.

* * * * *